US007683940B2

(12) United States Patent
Fleming

(10) Patent No.: US 7,683,940 B2
(45) Date of Patent: Mar. 23, 2010

(54) STREAMING NON-CONTINUOUS VIDEO DATA

(75) Inventor: Hayden Graham Fleming, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 10/567,641

(22) PCT Filed: Sep. 10, 2004

(86) PCT No.: PCT/AU2004/001229

§ 371 (c)(1),
(2), (4) Date: Aug. 22, 2006

(87) PCT Pub. No.: WO2005/027068

PCT Pub. Date: Mar. 24, 2005

(65) Prior Publication Data

US 2006/0279628 A1    Dec. 14, 2006

(30) Foreign Application Priority Data

| Sep. 12, 2003 | (AU) | ............................. 2003905157 |
| Sep. 12, 2003 | (AU) | ............................. 2003905158 |
| Sep. 12, 2003 | (AU) | ............................. 2003905159 |
| Sep. 12, 2003 | (AU) | ............................. 2003905160 |
| Sep. 12, 2003 | (AU) | ............................. 2003905161 |
| Sep. 12, 2003 | (AU) | ............................. 2003905162 |
| Sep. 12, 2003 | (AU) | ............................. 2003905163 |

(51) Int. Cl.
*H04N 5/228* (2006.01)

(52) U.S. Cl. .............. 348/222.1; 348/207.1; 348/231.1; 348/220.1

(58) Field of Classification Search .............. 348/222.1, 348/207.1, 231.1, 220.1; 710/72, 73; 386/5, 386/109, 110
See application file for complete search history.

(56) References Cited

U.S. PATENT DOCUMENTS

| 5,596,420 | A | * | 1/1997 | Daum | .................. | 386/110 |
| 5,878,220 | A | * | 3/1999 | Olkin et al. | .................. | 709/217 |
| 5,999,634 | A | | 12/1999 | Abbott et al. | .................. | 382/103 |
| 6,167,143 | A | | 12/2000 | Badiqué | .................. | 382/107 |
| 6,542,183 | B1 | * | 4/2003 | DeAngelis et al. | .......... | 348/159 |
| 2003/0184662 | A1 | * | 10/2003 | Porter et al. | ............. | 348/231.1 |
| 2004/0174439 | A1 | * | 9/2004 | Upton | .................. | 348/222.1 |

FOREIGN PATENT DOCUMENTS

| EP | 1154649 A2 | 11/2001 |
| WO | WO 91/01539 A1 | 2/1991 |
| WO | WO 96/01022 A1 | 1/1996 |
| WO | WO 03/052711 A1 | 6/2003 |

* cited by examiner

*Primary Examiner*—Yogesh K Aggarwal
(74) *Attorney, Agent, or Firm*—Fitzpatrick, Cella, Harper & Scinto

(57) ABSTRACT

A method and apparatus for providing a plurality of sequential image data samples for display, is disclosed. A first one of the image data samples is accessed and then a second one of the image data samples is accessed. The first and second image data samples may then be provided for display, where one or more further data samples are provided in the event that the first and second image data samples are not contiguous. These further data samples indicate that image data samples are not available between the first and second image data samples.

4 Claims, 99 Drawing Sheets

Please note that this drawing page is intentionally blank

| | |
|---|---|
| [Storage Server] | |
| Hostname=localhost | Storage Server hostname or IP |
| Port=80 | Storage Server Port |
| [Viewer Framerate] | |
| MaxRate=5.0 | Maximum viewer screen framerate |
| [Last Layout] | |
| Name=Untitled protected | Name of last layout in use |
| Protected Folder=0 | Flag:1=protected (admin), 0 = user |
| [Event Notification] | |
| NotifyOperator0=0 | Flag:1=notify, 0=don't notify for Highest Priority |
| NotifyDuration0=10 | Duration of notification (secs) for Highest Priority |
| RequireAcknowledge0=0 | Flag:1=require acknowledgement for Highest Priority |
| AudioAlert0=0 | Flag:1= audio notification for Highest Priority |
| NotifyOperator1=0 | Flag:1 = notify, 0 = don't notify for High Priority |
| NotifyDuration 1=10 | Duration of notification (secs) for High Priority |
| RequireAcknowledge1=0 | Flag:1 = require acknowledgement for High Priority |
| AudioAlert 1=0 | Flag:1 = audio notification for High Priority |
| NotifyOperator2=0 | Flag:1 = notify, 0 = don't notify for MediumPriority |
| NotifyDuration2=10 | Duration of notification (secs) for MediumPriority |
| RequireAcknowledge2=0 | Flag:1=require acknowledgement for Medium Priority |
| AudioAlert2=0 | Flag:1= audio notification for Medium Priority |
| NotifyOperator3=0 | Flag:1 = notify, 0 = don't notify for Low Priority |
| NotifyDuration 3=10 | Duration of notification (secs) for Low Priority |
| RequireAcknowledge3=0 | Flag:1 = require acknowledgement for Low Priority |
| AudioAlert 3=0 | Flag:1 = audio notification for Low Priority |
| NotifyOperator4=0 | Flag:1 = notify, 0 = don't notify for Lowest Priority |
| NotifyDuration 4=10 | Duration of notification (secs) for Lowest Priority |
| RequireAcknowledge4=0 | Flag:1 = require acknowledgement for Lowest Priority |
| AudioAlert 4=0 | Flag:1 = audio notification for Lowest Priority |
| ShowLogWindow=0 | Flag:1 = show log window, 0 = hide log window |
| LogWindowX1=932 | Left position of log window in screen coordinates |
| LogWindowY1=168 | Top position of log window in screen coordinates |
| LogWindowX2=1552 | Right position of log window in screen coordinates |
| LogWindowY2=518 | Bottom position of log window in screen coordinates |

Fig. 75

| Live Events Log | | | | | |
|---|---|---|---|---|---|
| | P | Event | Camera | Date & Time | Location and Zone |
| ◇ | 1 | Door Open | Info Desk | 23/8/03 12:55:35 | Pitt Street Mall Checkout Area |
| ◇ | 3 | Motion | Cash #1 | 23/8/03 12:50:04 | Pitt Street Mall 1st Floor |
| ◇ | 2 | Door Bell | Entrance | 23/3/03 12:40:46 | Pitt Street Mall 1st Floor |
| • | 3 | Motion | Cash #3 | 23/8/03 12:36:24 | Pitt Street Mall Checkout Area |
| • | 4 | Motion | Cash #3 | 23/8/03 12:20:09 | Pitt Street Mall Food Court |
| • | 3 | Motion | Cash #3 | 23/8/03 11:55:37 | Pitt Street Mall G/F Lift Area |
| • | 4 | Door Bell | Entrance | 23/8/03 11:52:23 | Pitt Street Mall Food Court |
| • | 5 | Door Open | Entrance | 23/8/08 11:52:15 | Pitt Street Mall Checkout Area |
| ◇ | 1 | Motion | Store Room | 23/8/03 11:12:24 | Pitt Street Mall Checkout Area |

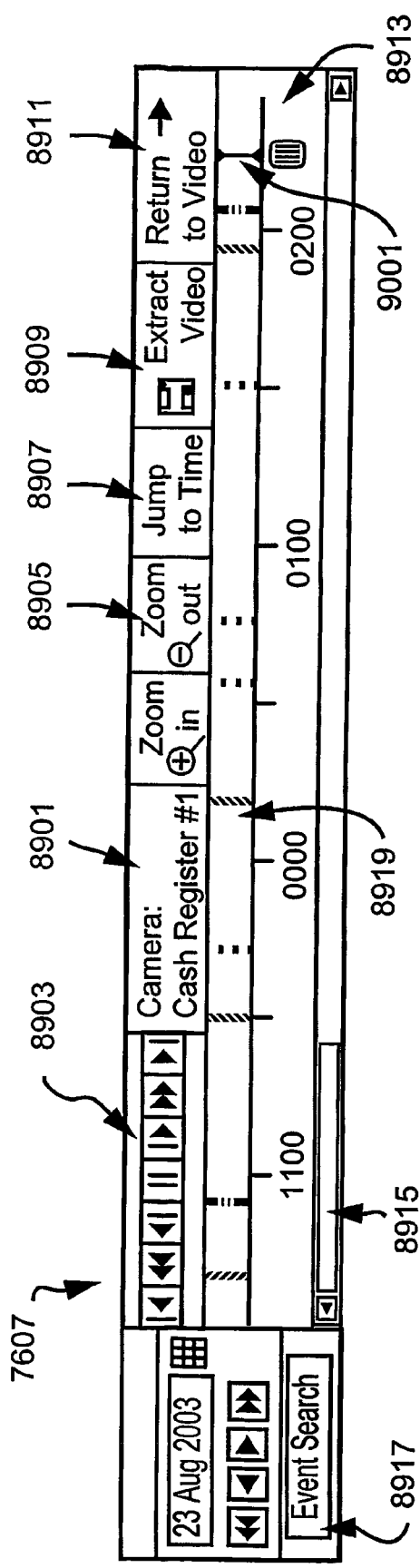
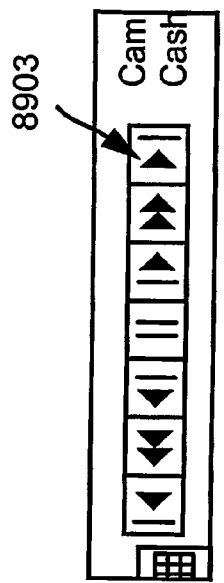
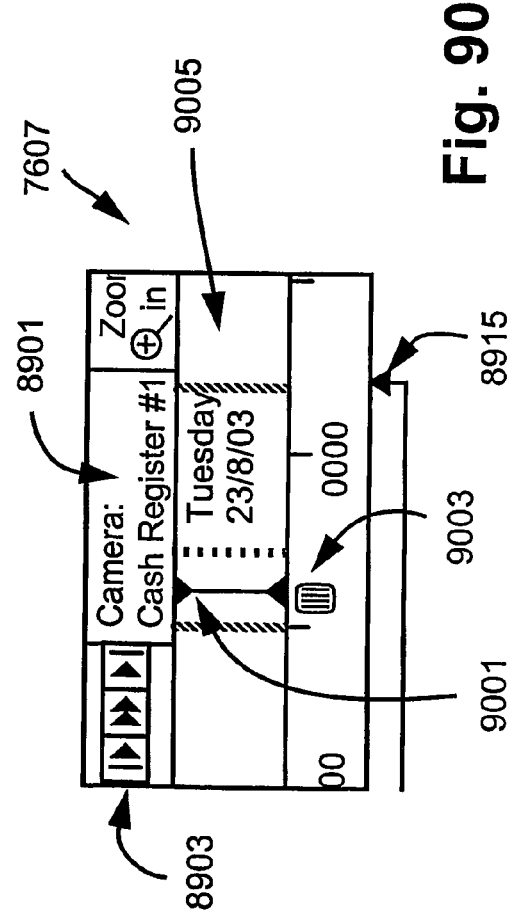
Fig. 89
Fig. 90
Fig. 91

Fig. 92

Event Search — 9200

To search for event, enter the search criteria below and click Search.

- Search for: ▨ 2. High priority ▼  Events
- Location: Pitt St Mall ▼  Zone: All Zones ▼ — 9205
- From: 21/8/03 ▼ 0800 ▲▼ hours
- To: 21/8/03 ▼ 1200 ▲▼ hours

[ Search ] — 9209  [ Stop Search ] — 9215

Search Results:

| ▲ | P | Event | Camera | Date & Time | | Location and Zone | |
|---|---|---|---|---|---|---|---|
| ⬠ | 1 | Door Open | Info Desk | 23/8/03 | 12:55:35 | Pitt St Mall | Checkout Area |
| ⬠ | 3 | Motion | Cash #1 | 23/8/03 | 12:50:04 | Pitt St Mall | 1st Floor |
| ⬠ | 2 | Door Bell | Entrance | 23/3/03 | 12:40:46 | Pitt St Mall | 1st Floor |
| • | 3 | Motion | Cash #3 | 23/8/03 | 12:36:24 | Pitt St Mall | Checkout Area |
| • | 4 | Motion | Cash #3 | 23/8/03 | 12:20:09 | Pitt St Mall | Food Court |
| • | 3 | Motion | Cash #3 | 23/8/03 | 11:55:37 | Pitt St Mall | G/F Lift Area |
| • | 4 | Door Bell | Entrance | 23/8/03 | 11:52:23 | Pitt St Mall | Food Court |
| • | 5 | Door Open | Entrance | 23/8/08 | 11:52:15 | Pitt St Mall | Checkout Area |
| ⬠ | 1 | Motion | Store Rm | 23/8/03 | 11:12:24 | Pitt St Mall | Checkout Area |

[ View Event in Camera ] — 9213   [ Cancel ] — 9217

STREAMING NON-CONTINUOUS VIDEO DATA

FIELD OF THE INVENTION

The present invention relates generally to video image processing and, in particular, to a method and apparatus for streaming non-continuous video data. The present invention also relates to a computer program product including a computer readable medium having recorded thereon a computer program for providing a plurality of sequential image data samples.

BACKGROUND

Due to recent world events, security has become a very important issue. As a result, video surveillance systems are increasingly being used both commercially and privately to monitor areas for security purposes.

Within the area of video surveillance systems, networked video surveillance technologies are now being used. Unlike conventional closed circuit television (TV) systems, networked video surveillance systems make use of standard network infrastructures, such as Internet Protocol (IP) based network infrastructures, to carry digital video signals and control signals. One advantage of networked video surveillance systems is that they allow video surveillance to be performed over existing networks such as the Internet; IP based local area networks (LANs); or IP-based virtual private networks (VPNs) running on top of a public network such as the Internet.

Typically, a networked video surveillance system comprises one or more storage servers (i.e., generally implemented as a general-purpose computer as known to those in the relevant art), which receive data from one or more video camera servers distributed on a computer network. Such a networked video surveillance system also typically comprises one or more viewing devices (e.g., computers, personal digital assistants (PDA) or phones), which can be used to view live video image data from the camera servers or stored video image data from the storage servers.

Networked video surveillance systems are part of a more general class of networked viewing and recording systems that can be used to view and record image data captured from local or remote networked video cameras. Such networked viewing and recording systems can be used for a wide variety of purposes. For example, such networked viewing and recording systems can be used for security in the surveillance of buildings and vehicles.

Networked viewing and recording systems can also be used for supervision. For example, networked viewing and recording systems can be used for checking the performance of staff within a building, or for checking the performance and progress of staff of contracted companies in remote locations.

Networked viewing and recording systems can also be used for entertainment. For example, such systems can be used for live viewing of sporting events and concerts. Another example use of such a system is for education (e.g., for distance learning).

Conventional networked viewing and recording systems, such as video surveillance systems, typically allow for the display and recording of video image data uploaded to a server from one or more remote video cameras over a network, such as the Internet. Often video image data stored on such a server and associated with a particular camera is not contiguous. This can occur, for example, because recording by the particular camera has been event-triggered or scheduled for specific durations of time only. Thus, no video image data may be stored on the server for that particular camera for a particular period of time, leaving gaps in the video image data for that particular camera.

As a result, when viewing stored video image data in parallel from multiple cameras, served from such a conventional server, the video image data may not remain synchronised. This can lead to an operator mistakenly believing that a network connection has been lost or that gaps in video image data are the result of a high degree of network traffic.

SUMMARY

It is an object of the present invention to substantially overcome, or at least ameliorate, one or more disadvantages of existing arrangements.

According to one aspect of the present invention there is provided a method of providing a plurality of sequential image data samples for display, said method comprising the steps of:

accessing a first one of said image data samples;

accessing a second one of said image data samples; and providing said first and second image data samples for display, wherein one or more further data samples are provided in the event that said first and second image data samples are not contiguous, said further data samples indicating that image data samples are not available between said first and second image data samples.

According to another aspect of the present invention there is provided apparatus for providing a plurality of sequential image data samples for display, said apparatus comprising:

means for accessing a first one of said image data samples;

means for accessing a second one of said image data samples; and means for providing said first and second image data samples for display, wherein one or more further data samples are provided in the event that said first and second image data samples are not contiguous, said further data samples indicating that image data samples are not available between said first and second image data samples.

According to still another aspect of the present invention there is provided a computer program product comprising machine-readable program code recorded on a machine-readable recording medium, for controlling the operation of a data processing apparatus on which the program code executes to perform a method of providing a plurality of sequential image data samples for display, said method comprising the steps of:

accessing a first one of said image data samples;

accessing a second one of said image data samples; and providing said first and second image data samples for display, wherein one or more further data samples are provided in the event that said first and second image data samples are not contiguous, said further data samples indicating that image data samples are not available between said first and second image data samples.

According to still another aspect of the present invention there is provided a computer program for providing a plurality of sequential image data samples for display, said program comprising:

code for accessing a first one of said image data samples;

code for accessing a second one of said image data samples; and code for providing said first and second image data samples for display, wherein one or more further data samples are provided in the event that said first and second image data samples are not contiguous, said further data samples indicating that image data samples are not available between said first and second image data samples.

Other aspects of the invention are also disclosed.

BRIEF DESCRIPTION OF THE DRAWINGS

One or more embodiments of the present invention will now be described with reference to the drawings and appendices, in which:

FIG. 51 is intentionally blank;

FIG. 75 shows an example of a viewer configuration file;

FIG. 88 shows a live event log;

FIG. 89 shows a timeline;

FIG. 90 shows a portion of the timeline of FIG. 89;

FIG. 91 shows play back controls;

FIG. 92 shows an event search dialog;

Figure 1:
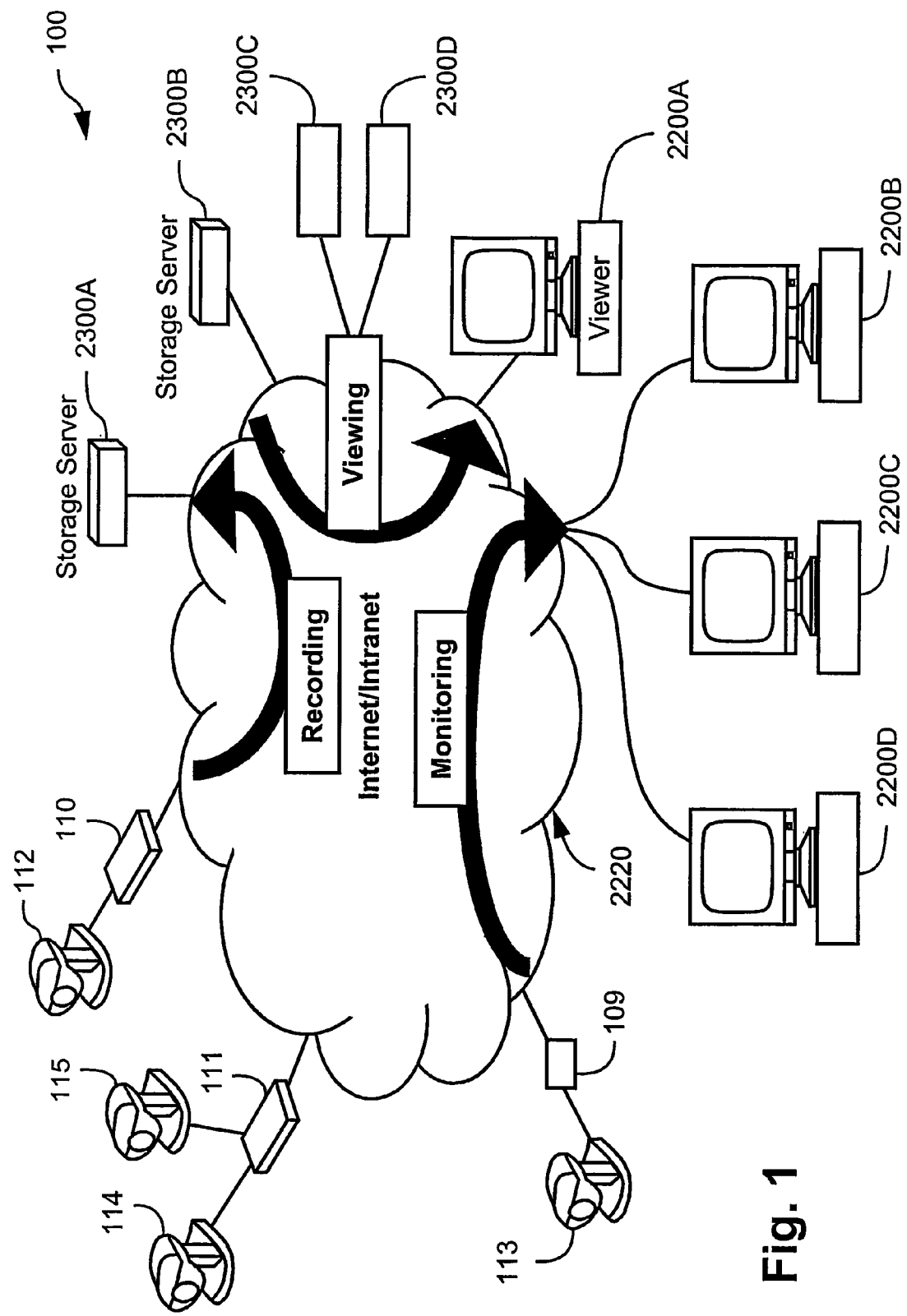
FIG. 1 is schematic diagram of a video surveillance system upon which arrangements described can be practiced.

Appendix A describes the format of blobs used in communication between the access engine and the viewers; and Appendix B describes headers, replies and commands used by the access engine and viewer.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the relevant art.

For ease of explanation the following description has been divided into Sections 1.0 to 5.0, each section including associated sub-sections.

1.0 Video Surveillance System Overview

FIG. 1 shows a video surveillance system 100. The system 100 comprises video cameras 112, 113, 114 and 115 connected to a computer network 2220, such as the Internet or an Intranet, via an associated camera server 109, 110 and 111. In some implementations the network 2220 can be a local area network (LAN). Further, in one implementation, one or more of the cameras 112-115 can be configured within an associated camera server 109-111, such that the camera and camera server are a single unit.

Some examples of proprietary cameras 112-115 are the Canon™ VC-C4 video camera. Some examples of proprietary camera servers 109-111 are the Canon™ VB150 and the Canon™ VB-C10, where the VB-C10 is an example of a model where the camera and camera server are a single unit.

Each of the cameras 112, 113, 114 and 115 and the associated camera servers 109-111, are responsible for the capture of video data representing images. The video data is output by the camera servers 109-111 as a video data stream. The camera servers 109-111 optionally comprise sensor inputs to which sensors can be connected. If a connected sensor is activated, then a camera server 109-111 can be configured to allow that sensor and an event notification is generated by the camera server 109-111.

The system 100 also comprises storage servers 2300A, 2300B, 2300C and 2300D, which can be used for monitoring the output of the sample data from any one of the camera servers 109-111 and for recording (i.e., requesting and storing) the sample data. The storage servers 2300A, 2300B, 2300C and 2300D, can also be used for accessing the sample data, for event handling and for the control of the system 100. The storage servers 2300A to 2300D will hereinafter be generically referred to as the storage server 2300, excepting where explicitly distinguished.

The video data captured by one or more of the cameras 112-115 and associated camera servers 109-111 can be uploaded as sample data, via the computer network 2220, from any one of the camera servers 109-111 to the storage server 2300. The sample data can be processed by the storage server 2300 and/or stored on a hard disk drive 2310 of the storage server (see FIG. 23), so that the sample data can be viewed by a user using a display 2314 (see FIG. 23) of the storage server 2300.

Alternatively, the sample data can be uploaded, via the computer network 2220, from the storage server 2300 to one or more viewers 2200A, 2200B, 2200C and 2200D, as seen in FIG. 1. The viewers 2200A to 2200D will hereinafter be generically referred to as the viewer 2200, excepting where explicitly distinguished. The viewer 2200 can be used by a user for processing and displaying the sample data, using a display device 2214 (see FIG. 24) configured with the viewer 2200.

The viewer 2200 can also be configured to receive the video frames directly from one or more camera servers 109-111 and to present the video frames to a user using the display device 2214.

Figure 22:
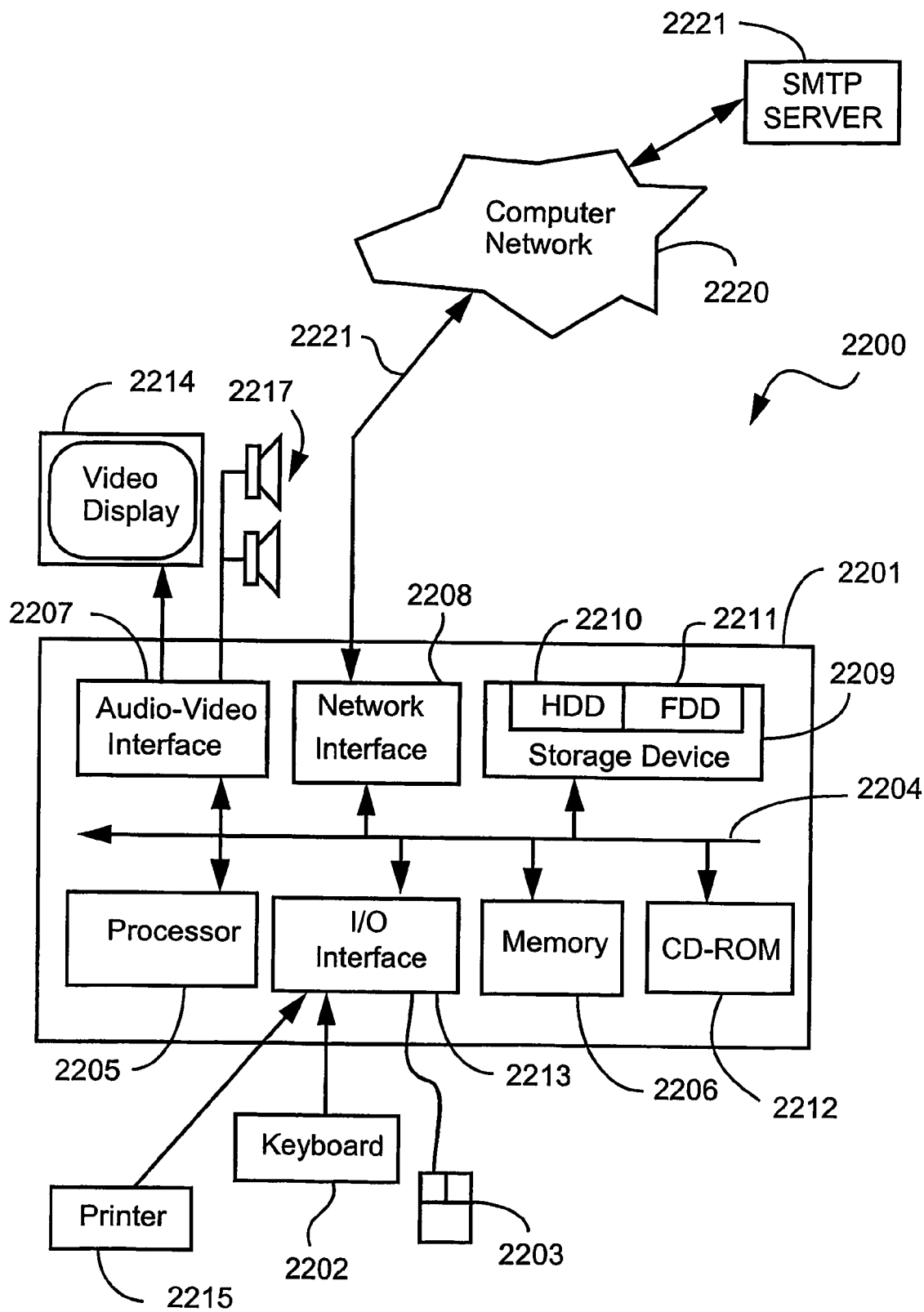
FIG. 22 is a schematic block diagram of a general-purpose computer upon which a viewer described herein can be practiced.

As seen in FIG. 22, the viewer 2200 is preferably formed by a computer module 2201, input devices such as a keyboard 2202 and mouse 2203, output devices including a printer 2215, a display device 2214 and loudspeakers 2217. A network interface 2208 configured within the computer module 2201 can be used for communicating to and from the computer network 2220, for example connectable via a network link 2221 (such as a coaxial cable, a twisted pair cable, a fibre optic cable, a wireless connection using 802.11b or Bluetooth™ or other connection type). A Modulator-Demodulator (Modem) transceiver device (not shown) incorporated within the network interface 2208 or otherwise, can also be used to obtain access to the computer network 2220, via a telephone line for example.

The computer module 2201 typically includes at least one processor unit 2205, and a memory unit 2206, for example, formed from semiconductor random access memory (RAM) and read only memory (ROM). The module 2201 also includes a number of input/output (I/O) interfaces including an audio-video interface 2207 that couples to the video display 2214 and loudspeakers 2217, an I/O interface 2213 for the keyboard 2202 mouse 2203, printer 2215 and optionally a joystick (not illustrated) or trackball (not illustrated). Optionally the module 2201 can include a touch-screen (not shown) formed by an overlaid touch-sensitive surface on the video display 2214, allowing user input by touching or moving a finger along the video display 2214 A storage device 2209 is provided and typically includes a hard disk drive 2210 and a floppy disk drive 2211. A magnetic tape drive (not illustrated) may also be used. A CD-ROM drive 2212 is typically provided as a non-volatile source of data. The components 2205 to 2213 of the computer module 2201, typically communicate via an interconnected bus 2204 and in a manner, which results in a conventional mode of operation of a computer system as known to those in the relevant art. Examples of computers on which the described arrangements can be practiced include IBM-PC's and compatibles, Sun Sparcstations or alike computer systems evolved therefrom.

Figure 23:
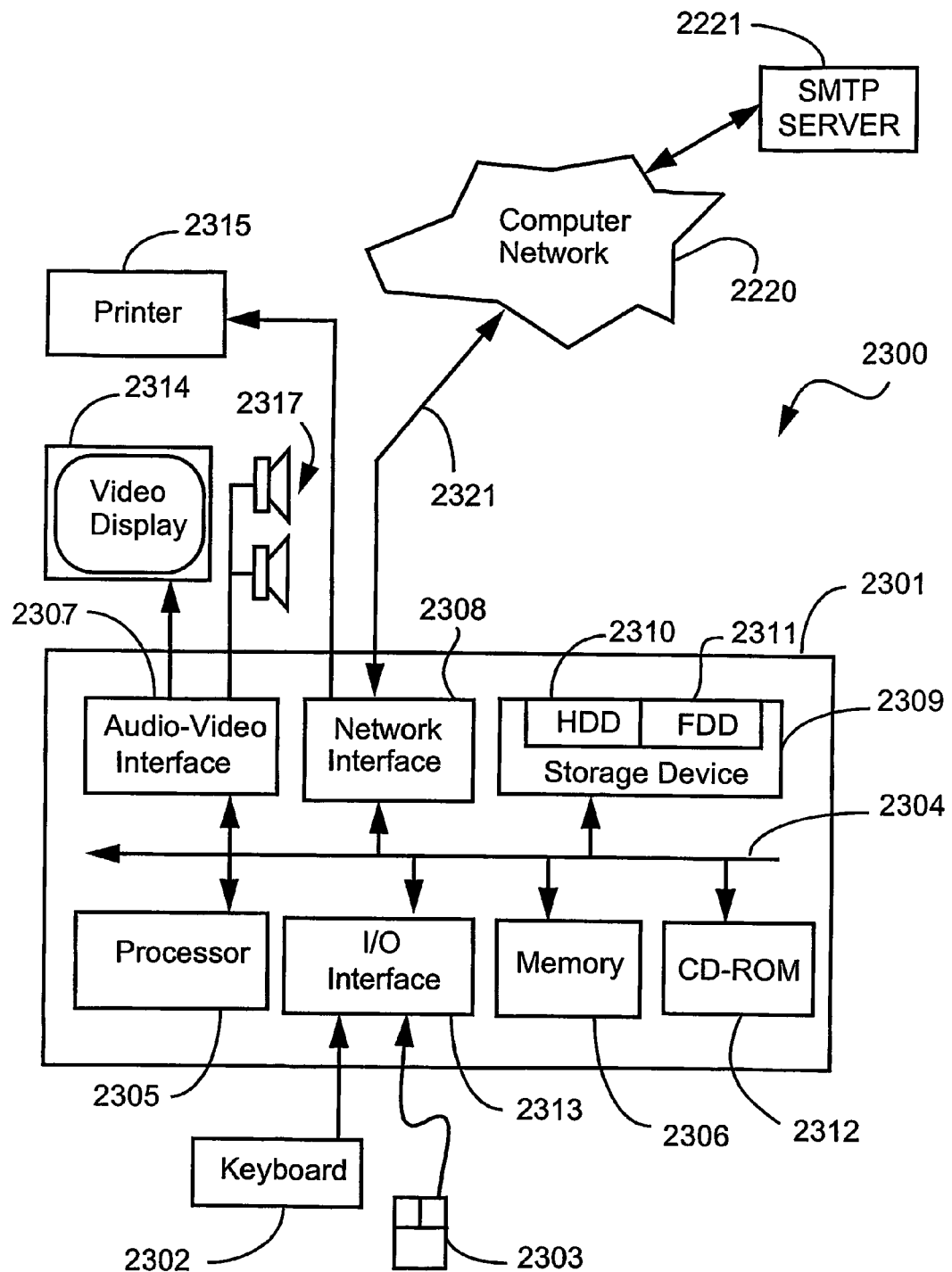
FIG. 23 is a schematic block diagram of a general-purpose computer upon which a storage server described herein can be practiced.

The storage server 2300 is also shown in detail in FIG. 23. The storage server 2300 is preferably formed by a computer module 2301, input devices such as a keyboard 2302 and mouse 2303, output devices including a printer 2315, a display device 2314 and loudspeakers 2317. A network interface 2308 is also configured within the computer module 2301 and can be used for communicating to and from the computer network 2220, for example connectable via network link 2321 (such as a coaxial cable, a twisted pair cable, a fibre optic cable, a wireless connection using 802.11b or Bluetooth™ or other connection type). A Modulator-Demodulator (Modem) transceiver device (not shown) incorporated within the network interface 2308 or otherwise, can also be used to obtain access to the computer network 2220, via a telephone line for example.

Similar to the computer module 2201, the computer module 2301 typically includes at least one processor unit 2305, and a memory unit 2306, for example formed from semiconductor random access memory (RAM) and read only memory (ROM). The module 2301 also includes an number of input/output (I/O) interfaces including an audio-video interface 2307 that couples to the video display 2314 and loudspeakers 2317, an I/O interface 2313 for the keyboard 2302, printer 2315 and mouse 2303 and optionally a joystick (not illustrated) or trackball (not illustrated). Optionally the module 2301 can include a touch-screen (not shown) formed by an overlaid touch-sensitive surface on the video display 2314, allowing user input by touching or moving a finger along the video display 2314 A storage device 2309 is provided and typically includes a hard disk drive 2310 and a floppy disk drive 2311. A magnetic tape drive (not illustrated) may also be used. Peripheral storage devices (not shown) connected to the computer module 2301 can be used. In addition, network accessible storage devices or collections of such devices (not shown), including Network Attached Storage (NAS) and Storage Area Networks (SAN), can be connected to the network 2220 and can be accessed through the network interface 2308. A CD-ROM drive 2312 is typically provided as a non-volatile source of data. The components 2305 to 2313 of the computer module 2301, typically communicate via an interconnected bus 2304 and in a manner, which results in a conventional mode of operation of such a computer system as known to those in the relevant art.

The camera servers 109-111 have a similar configuration to the computer modules 2201 and 2301. The camera servers 109-111 include a memory (e.g., memory 2306) and a processor (e.g., a processor 2305). However, the hardware configuration of the camera servers 109-111 will not be explained in further detail herein.

As described above, the storage server 2300 can be used for monitoring and handling events from sensors (for example, sensors attached to the camera servers 109-111). One of these events can include motion detection using a motion detector (not shown) connected to one or more of the camera servers 109-111 directly. Further events include heat/smoke detection using a heat/smoke detector, a door opening/closing using a limit switch, for example.

2.0 Storage Server Overview

Figure 2:
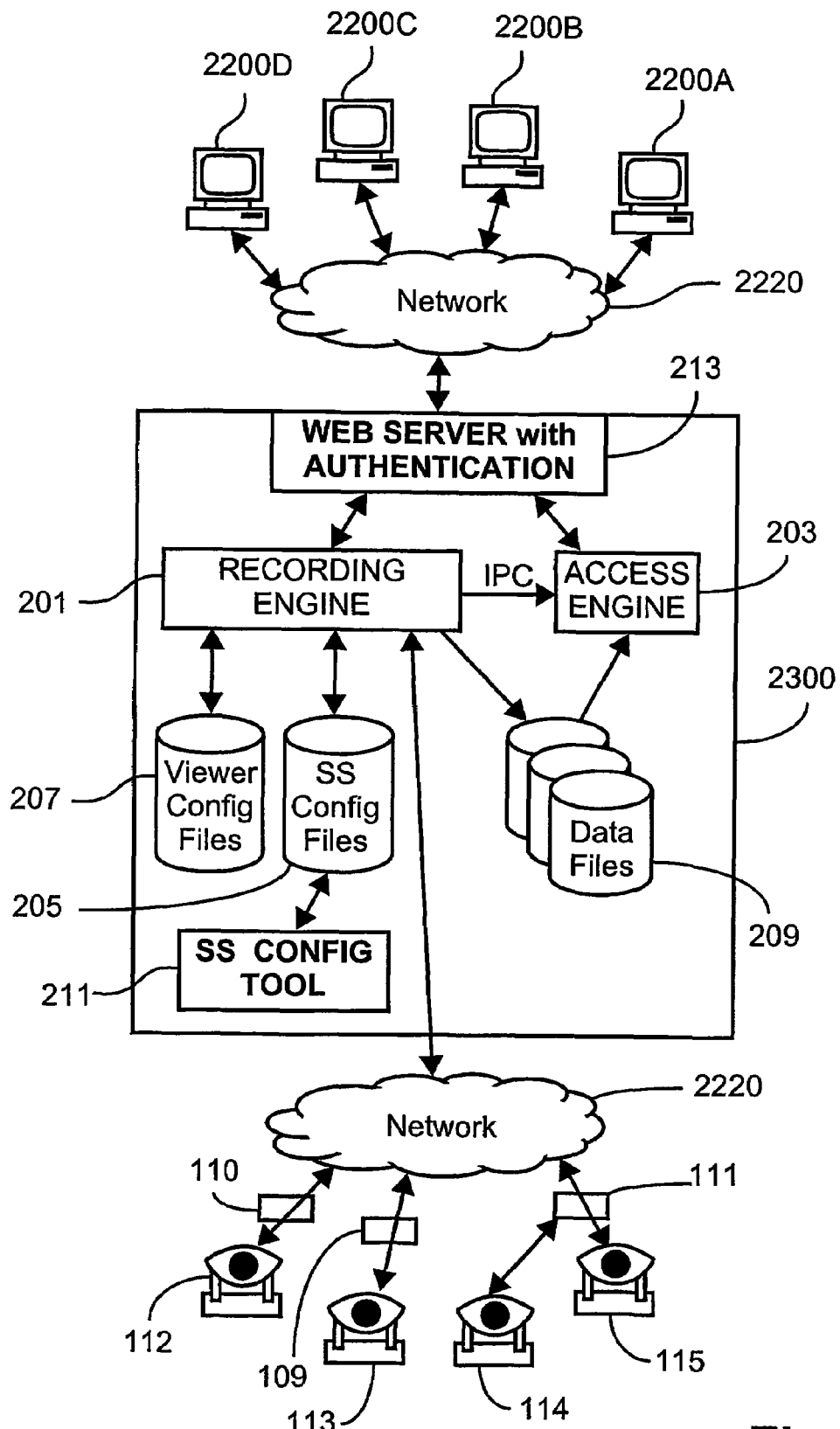
FIG. 2 shows a storage server of the system of FIG. 1 in more detail.

FIG. 2 shows the storage server 2300 in more detail. The storage server 2300 comprises a recording engine 201 and an access engine 203, which will be described in more detail below. The recording engine 201 and the access engine 203 are preferably implemented as separate software applications resident on the hard disk drive 2310 and being controlled in their execution by the processor 2305. Alternatively, the recording engine 201 and access engine 203 can be implemented as a single software application or further, one or both of the recording engine 201 and access engine 203 can be implemented in hardware.

The recording engine 201 is responsible for maintaining a set of storage server configuration files 205. A configuration file 205 contains a set of general settings, information relating to camera servers 109-111 that the storage server 2300 is responsible for, and information relating to cameras 112-115 that are associated with each of these camera servers 109-111. For each camera 112-115, the configuration file 205 also includes a set of schedule items that control the behavior of the storage server 2300 with regard to a particular camera 112-115 during a given time period.

The recording engine 201 also maintains a set of viewer configuration files 207. The viewer configuration files 207 include references to known storage servers (e.g., 2300A, 2300B, 2300C and 2300D). The viewer configuration files 207 also specify a set of Locations and Zones that are associated with each of the known cameras 112-115 and associated camera servers 109-111, which are associated with the storage server 2300. The Locations and Zones will be described in detail below. Typically, the recording engine 201 on a storage server 2300 maintains a set of viewer configuration files 207 when the storage server 2300 is acting as a master storage server, as will be described in detail below.

Figure 76:
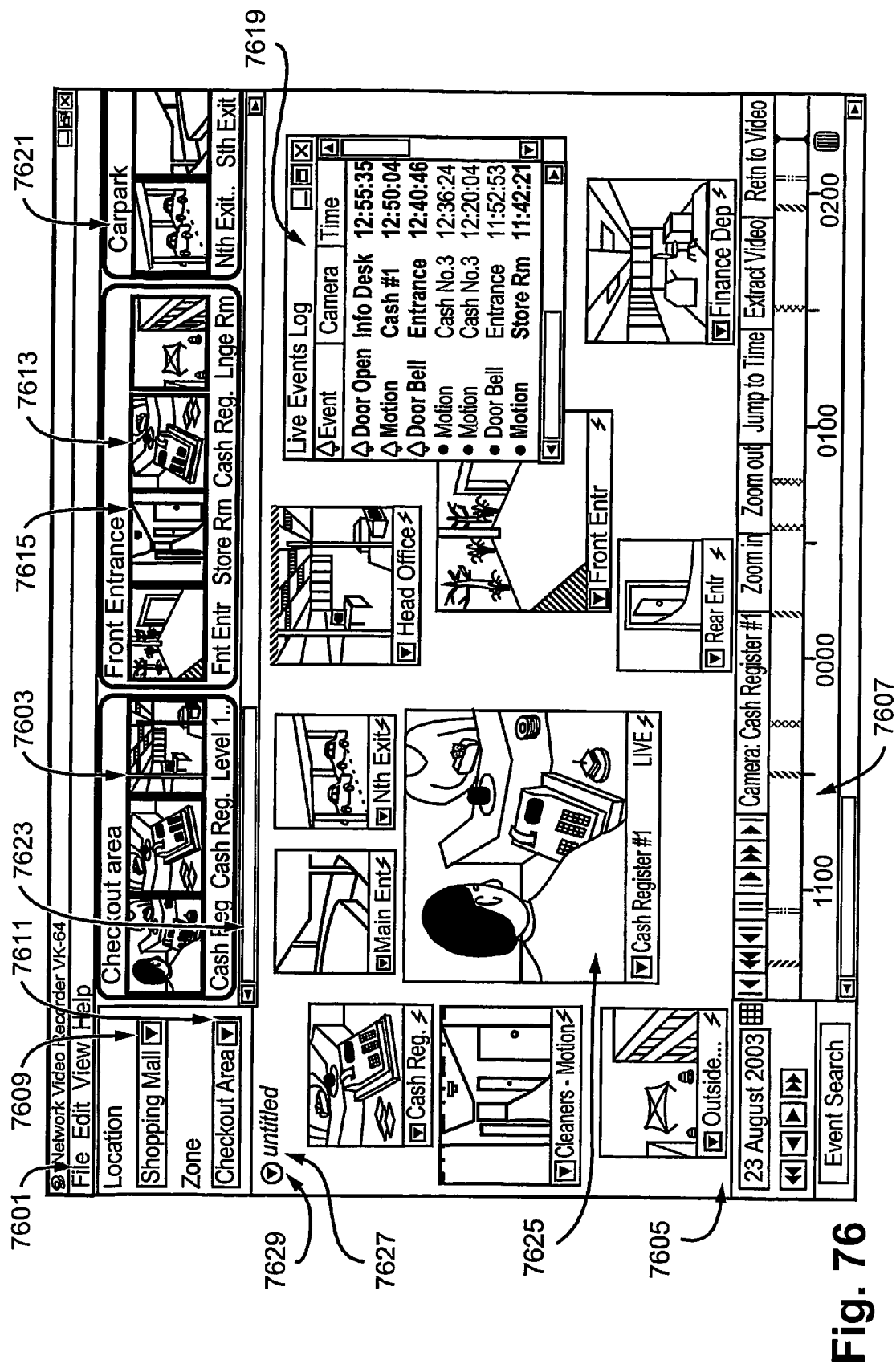
FIG. 76 shows a viewing screen.

The viewer configuration files 207 also comprise video window layouts. The video window layouts describe the manner in which sample data uploaded from the camera servers 109-111 and/or the storage server 2300 are displayed on the display device 2314 of the viewer 2200. The video window layouts will be explained in more detail below in section 5.0. However, as seen in FIG. 76, the specific arrangement, in a layout area 7605, of a set of video windows (e.g., 7625) each associated with a specific camera server 109-111 is referred to as a "layout".

The recording engine 201 writes to a set of data files 209, which can be distributed across one or more drives configured within the storage device 2309 of the storage server 2300. There can be a large number of storage devices (e.g., multiple hard disks). The drives can also be outside the storage server 2300, for example, on a peripheral storage device or on a network accessible storage device as described above. The following description refers to the writing or reading of data to or from the storage device 2309. Alternatively, data may be written to or read from a peripheral or network accessible storage device.

Each of the camera servers 109-111 preferably has a particular drive assigned to the camera server 109-111. The data files 209 include the video files, which store the video sample data collected from the camera servers 110. The data files 209 also include event files. As described above and as will be described in detail below, the event files are text files, which are used to store the details of events in the form of textual data. These events are generated by the recording engine 201 in response to event notifications from the camera servers 109-111. Such events can also occur as a result of analysis of received video sample data or other important occurrences by the storage server 2300.

The recording engine 201 maintains a set of network connections to each camera server 109-111 that the recording engine 201 is responsible for controlling. The network connections are used to retrieve camera server information, configure camera server settings, receive event notifications, and receive video sample data.

The recording engine 201 can be communicated with by one or more of the viewers 2200 on the network 2220 through a web server 213 in order to retrieve configuration information or status information and to reconfigure the recording engine 201 or the system 100. The recording engine 201 can also be communicated with by one or more web browsers (not shown) for retrieving status information (e.g., the recording status associated with specific cameras 112-115).

A viewer 2200 can send requests to the web server 213 using HTTP (HyperText Transport Protocol) and these requests are passed on to the recording engine 201, if the requests are formatted to indicate that they are to be sent to the recording engine 201, as described below. Responses are returned by the recording engine 201 to the web server 213 and passed on to the viewer 2200, which made the request.

The web server 213 is preferably implemented as application software which is typically executed by the processor 2305 separately to the recording engine 201 and the access engine 203. Where the viewer software is executed on the same computer module as the storage server 2300, requests are typically not sent to the web server 213 over the network 2220 but are typically sent by the viewer software to the web server 213 though a socket connection using the network module 301.

The term "web server" in this document is intended to refer to a server, which can communicate with client software using HTTP. The use of the term "web server" does not imply that the web server 213 is necessarily configured to serve content to browser software over the World Wide Web. On the storage server 2300, the web server 213 can be configured to only work with the viewer 2200, or the web server 213 can be configured to work with the viewer 2200 and to also serve content to browser software over the Internet or an Intranet. The web server 213 can be configured to authenticate users trying to obtain access to the storage server 2300 via one of the viewers 2200, for example, using HTTP digest authentication. Alternatively, the web server 213 can be configured to allow access based on HTTP basic authentication. As well as authenticating users for access to the storage server 2300, the web server 213 also determines whether a correctly authenticated user is registered as a storage server administrator. HTTP Digest and HTTP Basic authentication are specified in RFC 2617 published by the Internet Engineering Task Force (IETF).

Authentication is performed using the HTTP Digest (or in some configurations, the HTTP Basic) authentication method, where the valid user names are provided in a Storage Server Users file. Once authenticated, the web server 213 determines whether the authenticated user is an administrator by searching for the user name in an "admin" group stored in a Storage Server Groups file.

Access control for each separate command in the Recording Engine Access Protocol (see below) is enforced using the configuration files for the web server 213 itself, by associating each path of the command within the HTTP message (e.g., the path of the Uniform Resource Locator used in the request) with either the set of valid users, or only those users in the "admin" group. The access engine 203 is responsible for monitoring the data files 209 created by the recording engine 201. The access engine 203 is also responsible for serving requests for video sample data and event data where such requests are received from one or more of the viewers 2200 via the web server 213. The access engine 203 serves video data by finding a correct video file for a given playback request and serving sample data contained in the video file as a sample data stream to the viewer 2200. The access engine 203 serves event data by finding a correct event file for a given request and serving event data contained in the event file to the viewer 2200.

The recording engine 201 also co-ordinates with the access engine 203 using inter-process communication methods, which will be explained in more detail below, in order to inform the access engine 203 when new data files 209 are created.

The storage server 2300 also comprises a storage server configuration tool (SSCT) 211. The storage server configuration tool 211 is preferably implemented as application software resident on the hard disk drive 2310 of the storage server 2300. The storage server configuration tool 211 can be utilised by a user who is logged on to the computer module 2301 hosting the storage server 2300, which will be described in detail below. The configuration tool 211 provides a graphical user interface that allows a user to change any of the settings described in a GENERAL element 405 (see FIG. 5) of the storage server configuration file 205.

Accordingly, there are two different types of users of the system 100. An "administrator" with administrative rights can change the configuration settings of the storage server 2300 as well as access and view other sample data uploaded from the camera servers 109-111 via the network 2220. A second type of user referred to as an "operator" does not have any administrative rights and can only perform limited functions. These limited functions include such functions as selecting a video window layout using the viewer 2200 and viewing sample data uploaded from one or more of the camera servers 109-111, via the network 2220. The functions able to be performed by each of the types of users will be explained in more detail below. Further, both types of users will be generically referred to herein as a "user" or "users" excepting where explicitly distinguished.

3.0 Recording Engine

3.1 Modules of the Recording Engine

Figure 3:
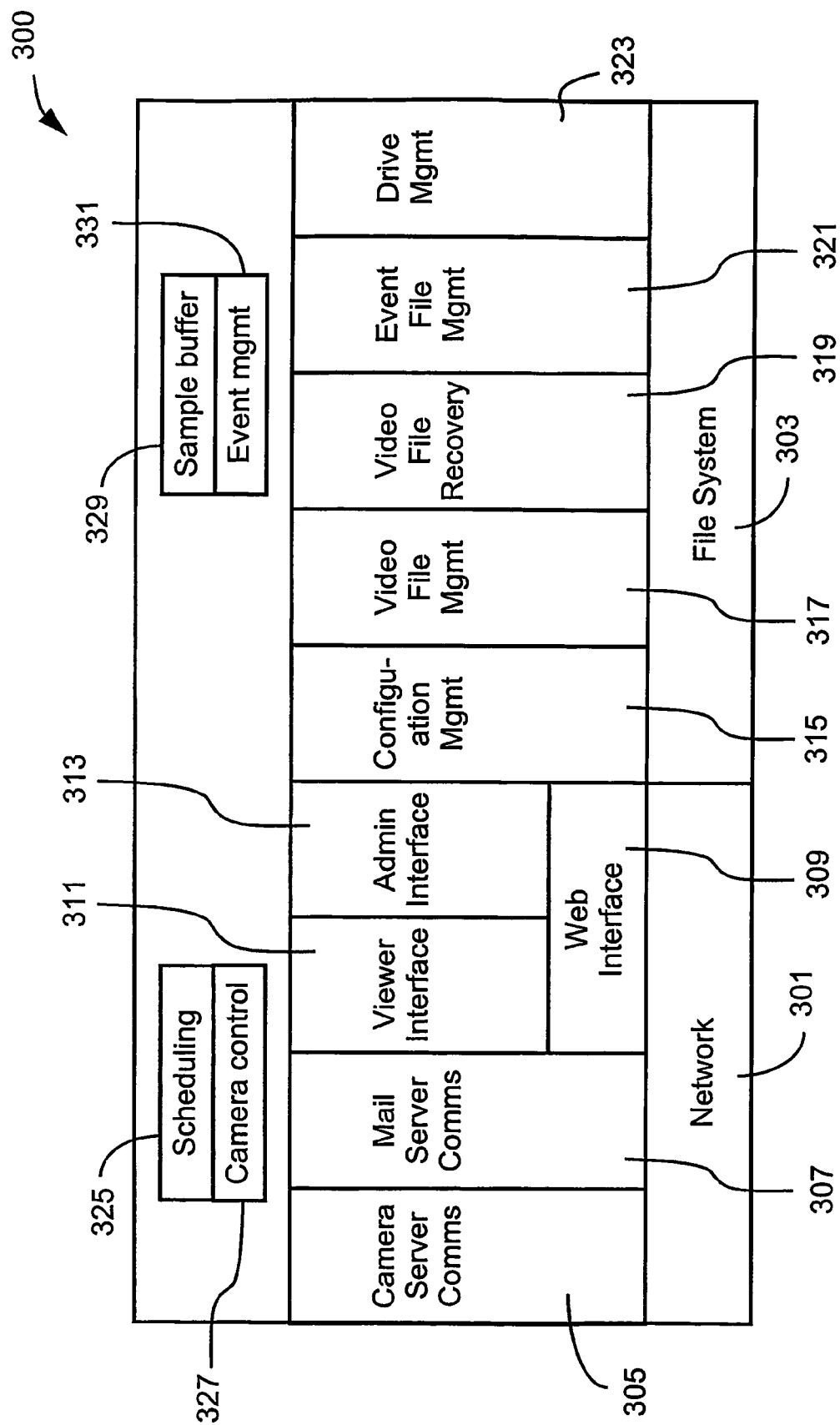
FIG. 3 shows modules of a recording engine configured within the storage server of FIG. 2.

The recording engine 201 can be broken up into a set of modules 300 as shown in FIG. 3. Each of the modules 300 are preferably implemented together as a single software program resident on the hard disk drive 2310 and being controlled in its execution by the processor 2305. Alternatively, one or more of the modules 300 can be implemented as separate software programs.

The first of the modules 300 is known as the network module 301. The network module 301 performs the underlying networking operations of the system 100. The network module 301 is typically part of an operating system of the storage server 2300. Another of the modules 300 is known as the file system module 303, which performs the underlying file system operations of the system 100. The file system module 303 is again typically part of the operating system of the storage server 2300 and will be explained in more detail below in section 3.3.

A camera server communications module 305, manages communications between the recording engine 201 and the camera servers 109-111 that the recording engine 201 controls, over the network 2220. The communications module 305 is responsible for ensuring that correct settings are sent to a particular camera server 109-111, and receiving event notifications as required. The camera server communications module 305 will be described in more detail below in section 3.7.

A mail server communications module 307 is also included in the modules 300. The mail server communications module 307 manages all communications between the recording engine 201 and a simple mail transfer protocol (SMTP) server 2221 connected to the network 2220. The SMTP server 2221 can be configured within the computer module 2301 of the storage server 2300 or remotely from the storage server 2300 as shown in FIG. 23. The SMTP server 2221 is used to send e-mail event notifications to mail servers on the network 2220 to eventually be delivered as emails to specific email mailboxes, based on the configuration of the storage server 2300 as will be discussed in detail below. A connection to a POP server can also be maintained if required for authentication purposes.

A web interface module 309 manages all communications with the web server 213 connected to the network 2220. The web interface module 309 typically communicates with the web server 213 and vice versa, via a Common Gateway Interface (CGI), or to enable more efficient operation on the storage server 2300, through the FastCGI™ interface which provides better support for continual communication between the web server 213 and the recording engine 201.

The modules 300 also include a viewer interface module 311, which manages viewer commands that are sent via the web interface module 309. The viewer interface module 311 is used to handle queries or requests for changes to video window layout and viewer configuration settings for all viewers 2200 when the storage server 2300 is being used as a master storage server connected to the network 2220. For example, any one of the storage servers 2300A, 2300B, 2300C or 2300D can be used as a master storage server. Such a master storage server will be referred to hereinafter as a master storage server 2300A.

An administration interface module 313 is also included for managing administration commands that are sent via the web interface module 309. The administration interface module 313 is used to handle queries or requests for changes to settings related to camera servers 109-111 and schedule settings for camera 112-115 associated with a particular storage server 2300.

The modules 300 also include a configuration management module 315 for managing all of the configuration files 207 stored on the hard disk drive 2310 of the storage server 2300.

A video file management module 317 is also included. The video file management module 317 manages the video files stored on the drives configured within the storage device 2309 of the storage server 2300. The module 317 is responsible for creating new video files as required, writing sample data to these new video files, and swapping to further new files when the size or duration of an existing file exceeds a predetermined limit.

A video file recovery module 319 ensures that all video files handled by the storage server 2300 are in a consistent and readable state. If the recording engine 201 is terminated prematurely (e.g., due to a power failure), any in-progress files are essentially unreadable until the video file recovery module 319 has examined the in-progress files and restored internal consistency to such in-progress files.

The modules 300 also include an event file management module 321 for managing the event files stored on the drives of the storage server 2300. The event file management module 321 is responsible for creating new event files as required, writing event data to these new event files, and swapping to further new files when the size or duration of an existing event file exceeds a predetermined limit. The event file management module 321 will be explained in more detail in section 3.6.

A drive management module 323 is also included in the recording engine modules 300. The drive management module 323 manages all of the drives configured within the storage device 2309 of the storage server 2300. The drive management module 323 maintains a list of all fixed drives in the storage device 2309. By selecting video files for deletion, the drive management module 323 can ensure that video files exceeding a certain age are removed and that free memory space on the hard disk 2310 is kept within predetermined limits. The drive management module 323 can also ensure that the memory space on the hard disk drive 2310 used by the recording engine 201 does not exceed a predetermined limit set by an administrator of the storage server 2300. The drive management module 323 can be configured to prevent recording to any particular drive of the storage server 2300 at any time that the free memory space of the particular drive or the used memory space on the hard disk drive 2310 exceed the predetermined limits.

The recording engine 201 also includes a scheduling module 325 for maintaining a list of schedules. The scheduling module 201 uses the operating system of the storage server 2300 to set timers corresponding to a future time where the settings of a camera 112-115 need to be changed. The scheduling module 201 then receives notifications from the operating system of the storage server 2300 as each schedule expires, in order to set a new schedule. Whenever a new camera schedule item 1115 (see FIG. 13) is activated, the scheduling module 201 adjusts the settings for the particular camera 112-115 corresponding to the new schedule item in order to conform to that schedule item. Whenever an event is triggered, the scheduling module 201 adjusts the camera settings of the camera 112-115 with which the event is associated as necessary according to the schedule item that is active at the time. Camera schedule items will be described in more detail below. The scheduling module 325 is also responsible for keeping track of the configuration of each camera 109-111 based on the current time. Whenever an event occurs that might change camera recording parameters, the scheduling module 325 ensures that the camera recording parameters are correctly reconfigured.

In addition, the scheduling module 325 tracks the time and ensures that camera recording parameters are changed whenever one schedule item gives way to another, or a post-event recording period expires.

A camera control module 327 is also included in the recording engine 201. The camera control module 327 is closely linked with the scheduling module 325 and camera server communication module 305. The camera control module 327 ensures that the settings of a particular camera server 109-111 are consistent with the settings specified by a current schedule item. That is, the camera control module 327 ensures that camera settings are kept up to date on the camera server 109-111. This involves sending new settings to the camera server 109-111 as the settings are changed within the recording engine 201 due to schedule changes or events, and monitoring the settings on the camera server 109-111 to ensure that the settings are kept accurate in the event that the settings are changed by a different camera server 109-111. The camera control module 327 sends new pan, tilt and zoom (PTZ_settings) to a camera server 109-111 in the following situations:

(i) A new schedule item is starting, where the required PTZ setting is different to the current PTZ setting;
(ii) An event has been triggered that requires a PTZ setting different to the current PTZ setting; or.
(iii) Another recording engine 201 has moved the camera 112-115 to a new position, when the current camera settings in the recording engine 201 require a set PTZ setting.

Figure 115:
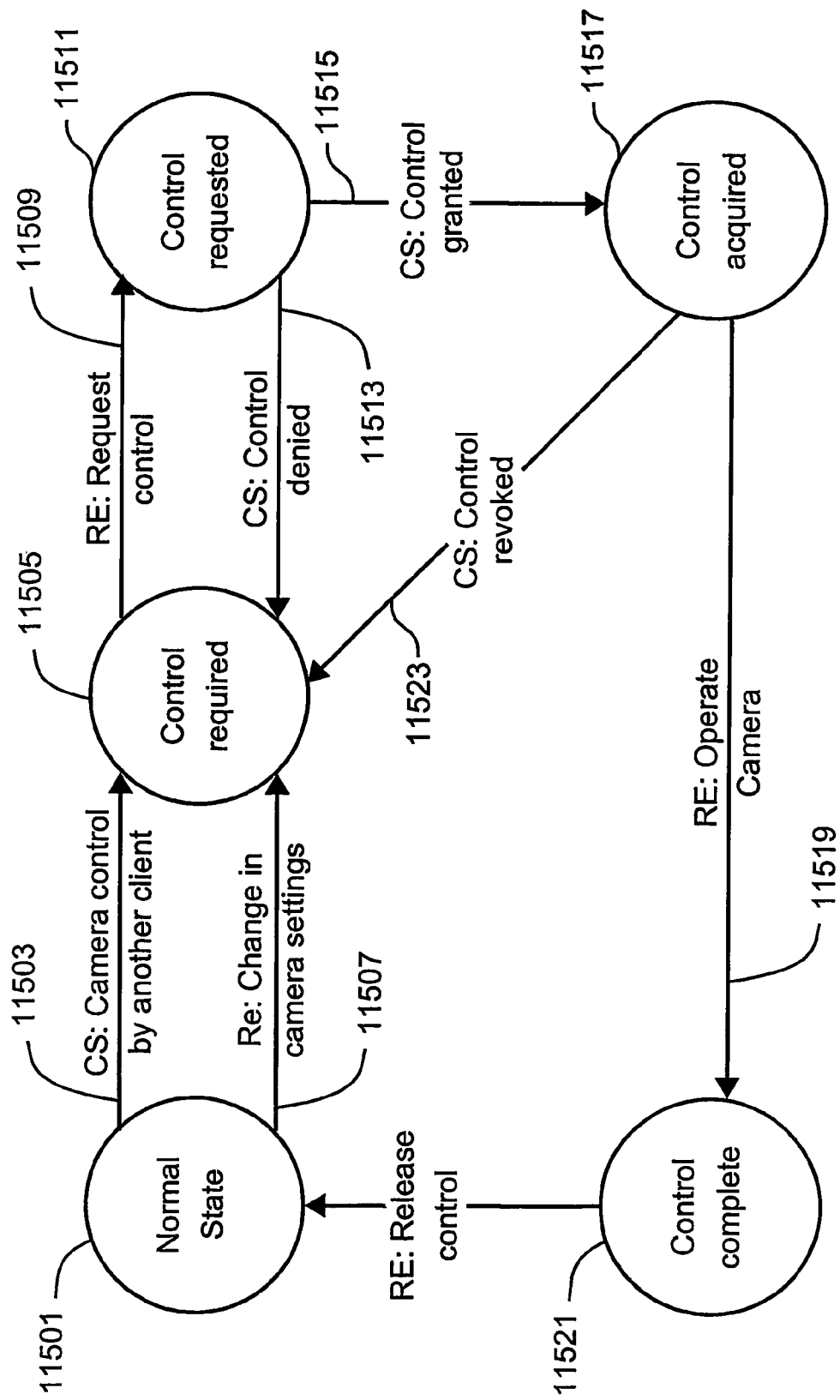
FIG. 115 is state diagram representing control of a camera by a camera control module of the recording engine.

FIG. 115 is state diagram representing control of a particular camera 112-115, associated with a camera server 109-111, by the camera control module 327 of the recording engine 201. As seen in FIG. 115, the control module 327 is typically in a normal state 11501, where a camera server 109-111 is controlling a particular camera 112-115 according to certain settings. Control of the particular camera 112-115 can be requested by another recording engine, for example, by the transmission of a request to the camera control module 327, as represented by arrow 11503. As a result, the camera control module 327 moves to a control required state 11505. The camera control module 327 can also move to the state 11505 following situations (i) and (ii) above, as represented by the arrow 11507, where a new schedule item is starting and the required PTZ setting are different to the current PTZ setting, for example.

As seen in FIG. 115, the control module 327 can then request control of the particular camera 112-115 by transmitting a control request, as represented by the arrow 11509, to the associated camera server 109-111. As a result, the camera control module 327 moves to a control requested state 11511. The camera server 109-111 may deny control of the particular camera server 109-111 and transmit a control denied message back to the control module 327. As a result, the camera control module 327 moves back to the state 11505. Alternatively, the camera server 109-111 may grant control of the particular camera 112-115 by sending a control granted message to the camera control module 327, as represented by the arrow 11515. As a result the camera control module 327 moves to a control acquired state 11517.

From the control acquired state 11517, the camera control module 327 operates the particular camera 112-115 by sending control commands to the associated camera server 109-111, as represented by the arrow 11519, and as will be described in detail below. As a result, the camera control module 327 moves to a control complete state 11521 and will remain in that state until the camera control module 327 releases the control of the camera 112-115 back to the associated camera server 109-111. As a result, the camera control module 327 will return to the normal state 11501.

The camera control module 327 can also move from the control acquired state 11517 to the control required state 11505, for example, by way of a user with a higher control right taking control of the particular camera 112-115, as will be explained in detail below.

The recording engine 201 also includes a frame buffer module 329. The frame buffer module 329 receives sample data from a camera server 109-111 and saves the sample data into a circular frame buffer configured within the memory 2306 of the storage server 2300. If sample data is to be recorded, the sample data is sent to the video file management module 317 for writing to the hard disk drive 2310. Sample data can also be fed to a motion detection algorithm implemented as software in the hard disk drive 2310 of the storage server 2300. Any suitable motion detection algorithm can be used to detect motion, such as an algorithm that compares differences between successive frames and applies a threshold value to determine whether a change of the required magnitude has taken place in each portion of an image and applies another threshold value to determine whether enough portions of the image have changed sufficiently.

If recording is not taking place, sample data is retained in memory 2306 for as long as possible before overflowing the frame buffer, and the sample data can be saved later to the hard disk drive 2310 if an event is triggered and pre-event recording is enabled for that event.

The recording engine 201 also includes an event management module 331 which converts signals received from various sources such as the camera server communications module 305, the viewer interface 311 and the drive management module 323 into event records, ensuring that these event records can be written to disk 2310 using the event file management module 321 and video file management module 317.

3.2 Storage Server Configuration Object

This section describes the basis for operations that involve storage server 2300 configuration: a Storage Server Configuration Object.

A storage server configuration object (SSCO) is an XML document that is used in several aspects of storage server 2300 configuration, such as in the storage server configuration files 205 and as data exchanged in the administration protocol, used by the administration interface 313. A storage server configuration object is preferably formatted in the known UTF-8 format. A hierarchy of elements 400 that make up such a storage server configuration object is described below, with reference to FIG. 4.

Figure 4:
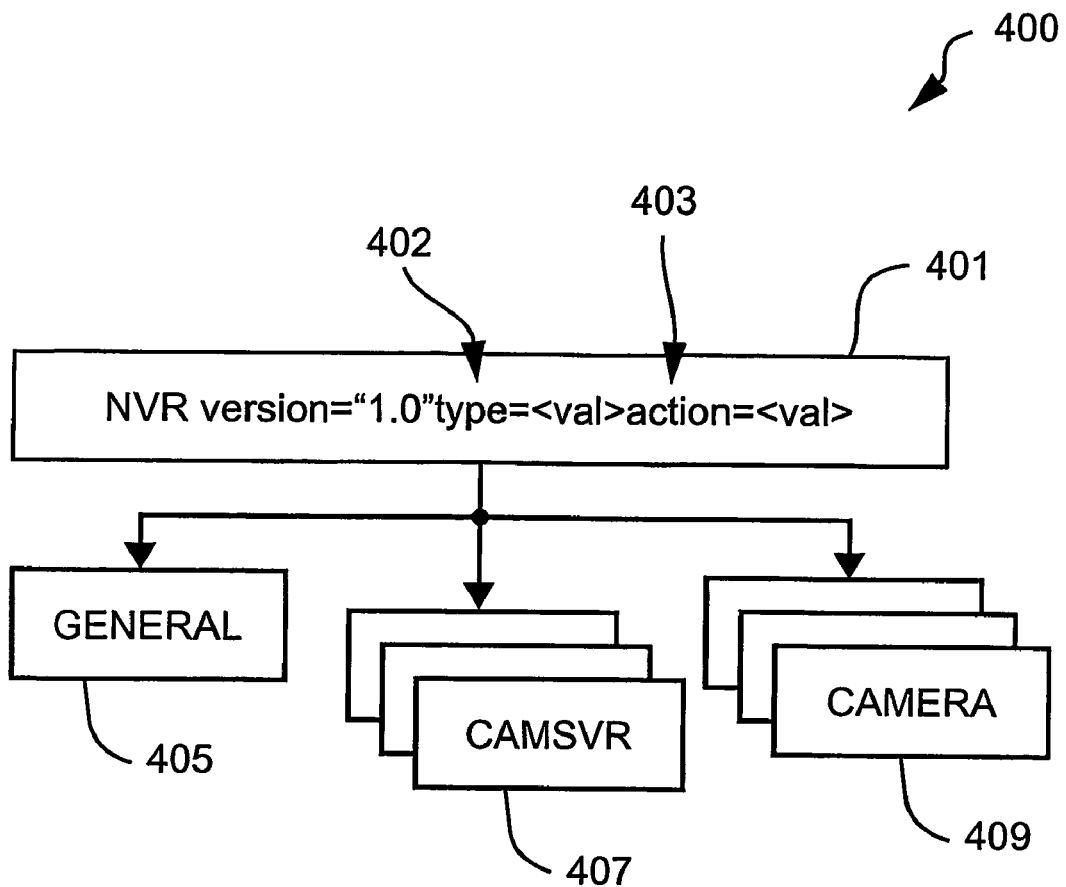
FIG. 4 shows a hierarchy of elements that make up a storage server configuration object.

As seen in FIG. 4, a storage server configuration object comprises a network video recorder (NVR) element 401, a GENERAL element 405, a CAMSVR element 407 and a CAMERA element 409, which will be described in detail below. Unless otherwise indicated, the terms "XML document", "element" and "attribute" used in the context of the description of a storage server configuration object are used in the sense defined in the Extensible Markup Language (XML) Recommendation (Second Edition) published by the World Wide Web Consortium (6 Oct. 2000).

3.2.1 Network Video Recorder (NVR) Element

The first element of the elements 400 is referred to as a network video recorder (NVR) element 401, as shown in FIG. 4. The network video recorder element 401 encapsulates configuration information corresponding to the storage server 2300 and which is stored in a particular storage server configuration object. The network video recorder element 401 comprises a 'type' attribute 402, which indicates the type and purpose of the particular storage server configuration object. The type element can be set to one of six values as follows:

(i) file—indicates that the storage server configuration object serves as the configuration file 205 of the storage server 2300;

(ii) general—indicates that the storage server configuration object describes the general settings of the storage server 2300 and preferably does not contain any CAMSVR 407 or CAMERA 409 elements, which will be described in detail below;

(iii) camsvr—indicates that the storage server configuration object describes the camera servers 109-111 associated with the particular storage server 2300. The network video recorder element 401 preferably does not contain any GENERAL 405 or CAMERA 409 elements, although CAMERA elements can be present within individual CAMSVR 407 elements;

(iv) camera—indicates that the storage server configuration object describes the state of all camera servers 109-111 associated with the storage server 2300. The network video recorder element 400 preferably does not contain any GENERAL 405 or CAMSVR 407 elements. However, CAMERA elements 409 contain STATE elements, which will be described below;

(v) sched—indicates that the storage server configuration object describes the schedules belonging to a set of camera servers 109-111. The network video recorder element 401 does not contain any GENERAL 405 or CAMSVR 407 elements. However, CAMERA elements 409 contain DAY elements 1111 (see FIG. 11) as will be described below; and (vi) trigger—indicates that the storage server configuration object describes a set of camera servers 109-111 which are to be triggered. The network video recorder element 401 preferably does not contain GENERAL 405 or CAMSVR 407 elements. Elements present within the CAMERA elements 409 can be ignored.

The network video recorder element 401 also comprises an 'action' attribute 403 that indicates that the storage server configuration object is intended to perform a change on the storage server 2300. The action attribute 403 is optional. When present in the network video recorder element 401, valid values for the action attribute are as follows:

(i) add—indicates that the storage server configuration object is used to add camera servers 109-111 or schedule days to the system 100;

(ii) modify—indicates that the storage server configuration object is used to modify details of existing camera servers 2300 or schedule days;

(iii) delete—indicates that the storage server configuration object is used to delete camera servers 109-111 or schedule days from the system 100;

(iv) movein—indicates that the storage server configuration object is used to add a camera server 109-111 to the storage server 2300 when that camera server 109-111 is being moved from a different storage server (e.g., 2300A, 2300B, 2300C or 2300D); and (v) moveout—indicates that the storage server configuration object is used to delete a camera server 109-111 from the storage server 2300, when that camera server 109-111 is being moved to a different storage server (e.g., 2300A, 2300B, 2300C or 2300D).

3.2.2 The GENERAL Element

Figure 5:
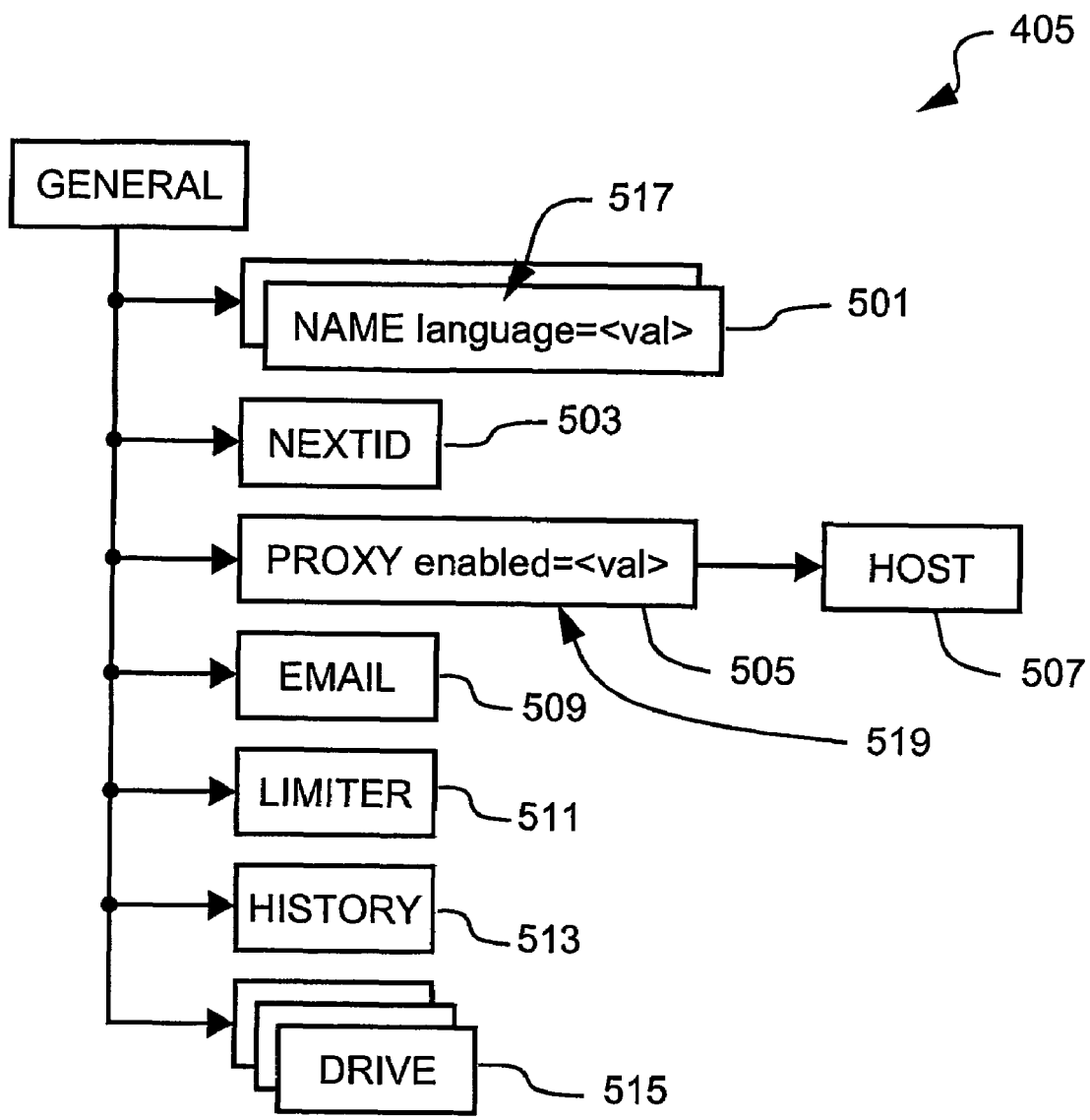
FIG. 5 shows a GENERAL element of FIG. 4 in more detail.

The GENERAL element 405 of the storage server configuration object is shown in FIG. 5. The GENERAL element 405 describes the general configuration of the storage server 2300 and includes a number of further elements 501-515, as seen in FIG. 5.

The GENERAL element 405 includes the NAME element 501, which indicates the name of the storage server 2300 as displayed in a configuration view on the viewer 2200 or storage server 2300 displays 2214 and 2314, respectively. The configuration view will be described in more detail below. There can be up to two NAME elements 501. The NAME elements 501 are distinguished by language, which is specified in the language attribute 517. Valid language identifiers are "English" and "Japanese", and preferably no two NAME elements 501 within a GENERAL element 405 have the same language identifier.

A NEXTID element 503 indicates a unique identifier corresponding to a next camera 112-115 to be added to the recording engine 201 of the system 100. The value of the NEXTID element 503 is incremented whenever a camera 112-115 is added to the system 100. The NEXTID element 503 ensures that each added camera 112-115 is given an identifier that does not conflict with other existing cameras 112-115, or cameras 112-115 which have been deleted from the system 100.

A PROXY element 505 indicates a HTTP proxy server (not shown) to be used when connecting the recording engine 201 to a camera server 109-111. An enabled attribute configured within the PROXY element 505 can take one of two values being "0" (disabled) or "1" (enabled). A HOST tag 507 of the PROXY element 519 indicates the host name or Internet Protocol (IP) address of the proxy server in "host:port" format. If the port attribute is omitted, the default value is eighty.

Figure 6:
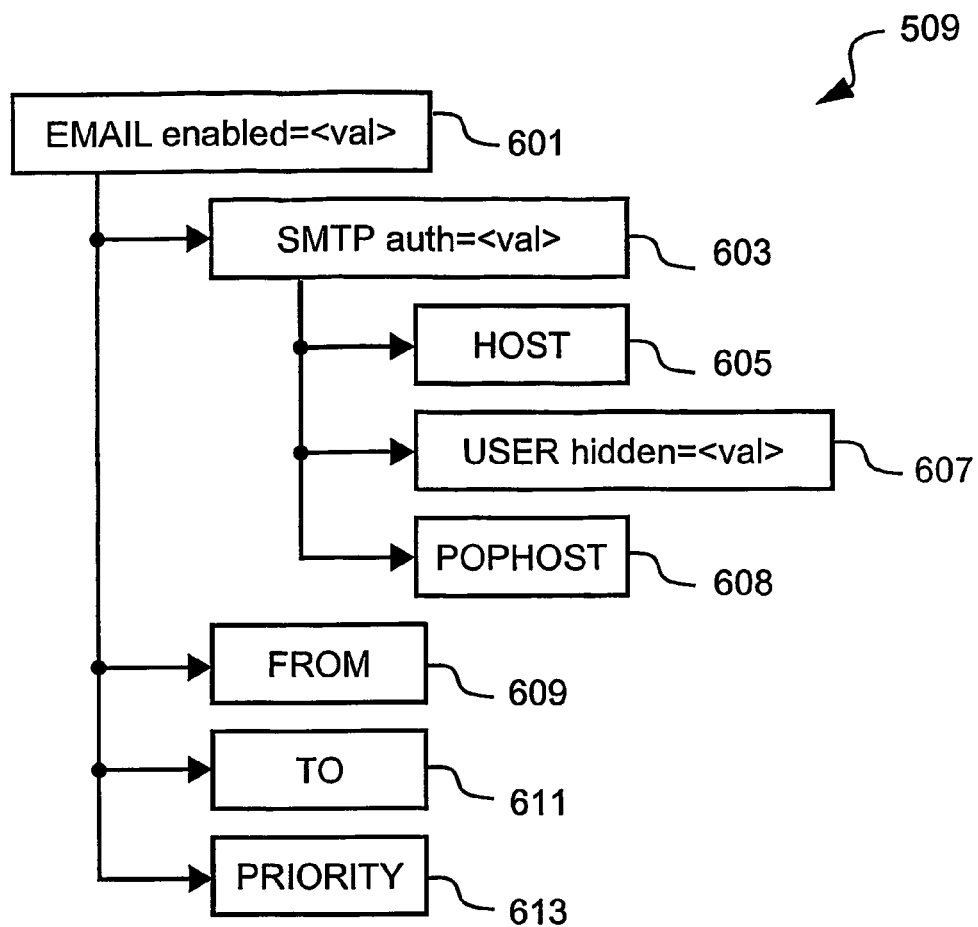
FIG. 6 shows an EMAIL element of FIG. 4 in more detail.

An EMAIL element 509 specifies the settings used by an E-mail notification system (not shown) of the recording engine 201 and will be described in further detail below in Section 3.2.3, with reference to FIG. 6.

Figure 7:
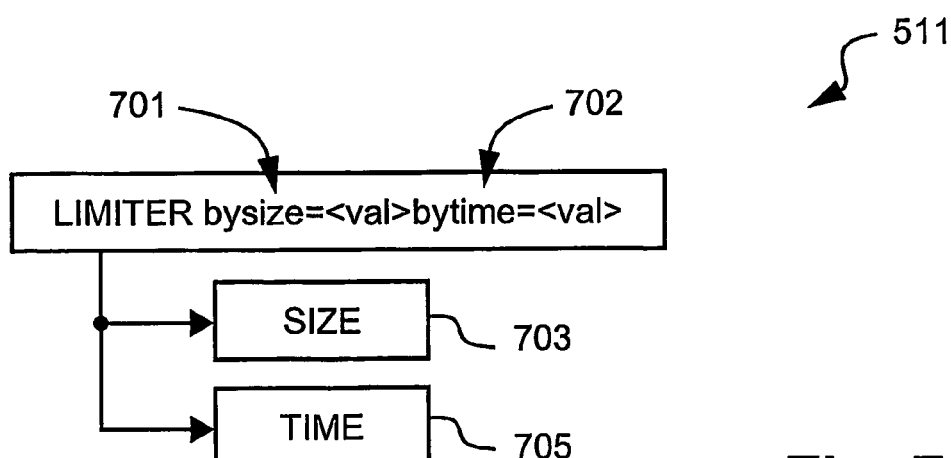
FIG. 7 shows a LIMITER element of FIG. 4 in more detail.

A LIMITER element 511 specifies criteria used to determine when video files and event files are to be swapped over and will be described in more detail below in section 3.2.4 with reference to FIG. 7.

A HISTORY element 513 contains a value representing the maximum age of video files and event files that are stored in video and event file directories of a drive configured within the storage device 2309 of the storage server 2300. The HISTORY element contains an integer value, which is measured in seconds.

The GENERAL element 405 also comprises a number of DRIVE elements 515. Each DRIVE element 515 describes the settings for a single drive configured within the storage device 2309 of the system 100. The DRIVE element 515 is described in more detail in section 3.2.5 with reference to FIG. 8.

3.2.3 The EMAIL Element

As described above, the EMAIL element 509 specifies the settings used by the E-mail notification system of the recording engine 201. As seen in FIG. 6, the EMAIL element 509 comprises sub-elements 603-613. The EMAIL element 509 also comprises an enabled attribute 601. If the enabled attribute 601 is set to 0, then the E-mail notification system is disabled, and all sub-elements can be ignored. If the enabled attribute 601 is set to a non-zero value, then the E-mail notification system is enabled.

An SMTP element 603 specifies the host name of the SMTP server 2221 used to send E-mails. The SMTP element 603 contains an optional 'auth' attribute. If present, the 'auth' attribute can be set to one of three values as follows:
- (i) none—indicates that no authentication needs to be performed on the SMTP server 2221;
- (ii) smtp—indicates that authentication is performed using the SMTP authentication protocol; and
- (iii) pop—indicates that authentication is performed by logging on to a POP server prior to having an open SMTP connection (using the known pop-before-smtp convention).

A HOST element 605 inside the SMTP element 603 indicates the host name or Internet Protocol (IP) address and port of the SMTP server 2221, in a "host:port" format. If the port is omitted, then the default value is 25.

A USER element 607 inside the SMTP element 603 indicates user details used to log-in to the SMTP server 2221 using either the SMTP or POP authentication methods. The USER element 607 includes a 'hidden' attribute. If the 'hidden' attribute is set to a non-zero value, then the contents of the USER element 607 do not represent the actual password to be used. The contents of the USER element 607 are of the format "username:password".

The POPHOST element inside the SMTP element indicates the host name or IP address of a POP server on the network 2220 to use for pop-before-smtp authentication, and the port associated with the POP server, in the format "host:port". If the port is omitted, the default value is 110.

A FROM element 609 of the EMAIL element 509 indicates the address to be used by the E-mail notification system as the sender of any E-mails that are sent. The format of the data contained in the FROM element 609 preferably conforms to the existing standards for describing E-mail addresses.

A TO element 611 indicates the address to be used by the E-mail notification system as the recipient of any E-mails that are sent. The format of the data contained in the TO element 611 should conform to the existing standards for describing E-mail addresses.

A PRIORITY element 613 indicates a threshold priority used by the E-mail notification system. Any events with a priority higher than or equal to the threshold priority will cause an E-mail notification to be sent. The priority level can range from one (i.e., representing the highest priority) to five (i.e., representing the lowest priority).

3.2.4 The LIMITER Element

As described above, the LIMITER element 511 specifies the criteria used to determine when video files and event files are to be swapped over and includes further elements 703 and 705. As seen in FIG. 7, the LIMITER element 511 includes a 'bysize' attribute 701. If the bysize attribute 701 is non-zero, then the value of a SIZE element 703 is used to determine when video files and event files are swapped. A 'bytime' attribute 702 is also included in the LIMITER element 511. If the bytime attribute 702 is non-zero, then the value of a TIME element 705 is used to determine when video files and event files are swapped.

The SIZE element 703 specifies the maximum size of a video file, in bytes. The recording engine 201 can exceed the maximum size by a small amount before swapping a file. If the bysize attribute 701 of the LIMITER element 511 is absent or set to zero, or if the SIZE element 703 is absent, a hard limit of one giga-byte is enforced.

The TIME element 705 specifies the maximum duration of a video file, in seconds. If the bytime attribute 702 of the LIMITER element 511 is absent or set to zero, or if the TIME element 705 is absent, a hard limit of twenty-four hours is enforced.

3.2.5 The DRIVE Element

Figure 8:
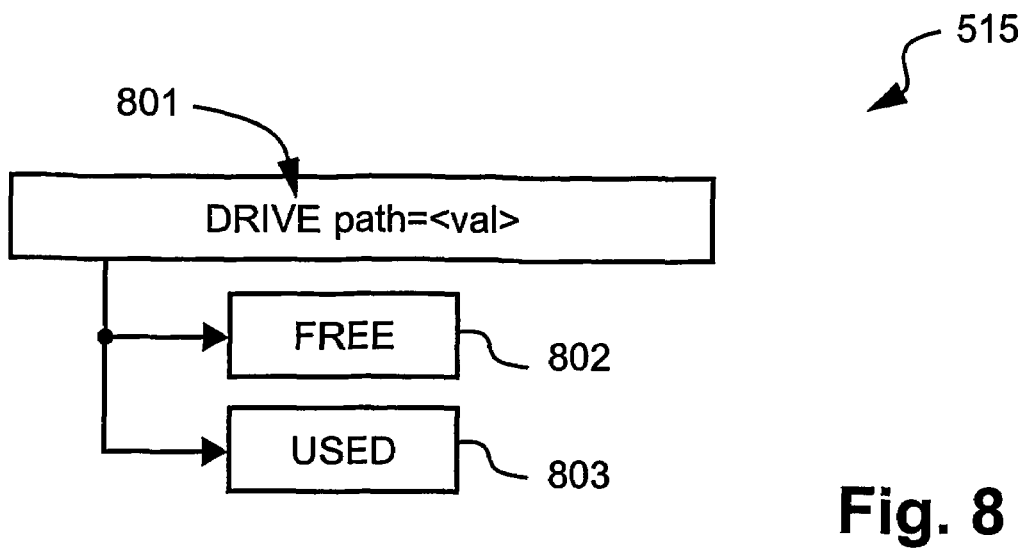
FIG. 8 shows a DRIVE element of FIG. 4 in more detail.

As described above, each DRIVE element 515 describes the state of each drive, configured within the storage device 2309 of the storage server 2300, which is used by the recording engine 201. There is preferably one DRIVE element 515 corresponding to each drive available for the storage server 2300. This includes all logical drives configured on the system 100 including those mapped to each of: internal storage devices (e.g., hard disks); partitions within storage devices; peripheral storage devices; network accessible storage devices; and other storage devices. As seen in FIG. 8, the drive element comprises two further elements 802 and 803. The DRIVE element 515 includes a path attribute 801 which indicates the path used by the processor 2305 to access a particular drive (e.g., in a Windows™ system, "C:\" indicates the first hard disk) of the storage device 2309.

A FREE element 802 contains values that control free memory space monitoring of the recording engine 201. The FREE element 802 consists of three integer values, each representing a number of bytes, separated by '/' characters. The first value represents a memory space threshold for the hard disk drive 2310. If the free memory space on the corresponding drive goes below the first value, then the recording engine 201 attempts to delete old video files until the free memory space reaches a higher value. The second value in the FREE element 802 represents a free memory space limit. If the free memory space on the corresponding drive goes below the second value, then the recording engine 201 attempts to delete old video files, and will refuse to write any more sample data to the drive until the free memory space is once again greater than the second value. The third value represents the free space on the drive at the time that the storage server configuration object is created.

A USED element 803 contains values which control the monitoring of memory space on the hard disk drive 2310 used by the recording engine 201. As described herein, "used disk space" refers to memory space used on the hard disk drive 2310 by the recording engine 201 for storing video and event files. The USED element 803 comprises three integer values, each representing a number of bytes, separated by '/' characters. The first value represents the used disk space threshold. If the space used by the recording engine 201 on the drive corresponding to the DRIVE element 515 goes above the first value, then the recording engine 201 attempts to delete old video files until the used space reaches a lower value. The second value represents a used disk space limit. If the space used by the recording engine 201 on the corresponding drive goes above the second value, then the recording engine 201 attempts to delete old video files. Further, in this instance, the recording engine 201 refuses to write any more sample data to the corresponding drive until the used disk space is once again smaller than the second value. The third value represents the used disk space on the drive at the time that this storage server configuration object is created.

3.2.6 The CAMSVR Element

Figure 9:
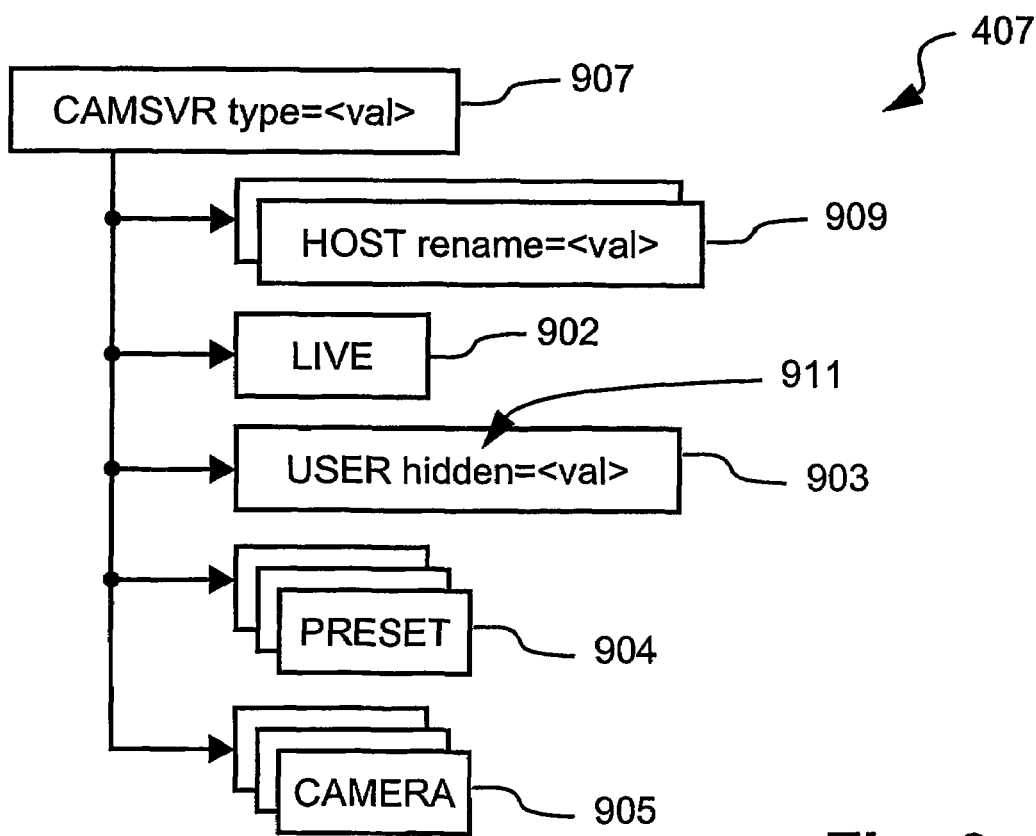
FIG. 9 shows a CAMSVR element of FIG. 4 in more detail.

As referred to above, the XML document forming the storage server configuration object comprises a CAMSVR element 407. The CAMSVR element 407 describes a single camera server 109-111 controlled by the storage server 2300. As seen in FIG. 9, the CAMSVR server 407 comprises further elements 901-905. The CAMSVR element 407 comprises a type attribute 907, which describes a proprietary type of camera server 109-111 that the storage server configuration object is associated with. The type attribute 907 can comprise one of the following proprietary type values:
  (i) VB101;
  (ii) VB150;
  (iii) VB-C10; and
  (iv) unknown—used only if the type of the camera server is not one of the above, or if the type of camera server 109-111 cannot be determined for some other reason.

Each HOST element 901 describes the host name or Internet Protocol (IP) address and the port used by the recording engine 201 to communicate with a particular camera server 109-111, in the format "host:port". If the port is omitted, the default value is 80. Typically, only one HOST element 901 is present. Two HOST elements 901 can be used when the associated storage server configuration object is used to change the host name or port used for the particular camera server 109-111. An optional rename attribute 909 can be used to specify which HOST element 901 describes the old host name and port ("old") and which HOST element 901 describes the new host name and port ("new").

A LIVE element 902 describes the host name or IP address and the port to be used by the viewer 2200 to communicate with the particular camera server 109-111, in the format "host:port". If the port is omitted, the default value is 80. The LIVE element 902 is optional and if omitted, the value represented by the LIVE element 902 is assumed to be identical to that of the HOST element 901.

The USER element 903 describes the user details used to log on to the particular camera server 109-111. A hidden attribute 911 is included in the USER element 903. If the hidden attribute 911 is set to a non-zero value, then the contents of the USER element 903 do not represent the actual password to be used. The contents of the USER element 903 are of the format "username:password".

Up to eight PRESET elements 904 can be included in the CAMSVR element 407. The PRESET elements 904 are described in detail in section 3.2.7 with reference to FIG. 10.

The CAMSVR element 907 can include up to four CAMERA elements 905. CAMERA elements 905 exist within a CAMSVR element 907 if the associated storage server configuration object type is set to "camsvr". The CAMERA elements 907 are described in detail below in section 3.2.8 with reference to FIG. 11.

3.2.7 The PRESET Elements

Figure 10:
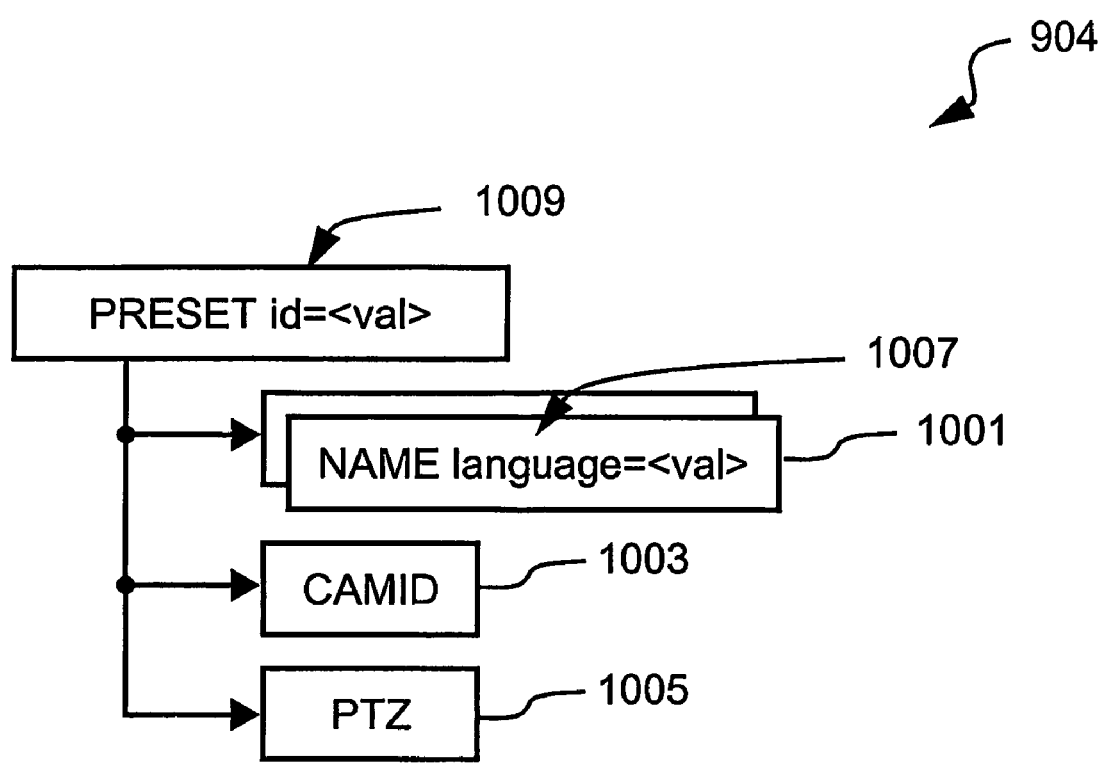
FIG. 10 shows a PRESET element of FIG. 9 in more detail.

The PRESET element 904 describes one of the preset positions for a camera 112-115 of a camera server 109-111 associated with the storage server 2300. As seen in FIG. 10, the PRESET element 904 includes an "id" attribute 1009, which specifies a preset that is being described, and can be an integer between one and eight. The PRESET element 904 also includes further elements 1001, 1003 and 1005.

Each of the NAME elements 1001 indicates the name of a preset. There can be up to two NAME elements 1001, which are distinguished by a language. The language is specified in a language attribute 1003. Valid language identifiers are "English" and "Japanese", and no two NAME elements 1001 within a single PRESET element 904 have the same language identifier.

A CAMID element 1003 indicates a camera number referred to by the particular preset. The camera number can be a value between zero and three for VB101 and VB150 type camera servers, and is set to 0 for VB-C10 camera servers. The camera number is used to identify the specific camera on a camera server 109-111 that supports multiple cameras 112-115.

The PTZ element 1005 indicates pan, tilt and zoom settings for the particular preset represented by the PRESET element 904. The PTZ element 1005 comprises three floating point values separated by '/' characters, indicating pan, tilt and zoom respectively.

3.2.8 The CAMERA Element

Figure 11:
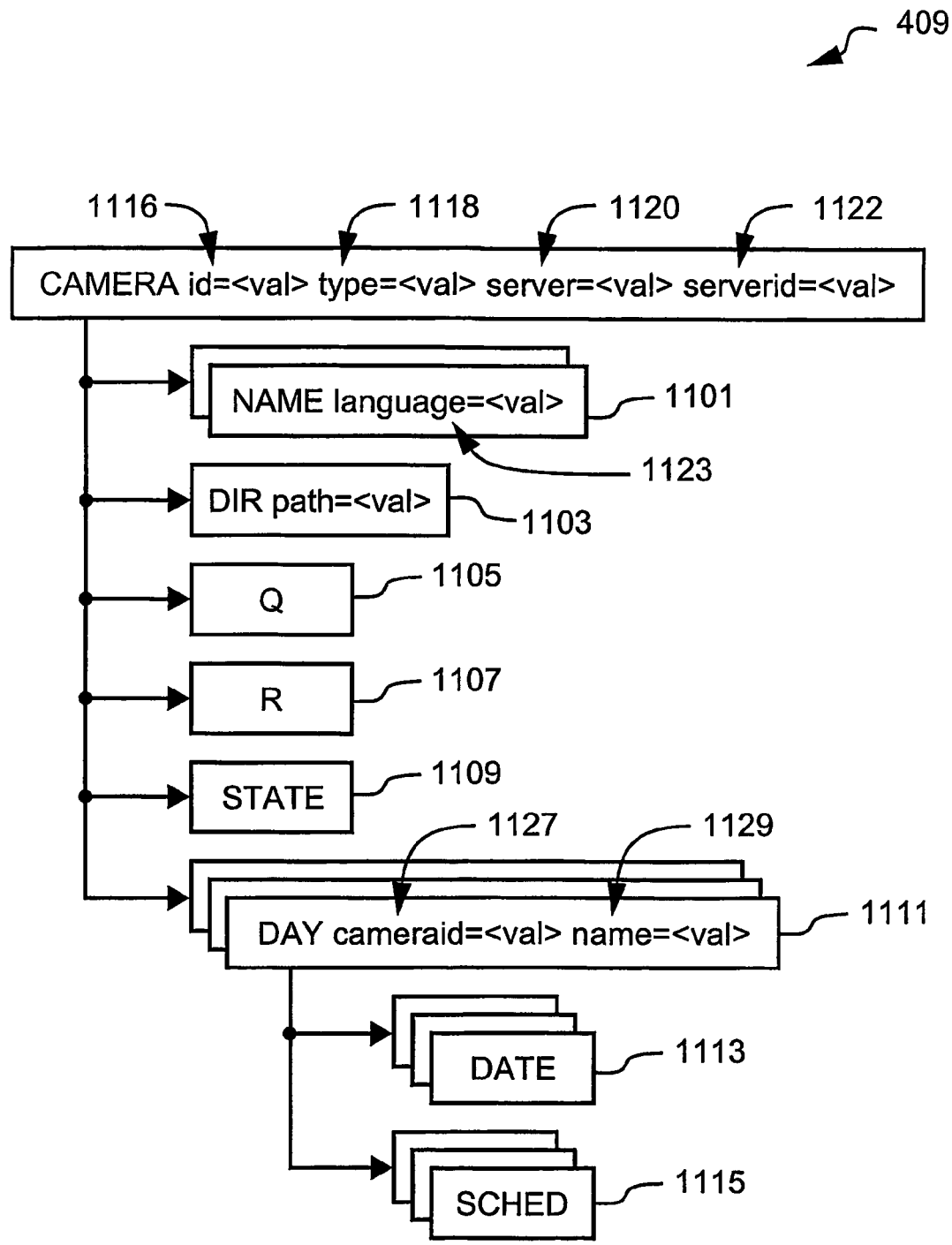
FIG. 11 shows a CAMERA element of FIG. 4 in more detail.

The CAMERA element 409 of a storage server configuration object describes a single camera 112-115 in the system 100. As seen in FIG. 11, the CAMERA element 409 includes a number of further elements 1101 to 1115. The CAMERA element 409 includes an 'id' attribute 1116, which specifies a unique camera identifier assigned to the camera 112-115 associated with the CAMERA element 409. A type attribute 1118 specifies the type of camera 112-115. The value of the type attribute 1118 is a string and indicates the particular type camera 112-115 that the camera server 109-111 reports the particular camera 112-115 to be.

A server attribute 1120 of the CAMERA element 409 specifies the camera server 109-111 that a particular camera 110-115 belongs to, in the format "host:port". In the absence of a port, the port is assumed to be eighty. A serverid attribute 1122 specifies the identifier of the camera server 109-111. For a VB101 or VB150 camera server 109-111, the serverid attribute 1122 value can be between zero and three, but for a VB-C10 camera server, the value can be zero and may be safely omitted.

Each NAME element 1101 of the CAMERA element 409 indicates the name of the associated camera 112-115. There can be up to two NAME elements 1101, which are distinguished by language. The language is specified by a language attribute 1123. The language attribute 1123 can be set to "English" and "Japanese", and preferably no two NAME elements 1101 within a single CAMERA element 409 have the same language identifier.

A DIR element 1103 specifies a directory configured within the storage device 2309 into which video and event files associated with the particular camera 112-115 are written. A path attribute 1125 is used to specify a directory path for the directory.

A Q element 1105 specifies the default image quality used when the particular camera 112-115 described by the CAMERA element 409 is recording. Valid values are described in Table 1 below:

TABLE 1

| | |
|---|---|
| −1 | Quality not specified (use the current quality settings without changing them) |
| 1 | JPEG quality factor 10 |
| 2 | JPEG quality factor 30 |
| 3 | JPEG quality factor 50 |
| 4 | JPEG quality factor 70 |
| 5 | JPEG quality factor 90 |

An R element 1107 specifies the default image resolution used when the particular camera 112-115 described by the CAMERA element 409 is recording. Valid values for the R element 1107 are described in the Table 2 below:

TABLE 2

| | |
|---|---|
| −1 | Resolution not specified (use the current resolution settings without changing them) |
| 0 | 160 × 120 |
| 1 | 320 × 240 |
| 2 | 640 × 240 (VB101 and VB150) or 640 × 480 (VB-C10) |

A STATE element 1109 is present in the camera element 409 if the storage server configuration object type is set to "camera". The STATE element 1109 is described in detail in section 3.2.9 below with reference to FIG. 12.

Each DAY element 1111 describes a single 24-hour period in a schedule for a particular camera server 109-111. A cameraid attribute 1127 specifies the particular camera server 109-111 that the DAY element 1111 belongs to, and should have the same value as the id attribute of the parent CAMERA element 409. A name attribute 1129 describes the name of the day in the schedule. Weekday schedules are indicated by specifying "Monday", "Tuesday" etc as the day names. If any string is used that is not a weekday name, the DAY element 1111 is assumed to represent a special schedule.

Each DATE element 1113 within a DAY element 1111 specifies a single date at which that day is active. Weekday elements are automatically assumed to be active on each day corresponding to their names, unless they are overridden by a special schedule with a DATE element 1113 corresponding to that day. The format of the DATE element 1113 is "yyyy-mm-dd".

Each SCHED element 1115 within a DAY element 1111 describes a single schedule item. The SCHED element 1115 is described in detail in section 3.2.10 with reference to FIG. 13.

3.2.9 The STATE Element

Figure 12:
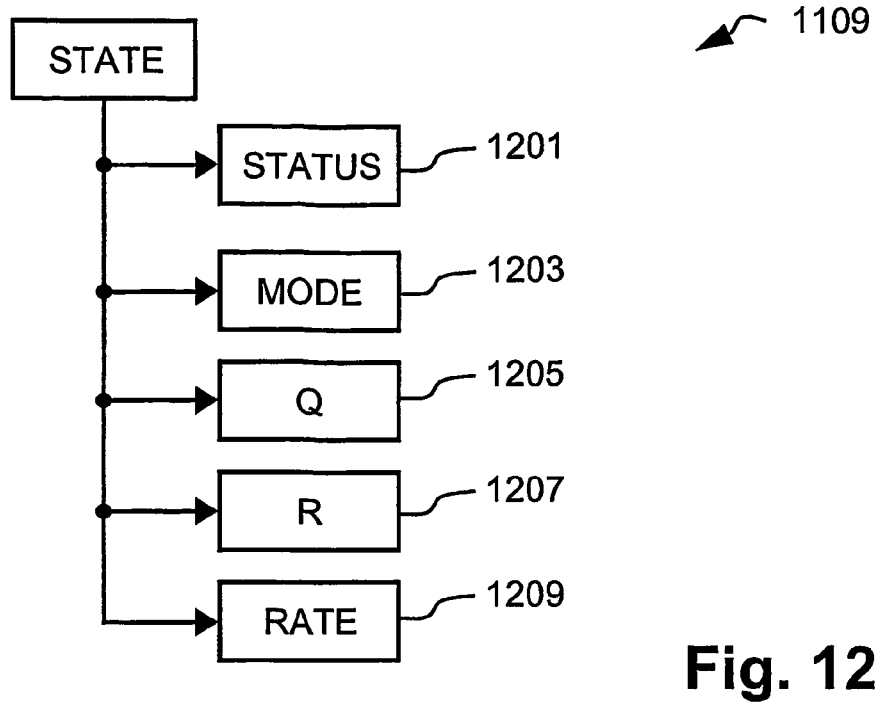
FIG. 12 shows a STATE element of FIG. 11 in more detail.

The STATE element 1109 can be contained within a CAMERA element 409 to indicate the current state of a particular camera 112-115. As seen in FIG. 12, the STATE element 1109 comprises a number of further elements 1201 to 1209.

A STATUS element 1201 indicates the current status of the associated camera server 109-111, and can take one of the following values:

(i) unknown;
(ii) disconnected;
(iii) idle;
(iv) starting;
(v) monitoring;
(vi) recording; and
(vii) error.

A MODE 1203 element contains an integer value, which describes the current schedule type. The following schedule types are shown in Table 3 below:

TABLE 3

| | |
|---|---|
| 0 | None |
| 1 | Record |
| 2 | Sensor |
| 3 | Record + Sensor |
| 4 | Motion |
| 5 | Record + Motion |
| 6 | Sensor + Motion |
| 7 | Record + Sensor + Motion |

A Q element 1205 specifies the quality that the particular camera server 109-111 is currently scheduled to be receiving sample data samples at. Valid values for the Q element 1205 are described in the Table 4 below:

TABLE 4

| | |
|---|---|
| −1 | Quality not specified (use the current quality settings without changing them) |
| 1 | JPEG quality factor 10 |
| 2 | JPEG quality factor 30 |
| 3 | JPEG quality factor 50 |
| 4 | JPEG quality factor 70 |
| 5 | JPEG quality factor 90 |

An R element 1207 specifies the resolution that the camera server 109-111 is currently scheduled to be receiving sample data samples at. Valid values for the R element 1277 are described in the Table 5 below:

TABLE 5

| | |
|---|---|
| −1 | Resolution not specified (use the current resolution settings without changing them) |
| 0 | 160 × 120 |
| 1 | 320 × 240 |
| 2 | 640 × 240 (VB101 and VB150) or 640 × 480 (VB-C10) |

A RATE element 1209 indicates the frame rate that the recording engine 201 is currently recording video at.

3.2.10 The SCHED Element

Figure 13:
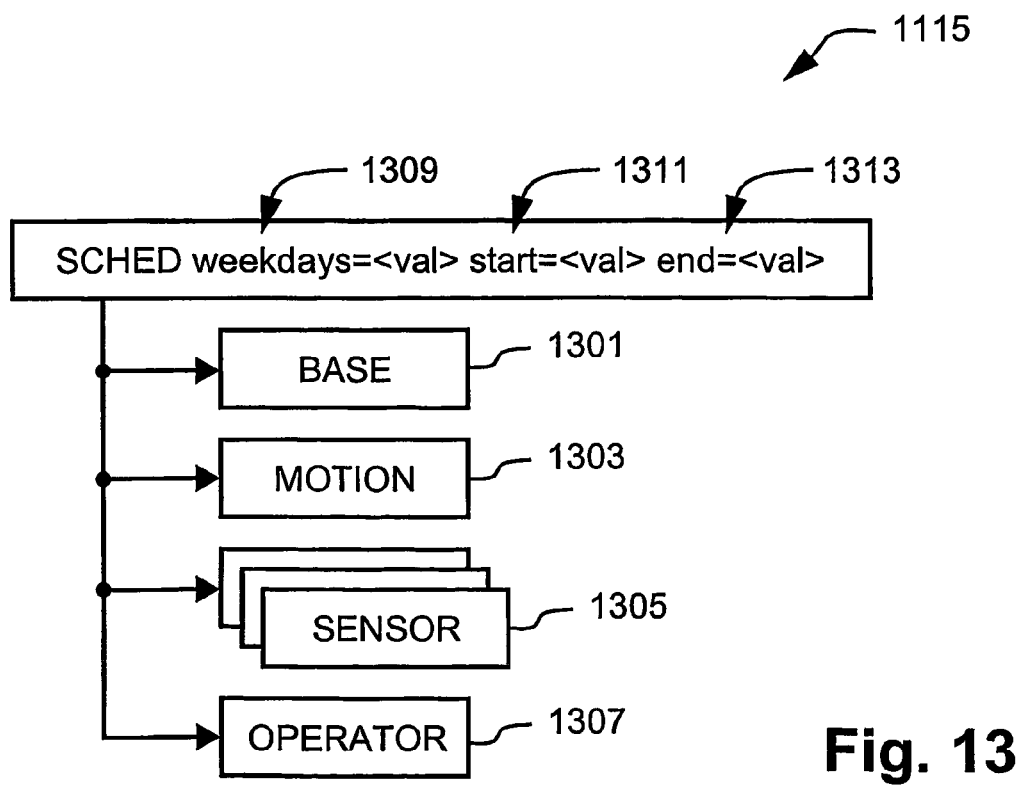
FIG. 13 shows a SCHED element of FIG. 11 in more detail.

The SCHED element 1115 describes a single schedule item within a day. As seen in FIG. 13, the SCHED element 1115 comprises a number of further elements 1301-1307. A weekdays attribute 1309 indicates the set of weekdays during which the particular schedule item is effective. The weekdays attribute 1309 is not used by the recording engine 201. The weekdays attribute 1309 is stored in a storage server configuration file 205 and sent to the viewer 2200 in order to allow the viewer 2200 to easily group identical schedule items that occur on more than one weekday. A start 1311 and stop 1313 attribute indicate the period of time during which the schedule item is effective, each of the attributes 1311 and 1313 having a format of "hhmm".

A BASE element 1301 describes the normal recording settings during the particular schedule period, and is described in more detail in section 3.2.11.

A MOTION element 1303 describes the motion detection settings during the schedule represented by the schedule element 1115. If motion detection is not enabled during the particular schedule, then the MOTION element 1303 can be omitted. The MOTION element 1303 is described in more detail in section 3.2.12.

Each SENSOR element 1305 describes sensor settings for a particular sensor input connected to a particular camera server 109-111. If sensor based recording (i.e., recording triggered by a sensor) is not enabled during the particular schedule, the SENSOR elements 1305 can be omitted. SENSOR elements 1305 are described in more detail in section 3.2.13.

An OPERATOR element 1307 describes the recording settings to be activated when a trigger message is received by the recording engine 201. This typically occurs when a user initiates manual recording from a viewing screen 7600 (see FIG. 76) of a viewer 2200 causing the viewer 2200 to send a RE_trigger command (as described in detail below) to the recording engine 201 via the web server 213. Recording settings are also activated when external software (such as an alarm control system) sends an RE_trigger command to the recording engine 201 via the web server 213. The OPERATOR element 1307 is essentially the same type as an EVENT element, which is described in detail in section 3.2.14.

3.2.11 The BASE Element

Figure 14:
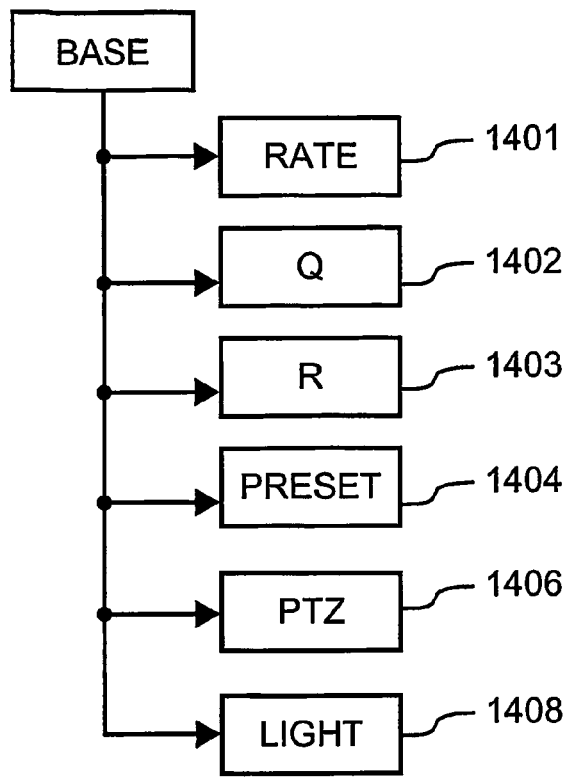
FIG. 14 shows a BASE element of FIG. 13 in more detail.

FIG. 14 shows the BASE element 1301. The BASE element 1301 describes the normal recording settings during a particular schedule period. As seen in FIG. 14, the BASE element comprises a number of further elements 1401-1408.

A RATE element 1401 indicates the frame (i.e, sample) rate to be recorded at, up to a maximum of 30.0 frames per second. If no recording is to take place, a rate of 0.0 is specified.

A Q element 1402 indicates the image quality of the sample data to be retrieved from the particular camera server 109-111 associated with the BASE element 1301.

An R element 1403 indicates the resolution of video sample data to be retrieved from the particular camera server 109-111.

A PRESET element 1404 indicates an identifier of the preset position that a camera 112-115 of a particular camera server 109-111 should face when recording. Valid preset identifiers are the numbers one to eight. A special value of negative one can be specified to indicate that the position of the camera 112-115 should not be controlled.

A PTZ element 1406 contains three floating point values, separated by '/' characters, which indicate the pan, tilt and zoom settings, respectively, of the camera 112-115 associated with a particular camera server 109-111. The PTZ element 1406 is used to specify a custom viewing position, which does not correspond to any of the presets, for the particular camera 112-115. The PRESET 1404 and PTZ elements 1406 are mutually exclusive.

A LIGHT element 1408 indicates whether backlight compensation associated with a particular camera 112-115 is to be turned on. A non-zero value for the LIGHT element 1408 indicates that the backlight compensation is to be turned on, while a value of zero indicates that the backlight compensation is to be off.

3.2.12 The MOTION Element

Figure 15:
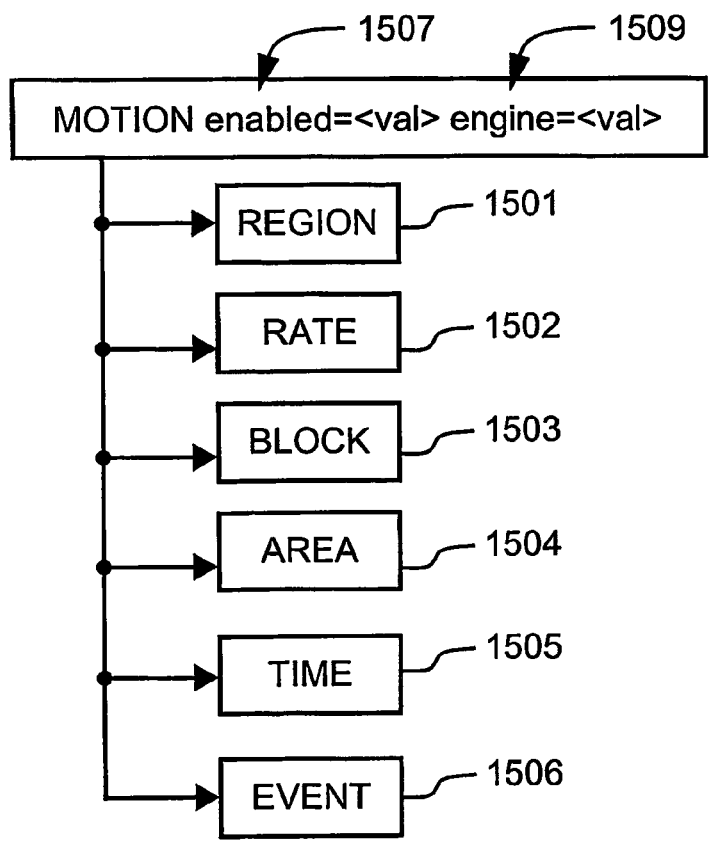
FIG. 15 shows a MOTION element of FIG. 13 in more detail.

A MOTION element 1303 indicates motion detection parameters used during the given schedule period defined by the SCHED element 1115. As seen in FIG. 15, the MOTION element 1303 comprises a number of further elements 1501-1506. An enabled attribute 1507 controls whether motion detection is enabled. If the value of the enabled attribute 1507 is zero, motion detection is disabled. If the value of the enabled attribute 1507 is non-zero, then motion detection is activated. An engine attribute 1509 controls where the motion detection is performed. The engine attribute 1509 can take one of two valid values as follows:

(i) re—indicates that motion detection should be performed by the recording engine 201;

(ii) camsvr—indicates that the motion detection should be performed by the particular camera server 109-111 (Note: this is applicable for certain types of camera server only such as the VB150 camera server type);

A REGION element 1501 indicates the portion of an image in which motion analysis is to be performed. That is, the area within a video image, represented by video sample data captured by a particular camera 112-115, where motion analysis is to be performed in order to detect motion. The motion analysis is performed by an image analysis engine (not shown) within the recording engine 201. The value of the REGION element 1501 is of the form "$((x1,y1)-(x2,y2))$", where $x1$ and $x2$ are between 0 and 80, and $y1$ and $y2$ are between 0 and 60. The $x1$, $x2$, $y1$ and $y2$ limits represent the number of 8×8 blocks in a 640×480 image. However, these limits can be scaled appropriately by the image analysis engine when smaller resolutions are in use.

A RATE element 1502 indicates the rate at which frames are analysed by the image analysis engine, up to a maximum of 30.0 frames per second.

A BLOCK element 1503 controls the block tolerance setting (i.e., also known as sensitivity) used by the image analysis engine, and can take a value between 0 and 255.

An AREA element 1504 controls the area tolerance setting used by the image analysis engine, expressed as a percentage of the total area (i.e., physical area) covered by the region being analysed. The AREA element 1504 can take a value between 0.0% and 100.0%

A TIME element 1505 controls the time tolerance setting used by the image analysis engine. The TIME element 1505 can be a value between 0.0 seconds and 5.0 seconds.

An EVENT element 1506 controls the recording engine 201 when a motion event has occurred. The EVENT element 1506 will be described in detail in section 3.2.14.

3.2.13 The SENSOR Element

Figure 16:
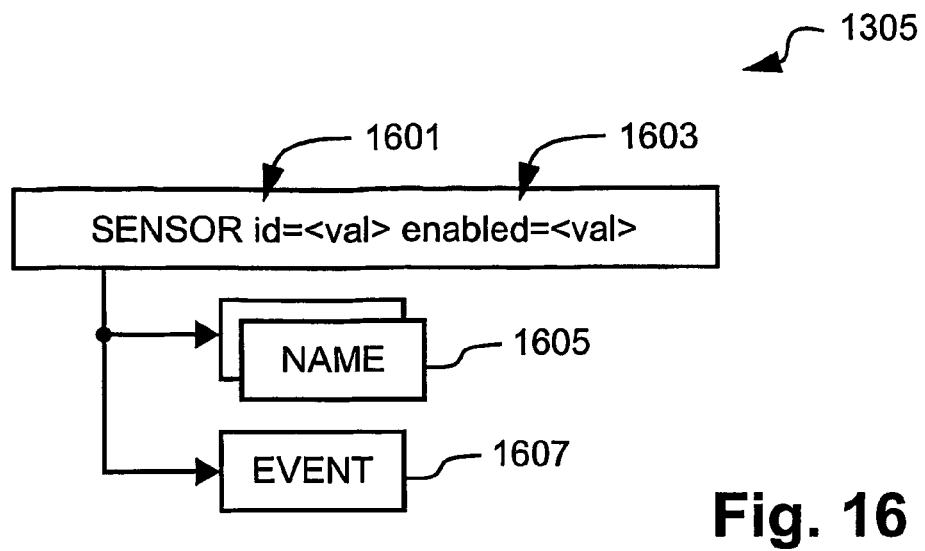
FIG. 16 shows a SENSOR element of FIG. 13 in more detail.

FIG. 16 shows the SENSOR element 1305. The SENSOR element 1305 may be used to indicate the settings used by a particular sensor associated with a particular camera server 109-111 described by the parent CAMERA element 409. As seen in FIG. 16, an id attribute 1601 indicates an identifier corresponding to the particular sensor on the particular camera server 109-111. On VB101 and VB150 type camera servers, the SENSOR element 1305 can be set to a value of zero or one. On VB-C10 type camera servers, the SENSOR element 1305 can be zero. An enabled attribute 1603 indicates whether sensor based recording with the associated sensor is enabled.

Each NAME element 1605 indicates the name of a particular sensor. There can be up to two NAME elements 1605. The NAME elements 1605 are distinguished by language, which is specified in the language attribute. Valid language identifiers are "English" and "Japanese". Two NAME elements 1605 within a single SENSOR element 1305 should have the same language identifier.

An EVENT element 1607 controls the recording engine 201 when a sensor event has occurred and is the same as the EVENT element 1506, which will be described in detail in section 3.2.14.

3.2.14 The EVENT Element

Figure 17:
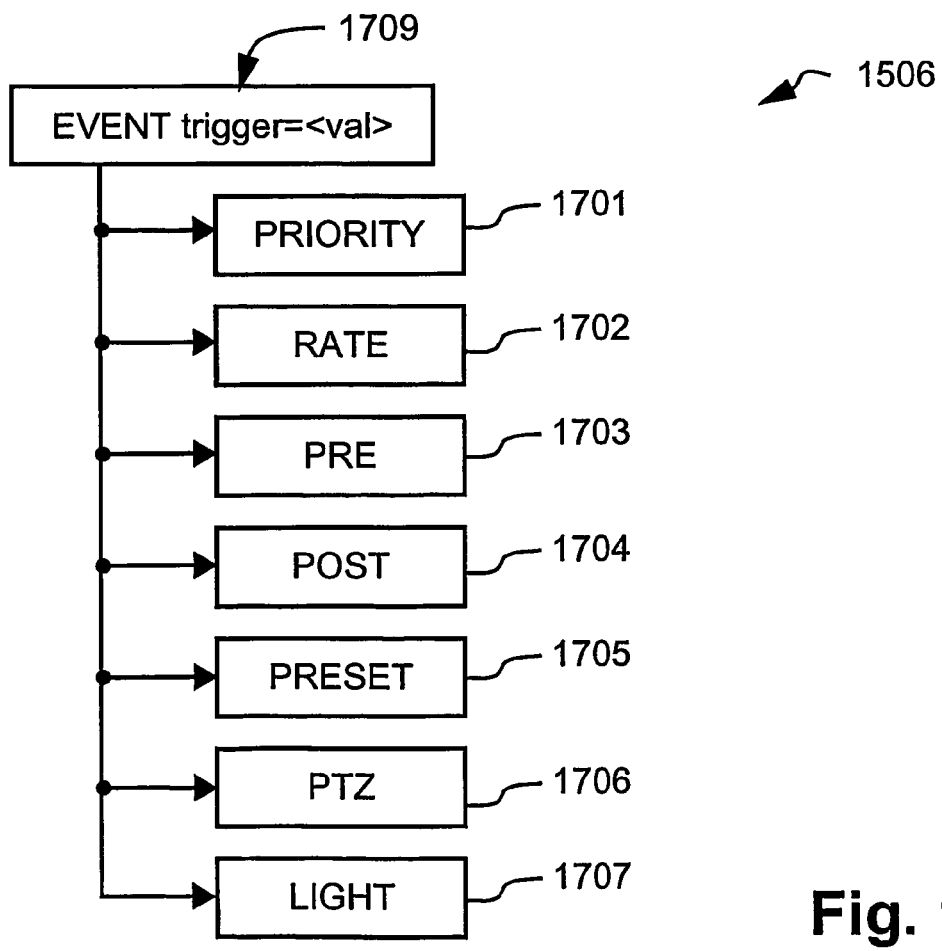
FIG. 17 shows an EVENT element of FIGS. 15 and 16 in more detail.

FIG. 17 shows an EVENT element 1506. As described above, the EVENT element 1506 controls the recording engine 201 when a particular event has occurred. As seen in FIG. 17, the EVENT element 1506 comprises a number of further elements 1701-1707. A trigger attribute 1709 indicates by a non-zero value that the associated event is to be triggered. That is, the settings inside the corresponding EVENT element are to apply for a certain time.

A PRIORITY element 1701 controls the priority of the event. When an event is triggered, settings apply only if the triggered event is the highest priority event of all events that are currently triggered for the associated camera 112-115. The value of the PRIORITY element 1701 can range from one (i.e., highest priority) to five (i.e., lowest priority).

A RATE element 1702 controls the rate at which frames (i.e., samples) are to be recorded while the associated event is triggered, up to a maximum of 30.0 frames per second.

A PRE element 1703 specifies a pre-event recording duration (i.e., the number of seconds of sample data that are to be recorded prior to that event being triggered).

A POST element 1704 specifies a post-event recording duration (i.e., the number of seconds after the event is no longer triggered that the settings within the EVENT element 1709 still apply).

A PRESET element 1705 specifies the preset position to which a particular camera 112-115 of an associated camera server 109-111 is to be moved if the event is triggered. Valid PRESET identifiers are the numbers one to eight. A special value of negative one can be specified to indicate that an associated camera 112-115 position is not to be controlled.

A PTZ element 1706 contains three floating point values, separated by '/' characters, which indicate the pan, tilt and zoom settings of a particular camera 112-115, respectively. The PTZ element 1706 can be used to specify a custom camera position, which does not correspond to any of the presets. The PRESET 1705 and PTZ 1706 elements are mutually exclusive.

A LIGHT element 1707 indicates whether backlight compensation associated with a particular camera 112-115 is to be turned on while the event is triggered. A non-zero value for the LIGHT element 1707 indicates that the backlight compensation is to be turned on while a value of zero indicates that the backlight compensation is to be off.

3.3 Storage Server Data

3.3.1 The Storage Server Configuration File

A storage server configuration file 205 is a data file containing a storage server configuration object (SSCO) of type "file". The storage server configuration file 205 contains the information necessary to run an individual storage server (e.g., one of the storage servers 2300A, 2300B, 2300C and 2300D). The storage server configuration file 205 is read by the recording engine 201 when the recording engine 201 begins to execute. The storage server configuration file 205 is rewritten every time the configuration of the recording engine 201 is changed by an administrator.

The storage server configuration tool 211 can also be used to rewrite the storage server configuration file 205, and sends an inter-process communication (IPC) message to the recording engine 201 every time the configuration file 205 is changed, in order to instruct the recording engine 201 to determine the general settings of the storage server 2300 again.

3.3.2 Storage Server User Authentication

The storage server users file defines which users have access to the recording engine 201 via the web interface 213, and can be modified using the storage server configuration tool 211, which will be described in detail below. The storage server user file is a text file consisting of a set of entries, one per line. Each entry consists of a user name (identifying the user), a realm (i.e., a string identifying the context within which the user is valid) and a digest. The realm used is a value configured for a system 100 (for example "COMPANYNAME"). The digest is generated by concatenating the user name, realm and password using the ':' (colon) character as a separator, and then applying the MD5 algorithm to this data to generate a hash.

The storage server groups file is used to define which users listed in the storage server users file have administrative privileges. The storage server groups file consists of a single line, beginning with the string "admin", which is followed by the user name of each user with administrative privileges, separated by spaces. The storage server groups file is also generated and modified by the storage server configuration tool (discussed below).

3.3.3 Storage Server Data File Structure

Figure 93:
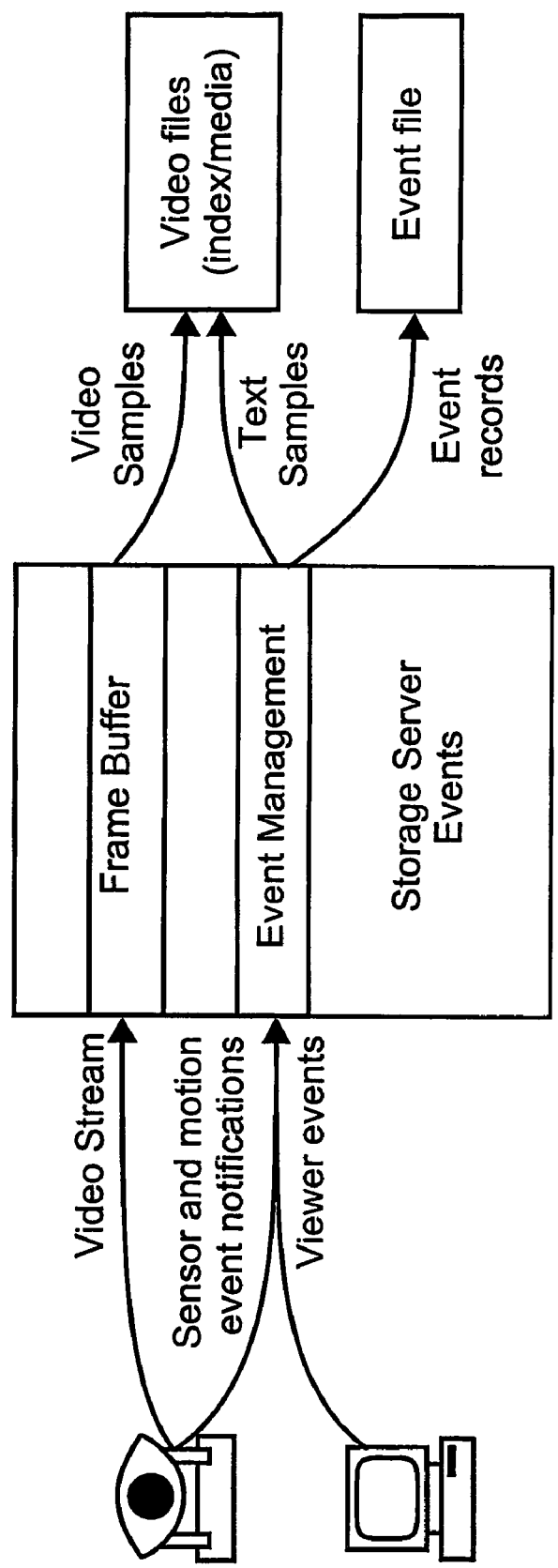
FIG. 93 is a schematic block diagram showing data flow through the recording engine.

The video and event data stored by the recording engine 201 is distributed among a set of files. All video data received from a camera 112-115 is stored in video files. Event data can be collected from a variety of sources including camera servers 109-111, viewers 2200, and internal storage server 2300 events. Event data is stored in the form of event records in a separate event file. Event data can also be inserted into text samples, which are stored together with received video frames in the video files. FIG. 93 shows the way the data flows through the recording engine from the sources of the data to the files.

3.3.4 Storage Server Video File Structure

In a video monitoring and recording system, it is advantageous to have recorded video in files using standard or de facto standard formats so that it is convenient for users to extract video from the storage server 2300 for playing or processing using third party programs (such as commonly used media players). Also, in some situations, it may be advantageous to maintain the data in smaller chunks associated with different durations of time. In these situations, the smaller chunks facilitate finer-grained control over the deletion of video sample data and enables easier access to the stored data by third-party tools.

The storage server 2300 maintains distinct sets of video files and event files within the storage device 2209 (including internal, external and network accessible drives). There is a set of files associated with each of the cameras 112-115 for a specific duration of time, consisting of a media file 1800 and an index file 1805, which are collectively referred to herein as video files, and an event file.

Figure 18:
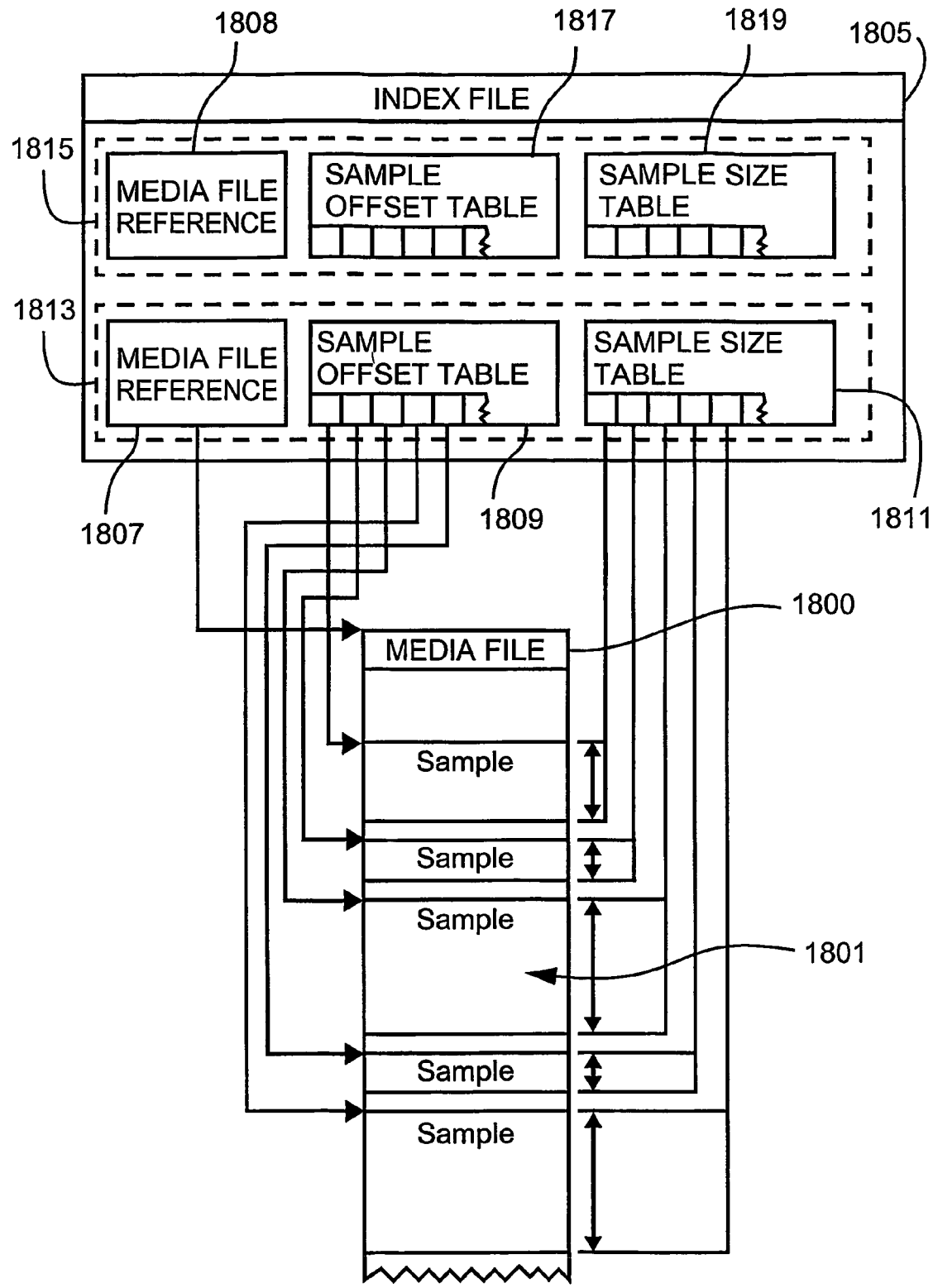
FIG. 18 shows the relationship between an index file and a media file.

As seen in FIG. 18, the video files comprise a first file 1800 and a second file 1805. The first file 1800, referred to as a media file, is used to store the video sample data captured by the cameras 112-115. Such media files 1800 can store video sample data as samples representing video frames and text samples representing time stamps and event notifications.

The second file 1805 of the pair of video files is referred to as an index file. The index file 1805 stores information which instructs a media player application (e.g., QuickTime™) or an access engine 203 as to where to find each sample in the media file 1800, and when each of the samples are to be played by the media player or served by the access engine 203.

The formats of the files 1800 and 1805 will be described in detail in section 3.3.4.2.

Although an implementation is described herein where media samples and index information (such as timing and resolution) are in separate files, in another implementation media samples and index information can be configured within a common file.

3.3.4.1 File Location and Naming

The data files 209 corresponding to each of the camera servers 109-111 are stored in a subdirectory of a drive selected to store files for that camera server 109-111. For example, the data files 209 can be stored in the directory "drive:\Webview-NVR\videofiles", where drive is replaced by the letter of the drive selected to store the data files 209. Each of the camera servers 109-111 that is recording at a given time has one pair of standby files (i.e., a media file 1800 and associated index file 1805) associated with the particular camera server 109-111. The standby files are named according to the following template (1):

Standby(0|1)_cameraid_creationdate_creationtime_count.avi; and

Standby(0|1)_cameraid_creationdate_creationtime_count.mov (1)

The character immediately following the word Standby is set to either 0 or 1, and indicates which standby file (i.e., media file 1800 and associated index file 1805) is being represented. As will be described below, there can be two standby files (i.e., two media files 1800 and two associated index files 1805) per camera server 109-111.

The cameraid section of the template (1) is a 16-character data string that represents a unique identifier of a particular camera server 109-111 given to the particular camera server 109-111 by the recording engine 201 when the particular camera server 109-111 was first added to the system 100. The cameraid section is represented in hexadecimal format, with lower case letters representing the values A to F.

The creationdate section of the template (1) represents the date at which the associated standby file was created, in Coordinated Universal Time (UTC). The format creationdate section is yyyymmdd.

The creationtime section of the template (1) represents the time at which the standby file was created, in universal time convention. The format of the creationtime section is hhmmss.

The count section of the template (1) represents the sequential number of the associated standby files, counting from a standby file representing the beginning of a current recording session by the recording engine 201. A separate counter can be maintained for each camera server 109-111 in the system 100. If more than one standby file is created with the same camera identifier, creation date and time (i.e., to the second), then the value of the count section can be used to distinguish between such files.

The recording engine 201 attempts to maintain one inactive standby file (i.e., one inactive media file 1800 and associated index file 805) per camera server 109-111 at any point in time. The recording engine 201 maintains one inactive standby file to ensure that any overhead incurred when creating a set of standby files does not delay the writing of sample data to these files, by having a file ready to record to when a file swapover occurs. Thus, when a standby file is moved to an active state by having a sample written to the corresponding media file 1800 of the standby file, a new inactive standby file is created in a parallel operation.

A standby file pair (i.e, media file 1800 and associated index file 1805) can be completed upon fulfillment of one of a set of criteria as follows:

(i) recording is stopped due to a schedule change;
(ii) the size of the media file 1800 exceeds a user configured limit;
(iii) the size of the media file 1800 exceeds a hard limit of one giga-byte;
(iv) the duration of the video sample date represented in the standby media file 1800 exceeds a user configured limit;
(v) the duration of the video sample data represented in the standby media file 1800 exceeds a hard limit of 24 hours; and
(vi) the associated index file 1805 is filled to capacity and cannot index further samples.

When a standby file pair is completed, the standby file pair is closed and renamed as a completed file pair according to the following template (2):

MEDIA_cameraid_startdate_starttime_enddate_endtime_count.avi; and

INDEX_cameraid_startdate_starttime_enddate_endtime_count.mov. (2)

As before, the cameraid section of the template (2) is a 16-character string that represents the unique identifier of a particular camera server 109-111 given to the particular camera server 109-111 by the recording engine 201 when the particular camera server 109-111 was first added to the system 100. The value of the cameraid section is represented in hexadecimal format, with lower case letters representing the values A to F.

The startdate section of the above template represents the date at which the first sample of the standby file pair was recorded, in universal time convention format. The startdate section format is yyyymmdd.

The starttime section represents the time at which the first sample of the file was recorded, in universal time convention format. The format of the starttime section is hhmmss.

The startdate and starttime do not necessarily represent the same values as the creationdate and creationtime used in the standby files.

The enddate section represents the date at which the standby file pair was completed, in universal time convention format. The format of the enddate section is yyyymmdd.

The endtime section represents the time at which the standby file pair was completed, in universal time convention format. The format of the endtime section is hhmmss.

The naming format of the above files allows the access engine 203 to determine whether a media file 1800 and associated index file 1805 representing a particular moment in time is present. The naming format also allows an administrator to easily determine the range of time covered by a particular file recorded by the recording engine 201 to enable copying and moving files using third party file management software such as Windows™ Explorer. The naming format also makes it possible for third party software applications to automatically handle or process the files (eg for automated periodic copying to archival storage) without having to check any form of central index of files. The naming format also avoids the possibility of inconsistency between a central index and the actual files which could occur if a central file index was maintained by the recording engine 201.

3.3.4.2 File Formats

As described below, the index file 1805 contains one or more tracks 1813 and 1815. Each track contains a reference (e.g. the reference 1807) to an associated media file 200. As such, in another implementation, an index file 205 having more than one track 213 can point to several media files (e.g. the media file 1800). For example, in the instance where one media file (e.g. the media file 1800) contains all video samples while another media file (not shown) contains all event descriptions associated with those video samples, an associated index file (e.g. the file 1805) can point to both of the media files 1800.

In one implementation, one media file (e.g. the file 1800) can be referenced by several index files 1805. For example, in the instance where one media file 1800 stores samples (i.e., sample data) received from several of the camera servers 109-111, such a media file 1800 can be referenced by several index files 1805.

3.3.4.2.1 Index File

The index file 1805 is configured in accordance with the QuickTime™ file format. The QuickTime™ file format stores data using a special memory structure called an atom. An atom is a data container specified by the QuickTime™ file format. Each atom has an associated type code which specifies the kind of data stored in the associated atom. As described above, a detailed description of the QuickTime™ file format and in particular, QuickTime™ atoms can be found in the publication entitled "QuickTime File Format", published by Apple Computer Inc.

The index file 1805 contains all of the atoms that are specified for a QuickTime™ file. An atom, referred to as a track atom, stores each track (e.g. the tracks 1813 and 1815). A track associated with a particular track atom contains a pointer (e.g., the media file reference 1813) to a media file 1800 that is referenced by the track.

As seen in FIG. 18, each of the tracks 1813 and 1815 of the index file 1805 also contain a sample-offset table 1809 and 1817, respectively. The tracks 1813 and 1815 store offsets to each sample (e.g. the sample 1801) within the associated media file 1800. Each of the tracks 1813 and 1815 of the index file 1805 also contains a sample size table 1811 and 1819, respectively. The sample size tables 1811 and 1818 store the size of the samples contained in the associated media file 1800.

The sample offset tables 1809 and 1817 and the sample size tables 1811 and 1819, are configured to be read by a QuickTime™ media player. As a result, a completed index file 1805 can be opened by a QuickTime™ media player, which locates the associated media file 1800 using the media file reference (e.g. the reference 1807) included within a track 1813 of the index file 1805. Additionally, as long as the contents of the completed index file 1805 are flushed to the hard disk drive 2310 regularly and in a manner that ensures the consistency of the file 1805, the QuickTime™ media player may view an in-progress recording up to the point of the last full flush. If there is a system failure, data added to the index file 1805 after the last time that the file 1805 was flushed will be lost from the index file 1805.

3.3.4.2.2 Media File

The format of the media file 1800 is flexible. Each individual sample (e.g. 1801) is stored as a single set of consecutive bytes. The following sections describe a preferred format for the media file 1800, which is supported by the described arrangements. However, a person skilled in the relevant art would appreciate that any suitable file format can be used for the media file 1800.

(i) AVI™ Media Data Format

The media file 1800 is configured in accordance with the Microsoft™ AVI™ file format. The AVI™ file format is a file specification used with an AVI™ media player application or any media player application that can read a file configured in accordance with the AVI™ file format. Such a media player application can be used to capture, edit, and play back video/audio sequences. In general, files configured in accordance with the AVI™ file format include multiple data streams (i.e., samples) containing samples of different types of data. Most AVI™ sequences use both audio and video streams. A simple variation of such an AVI™ sequence uses video data and does not require an audio stream. The media file 1800 is playable by any media player software application that can read the AVI™ file format.

The AVI™ file format has several limitations with regard to the processing of sample data captured by the camera servers 109-111. Firstly, each AVI™ sample is played back at a constant frame rate. Thus, changes in frame rate or late samples due to network lag can result in the playback rate inaccurately portraying the passage of time. Secondly, for an image file configured in accordance with the motion-JPEG (Joint Photographics Experts Group) standard, a value representing image resolution is stored within each JPEG fragment of the image file. However, media players such as the Windows™ Media Player can not scale the image, resulting in sub-optimal playback results.

When the media file 1800 is first created, a set of headers is generated. An AVI™ header is generated to store general details about the file 1800. Further, individual stream headers are generated to represent each track within the associated index file 1805 that points to the given media data file 1800. An empty sample list structure is also created to store each individual sample (e.g. the sample 1801) of the media file 1800.

When the media file 1800 is closed, the headers are updated to reflect the number of samples that were stored within the media file 1800. Further, an associated AVI™ index (not shown) is appended to the end of the file 1800. The AVI™ index is a standard structure required by the Windows™ Media Player to play back the sample data of an AVI™ file 1805.

When inserting a sample (e.g. the sample 1801) into an active (i.e., open) media file 1800, the sample is stored within a new sample chunk of the file 1800. The stored sample has a header indicating which data stream the corresponding sample belongs to and the size of the sample. Additionally, a special chunk, hereinafter referred to as a 'CNVD' chunk is inserted in front of the newly stored sample. The CNVD chunk is configured to be ignored by a standard AVI™ media player. The CNVD chunk contains additional information, which can be used to recover the media file 1800 and the associated index file 1805. In particular, the CNVD chunk contains information including the timestamp (i.e., in milliseconds) and the resolution of the newly stored sample following the CNVD chunk.

(ii) AVI™ Video Stream Handling

Each video sample of the sample data captured by the camera servers 109-111 is preferably configured as a separate JPEG file, which is inserted as a separate sample (i.e., sample chunk) within the AVI™ media file 1800.

(iii) AVI™ Text Stream Handling

The QuickTime™ file format, as described above, is a file specification used with a QuickTime™ media player application of the same name or any media player application that can read a file configured in accordance with the QuickTime™ file format. The QuickTime™ file format provides support for variable video frame rates and resolutions. A detailed description of the QuickTime™ file format can be found in the publication entitled "QuickTime File Format", published by Apple Computer Inc. The QuickTime File Format publication can be found at the website http://developer.apple.com/techpubs/quicktime/qtdevdocs/PDF/QTFileFormat.pdf, as of 9 Jan. 2003.

The QuickTime™ file format specifies that a text string consists of a 16-bit length field, followed by the text string characters. However, the AVI™ file format specifies a null-terminated string. In order to allow text strings to be played back correctly in both the QuickTime™ and the AVI™ file formats, two copies of the same text string are placed within a relevant sample chunk of the media file 1800. The first copy of the text string is a null-terminated version of the text string. An AVI™ media player automatically locates the first copy at the beginning of the relevant sample of the file 1800, and discards any data subsequent to the terminating character. The second copy of the text string is placed immediately after the null character terminating the first copy. The second copy is configured in accordance with the QuickTime™ file format. In this case, the QuickTime™ index file 1805 is provided with the offset of the second copy of the string, rather than the offset of the beginning of a sample, which the index file 1805 normally uses to reference a corresponding sample.

Figure 19:
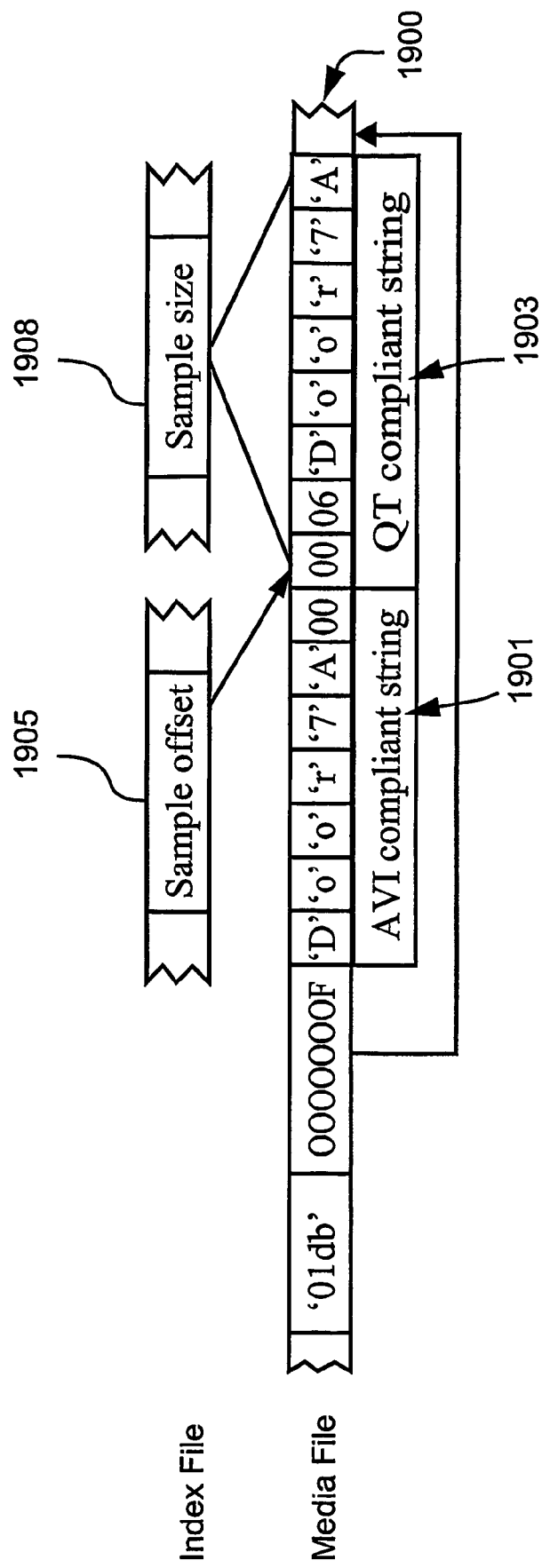
FIG. 19 shows an example of the placement of a text sample within a media file configured in accordance with the AVI™ file format.

As an example, FIG. 19 shows the placement of the text string sample, "Door7A", within a media file 1900 configured in accordance with the AVI™ file format. As seen in FIG. 19, an AVI™ version 1901 and a QuickTime™ version 1903 of the text sample are included in the file 1900. FIG. 19 also indicates the sample offset 1905 and the sample size 1908 entries of a corresponding index file (not shown) for the data string "Door7A". In particular, the sample offset entry 1905 points to the beginning of the QuickTime™ version 1903 of the text sample. Further, the sample size entry 1908 provides the size of the QuickTime™ version 1903.

3.3.5 Storage Server Event File Structure

The event files corresponding to each camera server 109-111 are stored in a subdirectory of a drive configured within the storage device 2309 and selected to store event files for that camera server 109-111. For example, the event files can be stored in the directory "drive:\Webview-NVR\eventfiles", where drive is replaced by the letter of the drive selected to store the event files.

The recording engine 201 creates an event file corresponding to each video file pair (i.e., relating to the same camera 112-115 and to the same duration of time). The matching of an event file with video file pair is useful in situations where video and event data is moved to archival storage, as the video and event data can be both copied or moved together and later can both be replaced together. Such matching ensures that the video data associated with specific events will be available if a user attempts to access information about the events, and that event data associated with specific video will be available if a user tries to access specific video.

Each event file can be named according to the following template:

EVENT_cameraid_creationdate-
_creationtime_count.evt          (3)

The cameraid section of the template (3) is a 16-character string that represents the unique identifier of a particular camera server 109-111 given to the particular camera 109-111 by the recording engine 201 when the particular camera server 109-111 was first added to the system 100. The value of the cameraid of the template section (3) is represented in hexadecimal format, with lower case letters representing the values A to F.

The creationdate section of the template (3) represents the date at which the event file was created, in UTC. The format of the creationdate is yyyymmdd.

The creationtime section of the template (3) represents the time at which the event file was created, in UTC. The format of the creationtime section is hhmmss.

The count section of the template (3) represents a sequential number corresponding to the event file, counting from an event file representing the beginning of a current recording session by the recording engine 201. A separate counter can be maintained for each camera server 109-111 in the system 100. If more than one file is created with the same camera identifier, creation date and time (i.e., to the second), then the value of the count section can be used to distinguish between such files.

In addition to these event files, there is a system event file that contains events associated with the storage server 2300 but not necessarily associated with a particular camera server 109-111. These include events that indicate the startup or shutdown of the recording engine 201, or remote users logging in to the system 100 on a viewer 2200 to retrieve viewer configuration and layout files, as will be explained in more detail below.

The event file is a text file, encoded in UTF8 format. Each line of the event file contains an event record describing a single event, and consists of several fields, delimited by a colon, as follows:

<datetime>:<cameraid>:<type>:<priority>:<description>          (4)

The datetime field of the event file line (4) describes the date and time at which the event was recorded. The datetime field is in the standard format that is generated by the ANSI function ctime ( ), with an additional millisecond field inserted. An example of such a time is: Tue Aug 19 05:05:53.585 2003, where the date and time are always expressed in UTC format.

The cameraid field describes the identifier of the camera sever 109-111 associated with the event. If no camera server 109-111 is associated with the event, the cameraid field is set to SYSTEM.

The type field of the event file line (4) comprises a four letter code defining the type of the event, followed by either a zero (i.e., indicating that the event is stopping—OFF) or a one (i.e., indicating that the event is starting—ON). Certain events, such as a user logging on, do not have an OFF event.

Table 6 below defines all the available event types:

TABLE 6

| | |
|---|---|
| NVRR | recording engine 201 is starting/stopping |
| NVRA | access engine 203 is starting/stopping |
| SENS | external sensor on/off |
| MOTN | motion detected (either by camera server, or storage server) |
| OPER | Operator triggered recording started |
| RECD | Video recording starting/stopping |
| FILE | Data file set created/closed |
| LOGN | User logged on requesting camera configuration |
| DISK | Low disk space alert |
| COMM | Communication failure to camera server |

The priority field of the event file line (4) above contains a value between one (i.e., highest priority) and five (i.e., lowest priority).

The final field of the event file line (4), description, may optionally contain additional colons as the end of the field is located using the newline character.

3.4 Configuration Management Module

The configuration management module 315 reads and writes the storage server configuration file, and provides a mechanism to allow other applications to signal the recording engine 201 when they modify the storage server configuration file.

Figure 94:
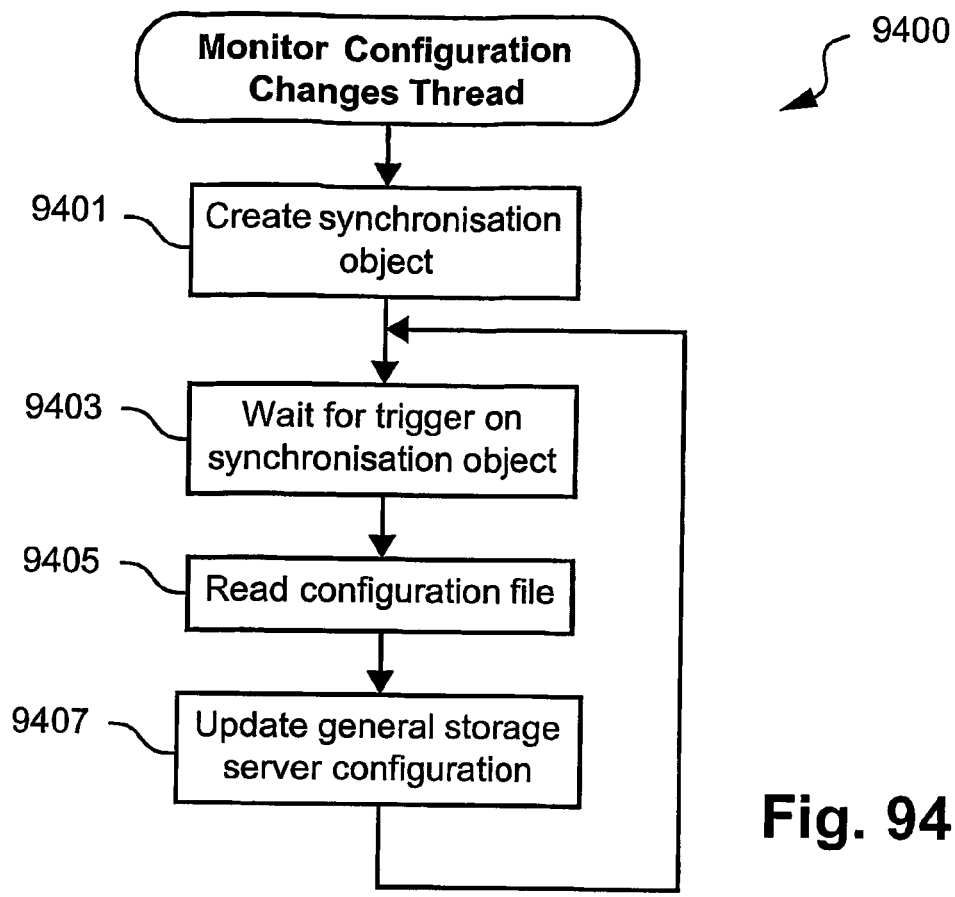
FIG. 94 is a flow diagram showing a process for monitoring configuration changes.

FIG. 94 shows is a flow diagram showing a monitor configuration changes process 9400. The process 9400 is preferably implemented as software resident on the hard disk drive 2310 and controlled in its execution by the processor 2305. The process 9400 waits on a synchronization object that can be signaled by other applications. In one implementation such another application will operate on a Microsoft Windows™ operating system. In this instance, the synchronisation object used is a named Event object. In one particular implementation, the object could be named "Recording Engine Configuration Changed", where the security attributes of the object are set to allow all users to access the object.

The process 9400 updates the General section of the configuration file. If camera servers 109-111 or cameras 112-115 were also added, modified or deleted, these changes are ignored.

The process 9400 begins at the first step 9401 where the processor 2305 creates a synchronisation object that can be accessed by other applications, setting the name and security attributes of the synchronisation object. The processor 2305 then enters a loop, waiting for the synchronisation object to be triggered by another application. After the object is triggered at step 9403, the Storage Server Configuration File is read at the next step 9405.

At the next step 9407, the process 9400 updates the internal variables that correspond to a General section of the Storage Server Configuration File, before returning to step 9403 where a new synchronisation event is sought.

3.5 Video File Management Module

The video file management module 317 of the recording engine 201 manages all of the video files (i.e., media files 1800 and associated index files 1805) stored on the drives configured within the storage device 2309 of the storage server 2300. The video file management module 317 is responsible for creating new video files as required, writing video sample data to the video files, and swapping to a standby file when the size or duration of an existing video file exceeds a set limit.

3.5.1 Video File Management Thread

The video file management module 317 comprises a video file management thread or subroutine. The video file management thread is responsible for creating and closing video files. The creation and closing operations can be relatively time consuming, and are thus performed by a separate thread (i.e., execution context) of lower priority than the main thread, in order to avoid potential delays in processing sample data received from the camera servers 109-111.

As described above, the recording engine 201 attempts to ensure that an inactive standby file (i.e., media file 1800 and associated index file 1805) is maintained for each camera server 109-111, in order to enable an instant swapover of files without any delays. As soon as a first sample is written to a standby file, the file management thread is instructed to create a new inactive standby file, ready for the next swapover.

Figure 20:
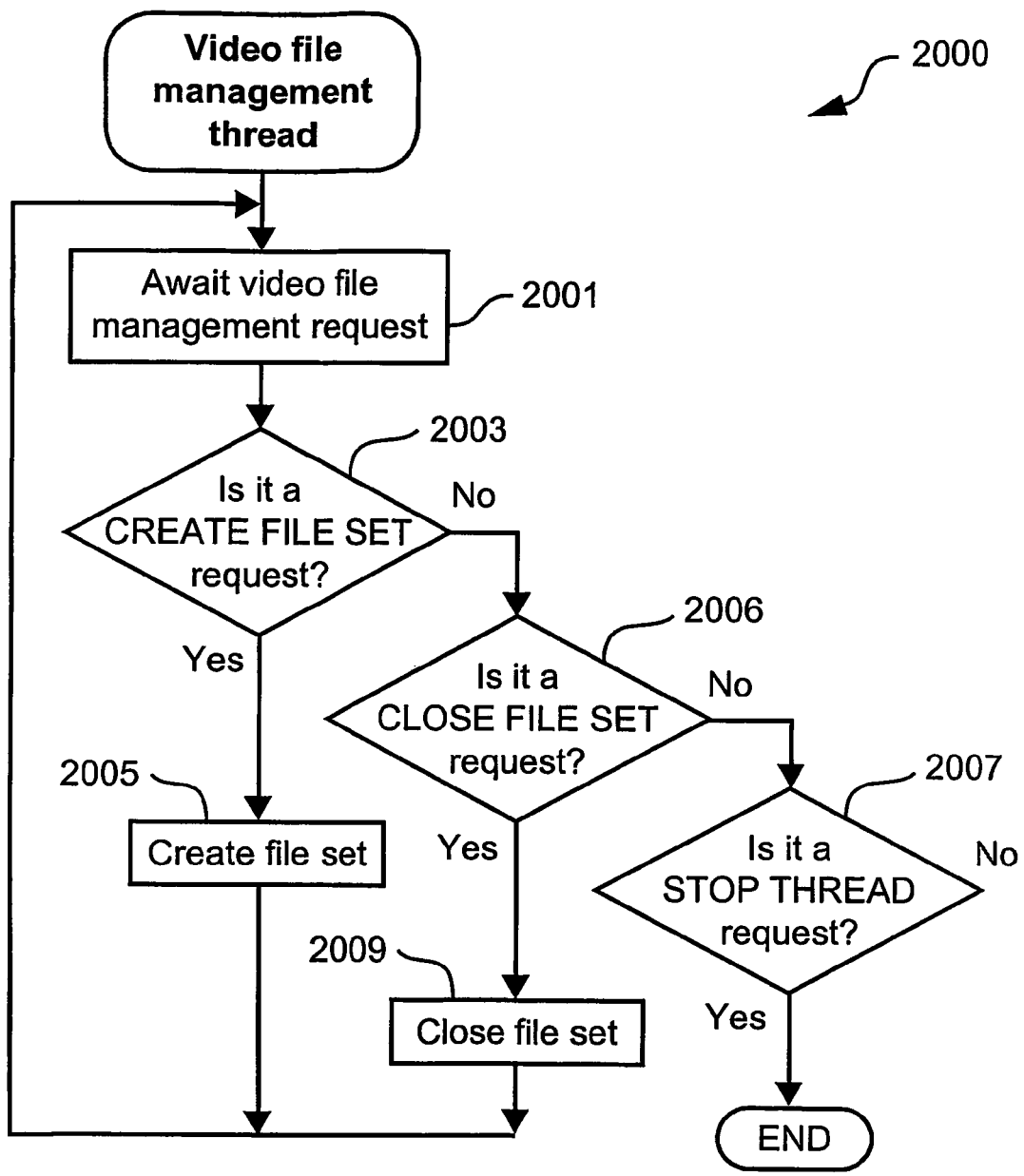
FIG. 20 is a flow diagram showing a process for creating and closing video files.

A process 2000 for creating and closing video files in accordance with the video file management thread is described below with reference to FIG. 20. The process 2000 is preferably implemented as software resident on the hard disk drive 2310 of the storage server 2300 and being executed by the processor 2305. The process 2000 begins at step 2001, where the processor 2305 waits until a message from another thread is detected. The message can be one of three types as will be described below.

At the next step 2003, if the message is a CREATE FILE SET request, the process 2000 proceeds to step 2003. Otherwise, the process 2000 proceeds to step 2006. At step 2305, the processor 2305 enters a create video file set process 2100, in order to create a media file 1800 and associated index file 1805. The process 2100 will be described in detail below in section 3.5.2 with reference to FIG. 21. The process 2000 then returns to step 2001.

At step 2006, if the message is a CLOSE FILE SET request, the process 2000 proceeds to step 2009. Otherwise the process 2000 proceeds to step 2007. At step 2009, the process 2000 enters a close video file set process 2600, in order to close the media file 1800 and index file 1805 to create a completed file pair. The process 2600 will be described in section 3.5.5. The process 2000 then returns to step 2001.

At step 2007, if the message is a STOP THREAD request, the process 2000 concludes. A STOP THREAD request is typically sent when the recording engine 201 is about to shut down. Otherwise the process 2000 returns to step 2001.

3.5.2 Create File Set Process

Figure 21:
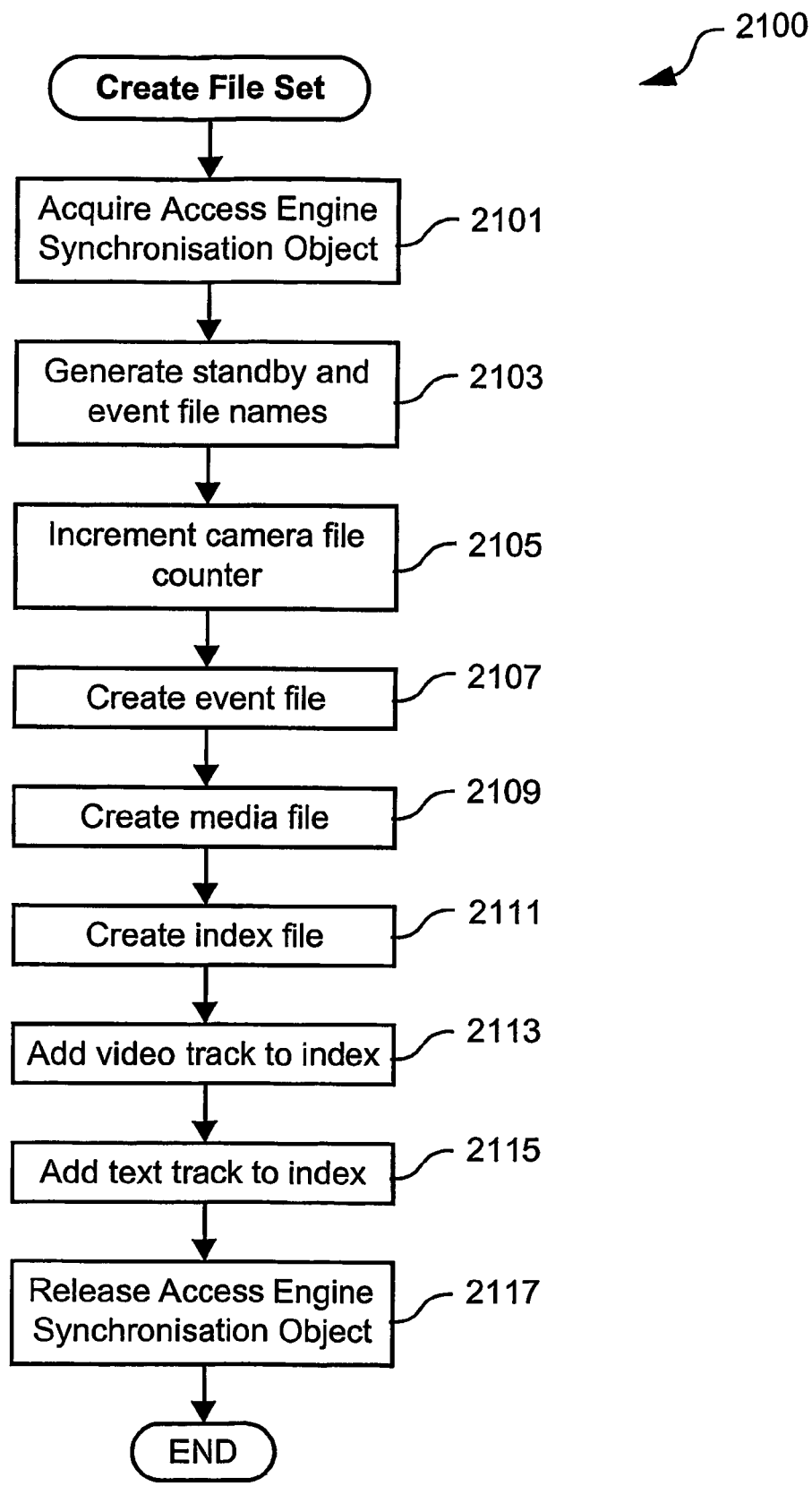
FIG. 21 is a flow diagram showing a process for initialising video files.

The create video file set process 2100 will now be described with reference to the flow diagram of FIG. 21. The process 2100 is called by the video file management thread. The purpose of the process 2100 is to create a set of standby files, each consisting of one media file 1800 and an associated index file 1805. The process 2100 is preferably implemented as software resident in the hard disk drive 2310 and being controlled in its execution by the processor 2305.

The process 2100 begins at step 2101 where the processor 2305 acquires a synchronisation object that is shared with the access engine 203. The synchronisation object is stored on the hard disk drive 2305 and is used to ensure that creation, opening, closure and deletion of media 1800 and index 1805 files are performed atomically with respect to each of the recording engine 201 and the access engine 203.

In the next step 2103, the processor 2305 generates a set of suitable standby file names, according to the specification in section 3.3.4.1. A file directory used to store the media file 1800 and associated index file 1805 is determined by combining the drive letter associated with the associated camera server 109-111 with the string "\Webview-NVR\videofiles", as described in section 3.3.4.1. The directory used to store the event files is determined by combining the drive letter associated with the camera server 109-111 with the string "\Webview-NVR\eventfiles".

At the next step 2105, the processor 2305 increments the file counter for the given camera 112-115 in preparation for the next standby file that is to be generated. Then at the next step 2107, the processor 2305 creates the event file in the hard disk drive 2310. The event file is created in accordance with a create event file process 3500 which will be described below with reference to FIG. 35. At the next step 2109, the processor 2305 creates the media file 200 in the hard disk drive 2310. The media file 1800 is created at step 2109 in accordance with a process 2400 for creating a media file 1800. The process 2400 will be explained in detail below with reference to FIG. 24.

The media file 1800 is created according to a media file path parameter and a media file format parameter, which are supplied by the processor 2305. The media file format parameter specifies the file format (e.g. AVI™ or QuickTime™) for the media file 200. Then at the next step 2111, the processor 2305 creates the index file 1805 in the hard disk drive 2310.

The index file 205 is generated based on an index file path parameter, which is supplied by the processor 2305. The index file 1805 is created at step 2111 in accordance with a process 2500 for creating an index file 1805. The process 2500 will be described in detail below with reference to FIG. 25. As described above, the index file 1805 is generated in accordance with the QuickTime™ format.

The process 2100 continues at the next step 2113 where the processor 2305 creates a first track (e.g. the track 1813) based on a track capacity parameter, a track rate parameter and a data source identifier parameter supplied by the processor 2305. The track created at step 2113 (e.g, the track 1213) is configured to reference sample data to be stored in the media file 1800. Also at step 2113, the processor 2305 adds the video track 1813 to the index file 1805 configured within the hard disk drive 2310. Then at the next step 2115, the processor 2305 creates a second track (e.g. the track 1815) based on the track capacity parameter, the track rate parameter and the data source identifier parameter. The second track 1815 is configured to reference text strings (i.e., text sample data). Also at step 2107, the processor 2305 adds the created text track 1815 to the index file 1805.

The process 2100 concludes at the next step 2117 where the synchronisation object obtained in step 2101 is released thereby allowing the access engine 203 to operate on these files.

3.5.3 Create Media File Process

Figure 24:
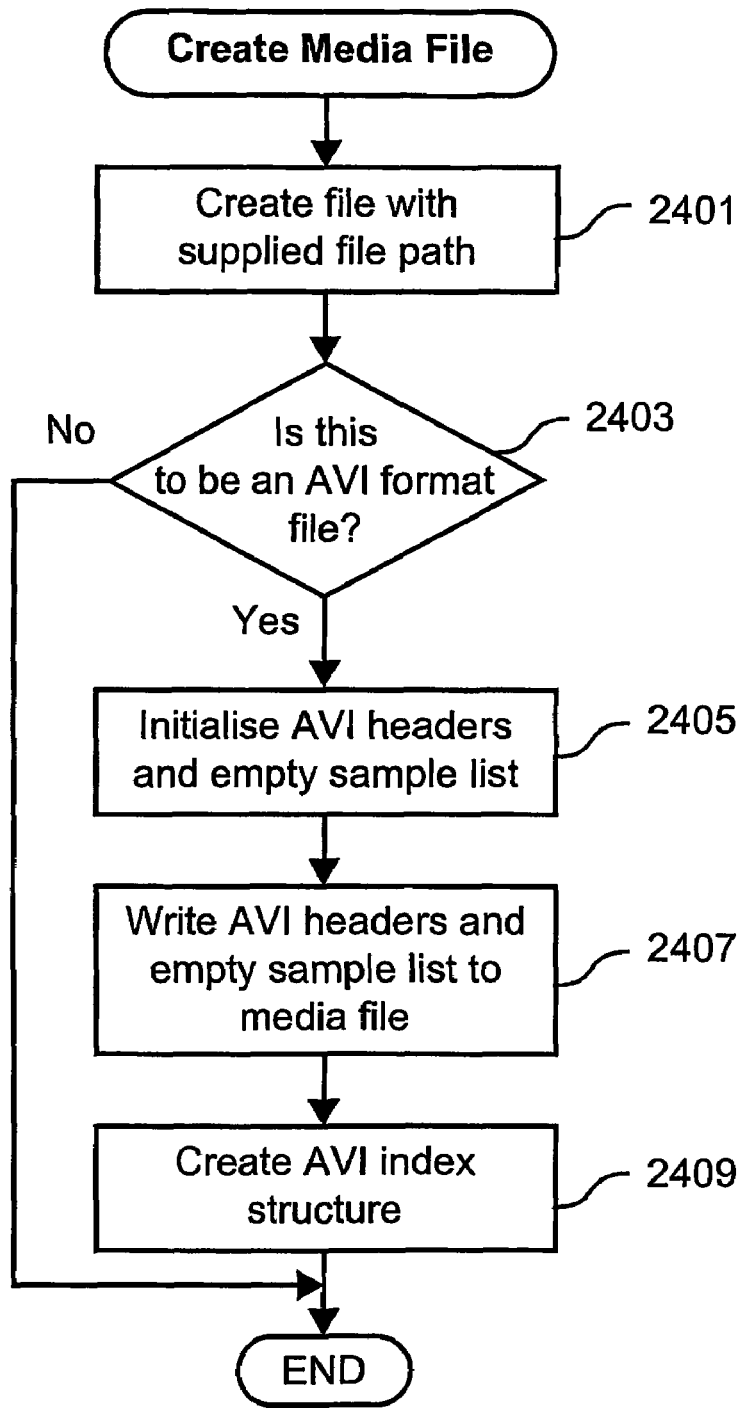
FIG. 24 is a flow diagram showing a process for generating a media file.

The create media file process 2400 of step 2109 will now be explained with reference to the flow diagram of FIG. 24. The process 2400 is preferably implemented as software resident in the hard disk drive 2310 and being controlled in its execution by the processor 2305. The process 2400 begins at step 2401 where the processor 2305 creates the media file 1800 at a memory address, in the hard disk drive 2310, as specified by the media file path parameter supplied by the processor 2305 at step 2109. At the next step 2403, if the media file format parameter specifies that the media file 1800 is to be configured in accordance with the AVI™ file format, then the process 2400 proceeds to step 2405. Otherwise, the process 2400 concludes.

At step 2405, the processor 2305 creates an empty set of headers and an empty sample structure to store the samples detected by the processor 2305. Then at step 2407, the created sample structures are written to the media file 1800 configured within the hard disk drive 2310. The process 2400 concludes at the next step 2409 where the processor 2305 creates an AVI™ index file structure. The index file 1805 structure can be stored either in the hard disk drive 2310 or in a temporary file configured within memory 2306, since the index file structure will be appended to the end of the media file 1800, the resultant length of which is currently unknown.

3.5.4 Create Index File Process

Figure 25:
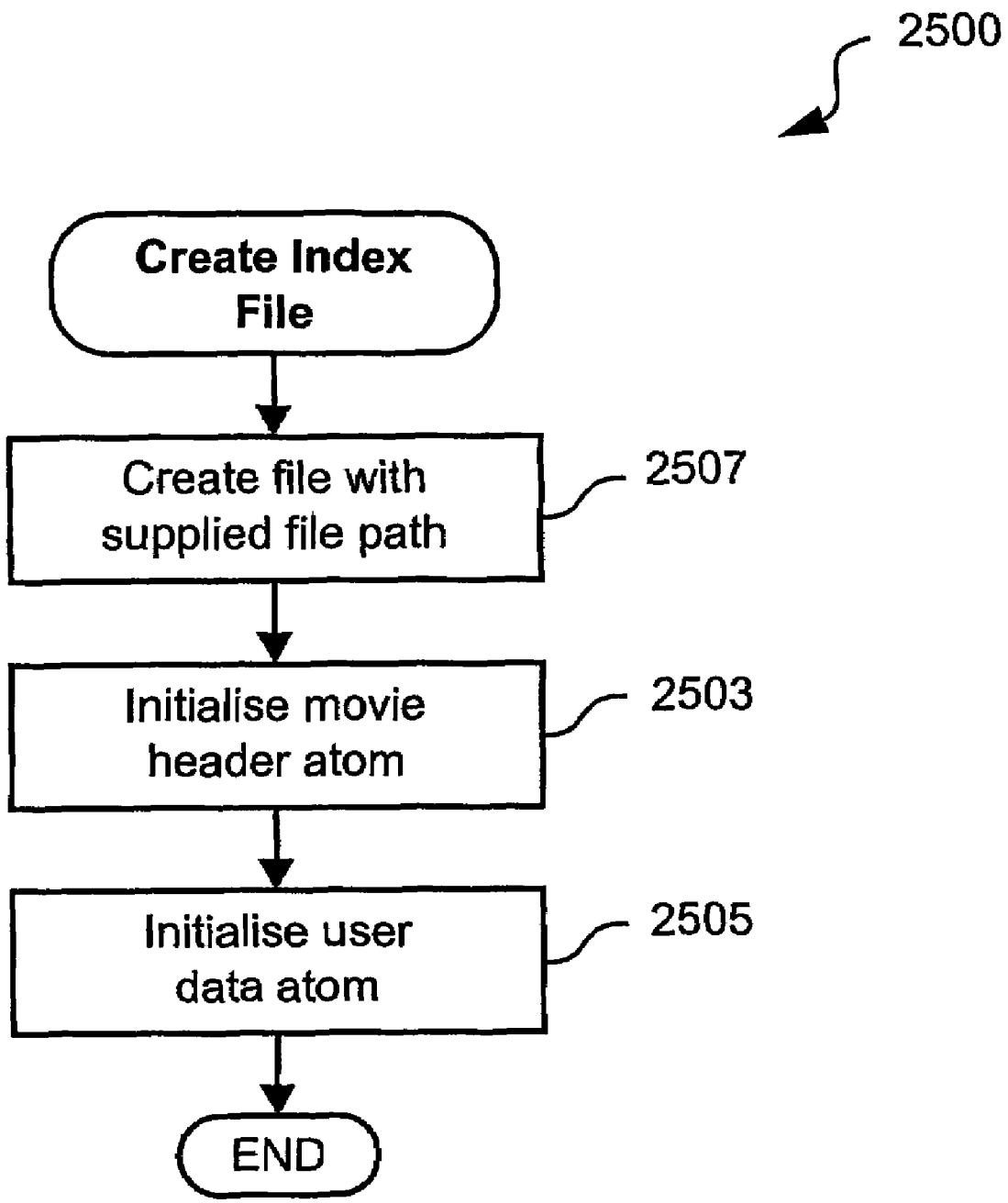
FIG. 25 is a flow diagram showing a process for generating an index file.

The process 2500 of creating an index file 1805 will now be explained with reference to the flow diagram of FIG. 25. The process 2500 is preferably implemented as software resident in the hard disk drive 2310 and being controlled in its execution by the processor 2305. The process 2500 begins at step 2501 where the processor 2305 creates the index file 1805 at a memory address, in the hard disk drive 2310, as specified by the index file path parameter supplied by the processor 2305 at step 2111. Then at the next step 2503, the processor 2305 initialises a movie header atom for the index file 1805.

Movie header atoms are used to specify the characteristics of an entire QuickTime™ movie and are explained in detail in the publication entitled "QuickTime File Format", published by Apple Computer Inc., as discussed above. The process 2500 concludes at the next step 2505, where the processor 2305 initialises a user data atom for the index file 1805. User data atoms allow a user to define and store data associated with a QuickTime™ object such as a movie.

3.5.5 Close Video File Pair Process

Figure 26:
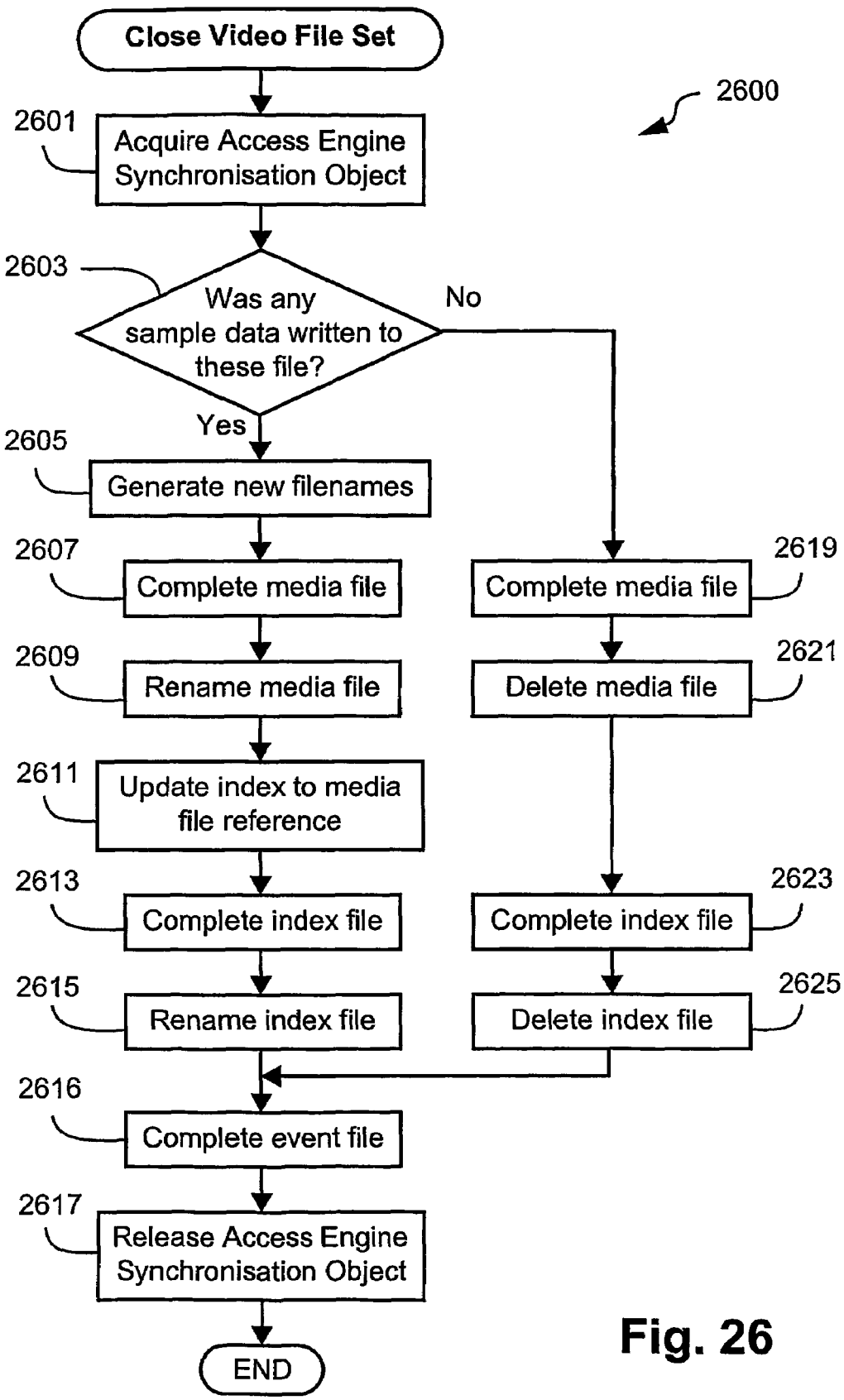
FIG. 26 is a flow diagram showing a process for closing a video file pair.

FIG. 26 is a flow diagram showing a process 2600 for closing a video file pair (i.e., a media file 1800 and associated index file 1805). The close video file pair process 2600 is called by the video file management thread. The purpose of the process 2600 is to take an active (open) pair of files, close the files and rename the files to the appropriate file names. The process 2600 is preferably implemented as software resident in the hard disk drive 2310 and being controlled in its execution by the processor 2305.

The process 2600 begins at step 2601 where the processor 2305 acquires the synchronisation object that is shared with the access engine 203. As described above the synchronisation object is used to ensure that creation, opening, closure and deletion of the media file 1800 and index file 1805 forming the file pair are performed automatically with respect to each of the recording engine 201 and the access engine 203. At the next step 2603, the processor 2305 determines whether the active file pair actually contain samples. If no samples are present at step 2603, then the file pair store no useful data and the process 2600 proceeds to step 2619. Otherwise, if samples are present within the standby file pair, a set of new file names is generated in accordance with the specification described above in section 3.3.4.1.

Figure 27:
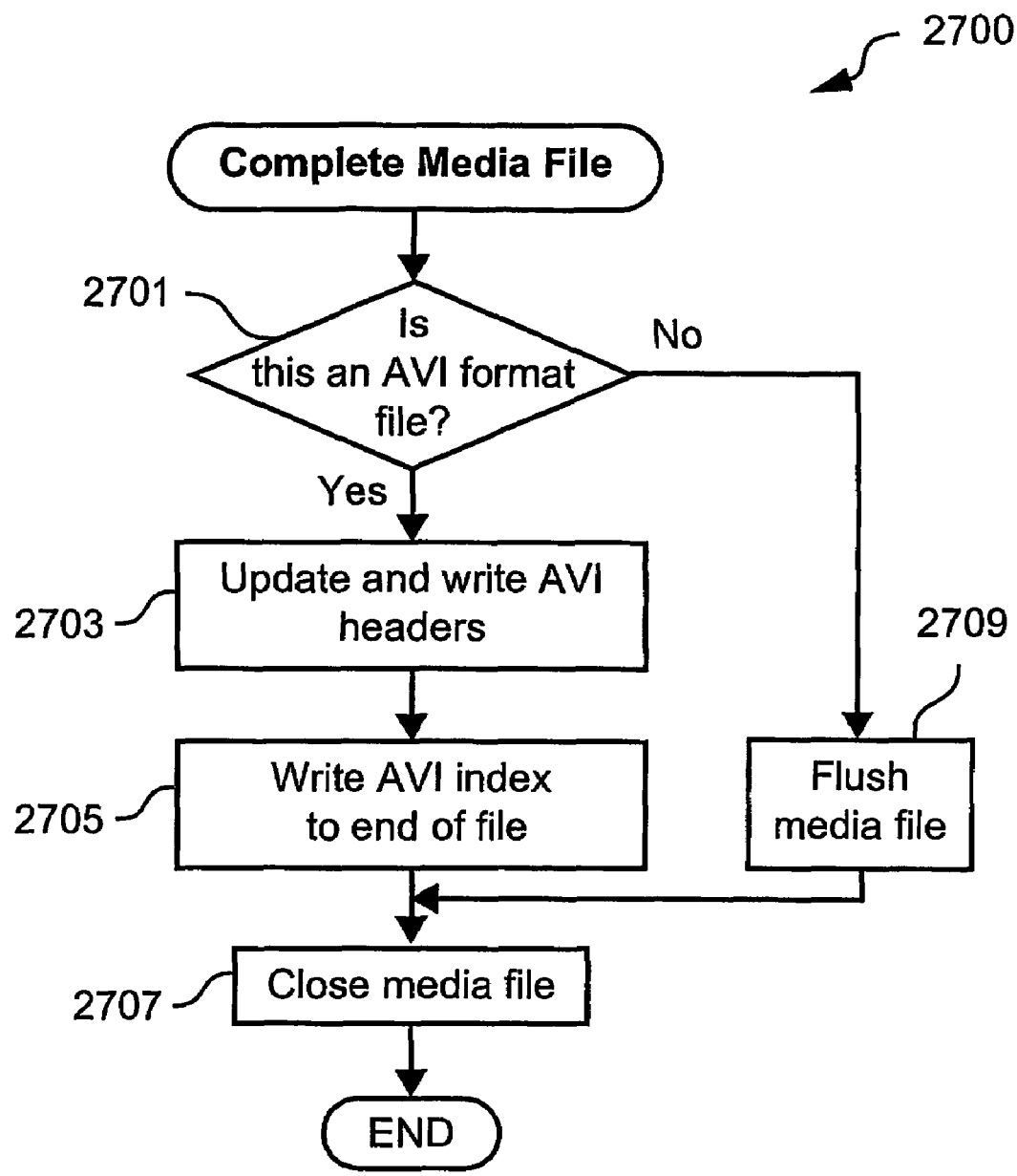
FIG. 27 is a flow diagram showing a process for completing a media file.

At the next step 2605, the media file 1800 of the file pair is closed in accordance with a complete media file process 2700, which will be described in detail below with reference to FIG. 27. Then at the next step 2609 the media file 1800 is renamed. The process 2600 continues at the next step 2611 where the media file reference 1808 in the associated index file 805 (i.e., the active index file 1805) is updated to correspond with the renamed media file 1800.

Figure 28:
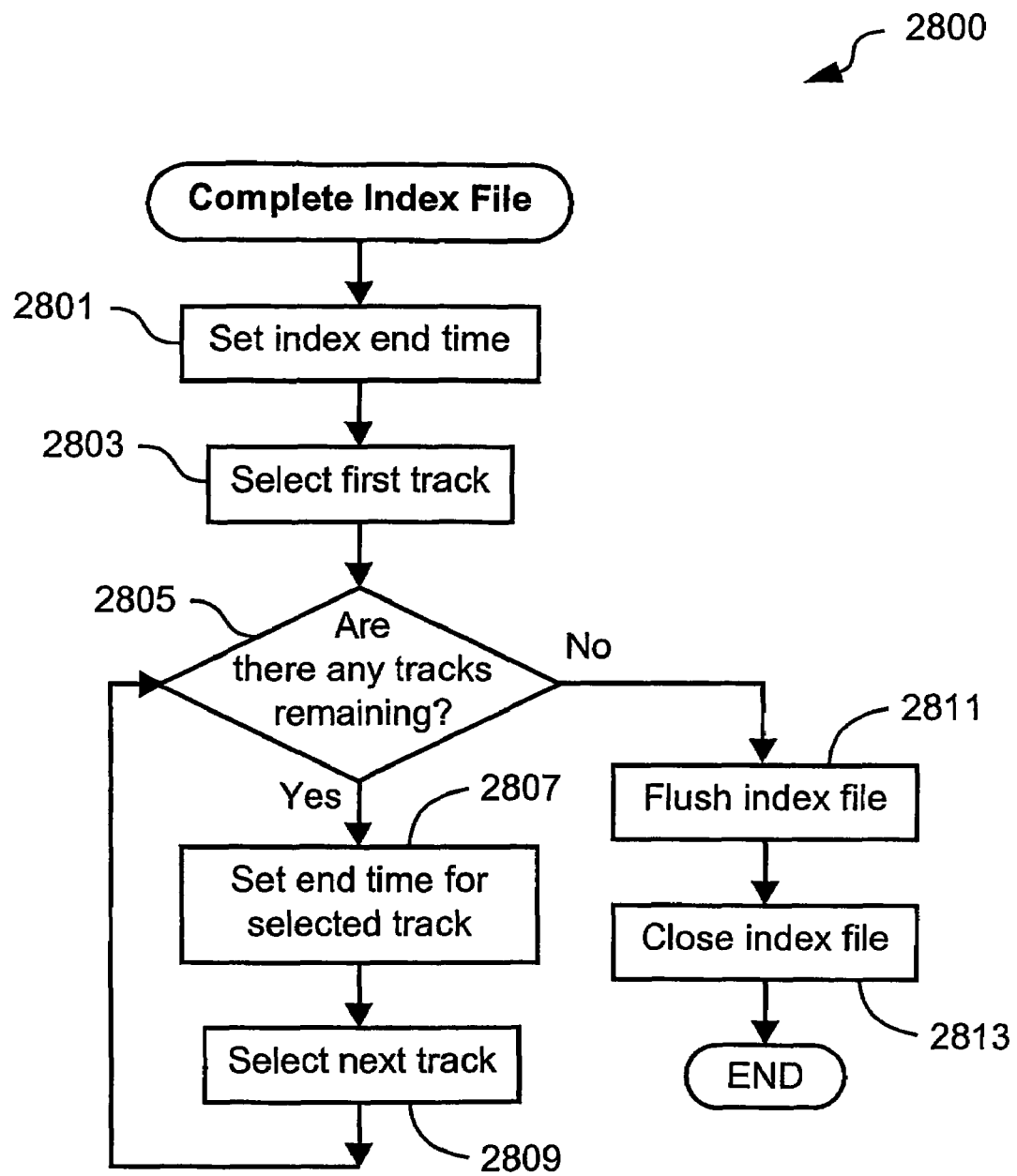
FIG. 28 is a flow diagram showing a process for completing an index file.

At the next step 2611, the active index file 1805 is closed in accordance with a complete index file process 2800, which will be described in detail below with reference to FIG. 28. Then at the next step 2615 the index file 1805 is renamed.

At step 2619, the media file 1800 is closed in accordance with the complete media file process 2700. Since the media file 1800 contains no useful data, the media file 1800 is deleted from the hard disk drive 2310 at the next step 2621. The process 2600 continues at the next step 2623, where the index file 1805 of the file pair is closed in accordance with the complete index file process 2800. Since the index file 1805 contains no useful data, the index file 1805 is deleted from the hard disk drive 2310 at the next step 2625. At step 2616, the process closes the event file belonging to the current file set by calling the event file process 3600. The process 2600 concludes at the final step 2617, where the synchronisation object obtained in step 2601 is released.

3.5.6 Complete Media File Process

The process 2700 as executed at steps 2607 and 2609 will now be described with reference to the flow diagram of FIG. 27. The process 2700 performs any cleanup tasks required to ensure that a media file 1800 is not corrupt and playable, and then closes the media file 1800. The process 2700 is preferably implemented as software resident in the hard disk drive 2310 and being controlled in its execution by the processor 2305.

The process 2700 begins at the first step 2701, where if the processor 2305 determines that the media file 200 is formatted in accordance with the AVI™ file format, then the process 2700 proceeds to step 2703. Otherwise, the process 2700 proceeds to step 2709 where any previously unwritten media file data in memory 2306 is flushed to the media file 1800 configured within the hard disk drive 2310. After step 2709 the process 2700 proceeds directly to step 2707.

At step 2703, the processor 2305 updates the AVI™ headers of the media file 1800 with information about the samples stored in the media file 1800. The headers are updated to reflect the exact number of samples stored in the media file 1800. At the next step 2705, the AVI™ index file 1805 is written to the end of the media file 1800. The process 2700 concludes at the next step 2707 where the media file 1800 is closed to create a completed media file 1800.

3.5.7 Complete Index File Process

The complete index file process 2800 as executed at steps 2613 and 2623 will now be described with reference to the flow diagram of FIG. 28. The process 2800 is preferably implemented as software resident in the hard disk drive 2310 and being controlled in its execution by the processor 2305.

The process 2800 begins at the first step 2801 where the processor 2305 sets the end time of the index file 205 to an index end time value supplied by the processor 2305. The end time of the index file 205 is set to cover the period from the first sample of the media file 1800 to the current time represented by a system clock of the storage server 2300. At the next step 1703, the processor 2305 selects a first track of the index file 1805. Then at step 2805 if the processor 2305 determines that there are any remaining tracks of the index file 1805 to be processed, then the process 2800 proceeds to step 1807. Otherwise, the process 2800 proceeds to step 2811.

At step 2807, the end time for the selected track is set to the index end time supplied by the processor 2305. The next track of the index file 1805 is then selected by the processor 2305 at step 1809 and the process 2800 returns to step 2805. At step 2811, the processor 2305 flushes any previously unwritten index file data in memory 2306 to the index file 1805 configured in the hard disk drive 2310. The process 2800 then concludes at the next step 2813, where the index file 1805 is closed.

3.5.8 Write Sample to File Process

Figure 29:
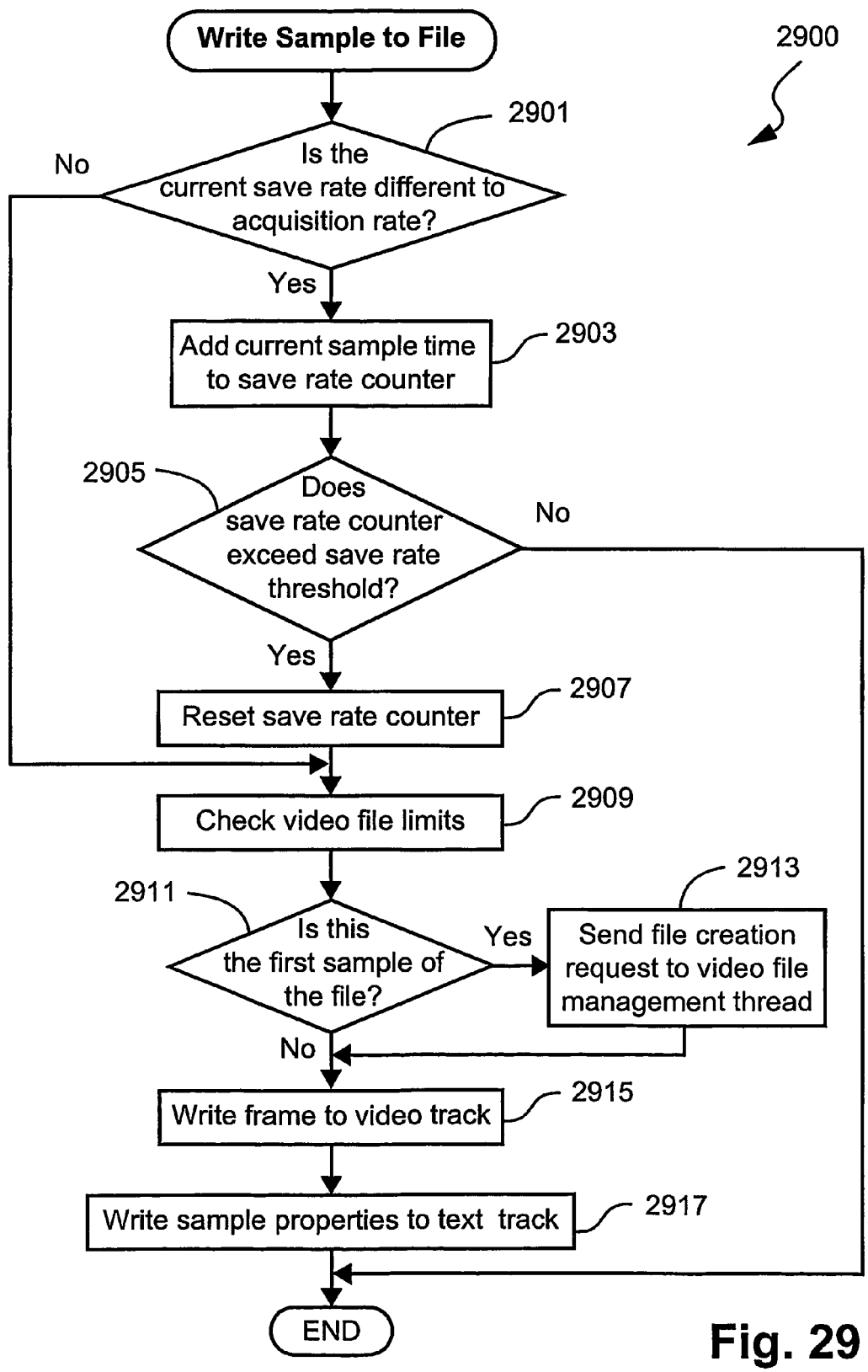
FIG. 29 is a flow diagram showing a process for writing a sample (i.e., frame) to the media file of FIG. 18.

FIG. 29 is a flow diagram showing a process 2900 for writing a sample to the media file 1800. The process 2900 takes a sample representing a single video data sample from a frame buffer configured within memory 2306, and ensures that the sample is written to the media file 1800. The associated index file 1805 is then updated to reference the newly written sample. The process 2900 is preferably implemented as software resident in the hard disk drive 2310 and being controlled in its execution by the processor 2305.

The process 2900 begins at the first step 2901 where if the current rate of saving sample data is the same as the rate of that the storage server 2300 is acquiring sample data, then the process 2900 proceeds to step 2909. Otherwise the process 2900 proceeds to step 2903 where a capture time (i.e., a timestamp) corresponding to a current sample is added to a save rate counter configured within memory 2306. That is, at step 2903, the save rate counter is incremented by the difference between the time of the current sample (i.e., frame) and the timestamp of the previous sample. At the next step 2905 if the value of the save rate counter exceeds the current save rate, then the process proceeds to step 2907. Otherwise the process 2900 concludes.

At step 2907, the processor 2305 resets the save rate counter by subtracting the current save rate from the value of the save rate counter. In the next step 2919, the processor 2305 determines whether there is enough disk space to write the current frame to the disk associated with the camera 109-111. If there is not enough room, the process concludes. Then at step 2909 the processor 2305 ensures that there is space to store the sample to be written to the media file 1800 in accordance with a check video file limits process 3000 which will be described in section 3.5.9 below with reference to FIG. 30.

At the next step 2911, if there are no samples in the media file 1800, then the process 2900 proceeds to step 2913. Otherwise, the process 2900 proceeds directly to step 2915. At step 2913, the processor 2305 sends a request to the video file management thread, executing on the storage server 2300, to create a new inactive standby file (i.e., media file 1800 and associated index file 1805). At step 2915, the sample is written to a video track of the media file 1800. The sample is written at step 2915 in accordance with a write frame to video track process 3100 which will be explained in detail below with reference to FIG. 31.

The process 2900 concludes at the next step 2917, where the properties of the sample are written in the form of a text string to a text track of the media file 1800 in accordance with a write frame properties to text track process 3200. The process 3200 will be explained in detail below with reference to FIG. 32.

3.5.9 Check Video File Limits Process

Figure 30:
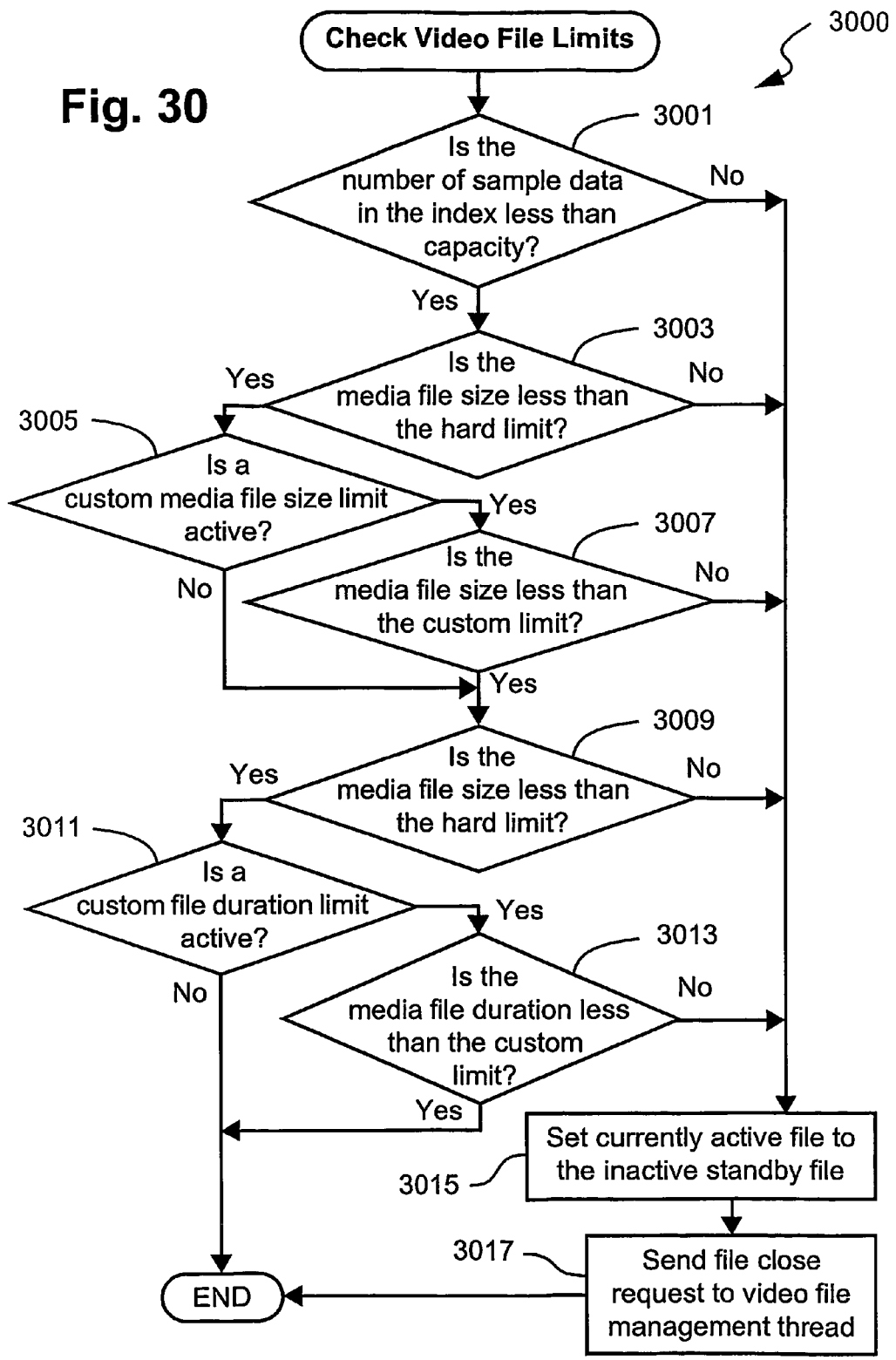
FIG. 30 is a flow diagram showing a process for checking video file limits.

The process 3000 of checking video file limits will now be described reference to FIG. 30. The process 3000 is preferably implemented as software resident on the hard disk drive 2310 and being controlled in its execution by the processor 2305. The process 3000 determines whether an active file pair for a camera server 109-111 (i.e., a currently active or open media file 1800) can accommodate any additional samples (i.e., video frames). If no more samples can be accommodated, the processor 2305 switches to an inactive standby file for that camera server 109-111, and issues a request to close the previous active media file pair.

The process 3000 begins at the first step 3001, where the processor 2305 checks the index file 1805 corresponding to the media file 1800 of the active file pair. If the index file 1805 has free entries in the corresponding sample table 1809 structure to accommodate a new sample then the process proceeds to step 3003. Otherwise, the process 3000 proceeds to step 3015. At step 3003, if the capacity of the currently active media file 1800 is less than a predetermined limit (e.g., one giga-byte) then the process 3000 proceeds to step 3005. Otherwise the process 3000 proceeds to step 3015. At step 3005, if the processor 230 determines that the system 100 is configured by a user to limit media file 1800 sizes then the process 3000 proceeds to step 3007. Otherwise, the process proceeds to step 3009.

At step 3007, if the processor 2305 determines that the currently active media file 1800 is smaller than the user specified limit then the process 3000 proceeds to step 3009. Otherwise, the process 3000 proceeds to step 3015. At step 3009, if the capacity of the currently active media file 1800 is less than a predetermined limit (e.g., one giga byte) then the process 3000 proceeds to step 3011. Otherwise, the process 3000 proceeds to step 3015. At step 3011, if the processor 2305 determines that the system 100 is configured by the user to limit media file 1800 duration, then the process 3000 proceeds to step 3013. Otherwise, the process 3000 concludes. At step 3013, if the processor 2305 determines that the duration of the currently active media file 1800 is smaller than the user specified limit then the process 3000 concludes. Otherwise, the process 3000 proceeds to step 3015.

At step 3015, the processor 2305 initiates a file swapover by setting the currently active media file 1800 to an inactive standby media file. Then at the next step 3017, the processor 2305 sends a CLOSE FILE request to the video file management thread in order to close the media file 1800 and the process 3000 concludes.

3.5.10 Write Sample (i.e., Frame) to Video Track Process

Figure 31:
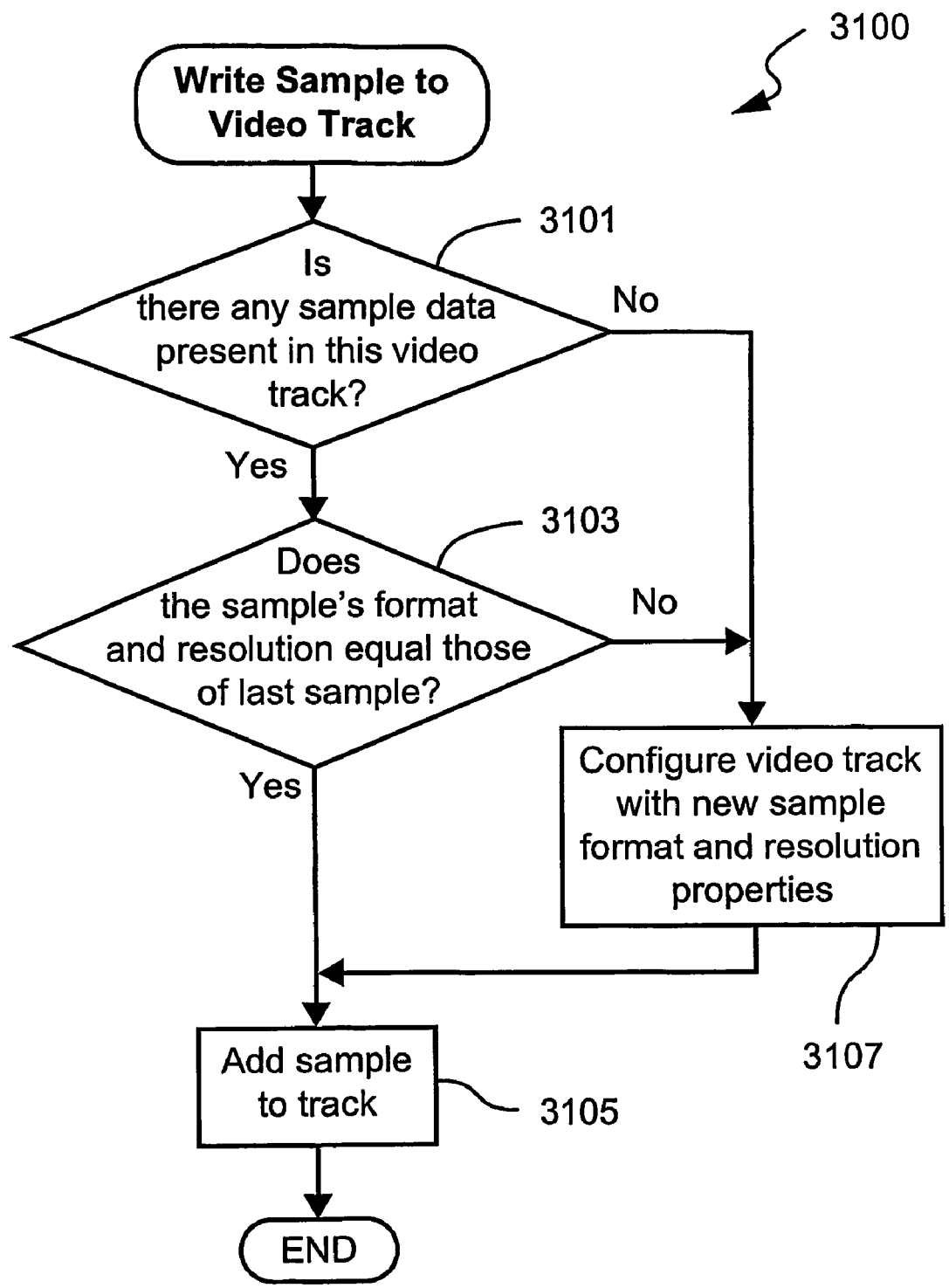
FIG. 31 is a flow diagram showing a process for writing a sample to a video track.

The process 3100 of writing a sample to a video track as executed at step 2915 will now be explained with reference to FIG. 31. The process 3100 is preferably implemented as software resident on the hard disk drive 2310 and being controlled in its execution by the processor 2305.

At the first step 3101, if there are already samples present in the video track of the active media file 1800 then the process 3100 proceeds to step 3103. Otherwise, the process 3100 proceeds to step 3107. At step 3103, if the format and resolution of the new samples are not the same as the current sample(s) in the media file 1800 then the process proceeds to step 3107. Otherwise the process 3100 proceeds directly to step 3105. At step 3107, the processor 2305 reconfigures a video track of the media file 1800 to accept a sample using the correct data format and resolution. The process 3100 concludes at step 3105 where the sample is added to the video track in accordance with a process 3300 for adding a sample to a track, which will be described in detail below with reference to FIG. 33.

3.5.11 Write Sample Properties to Text Track Process

Figure 32:
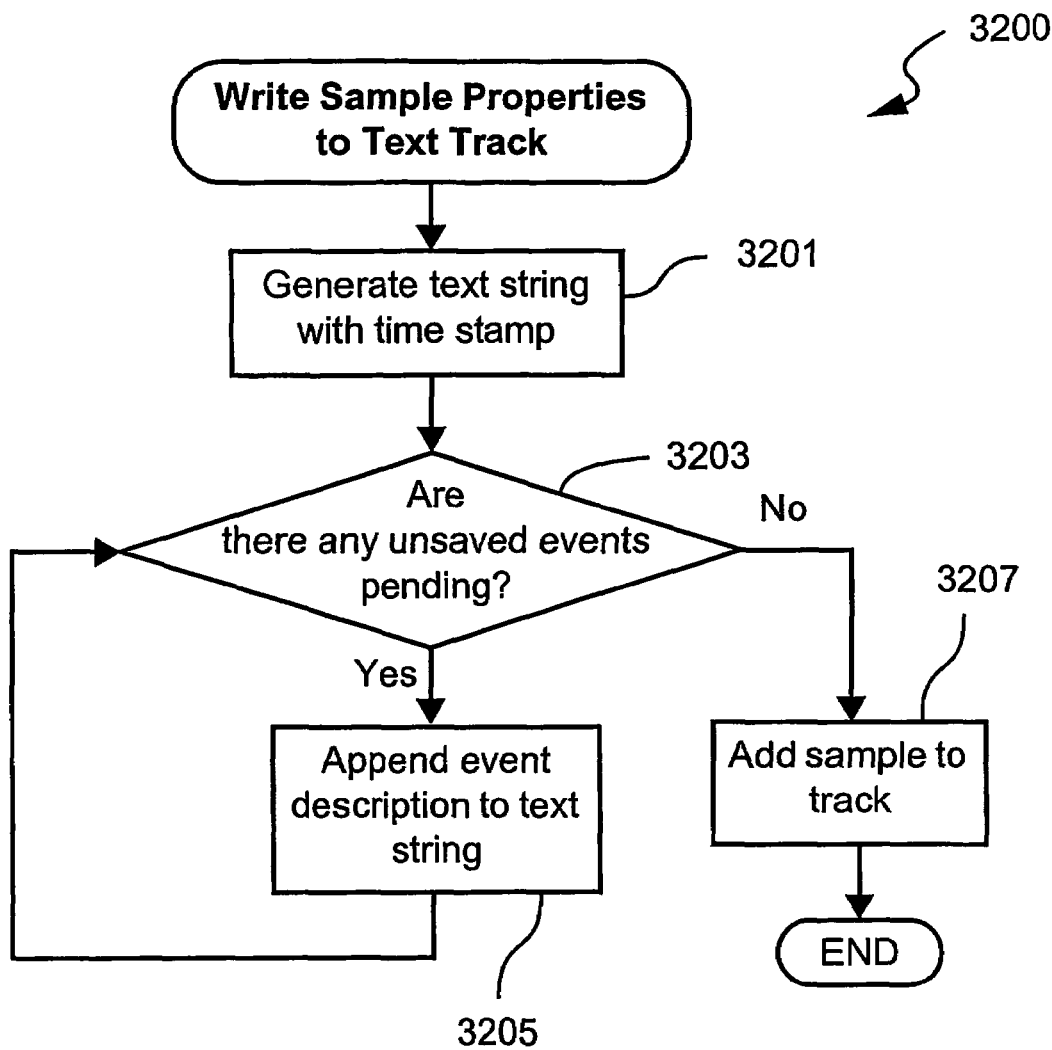
FIG. 32 is a flow diagram showing a process for writing sample properties to a text track.

The process 3200 for writing sample properties to a text track will now be described with reference to FIG. 32. The process 3200 is preferably implemented as software resident on the hard disk drive 2310 and being controlled in its execution by the processor 2305. The process 3200 ensures that time and event information is written to the text track of a media file 1800 configured within the hard disk drive 2310 of the storage server 2300. The time and event information can later be viewed in conjunction with the sample data, if the media file 1800 is played back using a QuickTime™ or AVI player™.

The process 3200 begins at the first step 3201 where the processor 2305 accesses a timestamp indicating the acquisition time associated with a sample to be written, and generates a string of the format that is generated by the ANSI function ctime ( ), with an additional millisecond field inserted. An example of such a time is: Tue Aug. 19 05:05:53.585 2003, where the date and time are always expressed in UTC format.

At the next step 3203, if there are any events for the associated camera server 109-111 that have not been saved to the current active media file 1800 then the process 3200 proceeds to step 3205. Otherwise, the process 3200 proceeds to step 3207. At step 3205, the processor 2305 pulls off a next event from an event queue configured in memory 2306, in turn, and the description of the event is appended to the string generated at step 3201. The process 3200 concludes at step 3207, where the text string is added to the text track in accordance with the process 3300.

3.5.12 Add Sample to Track Process

Figure 33:
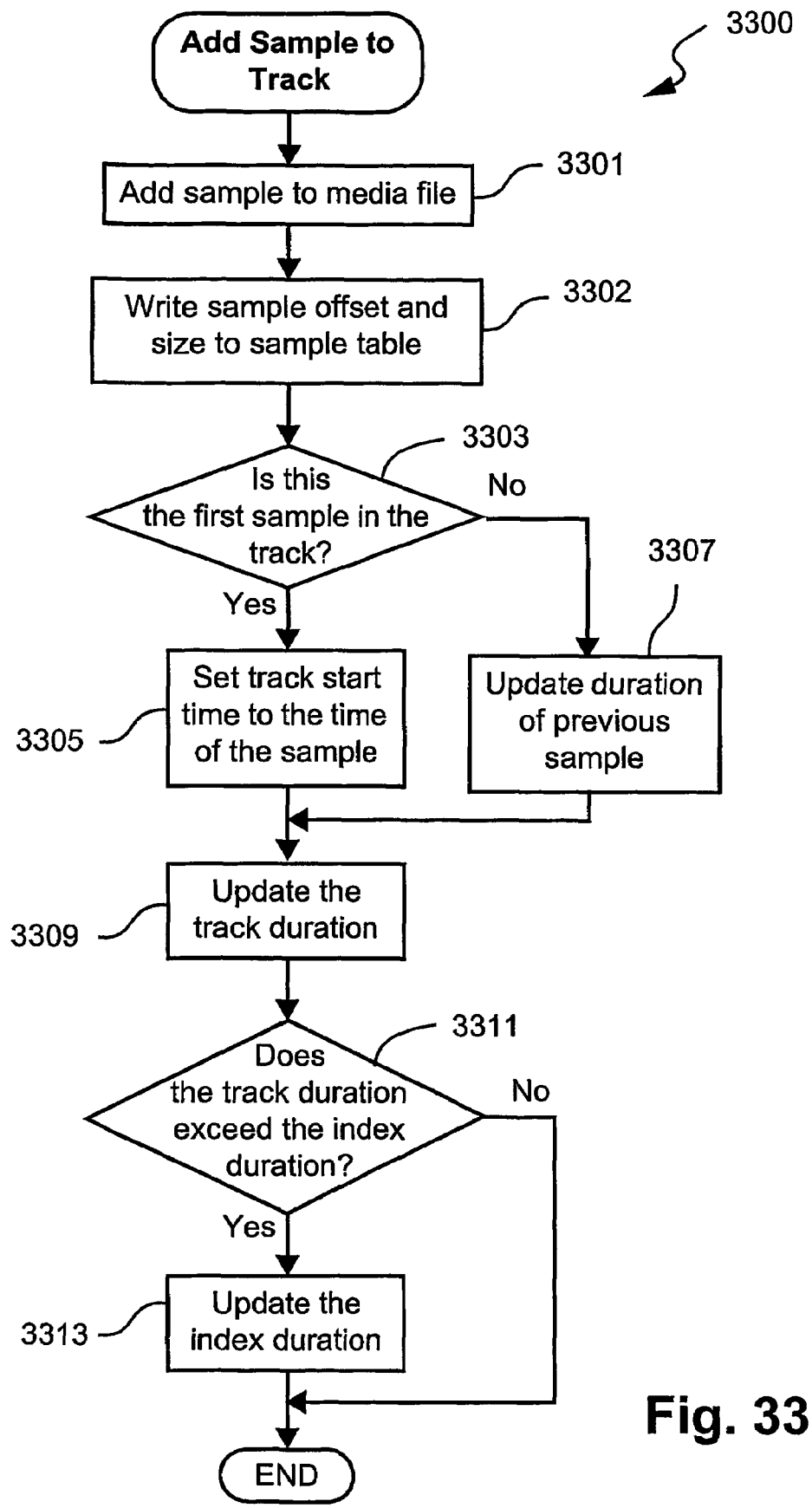
FIG. 33 is a flow diagram showing a process for adding a sample to a track.

The process 3300 for adding a sample to a track as executed at steps 3105 and 3207 will now be explained with reference to FIG. 33. The process 3300 takes a video sample or a text sample (i.e., text string) and ensures that the sample data is written to an active media file 1800 and that a reference to the sample is established in the associated index file 1805. The process 3300 is preferably implemented as software resident in the hard disk drive 2310 and being controlled in its execution by the processor 2305.

The process 3300 begins at step 3301 where the sample is added to the active media file 1800. The sample is added at step 3301 in accordance with an add sample to media file process 3400, which will be described in detail below with reference to FIG. 34. At the next step 3302, the sample offset indicated by a sample offset parameter and sample size parameter of the sample to be added, is written to the sample table structure (i.e. the sample offset tables 1809 or 1817 and the sample size table 1811 or 1819) of the index file 1805 track (i.e., either the video track 1813 or the text track 1815). At the next step 3303, if the sample is the first sample to be associated with the track then the process 3300 continues at the next step 3305. Otherwise, the process 3300 proceeds to step 3307.

At step 3305, the processor 2305 sets the starting time of the track to the timestamp of the current sample using the sample recording time parameter (i.e., timestamp) to reflect the acquisition time of the sample. Otherwise, the processor 2305 determines the duration of the previous sample by subtracting the timestamp (i.e., the acquisition time) of the previous sample from the timestamp of the current sample. Then at the next step 3309, a track duration value associated with the relevant track (i.e., the track 1813 or 1815) is set to the difference between the timestamp of the current sample and the timestamp of the relevant track. At the next step 3311, if the track duration causes the end of the track to exceed the index duration, then the process 3300 proceeds to step 3313. Otherwise, the process of step 1303 concludes. At step 1513, the index duration is updated to accommodate the track (i.e., the duration of the index file 1805 is adjusted by the processor 3205 to correspond to the end of the current track) and the process of step 1303 concludes.

3.5.13 Add Sample to Media File Process

Figure 34:
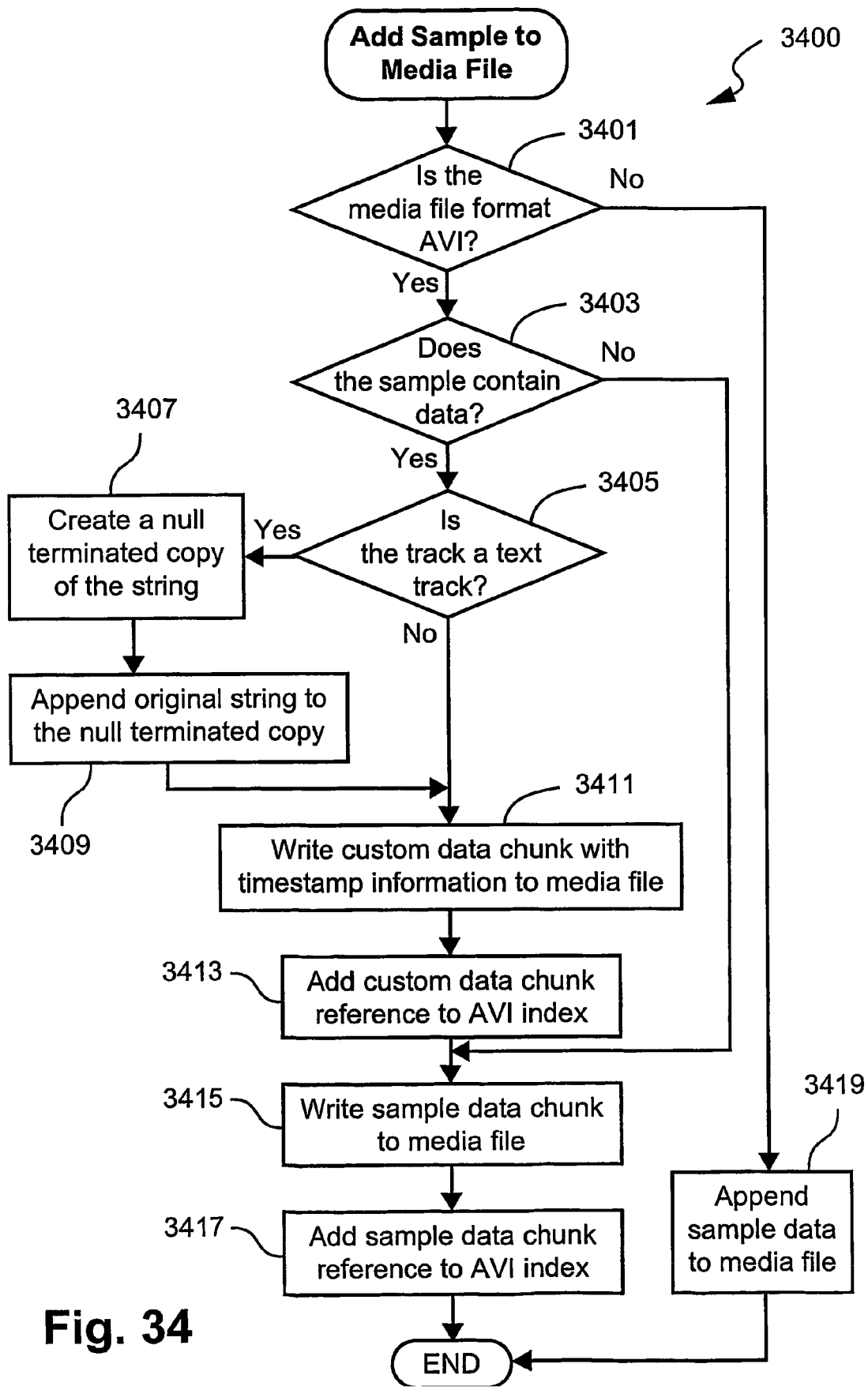
FIG. 34 is a flow diagram showing a process for adding a sample to a media file.

The process 3400 of adding a sample to a media file 1800 will now be explained with reference to FIG. 34. The process 3400 is preferably implemented as software resident in the hard disk drive 2310 and being controlled in its execution by the processor 2305.

The process 3400 begins at the first step 3401, where if the processor 2305 determines that the format of the media file 1800 is AVI™ then the process 3400 proceeds to step 3403. Otherwise, the process 3400 proceeds directly to step 3419, where the data of the detected sample is appended to a media file 1800 configured within the hard disk drive 2310.

At step 3403, if the sample to be added to the media file 1800 is empty (i.e. the associated sample size is zero) then the process 3400 proceeds directly to step 3415. Otherwise, the process 3400 proceeds to step 3405. At step 3405, if the track being written is a text track, then the process 3400 proceeds to step 3407. Otherwise, the process 3400 proceeds directly to step 3411. At step 3407, a null terminated copy of the string is created as described above in the section headed AVI™ Video Stream Handling. At the next step 3409, the original data of the detected sample is appended as a data string to the null terminated copy of the string.

Then at step 3411, the processor 2305 creates a custom data chunk containing a timestamp based on the detected sample acquisition time and writes the custom data chunk to the media file 1800 configured within the hard disk drive 2310. At the next step 3413, the AVI™ index is updated with a reference to the custom data chunk stored in the media file 800.

At step 3415, the processor 2305 writes a data chunk based on the detected sample to the media file 1800. The process 3400 concludes at the next step 3417 where the AVI™ index of the index file 1805 is updated with a reference to the custom data chunk stored in the media file 1800.

3.6 Event File Management Module

As described above, the recording engine 201 includes an event management module 321 for managing all of the event files stored on the drives configured within the storage device 2309 of the storage server 2300. The event management module 321 is responsible for creating new event files as required, writing data to these new event files, and swapping to further new event files when the size or duration of an existing event file exceeds a predetermined limit.

3.6.1 Create Event File Process

Figure 35:
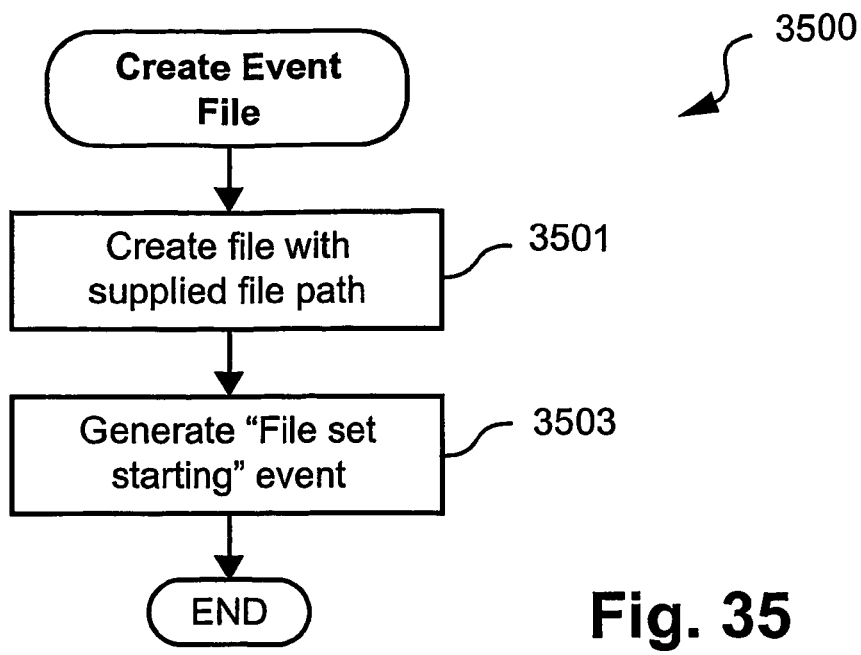
FIG. 35 is a flow diagram showing a process for ceating an event file.

FIG. 35 is a flow diagram showing the create event file process 3500. The process 3500 creates a standby media file 1800. The process 3500 is preferably implemented as software resident in the hard disk drive 2310 and being controlled in its execution by the processor 2305.

The process 3500 begins at the first step 3501 where the processor 2305 uses functionality provided by the operating system to create a file using the path generated at step 2103 of the create file pair process 2100. The process 3500 concludes at the next step 3503, where a "file set starting" event is generated in accordance with a generate event process.

3.6.2 Write Event to Event File Process

Figure 95:
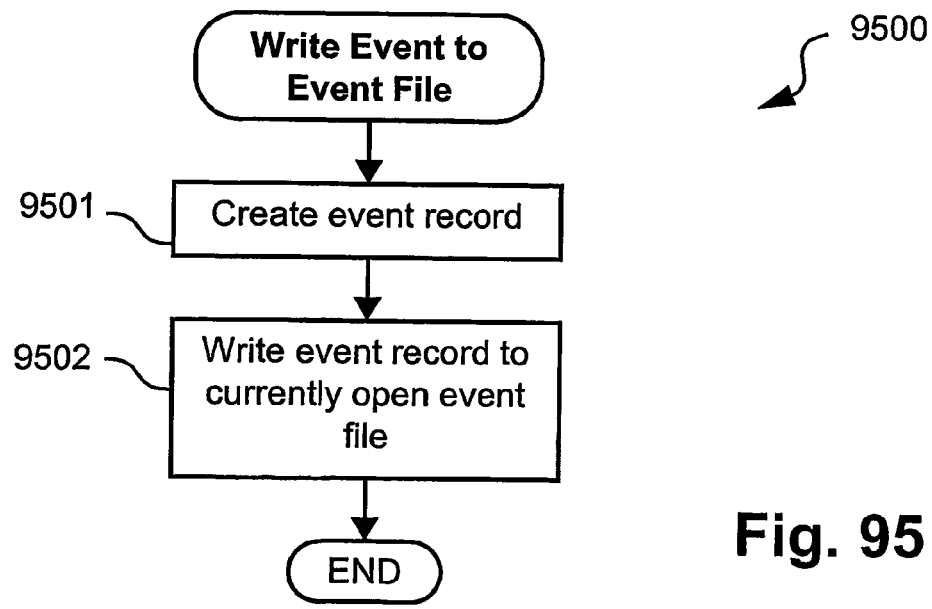
FIG. 95 is a flow diagram showing a process for writing an event to an event file.

FIG. 95 is a flow diagram showing a process 9500 for writing an event to an event file. The process 9500 is preferably implemented as software resident in the hard disk drive 2310 and being controlled in its execution by the processor 2305. The process 9500 begins at the first step 9501, where an event record is created according to the format described above. At the next step 9502, the event record is written to a currently open event file configured within the storage device 2309 or a currently open system event file.

3.6.3 Complete Event File Process

Figure 36:
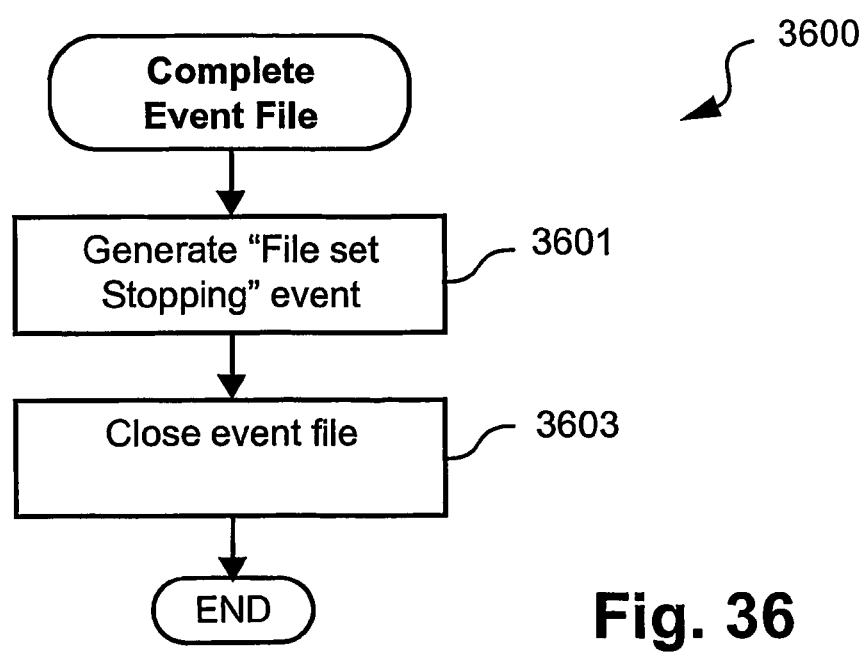
FIG. 36 is a flow diagram showing a process for completing an event file.

FIG. 36 is a flow diagram showing the complete event file process 3600. The process 3600 is preferably implemented as software resident in the hard disk drive 2310 and being controlled in its execution by the processor 2305.

The process 3600 begins at the first step 3601 where the processor 2305 generates a file set stopping event using the generate event process. The process 3600 concludes at the next step 3603 where the event file is closed.

3.7 Camera Server Communications Module

As described above, the camera server communications module 305 manages communications between the recording engine 201 and the camera servers 109-111 that the recording engine 201 controls. The communications module 305 is responsible for ensuring that correct settings are sent to a particular camera server 109-111, and receiving samples and event notifications as required. As such, the camera server communications module 305 is responsible for maintaining connections to the camera servers 109-111, and the exchange of all data between the recording engine 201 and each of the camera servers 109-111.

The camera servers 109-111 supported by the recording engine 201 communicate using the HTTP protocol over a TCP/IP connection. The recording engine 201 connects to the camera server 109-111 and issues an HTTP request, requesting a specific resource depending on the operation that is to be performed. Most requests supported by the camera servers 109-111 prompt an immediate reply. An exception to this is a get notice command, which leaves the connection open after a request until the camera server 109-111 has a new notification that can be sent to the recording engine 201.

A set of TCP/IP sockets is maintained for each camera server 109-111 (i.e, between each camera server 109-111 and the associated storage server 2300). A control socket of the TCP/IP sockets is responsible for sending commands to a particular camera server 109-111 that requests information about the current state of the particular camera server 109-111, or change various settings on the camera server 109-111 (such as the pan, tilt and zoom settings, backlight compensation, resolution, quality settings, motion detection settings, active camera, etc). A notice socket of TCP/IP sockets is responsible for listening for notifications of camera server events. A separate image socket is used to receive video sample data from each camera 112-115 that is connected to the particular camera server 109-111. Once started, images are sent from the camera server 109-111 to the recording engine 201 in a stream which can only be terminated by closing the image socket.

The camera server 109-111 maintains a set of connection identifiers which are used to represent active client sessions, and which are to be supplied together with certain requests. The control and notification sockets share a single connection identifier, while the image socket does not use an explicitly created one.

Socket communication is performed asynchronously. That is, the recording engine 201 notifies the operating system that the recording engine 201 is attempting to perform an operation to connect or write to a socket, and the operating system subsequently informs the recording engine 201 when the connection is complete, or when the operating system is ready to accept data to write. Additionally, the recording engine 201 registers itself to receive from the operating system read notifications whenever new incoming data is available on the socket, and disconnection notifications, if the socket is disconnected by the other end, or a timeout occurs.

3.7.1 Establish Camera Server Connection Process

Figure 37:
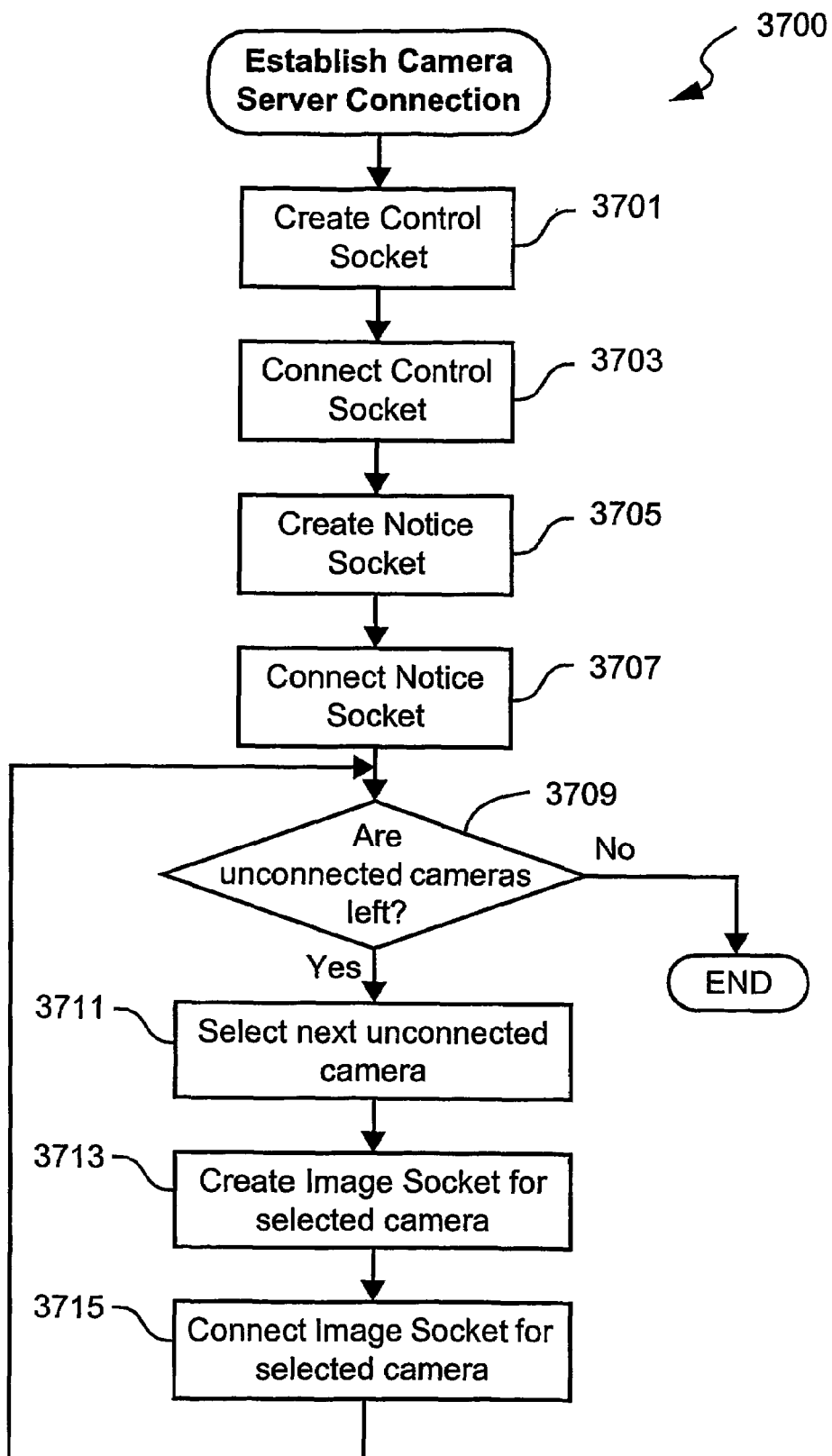
FIG. 37 is a flow diagram showing a process for establishing a camera server connection.

FIG. 37 is a flow diagram showing a process for establishing a camera server connection between the recording engine 201 executing on the storage server 2300 and each of the camera servers 109-111. The process 3700 is preferably implemented as software resident in the hard disk drive 2310 and being controlled in its execution by the processor 2305. The process 3700 is executed whenever a camera server 109-111 is initialized in the recording engine 201, either when the program is first started, or when a new camera server 109-111 is registered using the administration interface. The process 3700 begins by creating and connecting sockets for control and notification. The process 3700 then iterates through each camera 112-115 referenced by the camera server 109-111, and creates and connects an image socket for each one. All steps that connect to a socket do so by initiating an asynchronous connection attempt. The operating system will notify the recording engine 201. The process 3700 begins at step 3701 where the processor 2305 creates a control socket. At the next step the processor 2305 connects the control socket between the recording engine and each of the camera servers 109-111 associated with the recording engine 201 of the associated storage server 2300. Then at the next step 3705, the processor 2305 creates the notice socket. At the next step 3709, if the processor 2305 determines that there are any camera servers 109-111 that are not connected to the recording engine 201, then the process 3700 proceeds to step 3711. Otherwise, the process 3700 concludes.

At step 3711, the processor 2305 selects a next unconnected camera server 109-111. Then at the next step 3713, the processor 2305 creates an image socket for the selected camera server 109-111. At the next step 3715, the processor 2305 connects the image socket for the selected camera server 109-111.

3.7.2 Handle Socket Event Process

Figure 96:
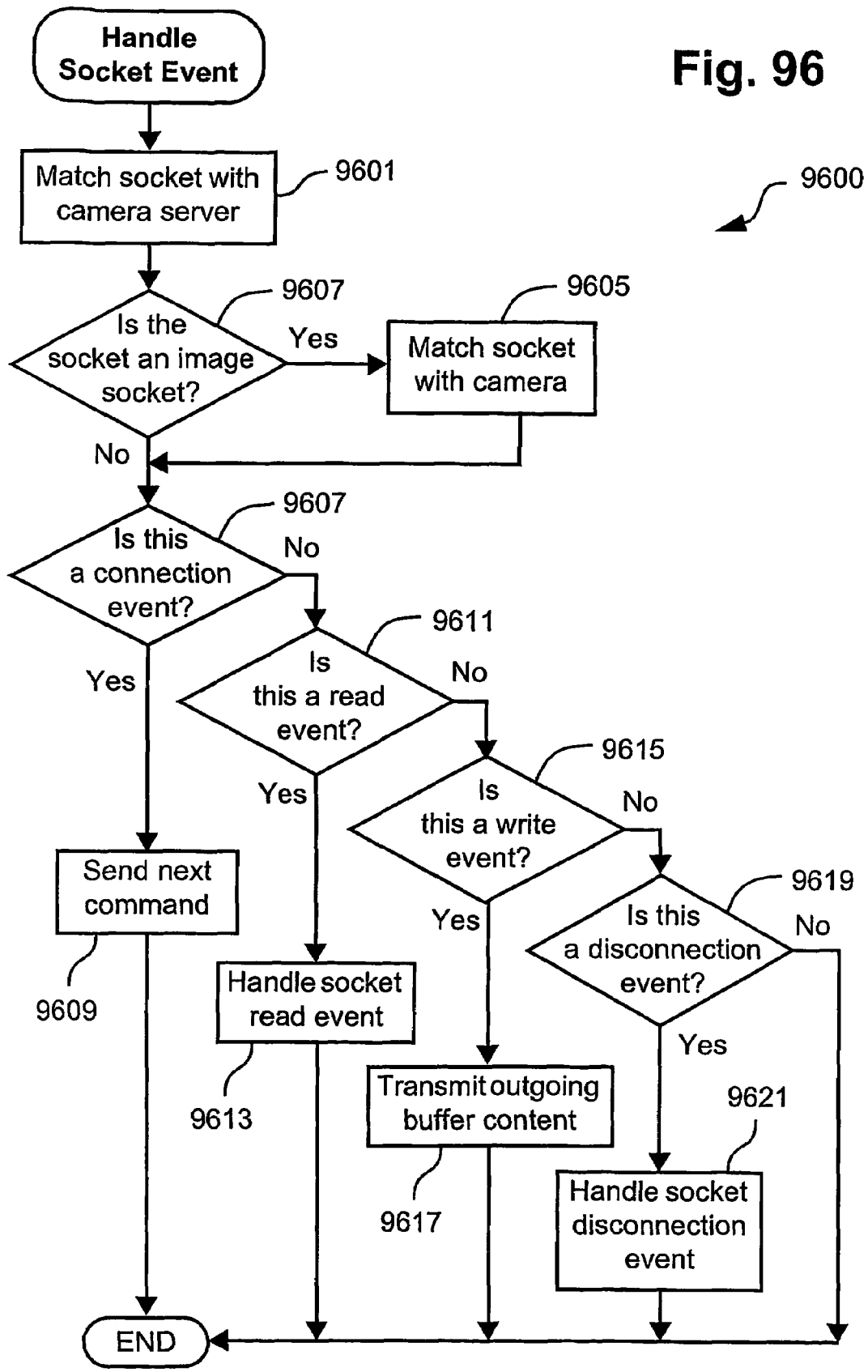
FIG. 96 is a flow diagram showing a process for processing socket events.

FIG. 96 is a flow diagram showing a process 9600 for handling a socket event. The process 9600 is preferably implemented as software resident on the hard disc drive 2310 and controlled in its execution by the processor 2305 of the storage server 2300. The process 9600 is executed by the operating system when a connection or disconnection occurs on a socket, when the socket is ready to accept data for writing to the socket, or when incoming data is ready to be read from the socket.

The process 9600 begins at the first step 9601 where the processor 2305 matches a particular socket with a camera server 109-111. At the next 9603, if the socket is an image socket, then the process 9600 proceeds to step 9605. Otherwise, the process 9600 proceeds to step 9607. At step 9605 the processor 2305 matches the socket with a particular camera 112-115.

Then at the next step 9607, if the processor 2305 detects a connection event, then the socket is ready to begin processing new commands, and the process 9600 proceeds to step 9609. Otherwise, the process 9600 proceeds to step 9611. At step 9609, the processor 2305 transmits a next command.

At step 9611, if the event detected by the processor 2305 is a read event, then the process 9600 proceeds to step 9613. Otherwise, the process 9600 proceeds to step 9615. At step 9613, the processor 2305 processes the socket read event.

At step 9615, if the event is a write event, then the process 9600 proceeds to step 9617. Otherwise, the process 9600 proceeds to step 9619.

At step 9617, the processor 2305 transmits content from an outgoing buffer configured within the memory 2306.

At step 9619, if the event is a disconnection event, then the process 9600 proceeds to 9621. Otherwise, the process 9600 concludes. At step 9621, the processor 2305 processes the socket disconnection event.

3.7.3 Send Next Command Process

Figure 97:
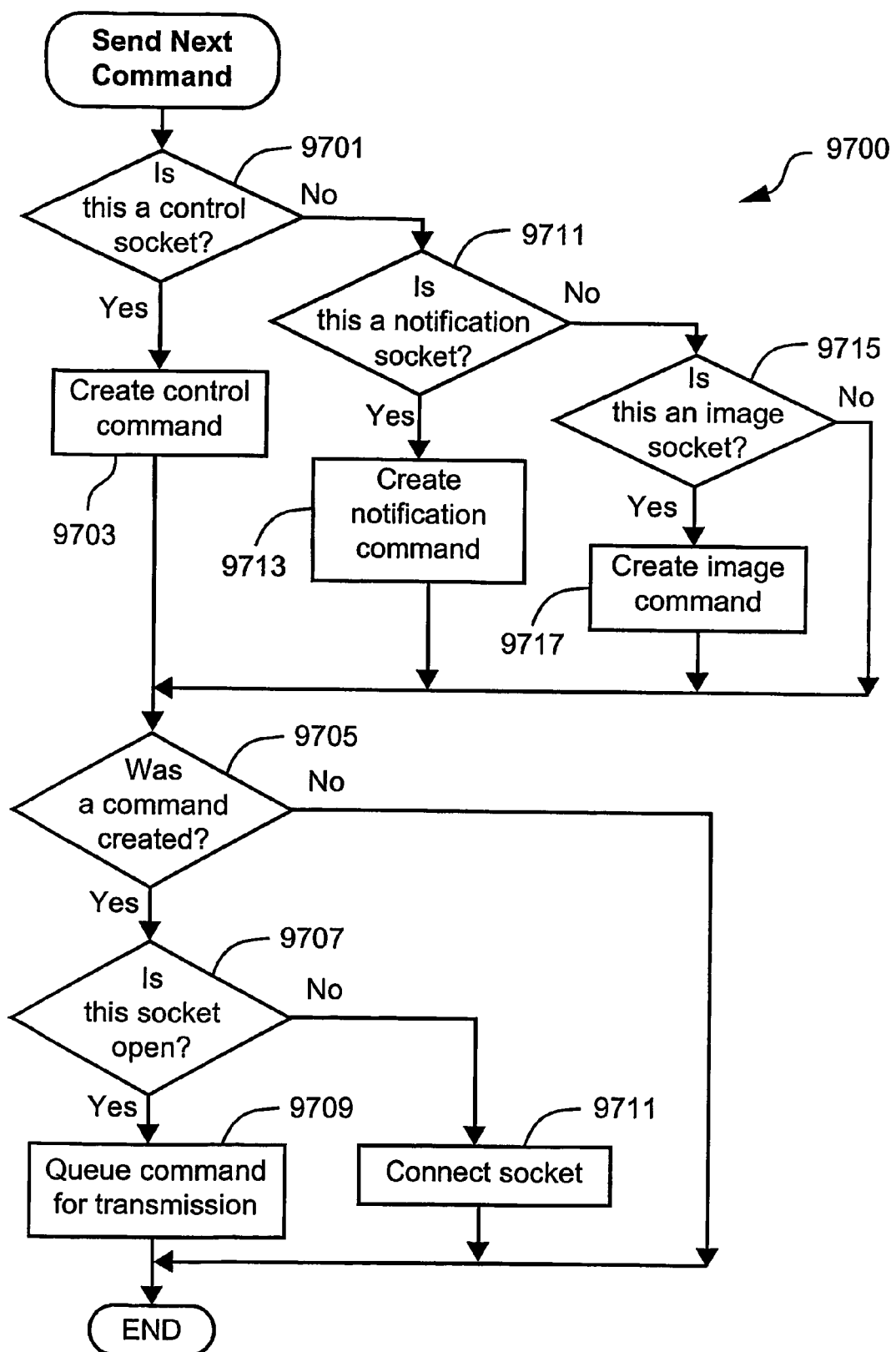
FIG. 97 is a flow diagram showing a process for sending a next command.

FIG. 97 is a flow diagram showing a process 9700 for sending a next command. The process 9700 is preferably implemented as software resident on the hard disc drive 2310 and being controlled in its execution by the processor 2305.

The process 9700 is responsible for ensuring that any commands that need to be sent on a particular socket are sent. Each time the process 9700 is executed, one command is queued for transmission on the socket. Thus, the response to each command to executes the process 9700 again to ensure that further commands are sent if necessary.

The process 9700 executes a process for creating control commands, a process for creating a notification Command or a process for creating an image command depending on which socket the process 9700 is acting on.

If a command is successfully created (i.e., a command may not be created if there are currently no outstanding commands that need to be executed on the given socket), then the process 9700 determines whether the socket is currently connected. If the socket is connected, the command is queued for transmission by asking the operating system to execute a process for processing a socket event when the socket is made ready for writing. If the socket is not connected, a request is issued to the operating system to connect the socket. Once the socket is connected, the operating system will call a process for processing a socket event, which will eventually execute a process of sending a next command.

If a command was not created, this means that nothing needs to be executed using the current socket at this point in time. The socket is disconnected.

The process 9700 begins at the first step 9701, where if the processor 2305 determines that the socket is a control socket, then the process 9700 proceeds to step 9703. Otherwise, the process 9700 proceeds to step 9711. At step 9703, the processor 2305 creates a control command and the process 9700 proceeds to step 9705.

At step 9711, if the processor 2305 determines that the socket is a notification socket then the processor 2305 proceeds to step 9713. Otherwise, the process 9700 proceeds to step 9715. At step 9713, the processor 2305 creates a notification command and the process 9700 proceeds to step 9705.

At step 9715, if the processor 2305 determines that the socket is an image socket, then the process 9700 proceeds to step 9717. Otherwise, the process 9700 proceeds to step 9705. At step 9717, the processor 2305 creates an image command.

At step 9705, if the processor 2305 determines that a command was created, then the process 9700 proceeds to step 9707. Otherwise, the process 9700 concludes. At step 9707, if the processor 2305 determines that the socket is open, then the process 9700 proceeds to step 9709. Otherwise, the process 9700 proceeds to step 9711.

At step 9709, the processor 2305 queues the created command in memory 2306 for transmission. At step 9711, the processor 2305 connects the created socket and the process 9700 concludes.

3.7.4 Handle Socket Read Process

Figure 98:
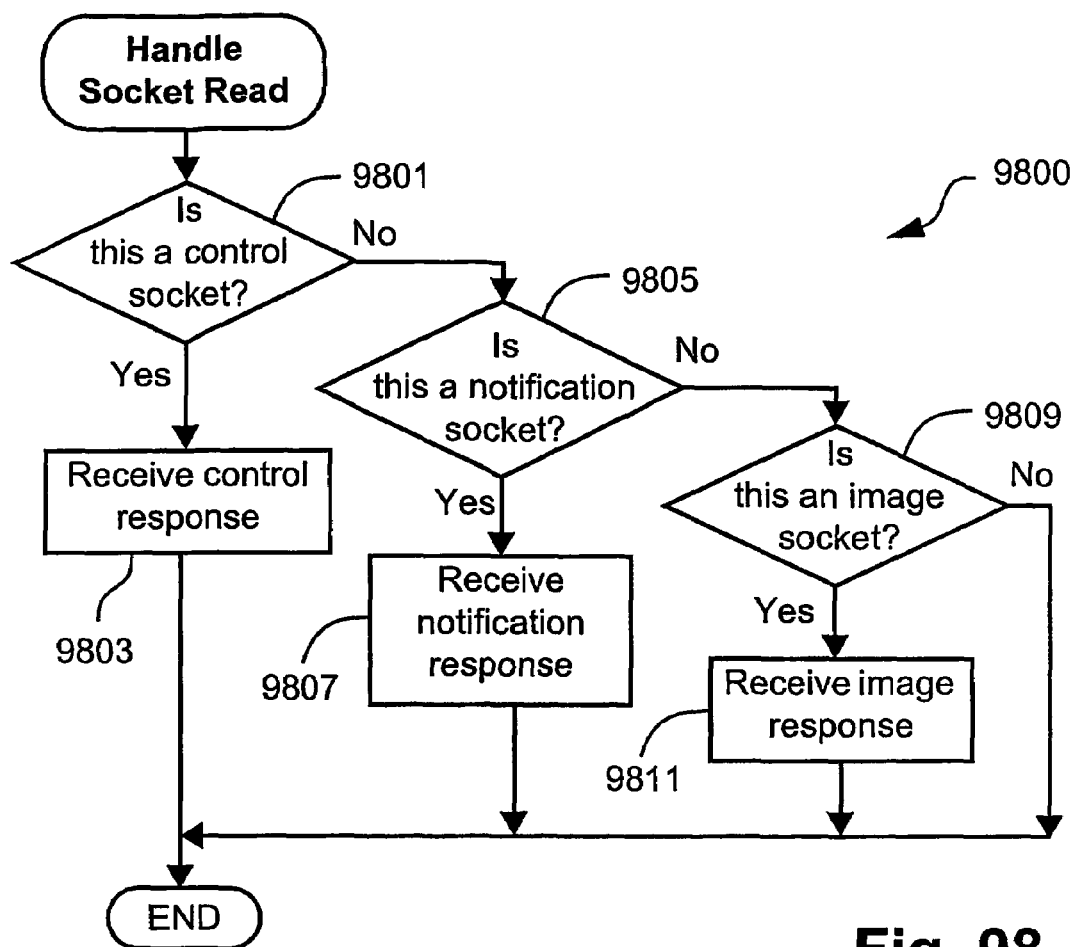
FIG. 98 is a flow diagram showing a process for processing a socket read.

FIG. 98 is flow diagram showing a process 9800 for handling a socket read command. The process 9800 is preferably implemented as software resident on the hard disc drive 2310 and being controlled in its execution by the processor 2305.

The process 9800 is executed when there is data ready to be read from a socket. The process 9800 determines the type of socket, and executes a function dedicated to that type of socket. The process 9800 begins at the first step 9801 where if the socket is a control socket then the process 9800 proceeds to step 9803. Otherwise, the process 9800 proceeds to step 9805. At step 9803, the processor 2305 receives a control response.

At step 9805, if the socket is a notification socket, then the process 9800 proceeds to step 9807. Otherwise, the process 9800 proceeds to step 9809. At step 9807, the processor 2305 receives the notification response.

At step 9809, if the socket is an image socket, then the process 9800 proceeds to step 9811. Otherwise, the process 9800 concludes. At step 9811, the processor 2305 receives the image response and the process 9800 concludes.

3.7.5 Handle Socket Disconnection Process

Figure 99:
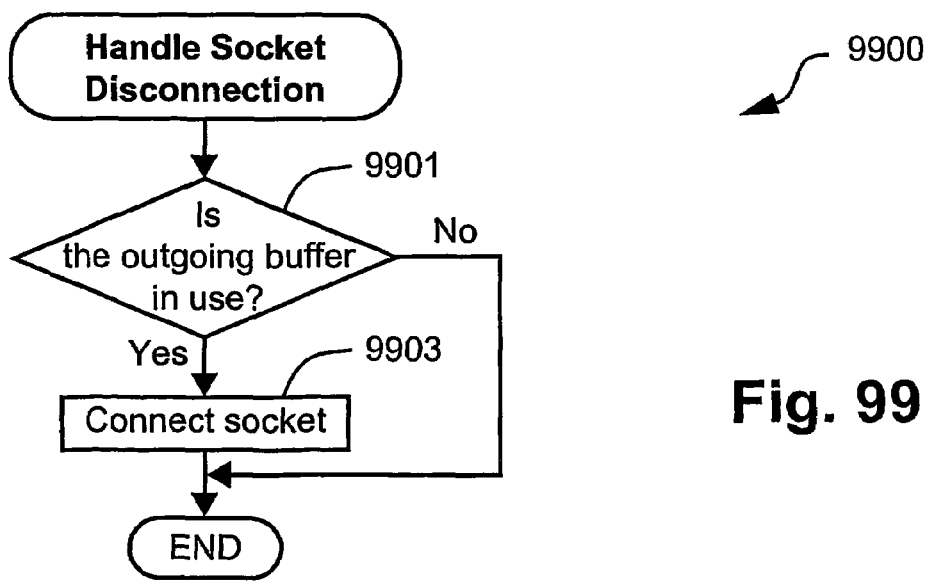
FIG. 99 is a flow diagram showing a process for processing a socket disconnection.

FIG. 99 is a flow diagram showing a process 9900 for handling a socket disconnection. The process 9900 is executed when the operating system informs the recording engine 201 that a socket has been disconnected. If an outgoing data buffer configured within memory 2306 contains data, then there is a command that needs to be transmitted on the socket. In this instance, the processor 2305 informs the operating system that a connection is to be established. The operating system will later inform the recording engine 201 of a successful connection.

If no data is present in the outgoing data buffer, the processor 2305 does not attempt to reconnect the socket. The socket can subsequently be connected when a new command needs to be sent.

The process 9900 begins at the first step 9901 where if an outgoing buffer configured within memory 2306 is in use, then the process 9900 proceeds to step 9903. Otherwise, the process 9900 concludes. At step 9903, the processor 2305 connects the socket and the process 9900 concludes.

3.7.6 Create Control Command Process

Figure 100:
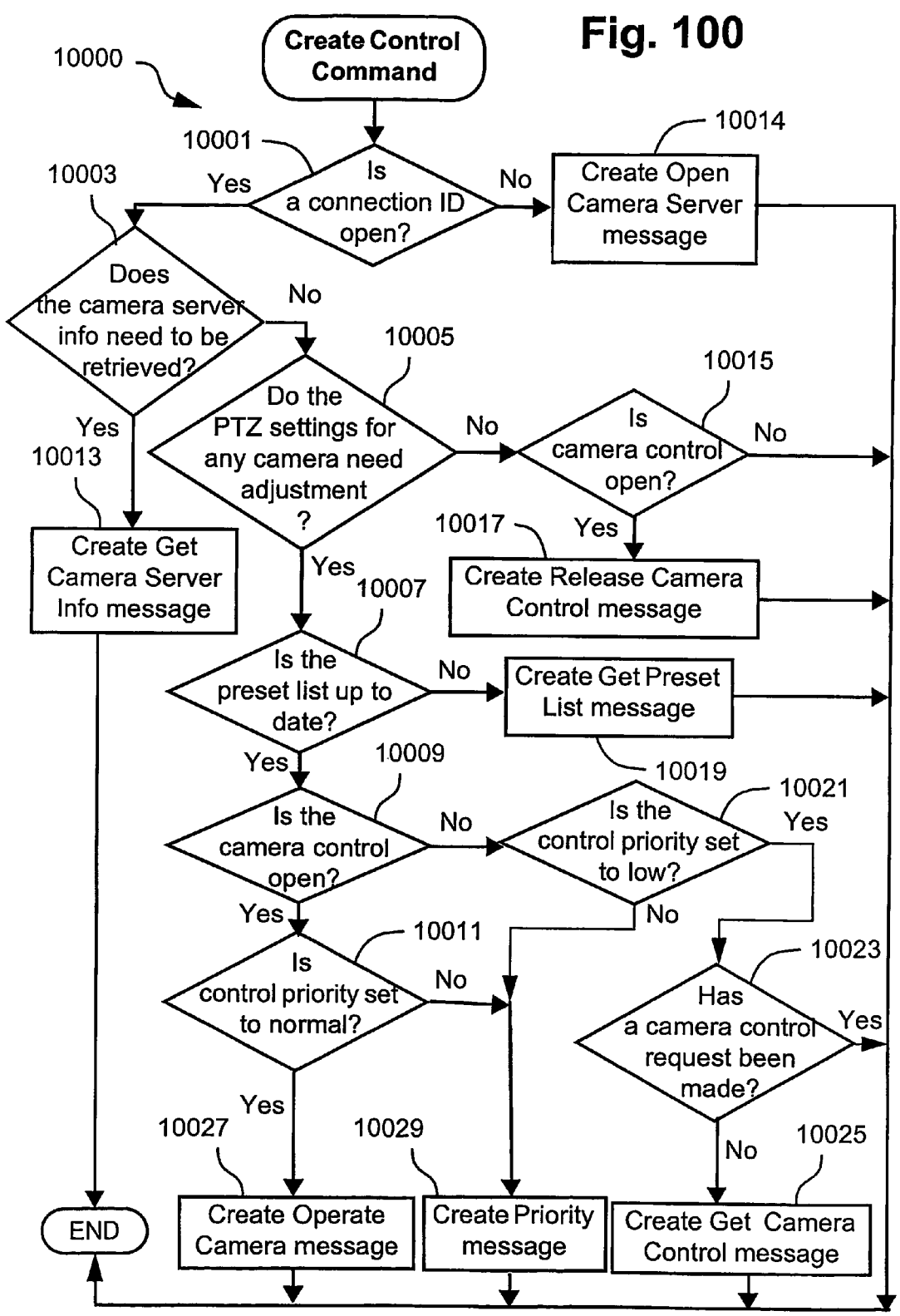
FIG. 100 is a flow diagram showing a process for creating a control command.

FIG. 100 is a flow diagram showing a process 10000 for creating a control command. The process 10000 is preferably implemented as software resident on the hard disc drive 2310 and being controlled in its execution by the processor 2305.

The process 10000 begins at the first step 10001 where if a connection identifier is open for a recording engine session with a particular camera server 109-111, then the process 10000 proceeds to step 10003. Otherwise, the process 10000 proceeds to step 10014 where the processor 2305 creates an open camera server message and the process 10000 concludes.

At step 10003, if the processor 2305 determines that camera server information needs to be retrieved, then the process 10000 proceeds to the next step 10013. Otherwise, the process 10000 proceeds to step 10005. At step 10013, the processor 2305 creates a get camera server information message and the process 10000 concludes.

In connection with step 10013, the recording engine 201 needs to be aware of various aspects of camera server configuration, such as names of attached cameras 112-115, current pan, tilt and zoom positions. As a result, at step 10013, the processor 2305 generates a HTTP message that requests such information. In some implementations, various requests may need to be executed separately to obtain all of the required information. These various requests can be combined into a single step for purposes of simplicity.

At step 10005, if the pan, tilt and zoom settings for any camera 112-115 needs adjustment, then the process 10000 proceeds to step 10007. Otherwise, the process 10000 proceeds to step 10015. At step 10007, if the processor 2305 determines that a preset list of a particular camera 112-115 is up-to-date, then the process 10000 proceeds to step 10009. Otherwise, the process 10000 proceeds to step 10019.

At step 10009, if camera control corresponding to the particular camera 112-115 is open, then the process 10000 proceeds to step 10011. Otherwise, the process 10000 proceeds to step 10021.

At step 10011, if the processor 2305 determines that control priority of a particular camera 112-115 is set to a normal priority level, then the process 10000 proceeds to step 10027. Otherwise, the process 10000 proceeds to step 10029. At step 10027, the processor 2305 creates an operate camera message and the process 10000 concludes. At step 10029, the processor 2305 creates a priority message and the process 10000 concludes.

At step 10015, if camera control is open, then the process 10000 proceeds to step 10017. Otherwise, the process 10000 concludes. At step 10017, the processor 2305 creates a release camera control message and the process 10000 concludes.

At step 10019, the processor 2305 creates a get preset list message and the process 10000 concludes.

At step 10021, if the processor 2305 determines that control priority of a particular camera 112-115 is set to a below normal priority level, then the process 10000 proceeds to step 10023. Otherwise, the process 10000 proceeds to step 10029 as described above.

Camera servers 109-111 typically allow storage servers (e.g., 2300A) requesting control at a specific control priority level (e.g., seven (7)) to take the control right from another storage server (e.g., 2300B), which already has control using the same control priority level (e.g., seven (7)). However, this may lead to two or more storage servers (e.g., the storage servers 2300A and 2300B) using the same control priority level perpetually taking the control of a particular camera server (e.g., 109) from each other.

For example, if the storage servers 2300A and 2300B are set to record from different preset camera positions for the camera 113, the storage servers 2300A and 2300B may keep requesting control of the particular camera server 109 to change the position of the camera 113. To avoid this, before gaining control, the processor 2305 of the camera server 2300A may set the priority level of the connection to the particular camera server 113 to a below normal level of six (6). As a result, the camera server 2300A will not take the control right from the storage server 2300B or the other storage servers 2300, which run at a normal priority level of seven (7), without control being granted to the storage server 2300A. Once control has been granted to the storage server 2300A, the processor 2305 of the storage server 2300A restores the priority level of the storage server 2300A to a normal level of seven (7) in order to prevent other storage servers 2300 from obtaining the control right.

At step 10023, if the processor 2305 determines that a camera control request has been made, then the process 10000 proceeds to step 10025. Otherwise, the process 10000 concludes. At step 10025, the processor 2305 creates a get camera control message and the process 10000 concludes.

3.7.7 Receive Control Response Process

Figure 101:
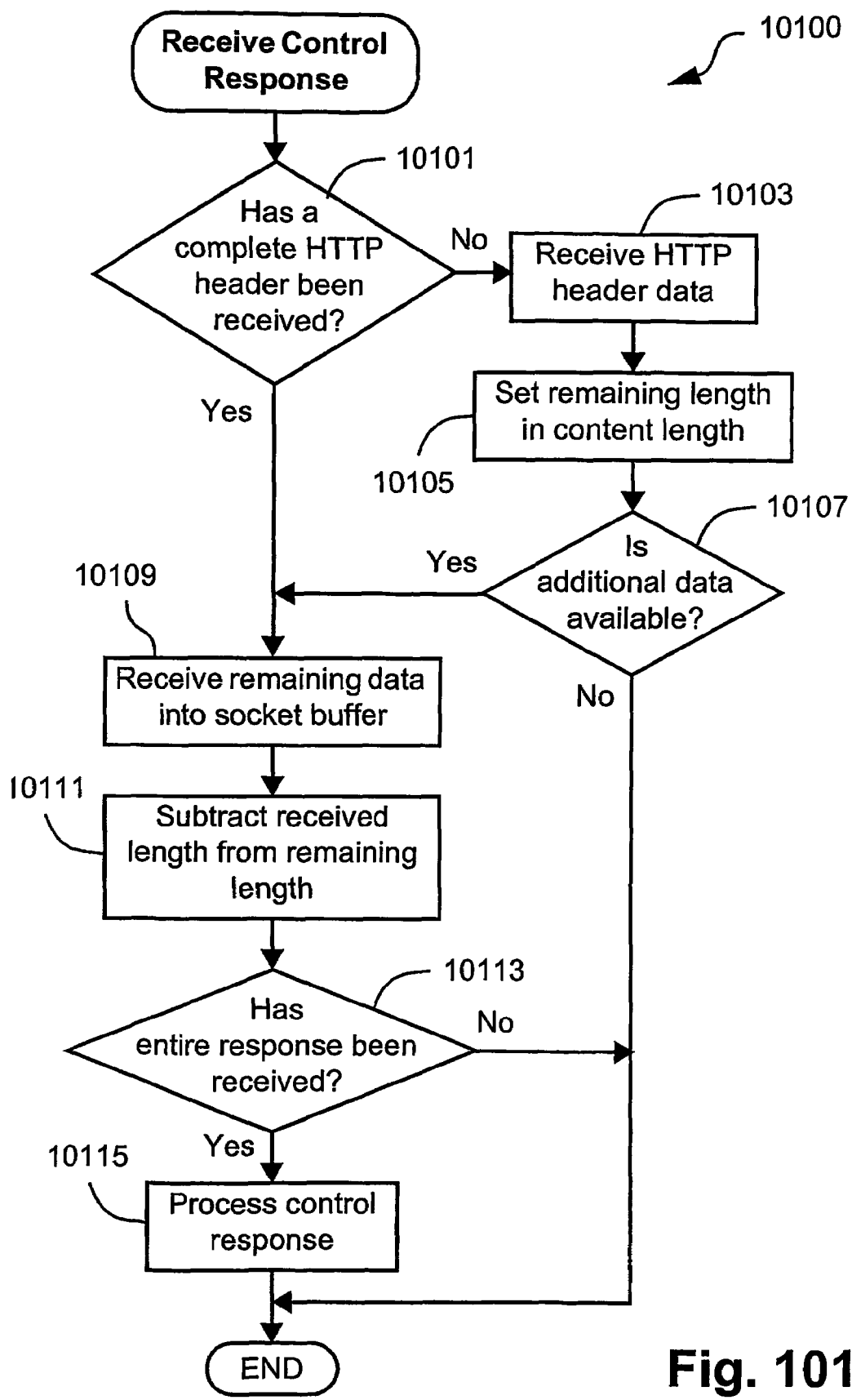
FIG. 101 is a flow diagram showing a process for receiving a control response.

FIG. 101 is a flow diagram showing a process 10100 for receiving a control response.

The process 10100 is executed when data is ready to be read on the control socket. The process 10100 can be executed more than once for a single response, if not all the response data is available at the same time.

If a current response does not yet contain a complete HTTP header, the data is received into a buffer for the HTTP header. The HTTP header is parsed to obtain the content length of the response, and, if any additional data is available, that data is received into a received data buffer.

If not all the response data has been received for the given socket, the process 10100 will end. Otherwise, the process for controlling a response is executed.

The process 10100 begins at the first step 10101, where if the processor 2305 determines that a complete HTTP header has been received, then the process 10100 proceeds to step 10109. Otherwise, the processor 2305 proceeds to step 10103 where HTTP header data is received.

At the next step 10105 the processor 2305 sets a remaining length attribute to the content length of the control response. Then at the next step 10107, if the processor 2305 determines that additional data is available, then the process 10100 proceeds to step 10109. Otherwise, the process 10100 concludes.

At step 10109, the processor 2305 receives remaining data into a socket buffer configured within memory 2306. Then at the next step 10111, the processor 2305 substracts a length of the received part of the response from the remaining length of the response. At the next step 10113 if the process 2305 determines that the entire response has been received, then the process 10100 proceeds to step 10115. Otherwise the process 10100 concludes.

At step 10115, the processor 2305 processes the control response and the process 10100 concludes.

3.7.8 Process Control Response Process

Figure 102:
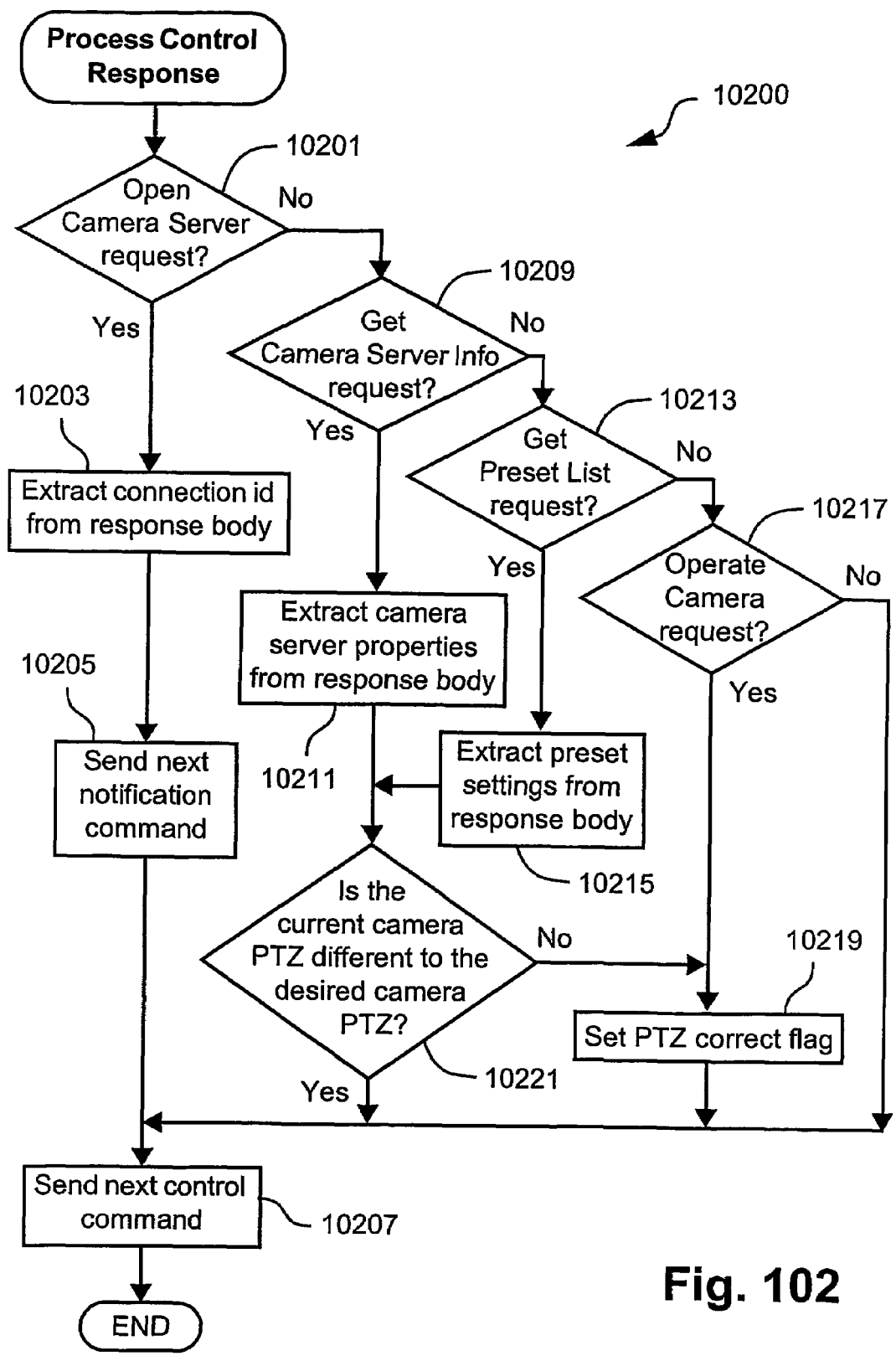
FIG. 102 is a flow diagram showing a process for controlling a response process.

FIG. 102 is a flow diagram showing a process 10200 for controlling a response process. The process 10200 is preferably implemented as software resident on the hard disc drive 2310 and being controlled in its execution by the processor 2305.

The process 10200 processes the data received in response to a command sent on a control socket and performs certain actions based on the request that the received data is in response. Certain requests do not require additional handling.

The process 10200 begins at the first step 10201, where if the processor 2305 detects an open camera server request, then the process 10200 proceeds to step 10203. Otherwise, the process 10200 proceeds to step 10209. At step 10203, the processor 2305 extracts a connection identifier from the response body of the request. Then at the next step 10205, the processor 2305 sends a next notification command and the process 10200 proceeds to step 10207.

At step 10209, if the processor 2305 determines that the request was a get camera server information request, then the process 10200 proceeds to step 10211. Otherwise, the process 10200 proceeds to step 10213. If the request was a get camera server information request, then the response body of the request is parsed to extract information about the camera server 109-111 that issued the request, including the current pan, tilt, zoom positions, camera names, etc. At step 10211, the processor 2305 extracts camera server properties from the response body of the request. Then the process 10200 proceeds to step 10221. At step 10213, if the processor 2305 determines that the request was a get preset list request, then the process 10200 proceeds to step 10215. Otherwise, the process 10200 proceeds to step 10217. If the request was a get preset list request, then the response body is parsed to extract information about the preset positions stored in the camera server. Accordingly, at step 10215, the processor 2305 extracts preset settings from the response body of the request and the process 10200 proceeds to step 10221.

At step 10217, if the processor 2305 determines that the request was an operate camera request, then the process 10200 proceeds to step 10219. Otherwise, the process 10200 proceeds to step 10207. At step 10219, the processor 2305 sets a pan, tilt, zoom (PTZ) correct flag. If the current PTZ settings for a camera are consistent with the settings required by the current camera settings in the recording engine, the "PTZ correct" flag is set in order to ensure that a command to move the camera is not sent where not necessary.

At step 10221, if the processor 2305 determines that the current camera pan, tilt, zoom settings are different to desired camera pan, tilt, zoom settings, then the process 10200 proceeds to step 10207. Otherwise, the process 10200 proceeds to step 10209. At step 10207, the processor 2305 sends a next control command. If the request was an operate camera request, then the new PTZ settings for the camera will be identical to those required by the recording engine, so the "PTZ correct" flag is set.

3.7.9 Create Notification Command Process

Figure 103:
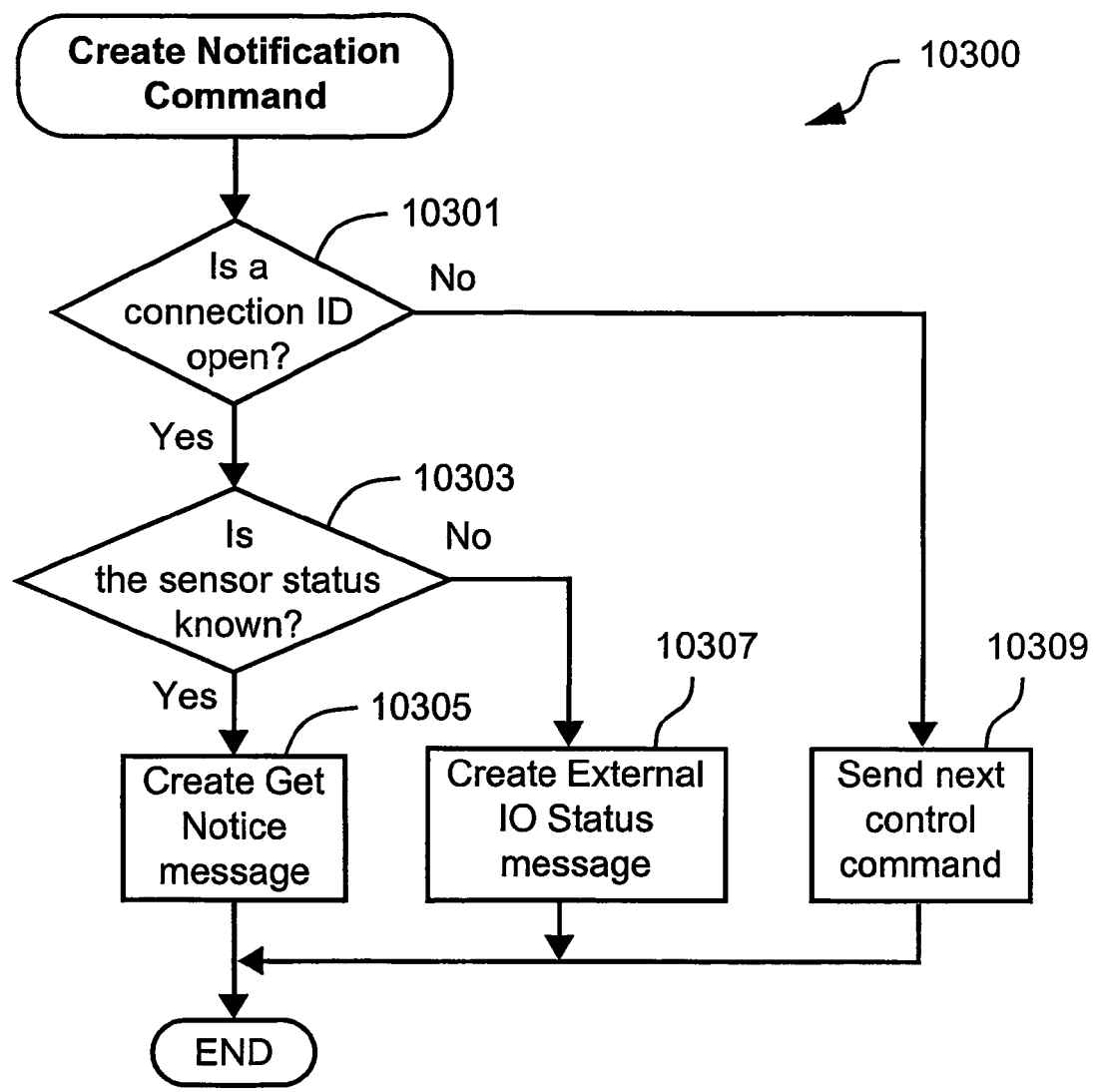
FIG. 103 is a flow diagram showing a process for creating a notification command.

FIG. 103 is a flow diagram showing a process 10300 for creating a notification command. The process 10300 is preferably implemented as software resident on the hard disc drive 2310 and being controlled in its execution by the processor 2305.

The process 10300 begins at the first step 10301 where if the processor 2305 determines that a connection identifier is currently open, then the process 10300 proceeds to step 10309. Otherwise, the process 10300 proceeds to step 10303. If a connection identifier is not currently open, a command is sent on the control socket to establish a new one. The command is sent by executing a send next command process with the control socket as an argument. Since no other commands may be sent on the notification socket until a connection identifier is established.

As will be described in detail below, if the current sensor status is not known, an external IO status message is created to determine the current sensor status. Otherwise, a Get Notice message is created, which allows the recording engine to listen for sensor and motion detection events and camera control events. At step 10303, if the processor 2305 determines that the status of a current sensor is known, then the process 10300 proceeds to step 10305. Otherwise the process 10300 proceeds to step 10307. At step 10305, the processor 2305 creates a get notice message. The get notice message allows the recording engine 201 to listen for sensor and motion detection events and camera control events.

At step 10307, the processor 2305 creates an external input/output (IO) status message and the process 10300 concludes. At step 10309, the processor 2305 sends a next control command and the process 10300 concludes.

3.7.10 Receive Notification Response Process

Figure 104:
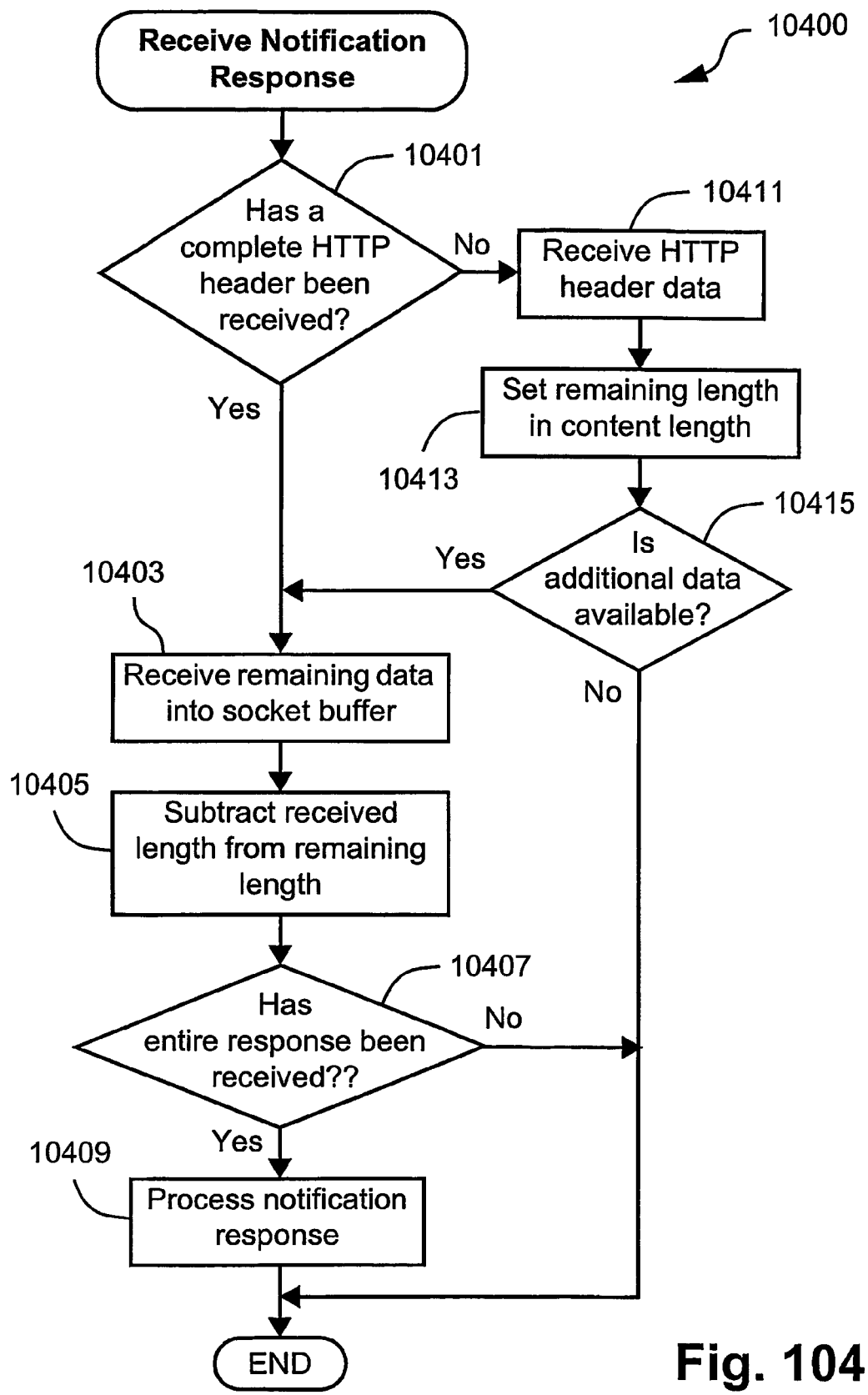
FIG. 104 is a flow diagram showing a process for receiving a notification response.

FIG. 104 is a flow diagram showing a process 10400 for receiving a notification response. If a current response does not yet contain a complete HTTP header, the data is received into a buffer for the HTTP header. The HTTP header is parsed to obtain the content length of the response, and, if any additional data is available, that data is received into a received data buffer.

The process 10400 begins at the first step 10401 where if the processor 2305 determines that a complete HTTP header has been received, then the process 10400 proceeds to step 10403. Otherwise, the process 10400 proceeds to step 10411. At step 10411, the processor 2305 receives the HTTP header data. Then at the next step 10413, the processor 2305 sets a remaining length to content length. At the next step 10415, if the processor 2305 determines that additional data is available, then the process 10400 proceeds to step 10403. Otherwise, the process 10400 concludes.

At step 10403, if the processor 2305 receives remaining data into a socket buffer configured within memory 2306, then at the next step 10405, the processor 2305 subtracts a received length from the remaining length of the notification message.

At the next step 10407, if the entire notification response has been received, then the process 10400 proceeds to step 10409. Otherwise, the process 10400 concludes. At step 10409, the processor 2305 processes the notification response.

3.7.11 Process Notification Response Process

Figure 105:
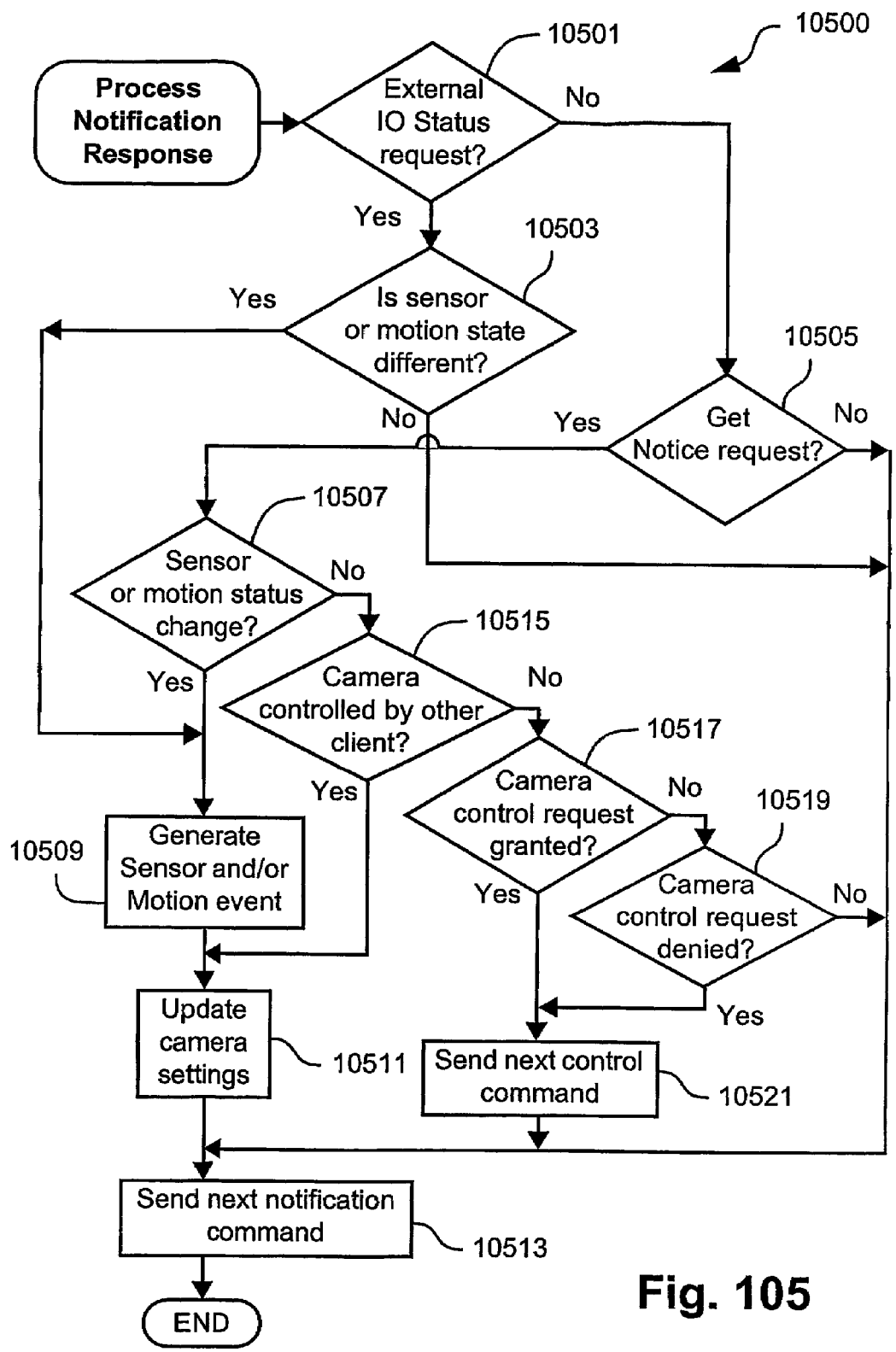
FIG. 105 is a flow diagram showing a process for processing a notification response.

FIG. 105 is a flow diagram showing a process 10500 for processing a notification response as executed at step 10409 of the process 10400. The process 10500 is preferably implemented as software resident on the hard disc drive 2310 and being controlled in its execution by the processor 2305. If the request is determined to be an external input output (IO) Status request, then the processor 2305 determines whether a current sensor and motion detection status reported by the camera 109-111 matches those known by the recording engine 201. If there is a change, a sensor and/or motion event is generated using a process for generating an event routine. The camera settings are updated according to a triggered event by executing a process for updating camera settings as will be described in detail below.

If the request is determined to be a get notice request, then the processor 2305 determines from the response what kind of notification this is.

If the notification indicates a change in sensor or motion detection status, a process for generating an event is called, and the camera settings are updated according to the triggered event by calling an update camera settings process.

If the notification indicates that a camera was moved by another client, a process for updating camera settings is executed to initiate to move the camera back to the position desired by the recording engine 201, if necessary.

If the notification indicates that camera control was granted, the next command is sent on the control socket using a process for sending a next command. This would typically cause an operate camera command to be generated to move the camera to a new position.

If the notification indicates that camera control was denied, the next command is sent on the control socket using the process for sending a next command. This would typically cause a new request for camera control to be issued, resulting in a loop that exits when camera control is finally granted.

The process 10500 begins at the first step 10501 where the processor 2305 determines if there is an external IO status request. If there is no request (the No option of step 10501) then the process 10500 proceeds to step 10505. If, however, there is an external IO status request (the Yes option of step 10501), then step 10503 checks whether a sensor or motion state is different. If there is no difference in states (the No option of step 10503) then the process 10500 proceeds to step 10513, in which the next notification command is sent.

If, however, there is a sensor or motion state that is different (the Yes option of step 10503) then the process 10500 proceeds to step 10509, which generates a sensor and/or motion event, depending on which state has changed.

Once the event has been generated, in step 10511 the camera settings are updated. Then, in step 10513, the next notification command is sent and the process 10500 concludes.

Step 10505, which is executed when there is no external IO status request, checks whether there is a get notice request. If there is a get notice request (the Yes option of step 10505) then step 10507 determines whether there is a sensor or motion status change.

If there is a status change (the Yes option of step 10507), then the process 10500 proceeds to step 10509, which has been described above. If there is no status change (the No option of step 10507) then in step 10515 the processor 2305 checks whether the camera 112-115 is controlled by another storage server 2300. If this is the case (the Yes option of step 10515) then the process 10500 proceeds to step 10511 in which, as previously described, the camera settings are updated. Otherwise, the process 10500 concludes.

If the camera 112-115 is not controlled by another storage server 2300 (the No option of step 10515) then in step 10517 the processor 2305 checks whether a camera control request has been granted. If a request has been granted (the Yes option of step 10517), then in step 10521 the next control command is sent. The process 10500 then proceeds to step 10513, in which the next notification command is sent.

If no camera control request has been granted (the No option of step 10517), then a check is performed in step 10519 as to whether a camera control request has been denied. If no denial has occurred (the No option of step 10519) then the process 10500 proceeds to step 10513, in which the next notification command is sent. If, however, a camera control request has been denied (the Yes option of step 10519) then control flow proceeds to step 10521, in which the next control command is sent.

3.7.12 Create Image Command Process

Figure 106:
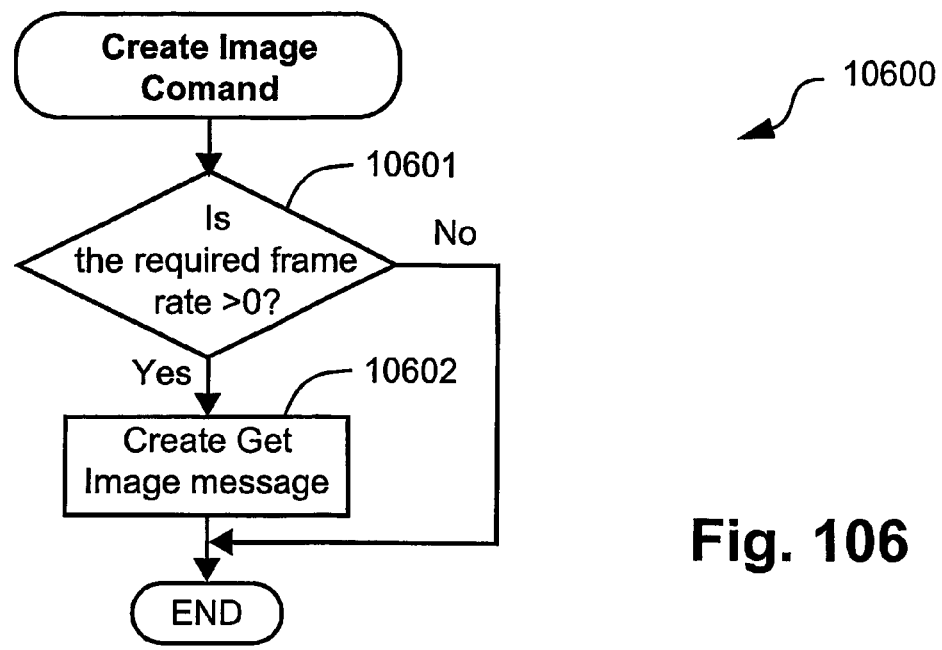
FIG. 106 is a flow diagram showing a process for creating an image command.

FIG. 106 shows a process 10600 for creating an image command. The process 10600 is preferably implemented as software resident on the hard disc drive 2310 and being controlled in its execution by the processor 2305. The process 10600 is executed when an image socket has been connected. If the acquisition frame rate currently required for a given camera is greater than zero, a get image message is created. Otherwise, the recording engine 201 does not need to receive image data using the socket.

The process 10600 begins at the first step 10601 where if the processor 2305 determines that a required frame rate is greater than zero, then the process 10600 concludes. Otherwise, the processor 2305 creates a get image message and the process 10600 concludes.

3.7.13 Receive Image Response Process

Figure 38:
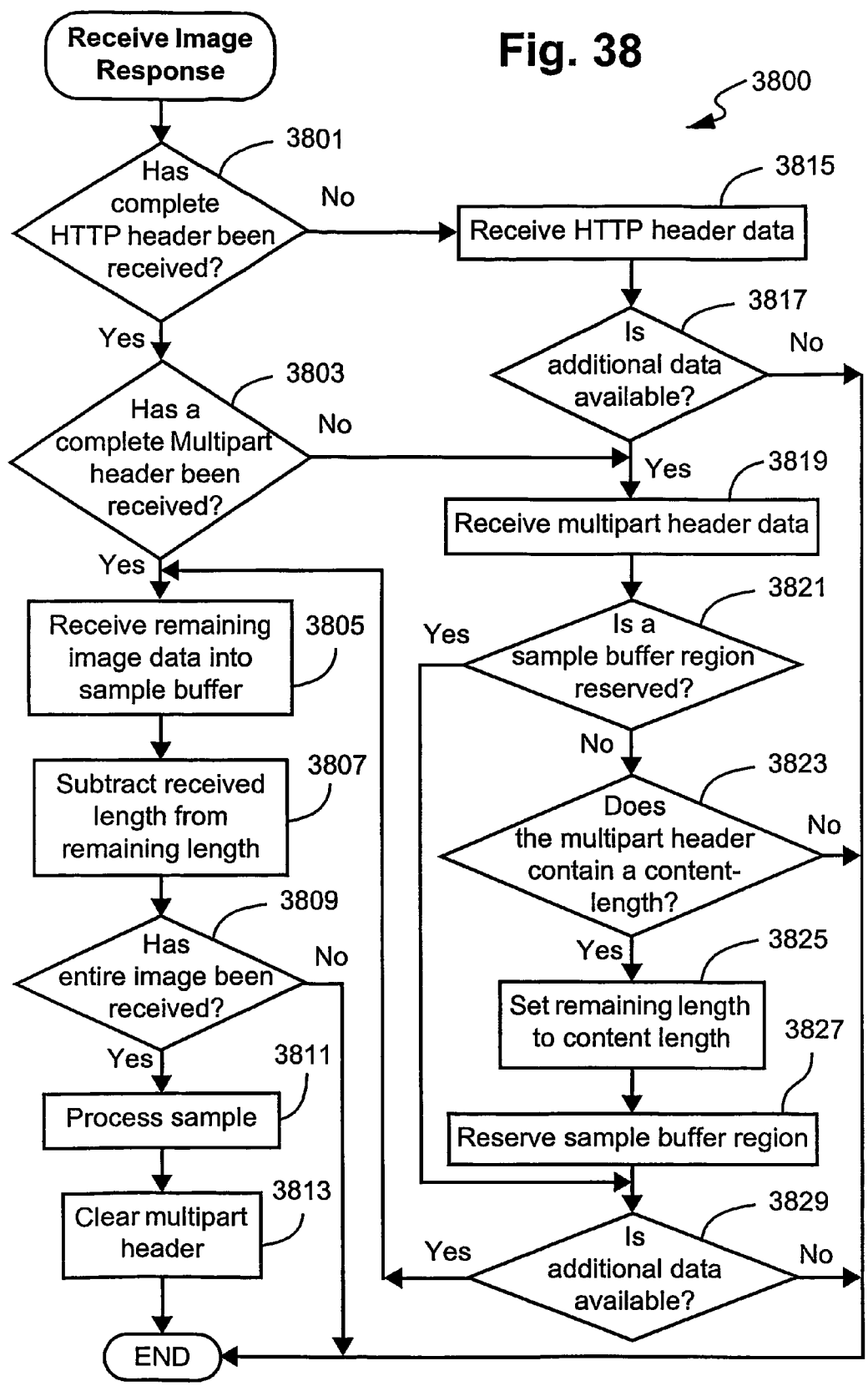
FIG. 38 is a flow diagram showing a process for receiving an image response.

FIG. 38 is a flow diagram showing a receive image response process 3800. The process 3800 is preferably implemented as software resident in the hard disk drive 2310 and being controlled in its execution by the processor 2305. The process 3800 is executed each time there is sample data available to be received by the storage server 2300 on the image socket of a camera server 109-111.

The process 3800 begins at step 3701 where if the processor 2305 determines that a complete HTTP header has been received from one of the camera servers 109-111, then the process 3800 proceeds to step 3803. Otherwise the process 3800 proceeds to step 3815. At step 3803, if the processor 2305 determines that a complete multipart header has been received, then the process 3800 proceeds to step 3805. Otherwise, the process 3800 proceeds to step 3819.

At step 3815, the processor 3815 receives HTTP header data. At the next step 3817, if the processor 2395 determines that no more additional sample data is available then the process 3800 concludes. Otherwise, the process 3800 proceeds to step 3819, where the processor 2305 receives multipart header data. Then at the next step 3821, if the processor 2305 determines that a frame buffer region has been reserved within the memory 2306 of the storage server 2300, then the process 3800 proceeds directly to step 3829. Otherwise, the process 3800 proceeds to step 3823, where if the processor 2305 determines that the multipart header contains a content-length then the process 3800 proceeds to step 3825. Otherwise, the process 3800 concludes. At step 3825, the processor 2305 sets a remaining length parameter to content-length. Then at step 3827, the processor 2305 reserves a frame buffer region within memory 2306 according to the remaining length of sample data to be received.

The process 3800 continues at the next step 3829, where if additional sample data is available, then the process 3800 proceeds to step 3805. Otherwise, the process 3800 concludes. At step 3805, the processor 2305 receives the remaining sample data into the frame buffer allocated within memory 2306 or hard disk 2310. Then at the next step 3807, the processor 2305 subtracts the received sample data length from the length of the remaining sample data. The process 3800 continues at the next step 3809, where if the processor 2305 determines that all of the sample data has been received from one of the camera servers 109-111 then the process 3800 proceeds to step 3811. Otherwise, the processor 2305 concludes. At step 3811, the processor 2305 processes the sample of the sample data received from one of the camera servers 109-111. The process 3800 concludes at the next step 3813, where the processor 2305 clears the multipart header.

3.8 The Frame Buffer Module

As described above, the recording engine 201 also includes a frame buffer module 329. The frame buffer module 329 receives sample data from a camera server 109-111 and saves the sample data into a circular frame buffer configured within the memory 2306 of the storage server 2300. If the sample data represents images to be recorded, the sample data is sent to the video file management module 317 for writing to the hard disk drive 2310. Sample data can also be fed to a motion detection algorithm. If recording is not taking place, the sample data is retained in memory 2306 for as long as possible before overflowing the frame buffer, and can be saved to the hard disk drive 2310 if an event is triggered and pre-event recording is enabled for that event.

Figure 39:
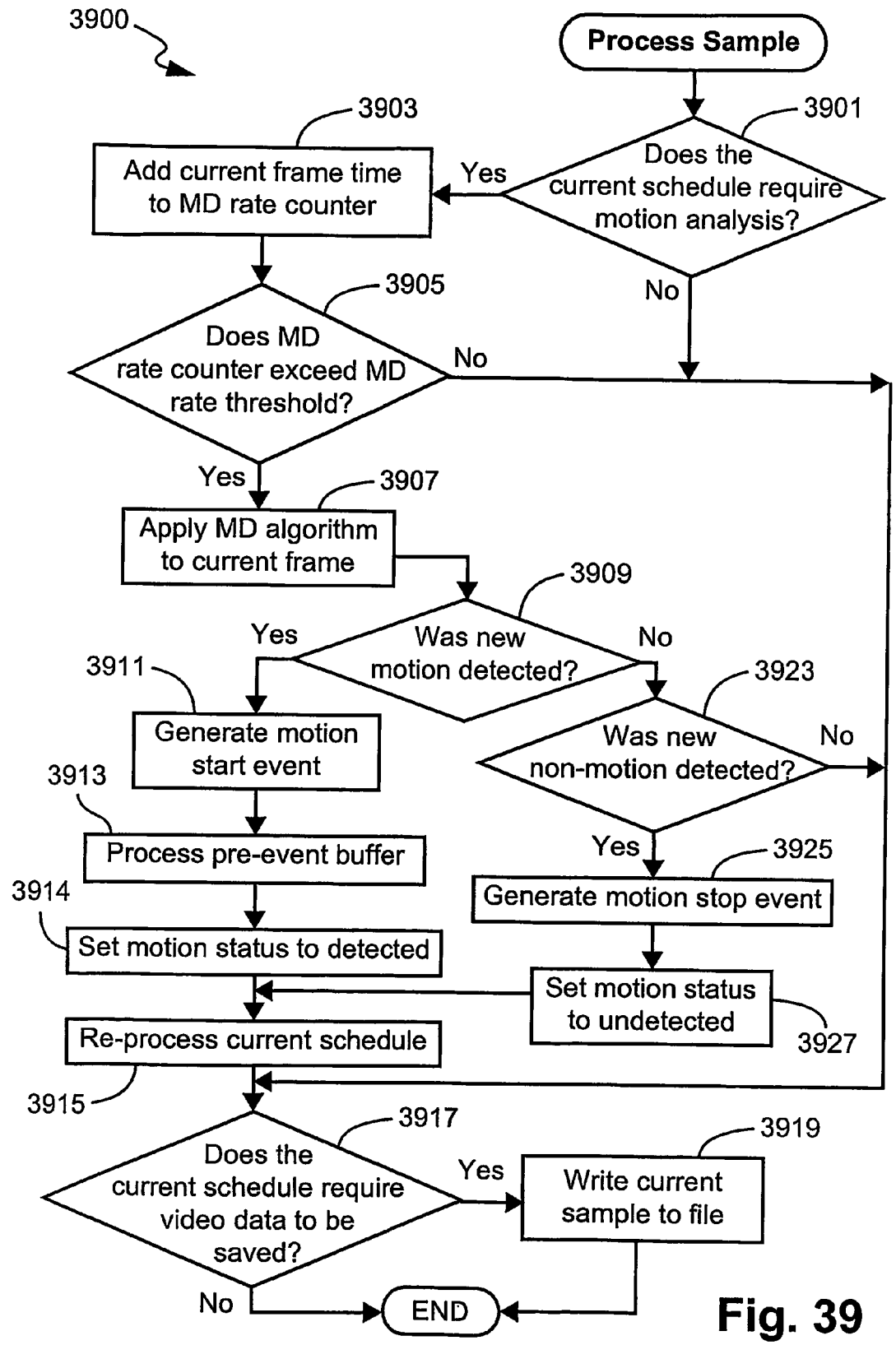
FIG. 39 is a flow diagram showing a process for processing a sample (i.e., frame)

FIG. 39 shows a process 3900 for processing a sample (i.e., frame). The process 3800 is preferably implemented as software resident in the hard disk drive 2310 and being controlled in its execution by the processor 2305. The process 3900 begins at step 3901 where if the processor 2305 determines that a current schedule for an associated camera server 109-111 requires motion analysis then the process 3900 proceeds to step 3903. Otherwise the process 3900 proceeds directly to step 3917. At step 3903, the processor 2305 adds the timestamp of the current sample to a motion detector rate counter configured within memory 2306. At the next step 3905, if the value of the motion detector rate counter exceeds a predetermined motion detector threshold, then the process 3900 proceeds to step 3907. Otherwise the process 3900 proceeds to step 3917. At step 3907, the processor 2305 applies a motion detector algorithm to the current sample. Any suitable motion detector algorithm can be used at step 3902.

At the next step 3909, if new motion was detected then the process 3900 proceeds to step 3911. Otherwise, the process 3900 proceeds to step 3923. At step 3911, the processor 2305 generates a motion start event. Then at the next step 3913, the processor 2305 processes a pre-event buffer configured within memory 2306. Motion status is set to detected at the next step 3914.

At step 3923, if the processor 2305 determines that motion was detected then the process 3900 proceeds to step 3925. Otherwise, the process 3900 proceeds to step 3917. At step 3925, the processor 2305 generates a motion stop event. Then at the next step 3927, the processor 2305 sets motion status to undetected.

The process 3900 continues at the next step 3915, where the processor 2305 re-processes the current schedule. Then at step 3917, if the processor 2305 determines that the current schedule requires sample data to be saved, then the process proceeds to step 3919. Otherwise, the process 3900 concludes. At step 3919, the current sample is written to an associated media file 1800.

3.9 Recording Engine Access Protocol

An access protocol is defined for the recording engine 201. The access protocol comprises six commands, which can be subdivided into two main groups.

Commands with an "RE_" prefix affect only the recording engine 201, and are managed by an administration interface of the recording engine 201. The administration interface will be explained in further detail below.

Commands with an "NVR_" prefix affect the entire system 100 as a whole, and are invoked on the storage server 2300 when the storage server 2300 is acting in the capacity of a master storage server for the system 100. Commands with the "NVR_" prefix are managed by a viewer interface of the recording engine 201.

Commands are sent by a software application on a viewer 2200 or other device (for example, a computer, PDA, phone, or any other device) to the web server 213 and the web server 213 passes the command to the recording engine 201. The command is handled within the recording engine 201 by the administration interface module 313 as described above. The command is typically sent from the web server 213 to the recording engine 201 using the Common Gateway Interface (CGI) and responses from the recording engine 201 are typically returned to the web server 213 also using the CGI interface. To enable more efficient operation on the storage server 2300, the FastCGI™ interface can be used.

The commands can also be sent from a software application (such as a viewer) running on the same storage server 2300. In this case, commands are still sent by the sending software to the web server 213. However, in such cases, rather than the command being sent across a network 2220, the command is typically sent through a socket connection within the same computer 2300.

Responses returned by the recording engine 201 to the web server 213 are then typically returned by the web server 213 to the viewer 2200 as HTTP responses.

3.9.1 Administration Interface

The recording engine administration interface comprises three commands, which are summarised in Table 7 below:

TABLE 7

| RE_Get | Retrieves the Recording Engine configuration |
| RE_Set | Modifies the Recording Engine configuration |
| RE_Trigger | Initiates operator triggered recording on a camera |

3.9.1.1 RE_Get Command

The RE_Get command is sent by a viewer 2200 as a request using the HTTP "Get method", on the following resource:

/webview-nvr/re_get.fcgi?action=<val>  (8)

The "action" argument of the resource (8) describes the type of information that is being requested. When certain values are used in the "action" argument, there can be certain other optional arguments present.

The return value of the RE_Get command can be a storage server configuration object (SSCO) of the nominated type. If an invalid type is specified, no data is returned.

Figure 40:
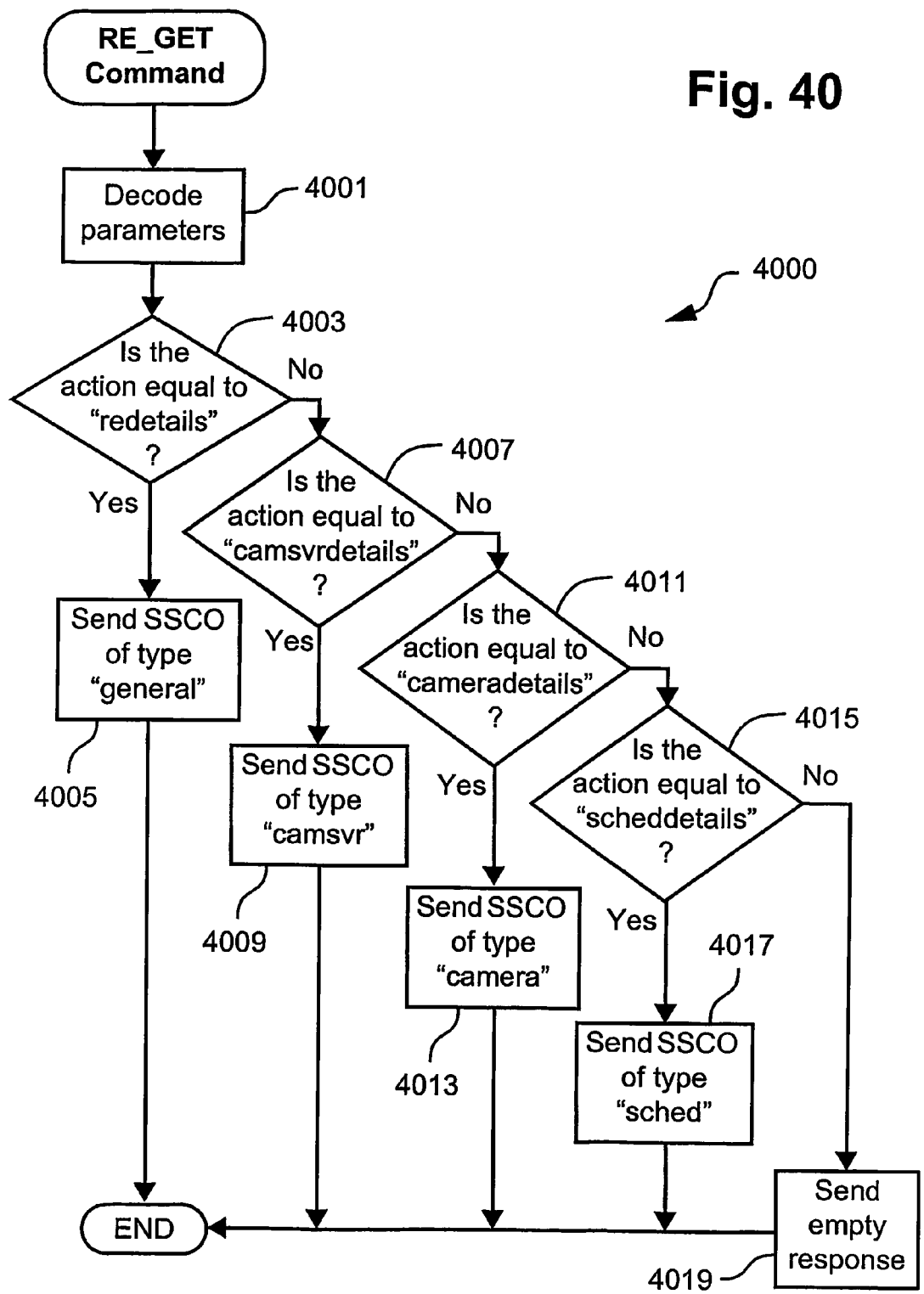
FIG. 40 is a flow diagram showing a process for processing an RE_Get command as performed by the recording engine.

FIG. 40 is a flow diagram showing a process 4000 for processing an RE_Get command as performed by the recording engine 201. The process 4000 is preferably implemented as software resident on the hard disk drive 2310 and being controlled in its execution by the processor 2305. The process 4000 begins at the first step 4001 where the parameters associated with the RE_Get command are decoded by the processor 2305. Then at the next step 4003, if the action associated with the command is equal to "redetails" then the process 4000 proceeds to step 4005. Otherwise, the process 4000 proceeds to step 4007. At step 4005, the processor 2305 sends a storage server configuration object of type "general" to the web server 213.

At step 4007, if the action associated with the command is equal to "camsvrdetails" then the process 4000 proceeds to step 4009. Otherwise, the process 4000 proceeds to step 4011. At step 4009 the processor 2305 sends a storage server configuration object of type "camsvr" to the web server 213.

At step 4011, if the action associated with the command is equal to "cameradetails" then the process 4000 proceeds to step 4013. Otherwise, the process 4000 proceeds to step 4015. At step 4013 the processor 2305 sends a storage server configuration object of type "camera" to the web server 213.

At step 4015, if the action associated with the command is equal to "scheddetails" then the process 4000 proceeds to step 4017. Otherwise, the process 4000 proceeds to step 4019. At step 4017 the processor 2305 sends a storage server configuration object of type "sched" to the web server 213. At step 4019, the processor 2305 sends an empty response.

3.9.1.1.1 REDETAILS Action

The REDETAILS action retrieves the general record engine 201 configuration. The REDETAILS action returns a storage server configuration object of type "general", as described above. No additional optional arguments are available.

3.9.1.1.2 CAMSVRDETAILS Action

The CAMSVRDETAILS action retrieves the list of camera servers 109-111 associated with the storage server 2300 and the camera 112-115 attached to the camera servers 109-111. The CAMSVRDETAILS action returns a storage server configuration object of type "camsvr", as described above. The optional argument "camsvrs" contains a comma-separated list of the host names of camera servers 110-115. If the "camsvrs" argument is present, the list of camera servers 109-111 returned is limited to those mentioned in the argument. Otherwise, all camera servers 109-111 are returned.

3.9.1.1.3 CAMERADETAILS Action

The CAMERADETAILS action retrieves the list of cameras 112-115 associated with the storage server 2300 and the status of the cameras 112-115. The CAMERADETAILS action returns a storage server configuration object of type "camera", as described above. The optional argument "cameras" contains a comma-separated list of camera identifiers. If the "cameras" argument is present, the list of cameras 112-115 returned is limited to those mentioned in the argument. Otherwise all cameras 112-115 are returned.

3.9.1.1.4 SCHEDDETAILS Action

The SCHEDDETAILS action retrieves the list of schedules belonging to the storage server 2300. The SCHEDDETAILS action returns a storage server configuration object of type "sched", as described above. The optional argument "cameras" contains a comma-separated list of camera identifiers and the optional argument "days" contains a comma-separated list of day names. If either or both of the "cameras" or "days" arguments is present, the list of schedules returned is limited to those schedules associated with the specified cameras 112-115 and/or days

3.9.1.2 RE_Set Command

The RE_Set command is sent by a viewer 2200 as a request using the HTTP "Post method, on the following resource:

/webview-nvr/re_set.fcgi?action=<val>   (9)

The "action" argument of the resource (9) describes the type of information that is being sent. When certain values are used in the "action" argument, there can be certain other optional arguments present.

A storage server configuration object can be supplied in the body of the request message. The storage server configuration object contains an action attribute in the network video recorder element 400 as described above with reference to FIG. 4.

The operations performed by the RE_Set command are not atomic. The process of the RE_Set command stops as soon as a problem is encountered, and no attempt is made to roll back any changes which have already been made.

The access privileges for the RE_Set command in the web server 213 are set so as to allow access to the RE_Set command to users who are administrators.

On successful completion of an RE_Set command, the recording engine 201 returns a storage server configuration object to the web server 213 describing the configuration of the changed camera servers 109-111 or schedules. The returned storage server configuration object can be used to obtain the camera identifier of camera servers 109-111 newly assigned to the storage server 2300.

If an error occurs, a brief XML document can be returned by the processor 2305 with a single element with a tag of NVR-STATUS. The contents of the NVR-STATUS tag describe the error which occurred.

Figure 41:
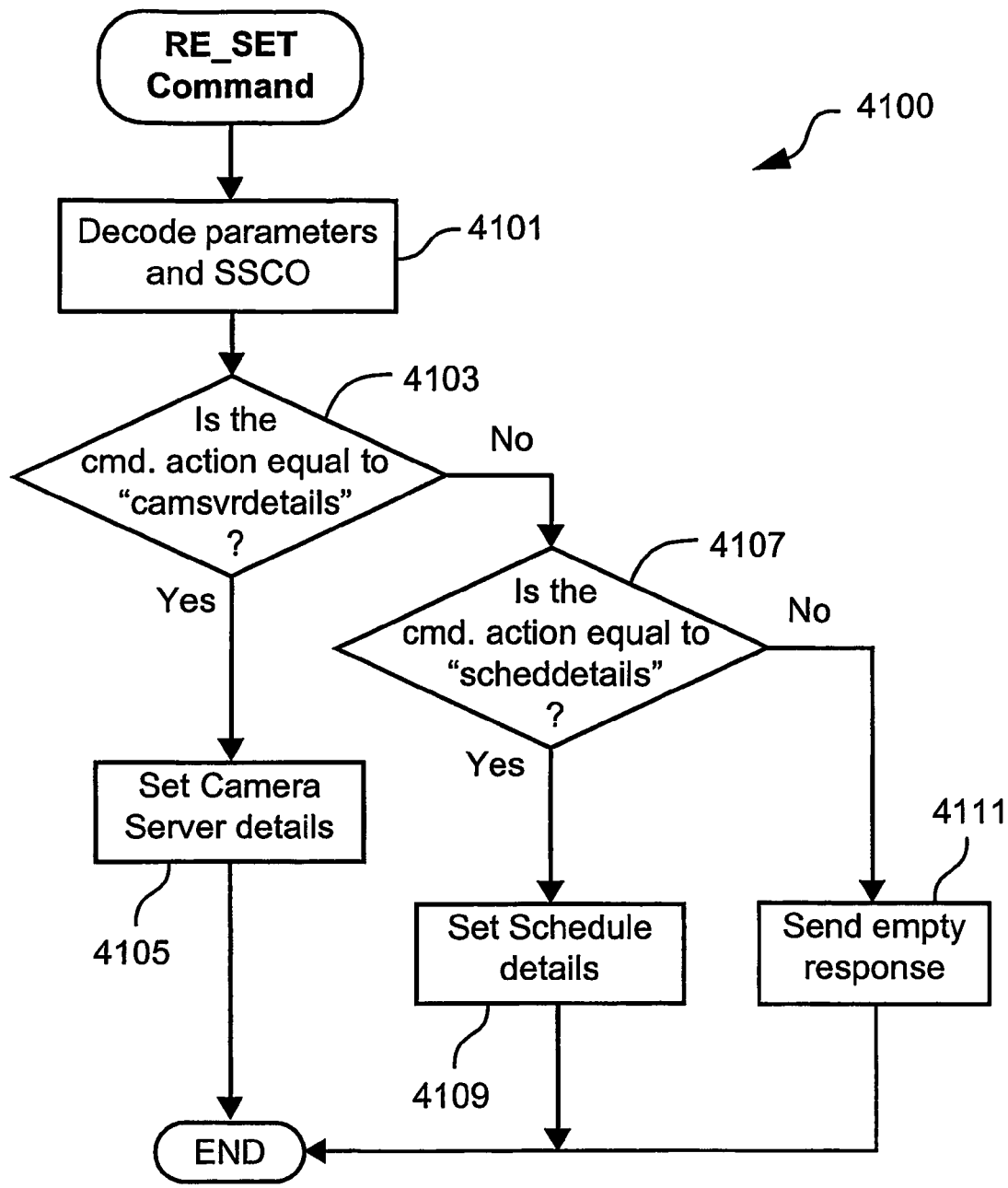
FIG. 41 is a flow diagram showing a process for processing an RE_Set command as performed by the recording engine.

FIG. 41 is a flow diagram showing a process 4100 for processing an RE_Set command as performed by the recording engine 201. The process 4100 is preferably implemented as software resident on the hard disk drive 2310 and being controlled in its execution by the processor 2305.

The process 4100 begins at the first step 4101 where the parameters associated with the RE_Set command and the storage server configuration object, are decoded by the processor 2305. Then at the next step 4103, if the action associated with the command is equal to "camsvrdetails" then the process 4100 proceeds to step 4105. Otherwise, the process proceeds to step 4107. At step 4105 the processor 2305 sets the details of the particular camera server 109-111.

At step 4107, if the action associated with the command is equal to "scheddetails" then the process 4100 proceeds to step 4109. Otherwise, the process proceeds to step 4111. At step 4109 the processor 2305 sets the schedule details for the particular camera server 109-111.

At step 4111, the processor 2305 sends an empty response to the web server 213.

3.9.1.2.1 CAMSVRDetails Action

Figure 42:
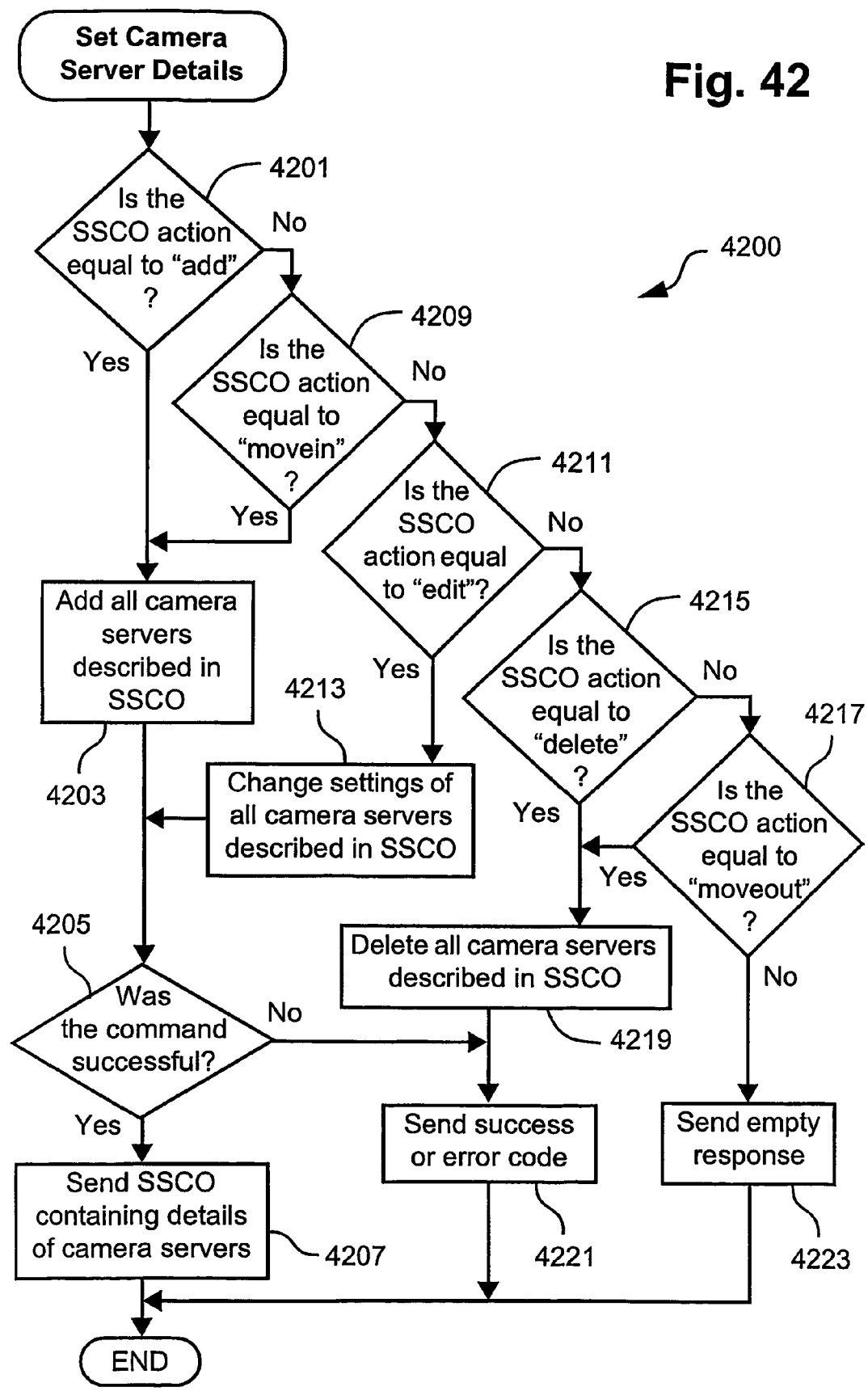
FIG. 42 is a flow diagram showing a process for setting camera server details.

The CAMSVRDETAILS action is used to add, modify and delete information about cameras 112-115 and the camera servers 109-111, on the storage server 2300. In relation to information about cameras 112-115 and camera servers 109-111 on storage servers 2300, the expressions "add", "modify" and "delete" refer respectively to adding information, modifying information and deleting information about the camera 112-115 or camera server 109-111. The action attribute in the associated network video recorder element 400 further defines the behavior of the command. FIG. 42 is a flow diagram showing a process 4200 for setting camera server 109-111 details. The process 4200 is preferably implemented as software resident on the hard disk drive 2310 and being controlled in its execution by the processor 2305.

The process 4200 begins at the first step 4201 where if the action associated with storage server configuration object received by the processor 2305 is add, then the process 4200 proceeds to step 4203. Otherwise, the process 4200 proceeds to step 4209. At step 4203, the processor 2305 adds all of the camera servers 109-111 described in the storage server configuration object to the set of camera servers 109-111 associated with the storage server 2300. At the next step 4205, if the command was successful, then the process 4200 proceeds to step 4207. Otherwise the process 4200 proceeds to step 4221. At step 4207, the processor 2305 sends the storage server configuration object containing the details of each of the camera servers 109-111 described in the storage server configuration object to each of the camera servers 109-111 associated with the storage server 2300.

At step 4209, if the action associated with the storage server configuration object received by the processor 2305 is movein, then the process 4200 proceeds to step 4203. Otherwise, the process 4200 proceeds to step 4211. At step 4211, if the action associated with the storage server configuration object received by the processor 2305 is edit, then the process 4200 proceeds to step 4213. Otherwise, the process 4200 proceeds to step 4215. At step 4213, the processor 2305 changes the settings related to all of the camera servers 109-111 listed in the storage server configuration object and then the process proceeds to step 4205.

At step 4215, if the action associated with the storage server configuration object received by the processor 2305 is delete, then the process 4200 proceeds to step 4219. Otherwise, the process 4200 proceeds to step 4217. At step 4219, the processor 2305 deletes all of the information about camera servers 109-111 listed in the storage server configuration object and then the process proceeds to step 4221. At step 4221, the processor 2305 generates a success code and the process 4200 concludes.

At step 4217, if the action associated with the storage server configuration object received by the processor 2305 is moveout, then the process 4200 proceeds to step 4219. Otherwise, the process 4200 proceeds to step 4223. At step 4223, the processor 2305 generates an empty response and the process 4200 concludes.

3.9.1.2.1.1 ADD and MOVEIN Actions

As described above, if the action associated with storage server configuration object received by the processor 2305 is add or movein, then all camera servers 109-111 described in the given storage server configuration object are added to the storage server 2300. This operation may fail for the following reasons:

(i) If adding a camera server 109-111 would force the number of camera servers 109-111 present in the system 100 to exceed the maximum allowed value (for example, this may be configured to be sixty-four);

(ii) A camera server 109-111 already has been added with the same host name and port as one of the camera servers 109-111 described in the storage server configuration object;

(iii) The host name specified for one of the camera servers 109-111 is invalid; or (iv) The directory name specified for one of the camera servers 109-111 is invalid.

3.9.1.2.1.2 MODIFY Action

As described above, if the action associated with the storage server configuration object received by the processor 2305 is modify, then all camera servers 109-111 described in the given storage server configuration object are matched to their counterparts in the storage server 2300, and new settings are entered. If the number of camera servers 109-111 is changed, the necessary cameras 112-115 are added to or deleted from the storage server 2300.

Camera identifiers are static, and are preferably not to be changed under any circumstances.

The modify action operation can fail for the following reasons:

(i) If modifying the camera server 109-111 would force the number of camera servers 109-111 present in the system 100 to exceed the maximum allowed value (for example, this may be configured to be sixty four);

(ii) If one of the specified camera servers 109-111 has not been added to the system 100;

(iii) If the host name specified for one of the camera servers 109-111 is invalid; or (iv) If the directory name specified for one of the cameras 112-115 is invalid.

3.9.1.2.1.3 DELETE and MOVEOUT Action

As described above, if the action associated with storage server configuration object received by the processor 2305 is delete or moveout, then all information about camera servers 109-111 described in the given storage server configuration object are deleted from the storage server 2300. The only information required in the CAMSVR elements is the HOST element. The other elements of the CAMSVR element can be omitted in this special case.

The delete and moveout operation can fail if the camera server 109-111 specified in the storage server configuration object has not been added to the system 100.

3.9.1.2.2 SCHEDDETAILS Action

The SCHEDDETAILS action is used to modify and delete schedule days associated with a camera 112-115. Individual schedule items are preferably not modified. When any change is made, the whole day is rewritten at once. The action attribute in the network video recorder element 400 further defines the behavior of the command. However, the action attribute in the SCHEDDETAILS action is limited to only three values: "add", "modify" and "delete".

Figure 43:
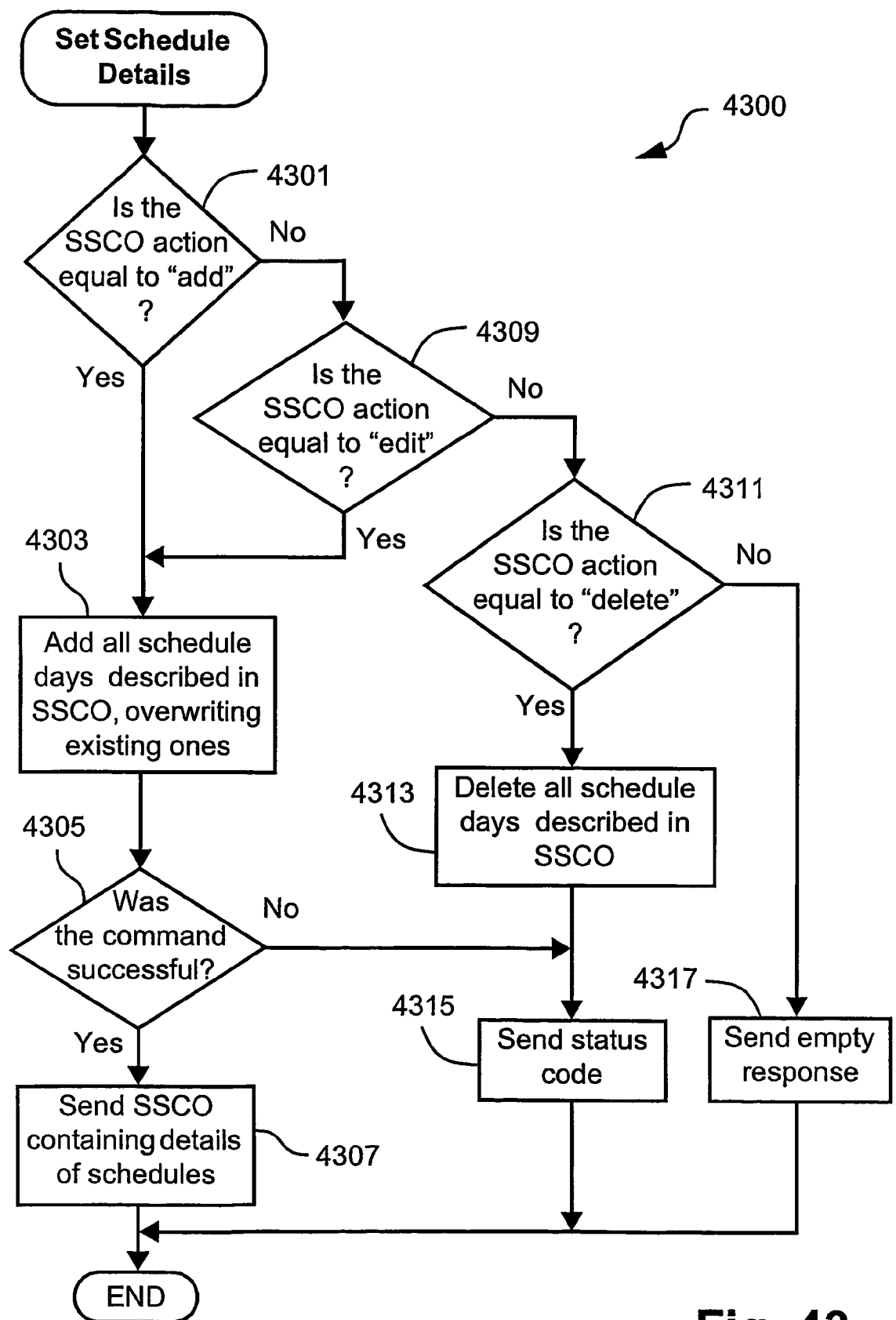
FIG. 43 is a flow diagram showing a process for setting camera server schedule details.

FIG. 43 is a flow diagram showing a process 4300 for setting camera server 109-111 schedule details. The process 4300 is preferably implemented as software resident on the hard disk drive 2310 and being controlled in its execution by the processor 2305. The process 4300 begins at the first step 4301 where if the action associated with storage server configuration object received by the processor 2305 is add, then the process 4300 proceeds to step 4303. Otherwise, the process 4300 proceeds to step 4309. At step 4303, the processor 2305 replaces all of the schedule details, of camera servers 109-111 associated with the storage server 2300, described by the storage server configuration object.

At the next step 4305, if the command was successful, then the process 4300 proceeds to step 4307. Otherwise the process 4300 proceeds to step 4315 where the processor 2305 generates an error code. At step 4307, the processor 2305 sends the storage server configuration object containing the newly modified schedule details to the viewer 2200 via the web server 213. At step 4311, if the action associated with the storage server configuration object received by the processor 2305 is delete, then the process 4300 proceeds to step 4313. Otherwise, the process 4300 proceeds to step 4317. At step 4313, the processor 2305 deletes the schedule days listed in the storage server configuration object and then the process proceeds to step 4315.

At step 4317, the processor 2305 generates an empty response and the process 4300 concludes.

3.9.1.2.2.1 ADD Action

If the action associated with the storage server configuration object received by the processor 2305 is add, all of the schedule days referred to in the storage server configuration object are added to the storage server 2300. If a particular day is already present for a given camera server 2300, the day is overwritten with the new day.

3.9.1.2.2.2 MODIFY Action

If the action associated with the storage server configuration object received by the processor 2305 is modify, all schedule days referred to in the storage server configuration object are added to the storage server 2300. If a particular day is already present for a given camera server 2300, the day is overwritten with the new day described in the storage server configuration object. The MODIFY action is substantially identical to that of the ADD action.

3.9.1.2.2.3 DELETE Action

If the action associated with the storage server configuration object received by the processor 2305 is "delete", then all schedule days referred to in the storage server configuration object are deleted from the storage server 2300. The only information required in the DAY elements is the name attribute, which identifies the day to be deleted.

The DELETE operation can fail if the specified schedule day does not exist in the given camera server 109-111 in the system 100.

3.9.1.3 RE_Trigger Command

The RE_Trigger command is sent as a CGI request using the HTTP "Post method", on the following resource (10) as below:

/webview-nvr/re_trigger.fcgi            (10)

A storage server configuration object for the RE_Trigger command can be supplied in the body of the request message. The storage server configuration object for the RE_Trigger command contains an action attribute in the associated network video recorder element 400. The value of the action attribute value is equal to "trigger".

The storage server configuration object for the RE_Trigger command contains a list of CAMERA elements 409, each element specifying a camera identifier of one camera server 109-111, which is to be triggered. Each camera server 109-111 that is specified in the storage server configuration object for the RE_Trigger command is set to record at maximum frame (i.e., sample) rate for sixty seconds, after which the particular camera server 109-111 returns to the mode that the particular camera server 109-111 was originally recording in.

Any other data within a CAMERA element 409 is ignored, and can be omitted. The RE_Trigger command returns an XML document with a single NVR-STATUS element. The contents of the NVR-STATUS element indicate whether the recording was triggered successfully, or detail an error if one occurred.

Figure 44:
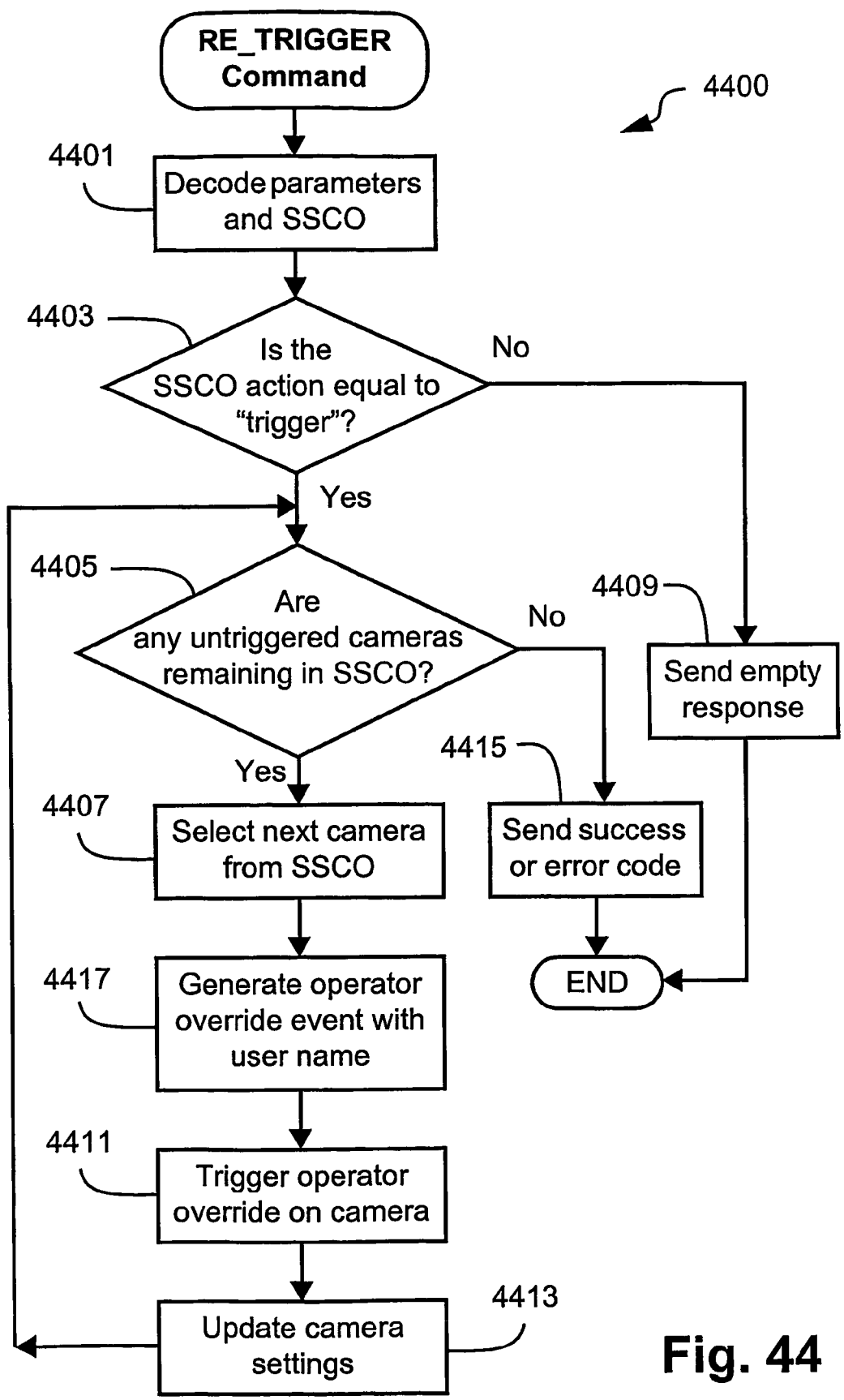
FIG. 44 is a flow diagram showing a process for processing an RE_Trigger command as performed by the recording engine.

FIG. 44 is a flow diagram showing a process 4400 for processing an RE_Trigger command as performed by the recording engine 201. The process 4400 is preferably implemented as software resident on the hard disk drive 2310 and being controlled in its execution by the processor 2305. The process 4400 begins at the first step 4401 where the parameters associated with the RE_Trigger command and the storage server configuration object, are decoded by the processor 2305. Then at the next step 4403, if the action associated with the command is equal to "trigger" then the process 4400 proceeds to step 4405. Otherwise, the process 4400 proceeds to step 4409.

At step 4405 if the processor 2305 determines that there are any untriggered cameras 112-115 remaining in the storage server configuration object, then the process 4400 proceeds to step 4407. Otherwise, the process 4400 proceeds to step 4415.

At step 4407, the processor 2305 selects a next camera 112-115 from the storage server configuration object. Then at the next step 4417, the processor 2305 generates an operator override event including the user name. At the next step 4411, the processor 2305 triggers an operator override on the particular camera 112-115. Then at the next step 4413, the processor 2305 updates the settings of the identified camera 112-115.

At step 4415, the processor 2305 generates a success or error code and the process 4400 concludes.

At step 4409, the processor 2305 generates an empty response and the process 4400 concludes.

3.9.2 Viewer Interface

The recording engine 201 comprises a viewer interface. The viewer interface comprises three commands, which are summarised in Table 8 below:

TABLE 8

| | |
|---|---|
| NVR_UserGet | Retrieves one of the viewer configuration files |
| NVR_UserSet | Rewrites a viewer configuration file, with user privileges |
| NVR_AdminSet | Rewrites a viewer configuration file, with administrator privileges |

3.9.2.1 NVR_UserGet Command

The NVR_UserGet command is sent as a request using the HTTP "Get method", on the following resource (11):

/webview-nvr/nvr_userget.fcgi?file=<val>            (11)

The value of the "file" argument in the resource (11) can be one of:

(i) config—retrieves a file from the hard disk drive 2310 describing a set of known storage servers 2300, a set of known camera servers 109-111, a set of known cameras 112-115 and relates the cameras 112-115 to a set of Zones and Locations (described later).

(ii) ulayout—retrieves a personal layout file from the hard disk drive 2310 which is a user specific file which can be used to store layouts customised by a single user;

(iii) playout—retrieves a shared layout file from the hard disk drive 2310, which is a file which can only be modified by a user with administrator privileges. The file contains layouts which can be used by all users (i.e., operators and administrators) of the system 100.

A layout file is a file containing a set of layouts (as is described below).

The files are returned in their original format in response to the NVR_UserGet command. The NVR_UserGet command is used by the recording engine 201 to indicate a user login, as NVR_UserGet command is always sent as the first command by a viewer 2200 seeking to be authenticated. Thus, a user login event is generated by the recording engine 201 whenever a NVR_UserGet command is received by the recording engine 201. In other arrangements, the login event can be detected by a module associated with the web server 213 notifying the recording engine 201 on successful HTTP authentication (including HTTP digest authentication or HTTP basic authentication) of a viewer 2200 with the web server 213.

Figure 45:
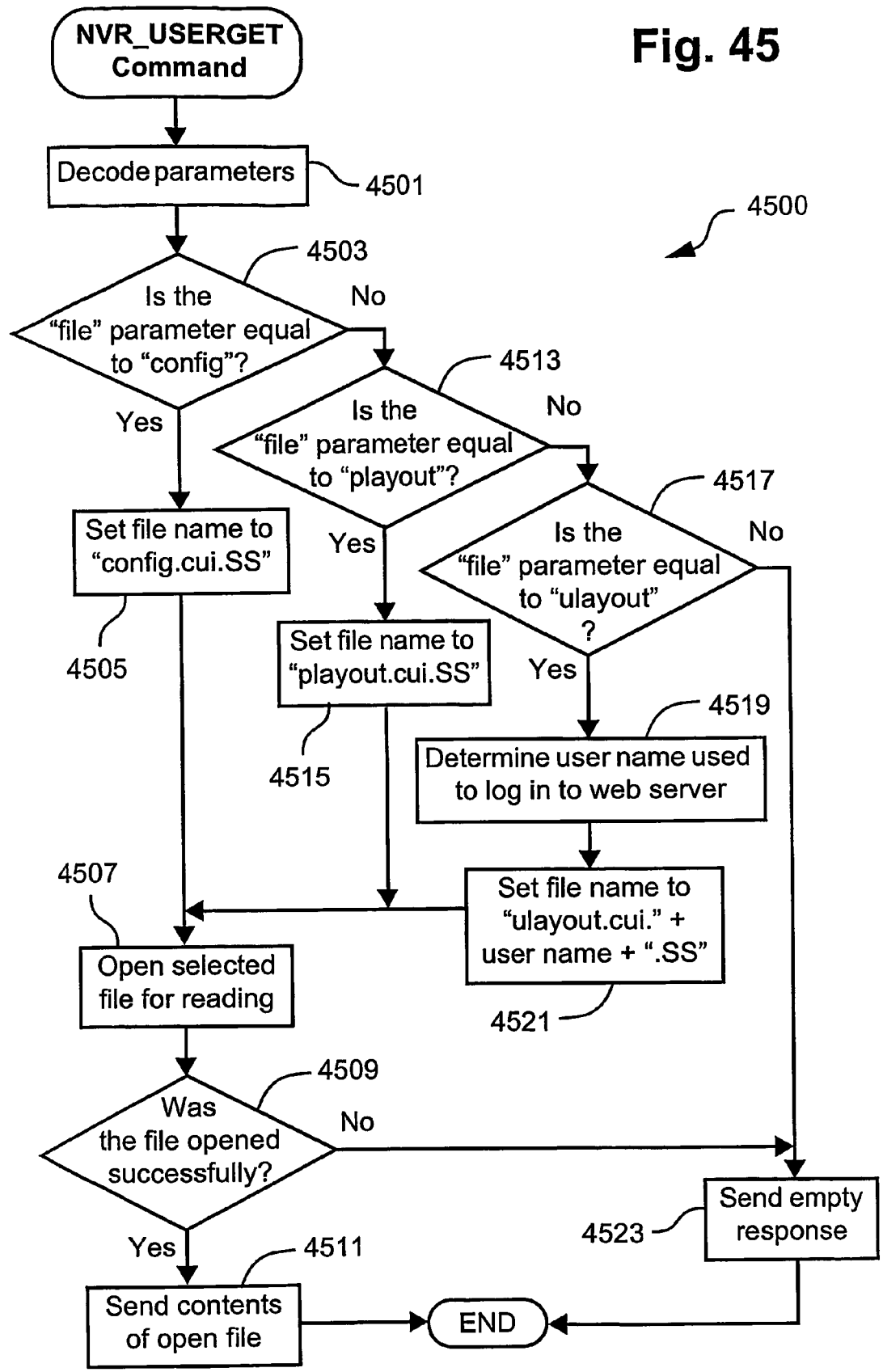
FIG. 45 is a flow diagram showing a process for processing an NVR_UserGet command as performed by the recording engine.

FIG. 45 is a flow diagram showing a process for processing a NVR_UserGet command as performed by the recording engine 201. The process 4500 is preferably implemented as software resident on the hard disk drive 2310 and being controlled in its execution by the processor 2305. The process 4500 begins at the first step 4501 where the parameters associated with the NVR_UserGet command are decoded by the processor 2305. Then at the next step 4003, if the "file" parameter associated with the command is equal to "config" then the process 4500 proceeds to step 4505. Otherwise, the process proceeds to step 4513.

At step 4505, the processor 2305 sets a file name to "config.cui.SS" and then the process 4500 proceeds to step 4507.

At step 4513, if the "file" parameter associated with the command is equal to "playout" then the process 4500 proceeds to step 4515. Otherwise, the process 4500 proceeds to step 4517. At step 4515 the processor 2305 sets a file name to "playout.cui.SS" and then the process 4500 proceeds to step 4507.

At step 4517, if the "file" parameter associated with the command is equal to "ulayout" then the process 4500 proceeds to step 4519. Otherwise, the process 4500 proceeds to step 4523. At step 4519 the processor 2305 determines the user name used to log into the web server 213. At the next step 4521, the processor 2305 sets the file name to "ulayout.cui." plus the value of the user name used at login plus ".SS" (for example, for a user name of "henry", the file name would be ulayout.cui.henry.SS") and the process 4500 proceeds to step 4507.

At step 4507, the processor 2305 opens the file with the file name set at step 4505, 4515 or 4521 for reading. Then at the next step 4509, if the processor 2305 determines that the file was successfully opened then the process 4500 proceeds to step 4511. Otherwise, the process 4500 proceeds to step 4523 where the processor 2305 sends an empty response and the process 4500 concludes. At step 4511, the processor 2305 sends the contents of the open file to the web server 213 which sends the contents of the open file on as a HTTP response to the viewer 2200 which initiated the NVR_UserGet command and the process 4500 concludes.

3.9.2.2 NVR_UserSet Command

The NVR_UserSet command is sent to the web server 213 as a request using the HTTP "Post method", on the following resource (12):

/webview-nvr/nvr_userset.fcgi?file=<val>    (12)

The value of the "file" argument of the resource (12) can be:
 (i) ulayout—rewrites the personal layout file, which is a user specific file used to store video window layouts customised by a single user.

The NVR_UserSet command replaces a personal layout file with the contents of the request message.

Figure 46:
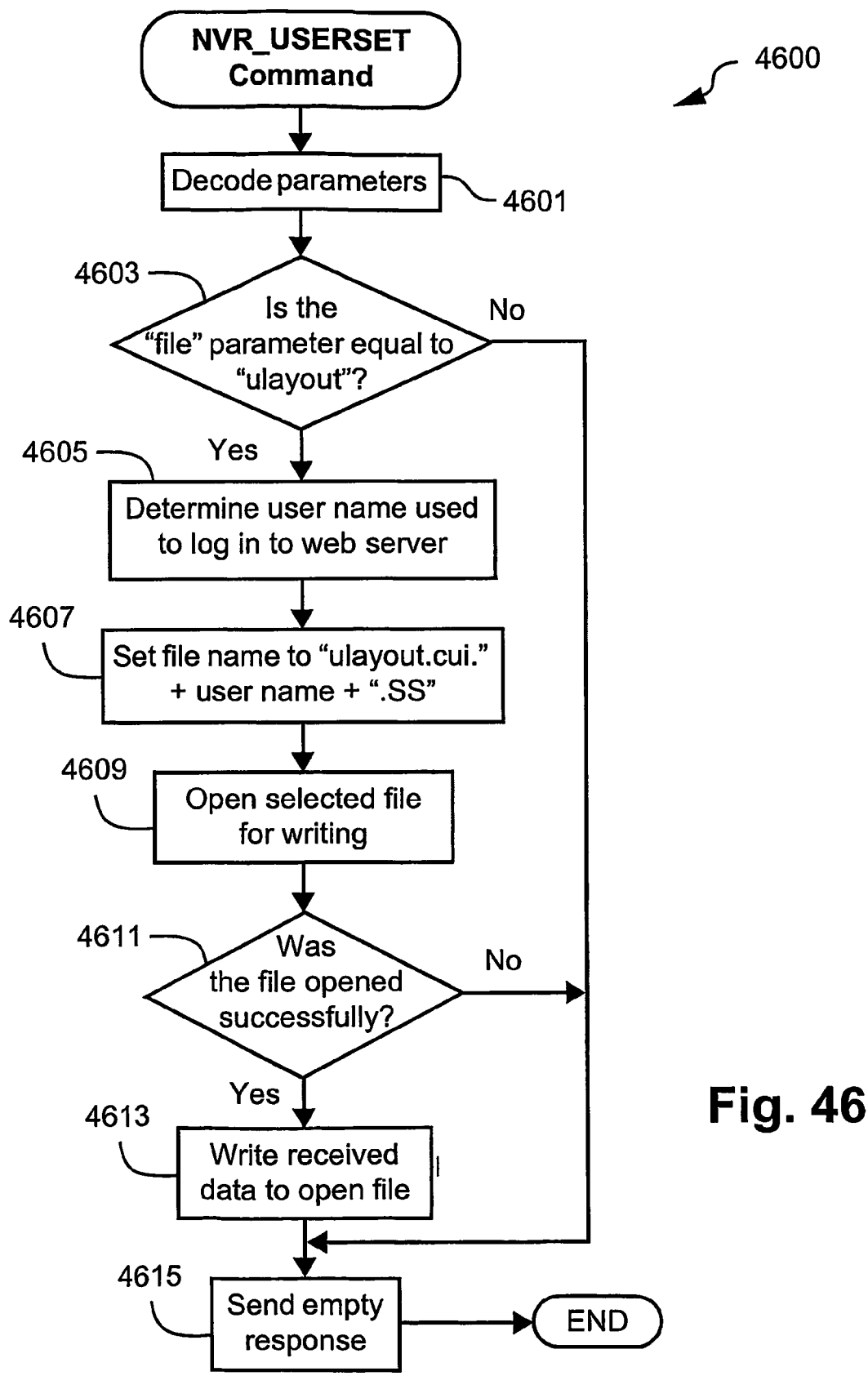
FIG. 46 is a flow diagram showing a process for processing an NVR_UserSet command as performed by the recording engine.

FIG. 46 is a flow diagram showing a process 4600 for processing an NVR_UserSet command as performed by the recording engine 201. The process 4600 is preferably implemented as software resident on the hard disk drive 2310 and being controlled in its execution by the processor 2305. The process 4600 begins at the first step 4601 where the parameters associated with the NVR_UserSet command and the storage server configuration object, are decoded by the processor 2305. Then at the next step 4603, if a "file" parameter associated with the command is equal to "ulayout" then the process 4600 proceeds to step 4605. Otherwise, the process proceeds to step 4615. At step 4605 the processor 2305 determines the user name used to log into the web server 213. At the next step 4607, the processor 2305 sets the file name to "ulayout.cui." plus the value for the user name plus ".SS". (for example, for a user name "henry", the file name would be set to ulayout.cui.henry.SS"). The process 4600 continues at the next step 4609 where the processor 2305 opens the file with this file name for writing. At the next step 4611, if the file was opened successfully, then the process 4600 proceeds to step 4613. Otherwise, the process 4600 proceeds to step 4615. At step 4613, the processor 2305 writes data received with the NVR_UserSet command to the open file configured within the hard disk drive 2310. The process 4600 concludes at the next step 4615, where the processor 2305 sends an empty response to the web server 213.

3.9.2.3 NVR_AdminSet Command

An NVR_AdminSet command is sent by the recording engine 201 to the web server 213 using the HTTP "Post method", on the following resource (13):

/webview-nvr/nvr_adminset.fcgi?file=<val>    (13)

The value of the "file" argument in the resource (13) can be:
 (i) config—rewrites a file describing a set of known storage servers 2300, and relating the camera servers 109-111 associated with the known storage servers 2300 to a set of Zones and Locations (as discussed below);
 (ii) playout—rewrites the shared layout file, which can only be modified by a user with administrative privileges. The shared layout file contains layouts which can be used by all users of the system 100.

The NVR_AdminSet command replaces one of the configuration or protected layout files with the contents of the request message.

The access privileges for the NVR_AdminSet command in the web server 213 can be set so as to allow access to the NVR_AdminSet command only to users who have administrative rights.

Figure 47:
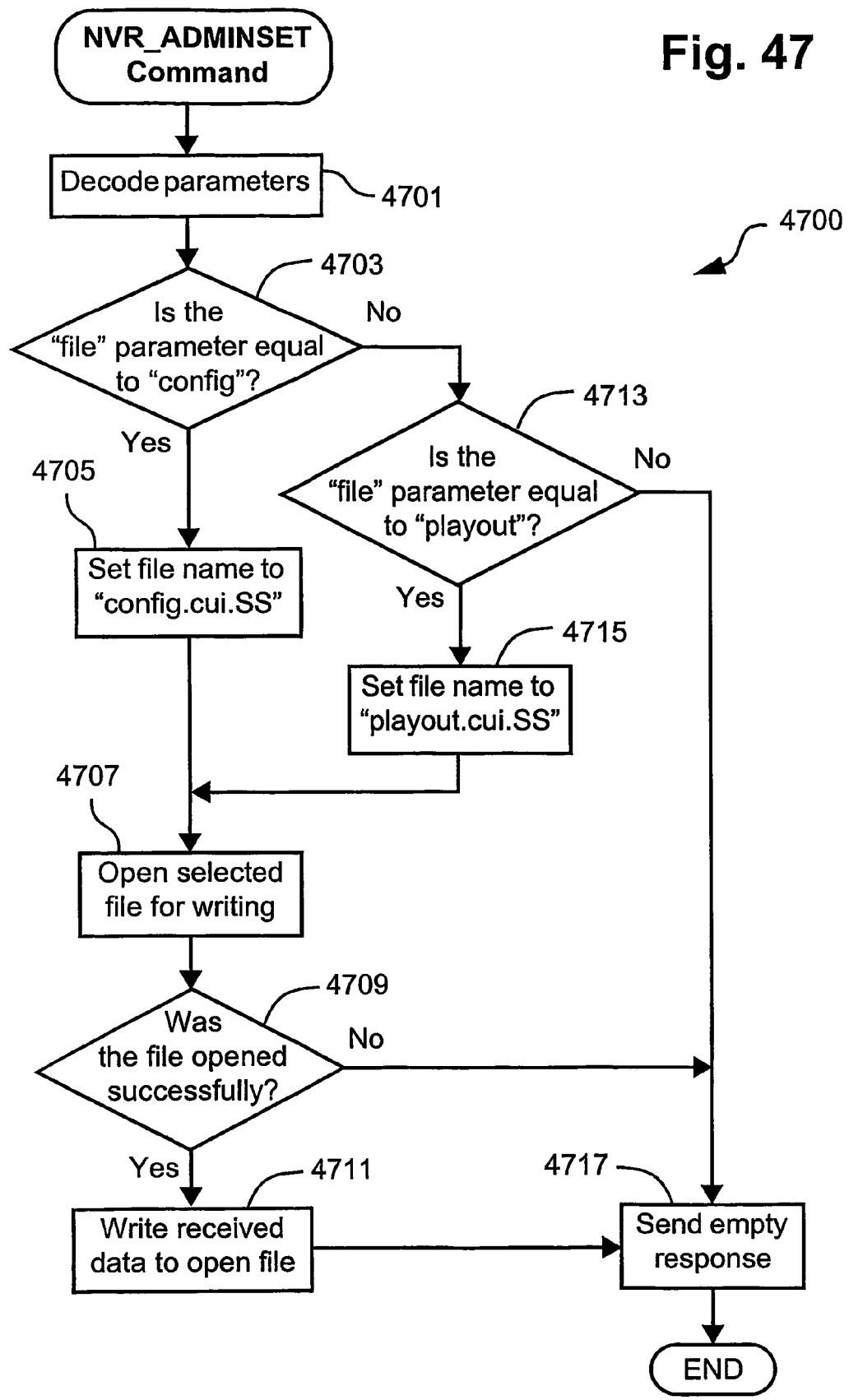
FIG. 47 is a flow diagram showing a process for processing an NVR_AdminSet command as performed by the recording engine.

FIG. 47 is a flow diagram showing a process 4700 for processing an NVR_AdminSet command as performed by the recording engine 201. The process 4700 is preferably implemented as software resident on the hard disk drive 2310 and being controlled in its execution by the processor 2305. The process 4700 begins at the first step 4701 where the parameters associated with the NVR_AdminSet command and the storage server configuration object, are decoded by the processor 2305. Then at the next step 4703, if a "file" parameter associated with the command is equal to "config" then the process 400 proceeds to step 4705. Otherwise, the process proceeds to step 4713. At step 4705 the processor 2305 sets the file name to "config.cui.SS".

At step 4713, if the "file" parameter associated with the command is equal to "playout" then the process 400 proceeds to step 4715. Otherwise, the process 4700 proceeds to step 4717. At step 4715 the processor 2305 sets the file name to "playout.cui.SS".

The process 4700 continues at the next step 4707 where the processor 2305 opens a file with this file name for writing. At the next step 4709, if the file was opened successfully, then the process 4700 proceeds to step 4711. Otherwise, the process 4700 proceeds to step 4717. At step 4711, the processor 2305 writes data received with the NVR_AdminSet command to the active file configured within the hard disk drive 2310. The process 4700 concludes at the next step 4711, where the processor 2305 sends an empty response to the web server 213.

3.10 Storage Server Configuration Tool (SSCT)

As described above, the storage server configuration tool 211 can be utilised by a user logged on to the computer 2301 hosting the storage server 2300. The configuration tool 211 provides a graphical user interface that allows an administrator to change any of the settings described in the GENERAL element 405 of the storage server configuration file 205.

The storage server configuration tool 211 is a user interface comprising a dialog box with three pages 10800, 10900 and 11000, which are accessed by clicking on tabs at the top of the main window.

Figure 108:
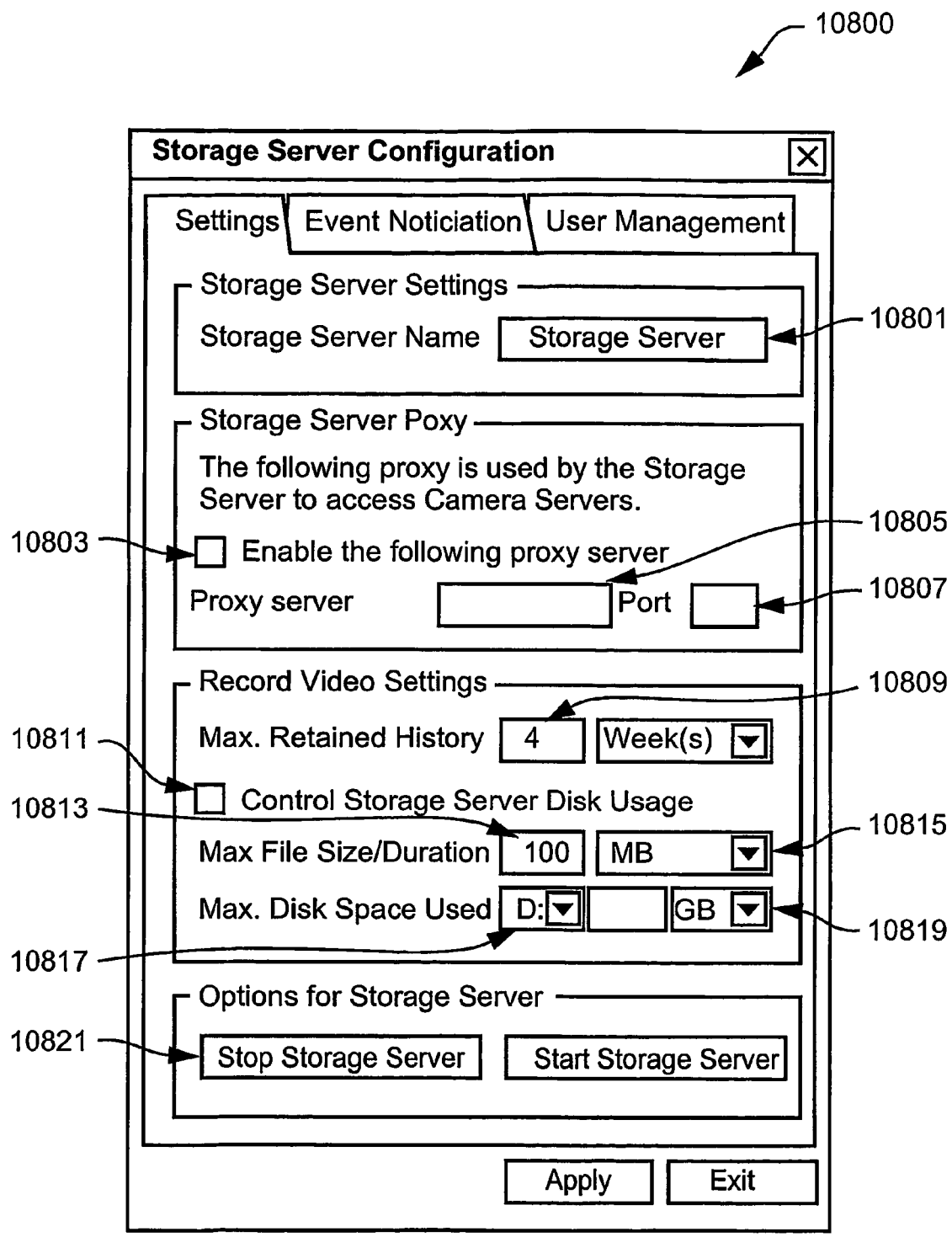
FIG. 108 shows a storage server configuration dialog.

FIG. 108 shows the first page 10800 which is entitled "Settings" and is used to configure general settings, all of which are described in the <GENERAL> element of a storage server configuration object. A "Storage Server Name" text box 10801 is used to to configure the name of a particular storage server 2300, which is stored in the <NAME> element (as described above). An "Enable the following proxy server" check box 10803 is used to control the enabled attribute of the <PROXY> element (as described above). A contents of the "Proxy server" text box 10805 and "Port" text box 10807 are stored in the <HOST> sub-element of the <PROXY> element (as described above). A contents of the "Max. Retained History" text box 10809 are stored in the <HISTORY> element (as described above). A "Control Storage Server Disk Usage" check box 10811 determines whether one of a bysize or bytime attribute can be set in the <LIMITER> element (as described above). A contents of the "Max. File Size/Duration" text box 10813 are stored in the <TIME> or <SIZE> elements of the <LIMITER> element described above. A combo box 10815 alongside the text box 10813 is used to determine which one of the elements is used to store the current value, and which one of the bysize or bytime attributes of the <LIMITER> element is set. A "Max. Disk Space Used"

text box 10817 contains the value stored in the <USED> element of the <DRIVE> element (as described above) corresponding to the drive indicated in a combo box 10819.

Buttons labeled "Start Storage Server" 10821 and "Stop Storage Server" 10823 are used to start and stop both the recording engine 201 and access engine 203.

Figure 109:
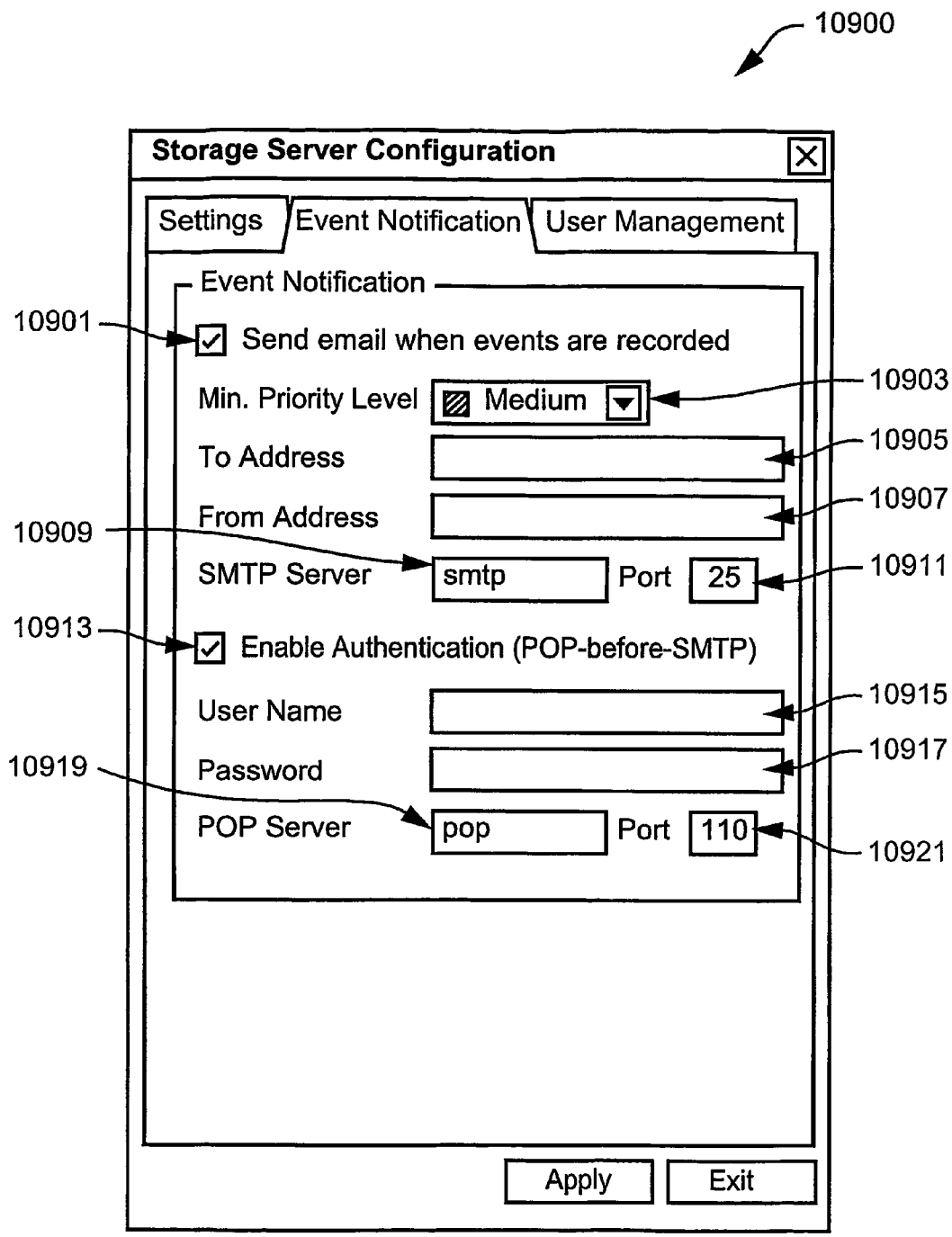
FIG. 109 shows a storage server configuration, event notification settings dialog.

FIG. 109 shows the second page 10900 which is titled "Event Notification" and is used to configure the E-mail notification settings which are described in the <EMAIL> sub-element of the <GENERAL> element of storage server configuration object. The <EMAIL> element is described above. A state of the "Send e-mail when events are recorded" check box 10901 is stored in the enabled attribute of the <EMAIL> element. If the check box 10901 is disabled, all other items in the page 10900 are also disabled. The value in a "Min. Priority Level" combo box 10903 is stored in the <PRI> element. The value of a "To address" text box 10905 is stored in the <TO> element. The value of a "From address" text box 10907 is stored in the <FROM> element. The values in a "SMTP server" 10909 and "Port" 10911 text boxes are stored in the <HOST> sub-element of the <SMTP> element. The value of an "Enable authentication" check box 10913 determine whether the value of the auth attribute of the <SMTP> element is set to "pop" (enabled) or "none" (disabled). If the check box 10913 is disabled, all items underneath the text box 10913 are also disabled. The values of a "User name" 10915 and "Password" 10917 text boxes are stored in the <USER> sub-element of the <SMTP> element. The values of a "POP Server" 10919 and "Port" 10921 text boxes are stored in the <POPHOST> sub-element of the <SMTP> element.

Figure 110:
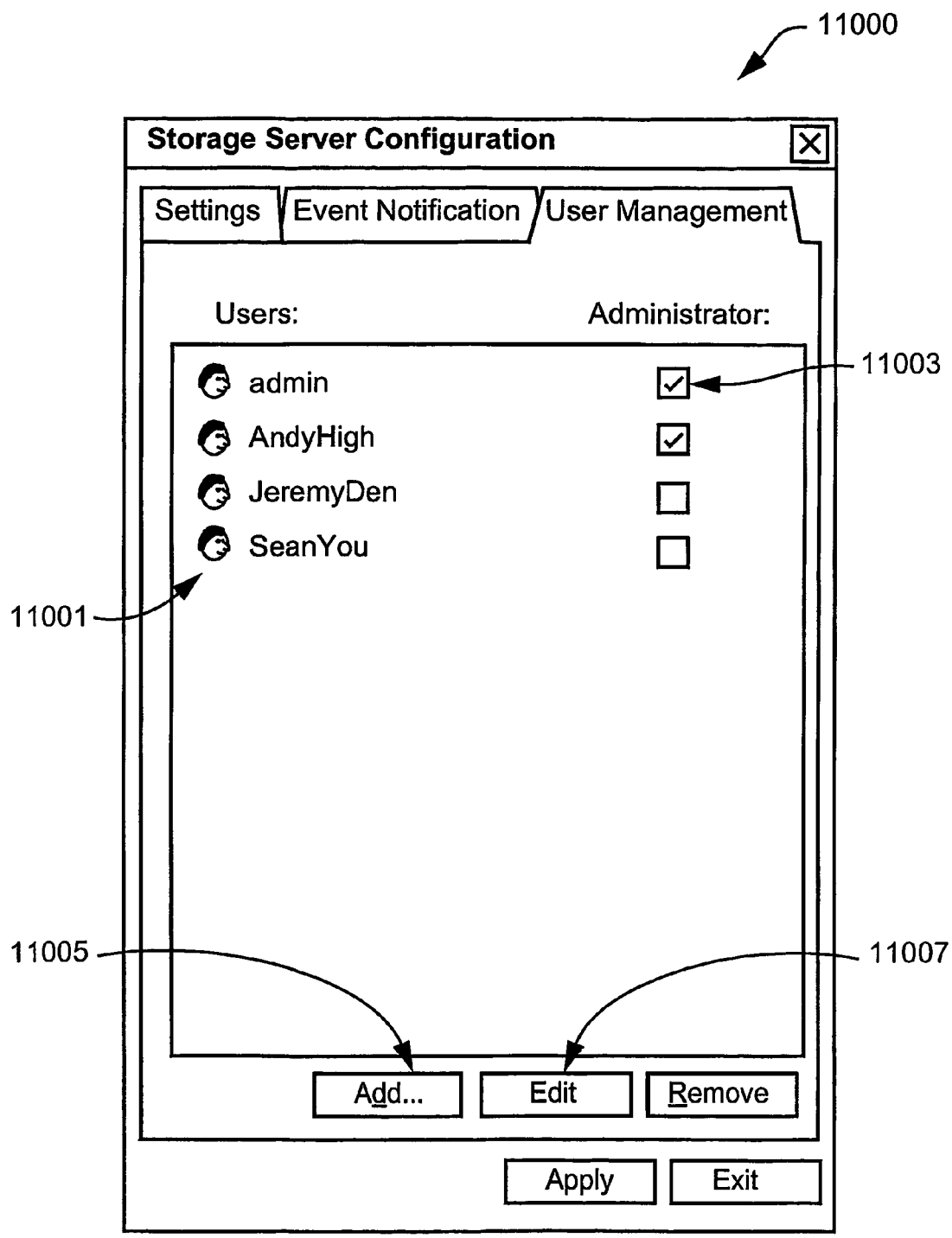
FIG. 110 shows a storage server configuration, user management settings dialog.

FIG. 110 shows the third page 11000 which is entitled "User Management", and contains a list 11001 of all users that are stored in a Storage Server Users file. All users that are mentioned in a Storage Server Groups file as members of an "admin" group contain a tick next to their user name (e.g., the tick 11003), indicating that the corresponding user are administrators.

Add 11005 and Edit 11007 buttons bring up a dialog box that can be used to modify the name and password of a user.

Changes to the configuration of the storage server 2300 can be effected by rewriting the storage server configuration file 205 with new settings. In order to preserve any recent changes made to the camera server list or the schedule items in the configuration file 205, the storage server configuration file 205 is reloaded every time the configuration tool 211 attempts to save any changes.

If the recording engine 201 is running when a change is made to the configuration of the storage server 2300 (which, during normal operation, is typically the case), the recording engine 210 is notified that the configuration has changed. In response, the recording server 201 reloads the configuration file 205 and resumes operation using the latest settings. In order for this notification to be done, the recording engine 201 creates a shared synchronization object stored in the memory 2306 of the storage server 2300 that is accessible by the storage server configuration tool 211 to be used when a change is made to the configuration of the storage server 2300.

In the implementation described herein, the shared synchronization object is a named event object. A thread in the recording engine 201 waits for the shared synchronization object to be triggered by the configuration tool 211. This thread will be explained in further detail below with reference to FIG. 50. The configuration tool 211 triggers the event to signal the recording engine 201 when the configuration tool 211 finishes writing changes to the configuration file 205.

Figure 48:
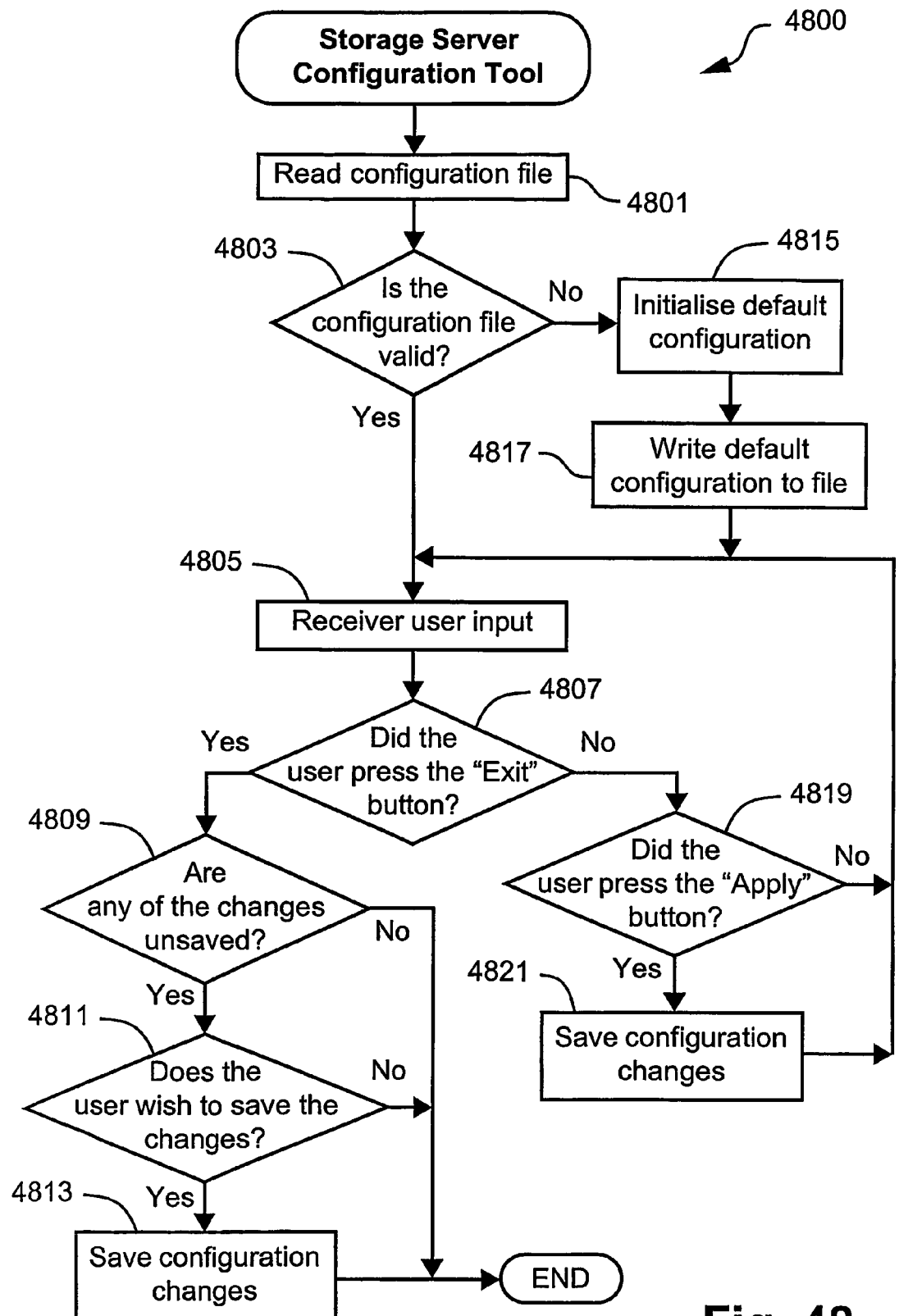
FIG. 48 is a flow diagram showing a storage server configuration tool process.

FIG. 48 is a flow diagram showing a storage server configuration tool process 4800. The process 4800 is preferably implemented as software resident on the hard disk drive 2310 and being controlled in its execution by the processor 2305. The process 4800 begins at the first step 4801, where the processor 2305 reads the configuration file 205. If the processor 2305 determines that the configuration file 205 is valid, then the process 4800 proceeds to step 4805. Otherwise, the process 4800 proceeds to step 4815 where the processor 2305 initialises a predetermined default configuration. Then at the next step 4817, the processor 2305 writes the default configuration to the configuration file 205.

Figure 49:
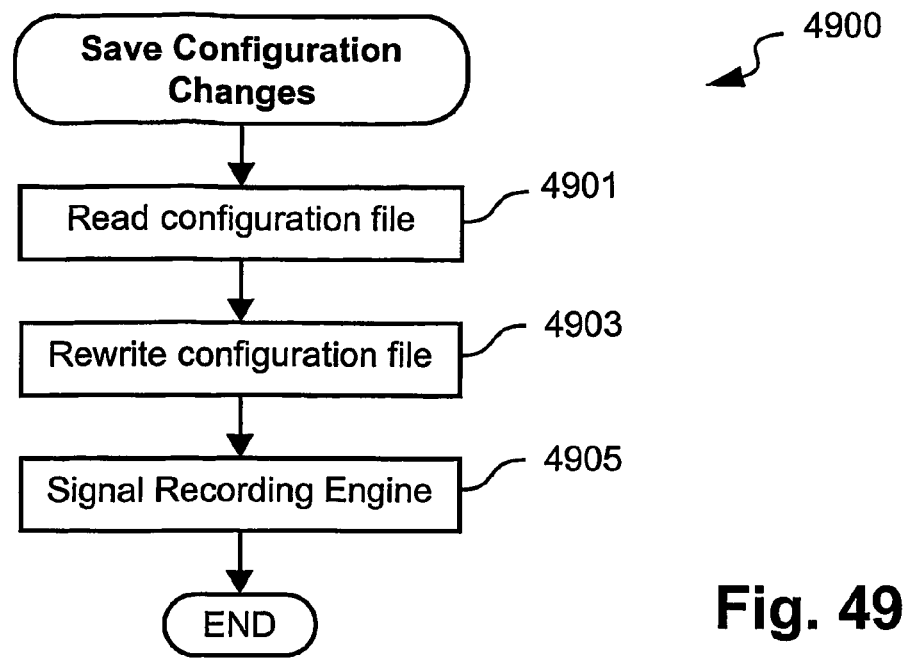
FIG. 49 is a flow diagram showing a process for saving configuration changes to the storage server.

The process 4800 continues at the next step 4805, where the processor 2305 receives user input via the keyboard 2302 or mouse 2303 for example. At the next step 4807, if the processor 2305 determines that the user entered "Exit", then the process 4800 continues at the next step 4809. Otherwise the process 4800 proceeds to step 4819, where if the processor 2305 determines that the user entered "Apply", the process 4800 proceeds to step 4821. Otherwise, the process 4800 returns to step 4805. At step 4821, the processor 2305 saves the configuration changes to the configuration file 205 in the hard disk drive 2310. A process 4900 for saving the configuration changes as executed at step 4821 will be described below with reference to FIG. 49.

The process 4800 continues at the next step 4809, where if the processor 2305 determines that there are any unsaved configuration changes, then the process 4800 continues to the next step 4811. Otherwise, the process 4800 concludes. At step 4811, if the user wishes to save the configuration changes, then the process proceeds to step 4813. Otherwise, the process 4800 concludes. At step 4813, the processor 2305 saves the configuration changes to the configuration file 205 in the hard disk drive 2310, in accordance with the process 4900.

The process 4900 of saving configuration files 205, as executed at steps 4813 and 4821 of the process 480, will now be explained in more detail. The process 4900 is preferably implemented as software resident on the hard disk drive 2310 and being controlled in its execution by the processor 2305. The process 4900 begins at the first step 4901, where the processor 2305 reads the configuration file 205. At the next step 4903, the processor 2305 rewrites the configuration file 205 to the hard disk drive 2305. The process 4900 concludes at the next step 4905, where the processor 2305 signals the recording engine 201 that the configuration changes to the storage server 2300 have been saved.

Figure 50:
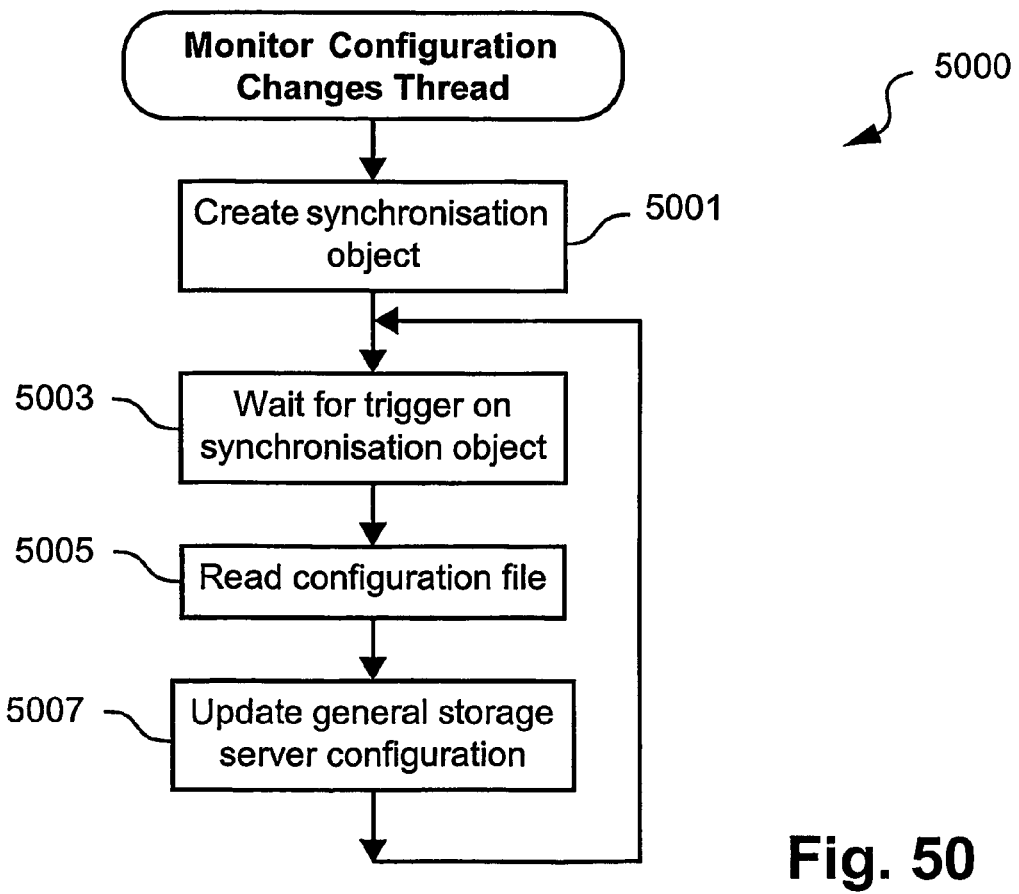
FIG. 50 is a flow diagram showing a process for monitoring configuration changes to the storage server.

FIG. 50 is a flow diagram showing a process 5000 for monitoring configuration changes to the storage server 2300. As described, the process 5000 is preferably implemented as a thread (i.e., sub-routine) in the recording engine 201. The process 5000 is preferably resident on the hard disk drive 2310 and is preferably controlled in its execution by the processor 2305.

The process 5000 begins at the first step 5001, where the processor 2305 creates a synchronisation object. At the next step 5003, the processor 2305 waits for the trigger from the configuration tool 211. Upon detecting the trigger, the processor 2305 reads the configuration file 205 at the next step 5005. Then at the next step 5007, the processor 2305 updates the storage server configuration and returns to step 5003.

3.11 Event Management

Figure 107:
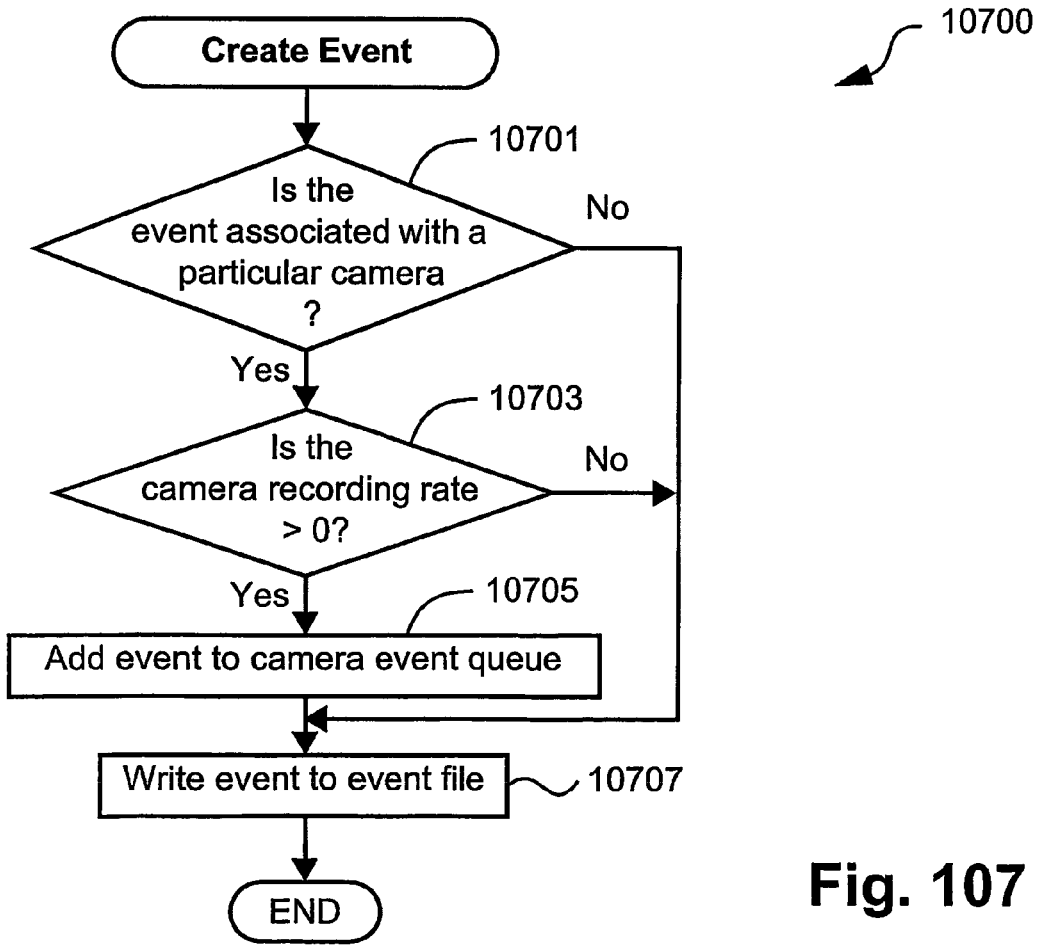
FIG. 107 is a flow diagram showing a process for generating an event.

FIG. 107 is a flow diagram showing a process 10700 for generating an event. The process 10700 is preferably implemented as software resident on the hard disc drive 2310 and being controlled in its execution by the processor 2305. The process 10700 is executed whenever an event is to be created in response to a condition. If the event is associated with a particular camera 112-115 and that camera is currently recording data, then the details of the event are added to an event queue for that camera. The purpose of the event queue is to hold on to event descriptions so that they can be saved in the video files together with the next video frame to be written.

The process 10700 begins at the first step 10701 where if the event to be generated is associated with a particular camera 112-115 then the process 10700 proceeds to step 10703. Otherwise, the process 10700 proceeds directly to step 10707.

At step 10703, if the processor 2305 determines that the recording rate of the particular camera 112-115 is greater than zero, then the process 10700 proceeds to step 10705. Otherwise, the process 10700 proceeds to step 10707. At step 10705, the processor 2305 adds the event to a camera event queue configured within memory 2306. The process 10700 concludes at the next step 10707 where the processor 2305 writes an event to the event file.

Figure 111:
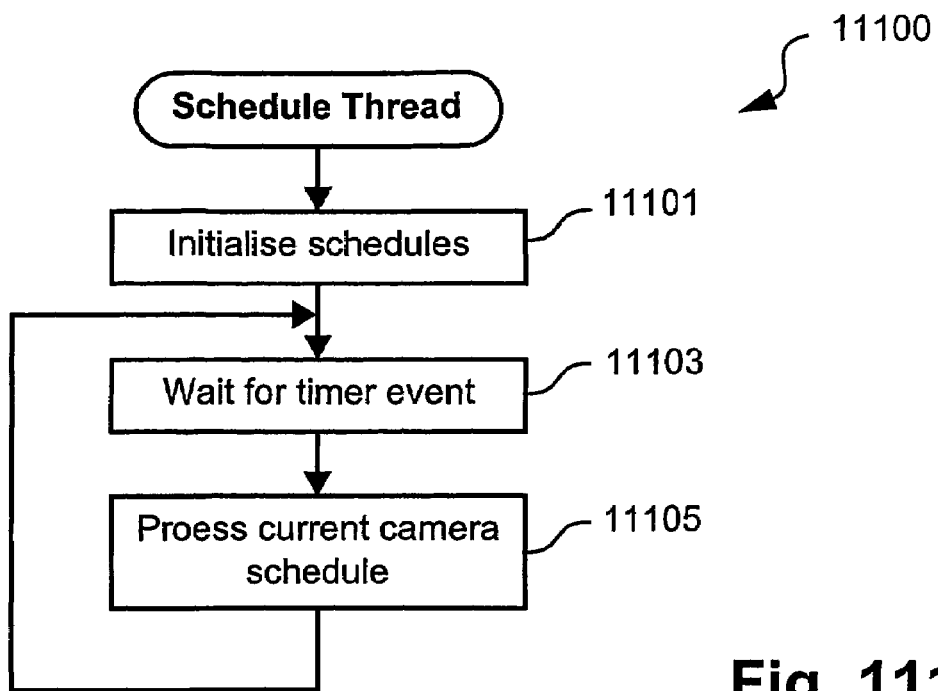
FIG. 111 is a flow diagram showing a schedule thread process.

FIG. 111 is flow diagram showing a schedule thread process 11100 in more detail. The process 11100 is preferably implemented as software resident on the hard disc drive 2310 and being controlled in its execution by the processor 2305. In step 11101, the processor 2305 initialises the schedules. Then, in step 11103 the processor 2305 waits for a timer event. Thereafter, in step 11105, the processor 2305 processes a current camera schedule. After processing the schedule, control flow returns to step 11103 to wait for the next timer event.

Figure 112:
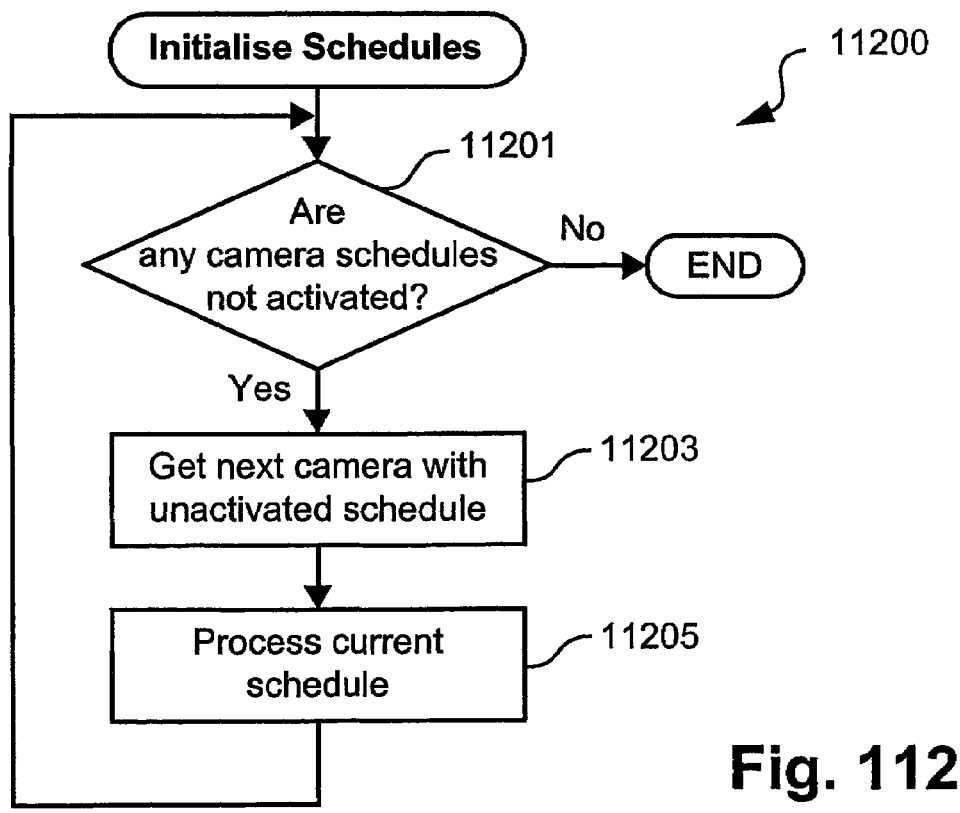
FIG. 112 is a flow diagram showing a process for initialising schedules.

FIG. 112 is a flow diagram showing an initialised schedules process 11200. The process 11200 is preferably implemented as software resident on the hard disc drive 2310 and being controlled in its execution by the processor 2305. In step 11201 the processor 2305 checks whether any camera schedules are not activated. If there are camera schedules not activated (the No option of step 11201) then the process 11200 ends. If, however, there are camera schedules not activated, then in step 11203 the processor 2305 gets the next camera with an unactivated schedule. Then, in step 11205, the current schedule is processed. Thereafter, control flow returns to step 11201 to check for any further camera schedules that are not activated.

Figure 113:
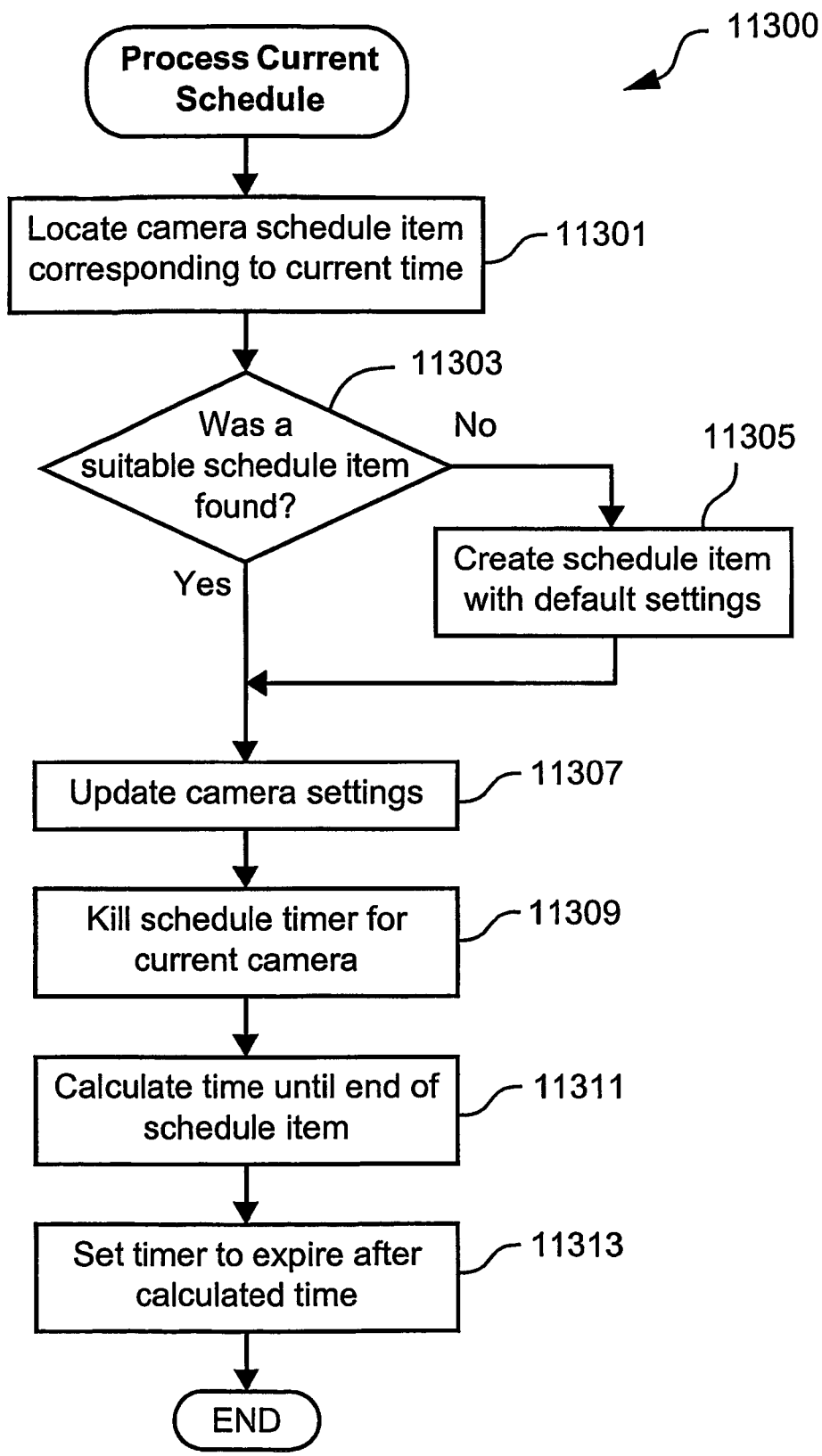
FIG. 113 is a flow diagram showing a process for processing a current schedule.

FIG. 113 is a flow diagram showing a process 11300 for processing a current schedule. The process 11300 is preferably implemented as software resident on the hard disc drive 2310 and being controlled in its execution by the processor 2305. In step 11301, the processor 2305 locates a camera schedule item corresponding to the current time. Then, in step 11303, a check is performed to determine whether a suitable schedule item was found. If no schedule item was found (the No option of step 11303) then in step 11305 a schedule item is created using default settings. The process 11300 then proceeds to step 11307. If a suitable schedule item was found (the Yes option of step 11303) then the process 11300 proceeds directly to step 11307, bypassing step 11305.

In step 11307 the camera settings are updated. Then, in step 11309 the schedule timer for the current camera 112-115 is terminated. At the next step 11311, the processor 2305 then determines the time until the end of the schedule item. Next, in step 11313 a timer is set to expire after the time calculated in step 11311. The process 11300 then concludes.

Figure 114:
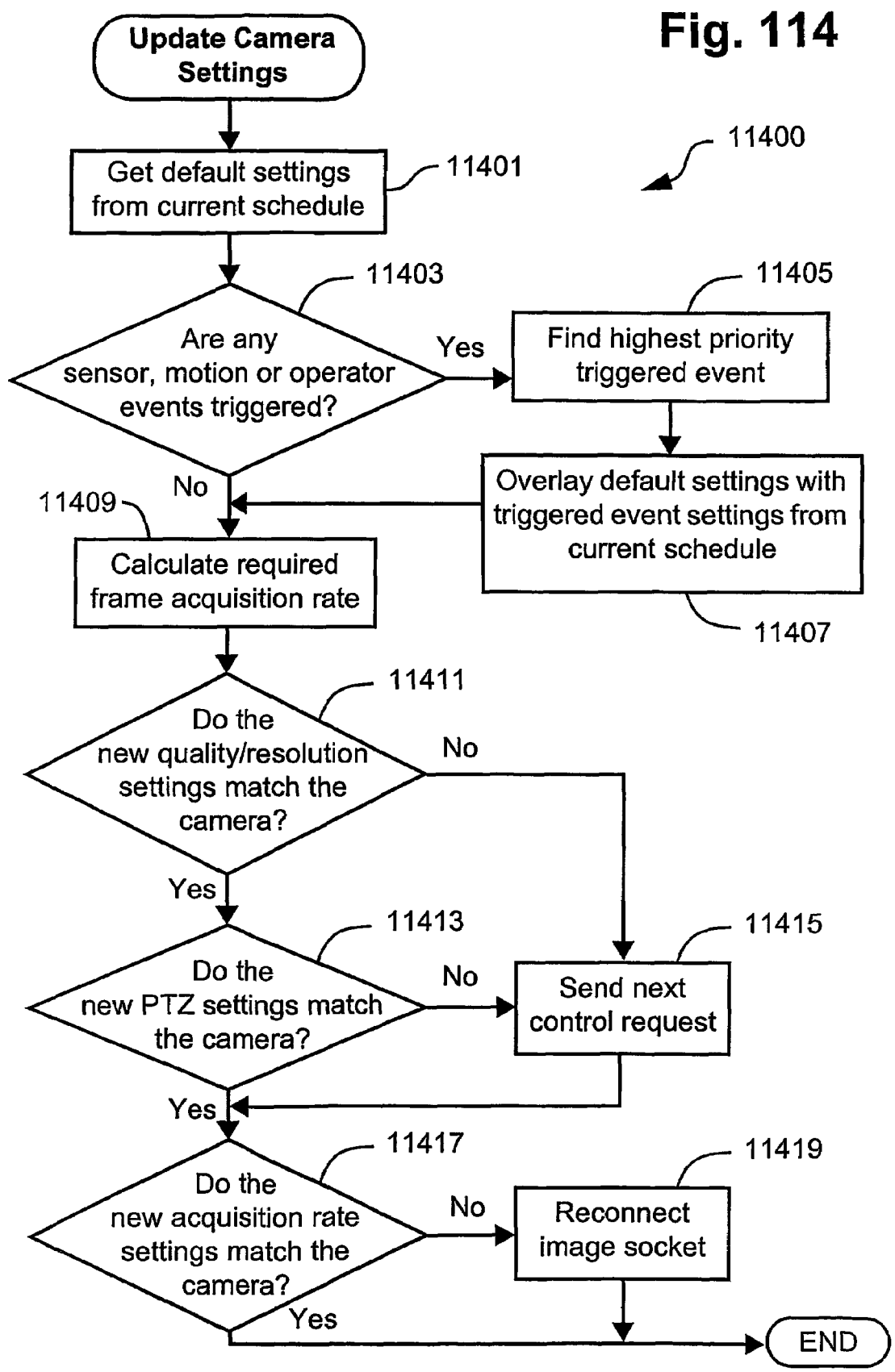
FIG. 114 is a flow diagram showing a process for updating camera settings.

FIG. 114 is a flow diagram showing a process 11400 for updating camera settings. The process 11400 is preferably implemented as software resident on the hard disc drive 2310 and being controlled in its execution by the processor 2305. The process 11400 is executed whenever a new schedule item is started for a camera, or when a sensor, motion or operator event occurs.

As described in detail below, in the first step, a currently active schedule item for a camera 112-115 is obtained, and the camera settings stored in the associated camera server 109-111 are copied into a temporary structure. If any sensor, motion or operator events are currently triggered, the highest priority of these events is located. If more than one event is found with the same priority, an operator override event automatically overrides any other events, and a motion event will override any sensor events. If two sensor events are present and have the same priority, the first sensor event will override the second sensor event. Once an event is selected, the default camera settings described previously are overlaid with the settings associated with that event in the currently active schedule item.

Once the current camera settings have been established, the required frame acquisition rate is calculated by taking highest of the required recording rate, motion detection rate and recording rate for any untriggered events that have an associated pre-event recording period. The processor 2305 then determines whether the required quality and resolution settings are equal to those currently used by the camera. If not, the processor 2305 issues a request on the control socket using the process for sending a next command, which will trigger a chain of requests that will result in the quality and resolution for the camera to be changed.

The processor 2305 then determines whether the required pan, tilt, zoom (PTZ) settings are equal to those currently used by the camera 112-115. If not, the processor 2305 issues a request on the control socket using the process for sending a next command, which will trigger a chain of requests that will result in the PTZ for the camera 112-115 to be changed.

The processor 2305 then determines whether the required acquisition frame rate is equal to that currently used by the image socket associated with the camera 112-115. If not, the processor 2305 reconnects the image socket, which will automatically resume frame acquisition at the correct rate as soon as the socket is connected.

The process 11400 begins at the first step 11401 where the processor 2305 retrieves default settings from a current schedule. Such default settings can be stored in the storage device 2309.

Next, in step 11403, the process 11400 determines whether any sensor, motion or operator events are triggered. If no events are triggered (the No option of step 11403) then the process 11400 proceeds to step 11409, bypassing steps 11405 and 11407.

If there are sensor, motion or operator events that have been triggered (the Yes option of step 11403) then, in step 11405 the triggered event having the highest priority is found. Then, in step 11407 the process 11400 overlays the default settings with settings from the current schedule relating to the triggered event. Then in step 11409 the process 11400 determines the required frame acquisition rate. Step 11411 then determines whether the new quality/resolution settings match the camera 112-115. If the settings do not match (the No option of step 11411), then step 11415 sends the next control request. If, however, the new quality/resolution settings do match the camera (the Yes option of step 11411) then step 11413 checks whether the new pan, tilt and zoom (PTZ) settings match the camera 112-115. If the PTZ settings do not match (the No option of step 11413) then process 11400 proceeds to step 11415.

If the new PTZ settings do match the camera (the Yes option of step 11413) then step 11417 checks whether the new acquisition rate settings match the camera. If this is the case (the Yes option of step 11417) then the update camera settings process 11400 ends. If, however, the new acquisition rate settings do not match the camera 112-115 (the No option of step 11417) then, prior to ending the routine 11400, step 11419 reconnects the image socket. A camera information update thread periodically checks various settings on the camera server 109-111. Certain settings, such as camera and sensor names and preset positions, are not under the control of the recording engine 201, and are periodically checked to ensure that the recording engine 201 is aware of their current values. Other settings, such as image quality and resolution, are under the control of the recording engine 201, and are changed on the camera server 109-111 if the recording engine 201 finds that the settings have been changed.

4.0 Access Engine

The access engine 203 is the component of the system 100 that handles the collation and serving of video and event files. The access engine 203 monitors the data files 209 that the recording engine 201 stores within the hard disk drive 2310 of the storage server 2300 (or external storage devices such as peripheral storage devices and networked storage devices, as described above) as completed and active video and event files. The access engine 203 keeps a record of the data files 209 and provides access to the data files 209 using a viewer 2200 in such a way that the viewer 2200 is unaware of the size and time range of the individual data files 209. In this way, the access engine 203 provides the viewer 2200 with seamless access to the stored video and event data.

The access engine 203 is an element of the storage server 2300, as illustrated in FIG. 2. The access engine 203 is preferably implemented as a software application resident on the hard disk drive 2310, with execution being controlled by the processor 2305, as shown in FIG. 23.

4.1 Structure of Access Engine

Figure 52:
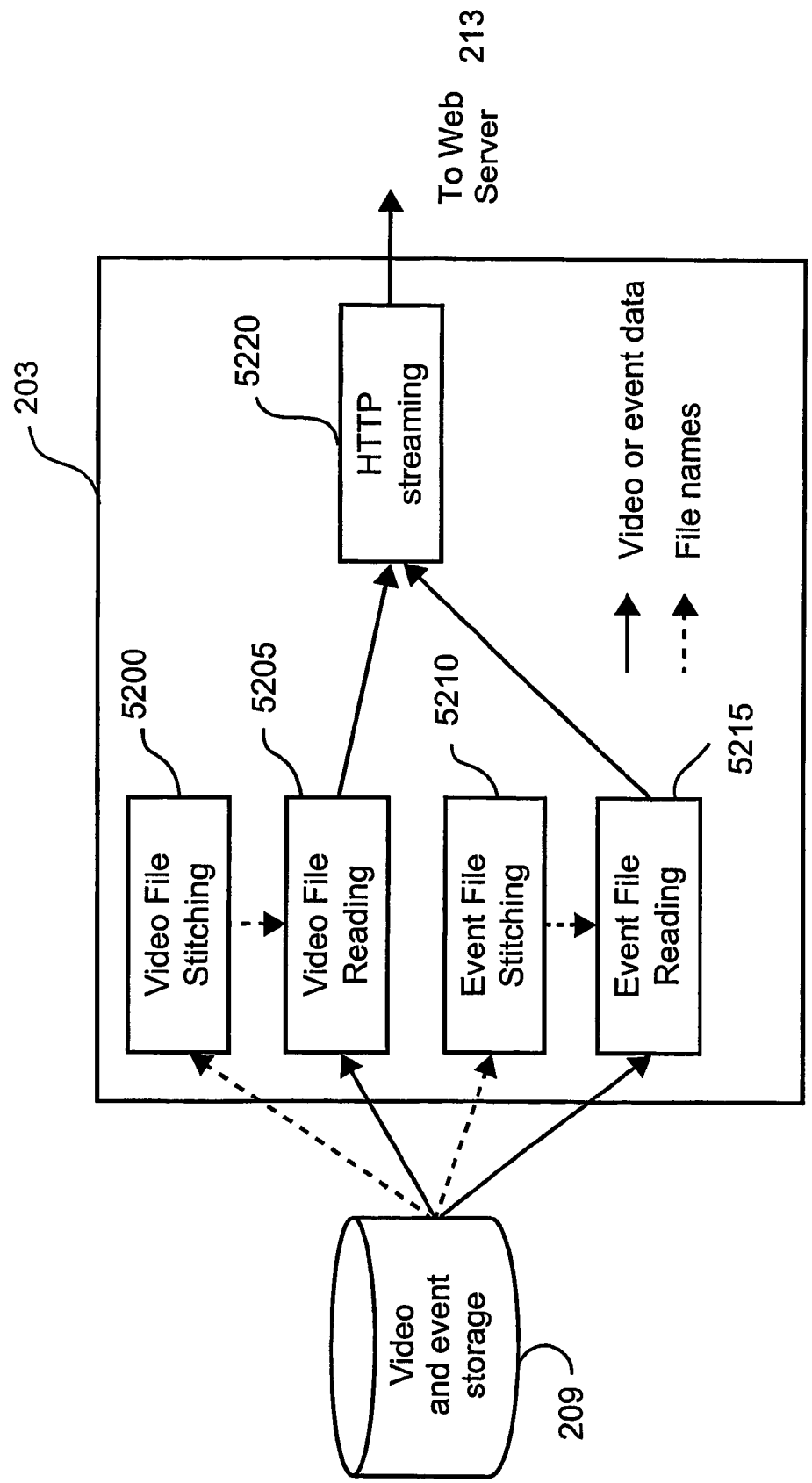
FIG. 52 shows a schematic block diagram of the access engine of FIG. 2.

FIG. 52 shows five functional units of the access engine 203. In FIG. 52, solid arrows indicate the movement of data from video or event file pairs, while dashed arrows indicate the movement of data from file names (i.e., the unit at the target of the dashed arrow reads the file names of the data files 209). When monitoring the video and event storage 209, the access engine 203 uses file name parsing where possible, in preference to accessing an actual file. The use of file name parsing helps reduce the load on the hard disk 2310 and processor 2305.

The video file stitching unit 5200 monitors the file names of video file pairs (i.e., a media file 1800 and associated index file 1805) in the data directories containing the data files 209, and maintains a stitched video file list. The stitched list maintained by the video file stitching unit 5200 enables individual video files to be stitched together and served as a continuous stream to a viewer 2200.

When a request for a range of video information is received, the access engine 203 identifies, using the stitched video file list, which video files are required to satisfy the request. The files thus identified will generally include video sample data from before the beginning of the requested range and some video sample data from after the end of the range. There can be gaps in the range of video sample data returned by file stitching unit 5200 where such video sample data has not been stored in the data files 209 (e.g., if the recording engine 201 has been configured for scheduled, motion or sensor triggered recording).

The video file reader 5205 then opens the identified video file pairs in sequence and serves the data in the opened files to the HTTP streaming interface 5220, from which the data from the file is forwarded to the web server 213 and thence to the viewer 2200 that initiated the request.

In an analogous fashion, the event file stitcher 5210 monitors the event records stored in the data files 209 and maintains a stitched event file list. The stitched event files list indicates how the event files relate to one another. Using the stitched list, events within a specified time range can be requested. When a request for event information is received from a viewer 2200, the access engine 203 makes use of the stitched event file list to determine which event files are required to service the request.

The event file reader 5215 then accesses the required event file from data files 209 and forwards the extracted event records to the HTTP streaming interface 5220, from which the event records are forwarded to the viewer 2200 that initiated the request.

When a new event file is noticed by the access engine 203, the access engine 203 creates a new index, stored in memory 2306, which contains a mapping from time to offsets within the event file.

Because the event files are considerably smaller than the video files, in one arrangement the event file stitcher 5210 and event file reader 5215 are combined into a single functional unit.

Figure 53:
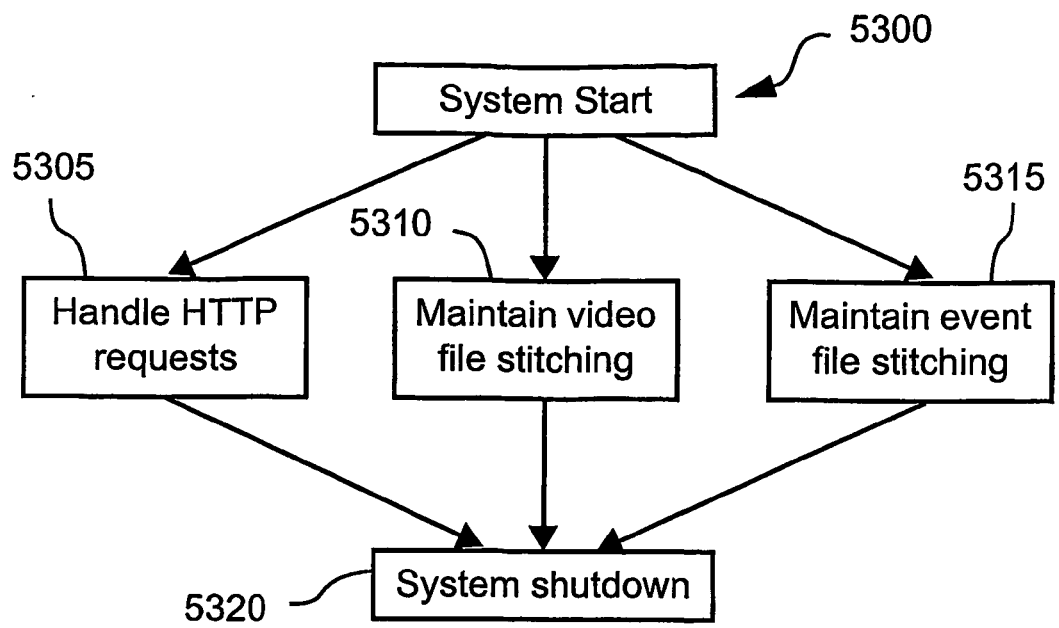
FIG. 53 shows a flow chart illustrating the principal tasks of the access engine of FIG. 52.

FIG. 53 shows the tasks performed by the access engine 203. In step 5300, the system is started.

While the access engine 203 is running, three tasks are performed in parallel. Step 5310 is the maintenance of the video file stitching. Step 5315 is the maintenance of the event file stitching. In step 5305, the access engine 203 handles requests received from viewers 2200.

The access engine 203 continues to perform tasks 5305, 5310 and 5315 until the system is shut down in step 5320.

4.1.1 Interaction Between the Access Engine and the Recording Engine

The access engine 203 and the recording engine 201 are loosely integrated since the access engine 203 and the recording engine 201 both access data files 209. When the access engine 203 has opened a file in the directories containing the data files 209, the access engine 203 can interfere with the activity of the recording engine 201, as the recording engine 201 cannot rename or delete the open file. The files are only opened while the files are being used by the access engine 203, or shortly before the files are needed. This is important to ensure that the operations of the recording engine 203 are not interfered with more than is necessary.

As described above in Section 3, the recording engine 201 writes data into a matched pair of files, each pair consisting of a media file 1800 and an index file 1805. Each media file 1800 and index file 1805 goes through a three-stage life cycle. An inactive standby file becomes an active file, which in turn becomes a completed file. The life cycle of event files is discussed in section 4.2.2.

As described earlier, an inactive standby file is created by the recording engine 201 as soon as a camera (112-115) is added to the control of the recording engine 201. The inactive standby file associated with the camera 112-115 is created whether or not the camera has any associated recording schedule. As a consequence, the recording engine 201 can begin recording to the file immediately video information is received, without having to wait for a file to be created. Commencing video recording is a time-critical task and any delay caused by file creation before recording is undesirable.

Inactive standby files do not contain any video samples and are consequently ignored by the access engine 203 when monitoring the data directories 209.

Once samples (i.e. frames) have been written to a media file 1800, the inactive standby file becomes an active file. As discussed in Section 3.3.4.1, the file name format of an inactive standby or active file includes the creation time of the file (i.e., a timestamp). The creation time, in general, differs from the start time of the video sample data stored in the file as files are created before they are actually used.

Active files are files that are currently being updated by the recording engine 201. As seen in FIG. 18, the active files are typically structured as two associated files, an index file 1805 and a media file 1800. For an active file pair, both the media file 1800 and the index file 1805 are open and are added to by the recording engine 201 while recording video sample data.

The access engine 203 uses the index file 1805 to find the correct samples to extract. The index file 1805 is only updated with current sample data periodically (for example, once every ten seconds) which means that the data in the index file 1805 may not truly represent the data in the media file 1800. When first opening a file, the access engine 203 obtains a snapshot of the state of the active file. While the access engine 203 is streaming video data from a media file 1800, the access engine 203 checks the current state of the file periodically to update the knowledge of the access engine 203 of the amount of recorded video sample data in the media file 1800.

For an active file, the file name indicates the file creation time. However, as the creation time may not coincide with the first sample, the start time of the samples in the media file 1800 may need to be retrieved from the file.

Once the recording engine 201 has finished recording to a file, the recording engine 201 closes and completes the file. A completed file is renamed to indicate the start and stop times of the samples in the media file 1800, rather than the file creation time. Once a file is completed, both the media file 1800 and index file 1805 are consistent and no further updates to the file pair are possible.

If the access engine 203 is not running, then each camera monitored by the recording engine 201 will have one inactive standby file, one active file and a number of completed files. Owing to the limitations of some operating systems it may not be possible to rename a file while the file is currently being used by another process. Thus, if the access engine 203 is currently streaming the video sample data in an active file to a viewer 2200 and the recording engine 201 finishes with the file currently being streamed, the recording engine 201 will be unable to rename the file until the access engine 203 has finished streaming the file. This limitation introduces complications into the file naming scheme as it is possible to have completed files that have not yet been renamed. Thus, a camera 112-115 may have several active files associated with the camera 112-115 in the directories with data files 209, although only one is being updated by the recording engine 201 with sample data.

4.2 File Stitching

Figure 54:
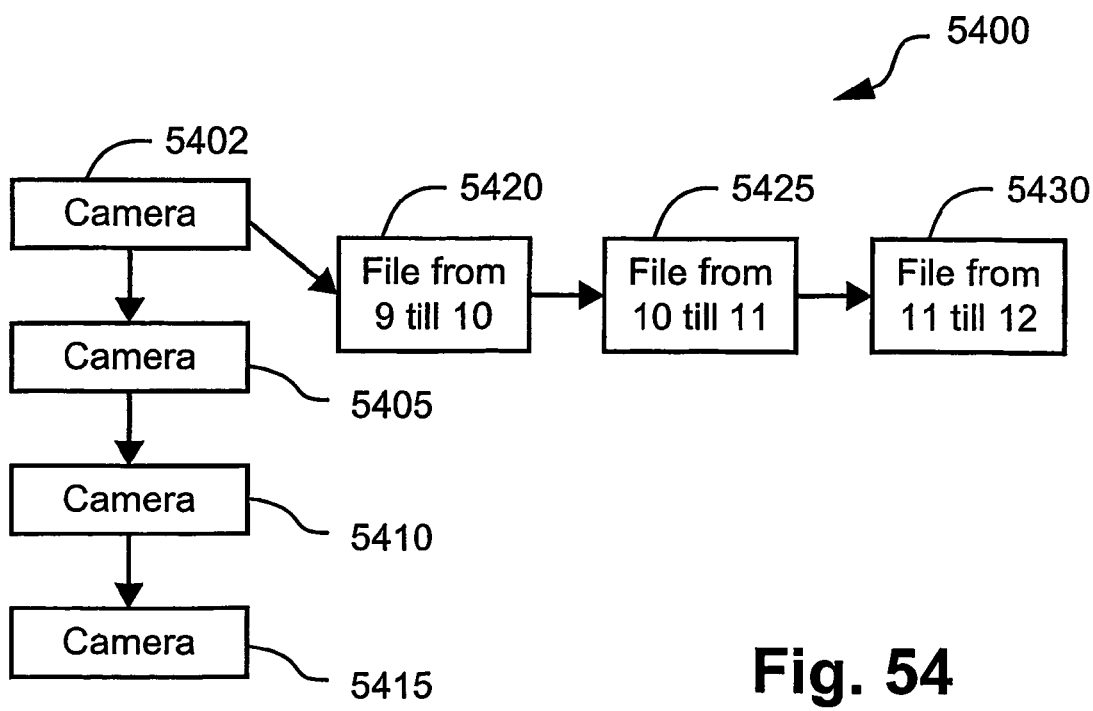
FIG. 54 is a schematic block diagram of a data structure used by the access engine for file stitching.

To provide seamless access to the data 209, the access engine 203 maintains two ordered lists of the current set of files for each camera 112-115. The data structure used for the ordered list maintained by the access engine 203 is shown in FIG. 54. There is one of these lists relating to video files and one relating to event files.

The ordered stitching list 5400 as shown contains four camera records 5402, 5405, 5410 and 5415. However in practice, the number of camera records in the ordered list 5400 depends on the number of cameras 112-115 having active or completed files stored as data files 209.

In the illustrated example, camera record 5402 is associated with the sequence of files 5420, 5425 and 5430. File 5420 relates to data between 9 and 10 o'clock, file 5425 relates to data between 10 and 11 o'clock, and file 5430 relates to data between 11 and 12 o'clock. The file data structures 5420, 5425 and 5430 are stored in start time order. In assembling the ordered list 5400, file names are parsed for the start and end time. Using file names is faster than opening each file and retrieving the times from the data structures within a file. The files referenced in the stitching list include active and completed files.

In the example of FIG. 54, the camera record 5402 is the only camera record which has any associated data files 209. Camera record 5402 is shown as having three associated data files. However, this is merely for purposes of illustration and the number of associated data files will depend on the current operation of the system 100.

The most recently created active file is the active file currently in use and any other active files associated with the same camera 112-115 are files that have not yet been renamed. As discussed above, the time in the file name of the active files that have not yet been renamed is not the actual start recording time of the file but instead the creation time of the file. When adding active files (or completed files that have not yet been renamed because they were in use as described above) of the data files 209 to the ordered stitching list 5400, it is necessary to read the actual time of the first event by reading the time data of the first text sample in the media file.

The access engine 203 checks for data files 209 in each of the drives 2310 on which the recording engine 201 records data.

4.2.1 Video File Stitching

Figure 55:
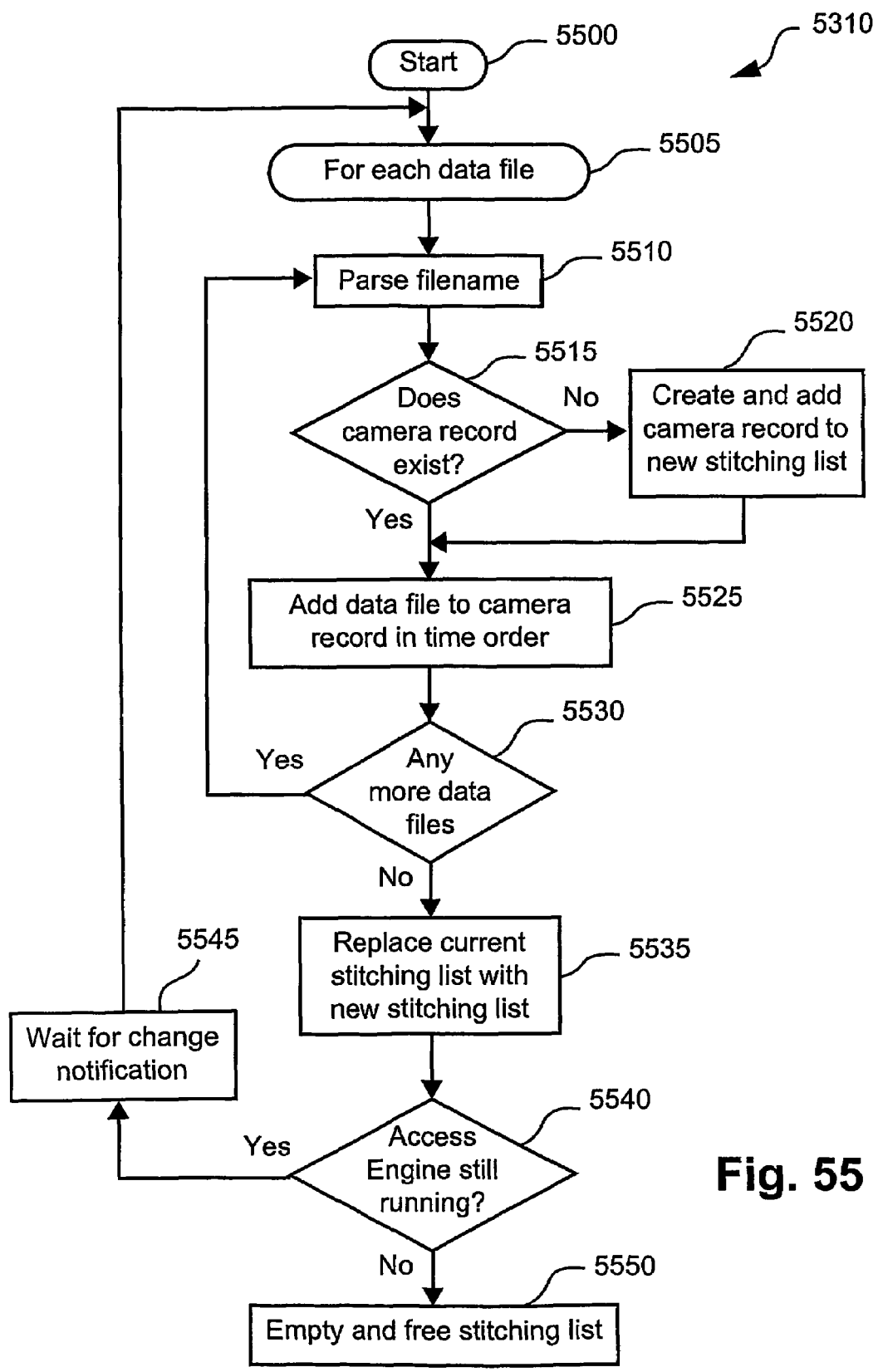
FIG. 55 is a flow diagram of the video file stitching performed by the access engine.

The step 5310 of maintaining the video file stitching is shown in greater detail in FIG. 55. Step 5310 is preferably implemented as a software application resident on the hard disk drive 2310, with execution being controlled by the processor 2305, as shown in FIG. 23.

Video file stitching commences in step 5500. An initial video file stitching is performed when the access engine 203 is started. Thereafter, the video file stitching is performed whenever there is a new data file 209 or a data file 209 is renamed or when the recording engine 201 notifies the access engine 203 of a change to the status of data files 209 via inter-process communication.

In one implementation, the access engine 203 uses Windows™ file change notifications to be informed when something has changed in the directory containing the data files 209. Once notified, the access engine 203 rebuilds the in-memory file list 5400 based on the current set of data files 209. As described above, the access engine 203 can monitor multiple directories if necessary.

In another implementation, the access engine 203 periodically checks for changes in the directory structure of the data files 209.

Next, the access engine 203 enters loop 5505, which examines each of the active and completed files in the data files 209. In step 5510, the first step of loop 5505, the access engine 203 parses the file name of the video file presently being examined. As described in Section 3.3.4.1, the file name provides information relating to the camera 112-115 with which the file is associated, together with time information related to the contents of the file under examination.

Step 5515 checks to see whether a camera record 5402-5415 corresponding to the parsed camera identifier already exists in the ordered list 5400. If a camera record does exist, (i.e., the Yes option of step 5515), then control flow proceeds directly to step 5525, bypassing step 5520. If the camera record does not exist in the ordered list 5400 (i.e., the No option of step 5515) then, in step 5520 the access engine 203 creates and adds an appropriate camera record to the ordered stitching list 5400.

Control flow then proceeds to step 5525, in which the required information about the data file 209 under examination is added to the camera record in time order, as illustrated in FIG. 54.

The ordered list 5400 does not include the contents of the video files. The data file information 5420, 5425, 5430 present in the ordered list 5400 merely contains information derived from the file names including start time, stop time (when known) and the camera identifier and is ordered according to the start time.

Next, in step 5530, the access engine 203 checks to see whether there are any more data files 209 which have not yet been incorporated into the ordered stitching list 5400. If there are still files which need to be included in the ordered list 5400, then control flow returns to step 5510, in which the next data is examined.

If there are no more data files to examine (i.e., the No option of step 5530) then control flow exits loop 5505 and proceeds to step 5535 in which the ordered stitching list that is currently being used by the request handler 5305 is replaced with the new ordered stitching list 5400 that has been updated by loop 5505.

Once the new ordered stitching list 5400 has been made available to the other elements of the access engine 203, control flow proceeds to step 5540, which checks whether the access engine 203 is still running. If the access engine 203 is not in the process of shutting down (i.e., the Yes option of step 5540) then in step 5545 the access engine 203 waits for notification of change to the data files 209. As described above, in an alternative implementation of step 5545, the access engine 203 can periodically check for changes to the directory structure of the data files 209. Once the access engine 203 is aware of a change to data files 209, loop 5505 is re-commenced.

If the access engine 203 is in the process of shutting down (the no option of step 5540), then in step 5550 the access engine 203 empties and frees up the ordered stitching list 5400.

4.2.2 Event File Stitching

Step 5315, which maintains event file stitching, ensures seamless access to ranges of events, using a similar procedure to the maintenance of video file stitching (step 5310). Event file stitching is somewhat simpler in that event files do not go through the 3-stage life cycle of video files. Event files have only two stages, active and completed. The file name is the same for both stages. Consequently, the difficulties that arise when video files are renamed are not encountered in the case of event files.

Each event file has a single date, which is the time the file was created. This enables a strict ordering of event files. Unlike video files, event files are not created before they are needed. The smaller data size of event records relative to video samples means that event records can be queued in memory while an event file is being created after a file swap-over. The queued event records can be written to the new file by the recording engine 201 once file creation is complete.

It is necessary to parse event files to extract the end time from the last event in the file. No event files from the same camera 112-115 have overlapping time periods. It is possible, however, for two adjacent event files in time order to contain different event records associated with events that occur at the same instant (that is, within a millisecond, the granularity of time used by the recording engine 201). That is, a given event file can contain an event record with the same time as an event record in the previous file in a sequence of event files. However, the later event file cannot contain any event records that contain an earlier time than any event record in the previous event file. Thus, the time of all event records in an earlier file is required to be less than or equal to the time of all event records in following files. All event records are stored in time order.

The access engine 203 builds indexes of the event files, in memory 2306 to reduce the time spent searching through the files when a request is received. To allow the access engine 203 to seek a particular event in a file without having to search through all the records in the file until the access engine 203 finds the correct event, the stored indexes provide offsets indexed by event time. Thus searching through the indexes gives the required offset or a point near the desired event.

The event file stitching list 5400 (which is a data structure with the same structure as the video file stitching list) can be maintained using the same steps as those shown in FIG. 55 with respect to the video file stitching maintenance 5310. Step 5525 of adding data file information to the appropriate camera record is somewhat simpler because of the more straightforward life cycle of event files. When the access engine 203 adds event file information to the camera record, the event file lists can be simply ordered by the creation time of the event file, as stored in the file name.

Once the end of the file is reached, the next file is read from the list of files for that particular camera server 109-111. Events can then be read and streamed from the new file to the viewer 2200 that has initiated a request. The process continues until the end time of the request.

Event requests can also ask for a continuing stream of events as the event requests are created by the recording engine 201. Instead of ending the stream once the access engine 203 has reached the end of the stored events, the access engine 203 continues to watch the event files for further updates and sends such updates to the viewer 2200 when the updates occur.

The access engine 203 watches for new event files to be created in the data directories which contain the data files 209. New event files are, in general, created when the recording engine 201 swaps over to a new event file, although it may be due to an external software application restoring previously removed video and event files.

In one implementation, the access engine 203 uses Windows™ file change notifications to be informed when something has changed in the directory containing the data files 209. Once notified, the access engine 203 rebuilds the in-memory file list 5400 based on the current set of data files 209. As described above, the access engine 203 can monitor multiple directories if necessary.

In another implementation, the access engine 203 periodically checks for changes in the directory structure of the data files 209.

4.3 Handling Requests

Figure 56:
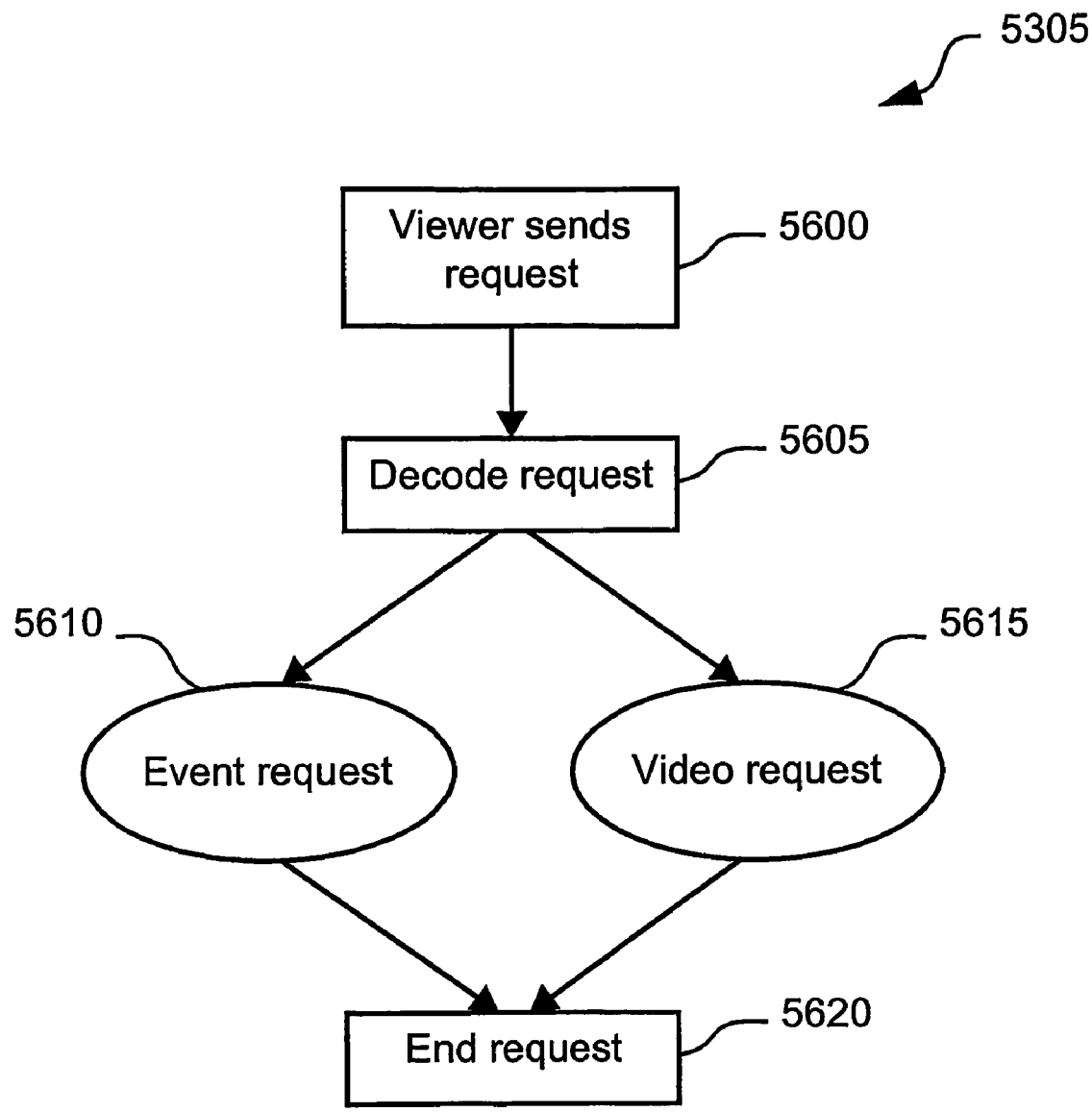
FIG. 56 is a flow diagram of the request handling procedure of the access engine of FIG. 52.

One of the principal tasks of the access engine 203 is to handle requests for video samples and event records stored in the data files 209. The request handling step 5305 is shown in more detail in FIG. 56.

The process is initiated in step 5600, in which a viewer 2200 sends a request for video samples or event records to the web server 213 which passes on a request to the access engine 203. A description of the data which is used in the request is given later in this document.

Files used by the system 100 are accessible by the viewers 2200 once the files are placed into the directories containing the data files 209. Similarly, once files are removed from the directories containing the data files 209, the access engine 203 will not serve any further requests for the removed video information. Operating system limitations can prevent the file from being removed while the file is currently being accessed by the access engine 203.

Next, in step 5605, the streaming interface 5220 decodes the request. If the request is for event records, the access engine 203 processes the request according to step 5610. If the request is for video samples, then the request is handled in step 5615. Once the appropriate step 5610 or 5615 has been completed, the request handling procedure ends in step 5620.

For convenience of the viewers 2200 it is possible to play information from before the beginning of a request by playing backwards (i.e., by the access engine 203 setting the play rate to a negative value which may be done, for example, by the user of a viewer 2200 pressing on the rewind button). In order to read this earlier information, the access engine 203 makes use of the ordered file stitching list 5400 to identify the previous file in the series, given a current file. The file stitching unit 5200 then searches for the identified previous file, taking into account the possibility that the file name may have changed on completion. The file stitching unit 5200 then returns the previous file in the sequence or a no-file value if no previous file is found.

The access engine 203 handles requests for sample data in the future in a similar manner. For instance, a viewer 2200 can request video sample data starting an hour ago and continuing until tomorrow morning. Clearly, only the first hour of the requested data will be available in the set of data files 209. However, by the time the access engine 203 has streamed the available hour of video sample data in real time, there will be another hour of video sample data available, provided the recording engine 201 was recording during that period. The video file reader 5205 can then interrogate the video file stitching unit 5200 for the name of the next file, which will now be in the ordered stitching list 5400, and then continue streaming to the viewer 2200. If the play rate is higher than normal forward real time (for example, if the user of a viewer 2200 has pressed on the fast forward button), the request will eventually catch up to "live" and so the access engine 203 will complete the request (that is, send an "end stream" blob).

Thus, it is possible for a viewer 2200 to request a range of video sample data that is not currently in the data files 209.

4.3.1 Video File Streaming

Figure 57:
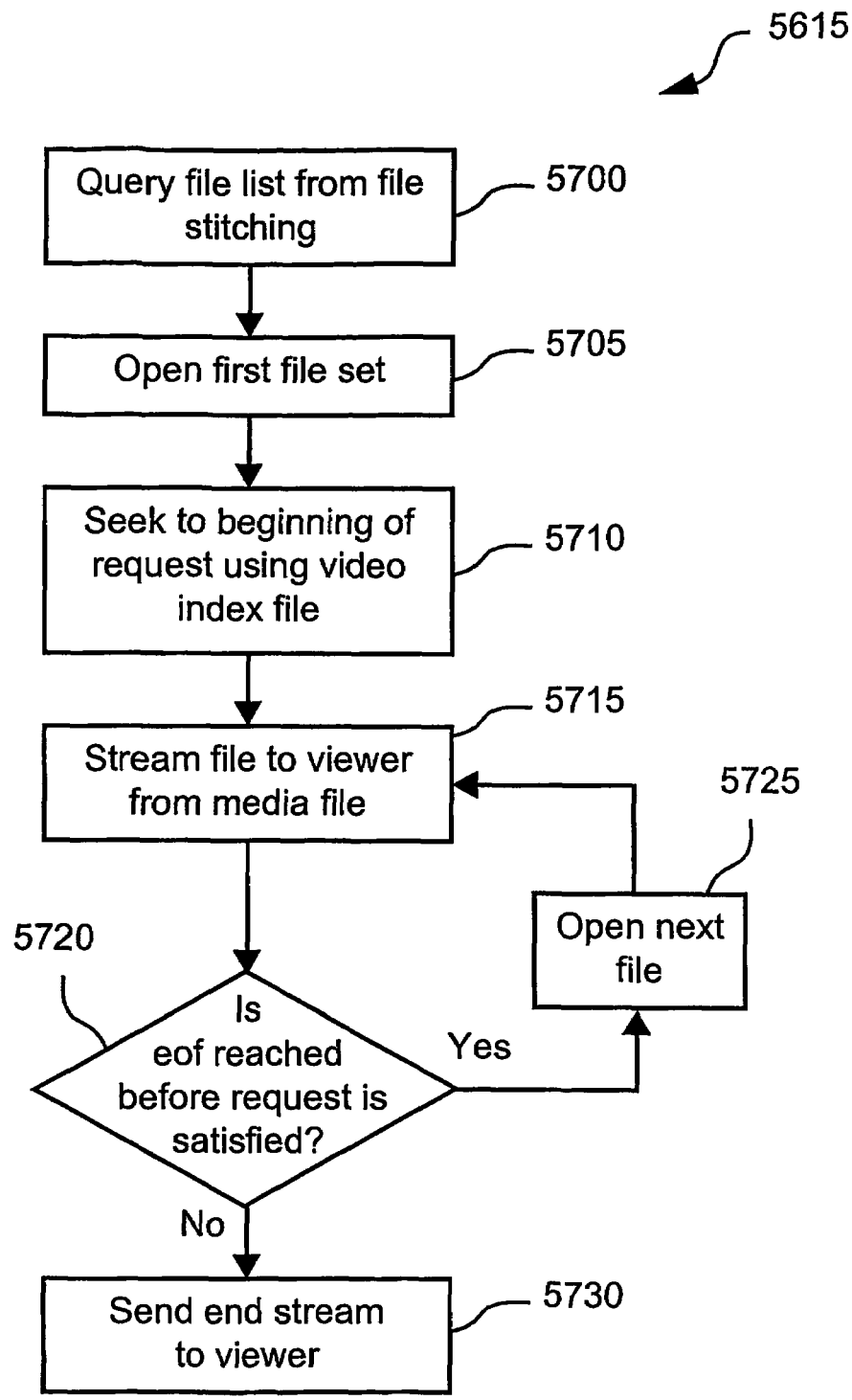
FIG. 57 is a flow diagram of the video streaming performed by the access engine.

FIG. 57 shows in more detail the video request handling step 5615. The video request handling step 5615 is preferably implemented as a software application resident on the hard disk drive 2310, with execution being controlled by the processor 2305, as shown in FIG. 23.

In step 5700 the video file reader 5205 queries the ordered video stitching list 5400 in order to determine the range of files required to satisfy the current request.

Next, in step 5705, the video file reader 5205 opens the first file in the set of files identified in step 5700. Then, in step 5710, the video file reader 5205 seeks through the open file to find the beginning of the requested time period. This is done to start the video streaming at the correct time rather than at the start of the file. The reader 5205 uses the associated index file 1805 in order to find the required offset within the media file 1800.

Next, in step 5715, the access engine streams the video samples to the viewer 2200 from the opened media file 1800. Step 5720 checks whether an end of file (EOF) is reached before the request has been satisfied. If no end of file is encountered and the request has been satisfied (i.e., the No option of step 5720) then in step 5730 the access engine 203 sends an "end stream" notification to the viewer 2200.

If, however, an end of file is reached and the request is not yet satisfied (i.e., the Yes option of step 5720) then control flow proceeds to step 5725, in which the video file reader 5205 opens the next file as determined by the ordered stitching list 5400.

Note that a file can be renamed at any time, provided the file is not open. In consequence, the video file reader 5205 can attempt to open the active file name of a section of video sample data rather than the completed file name, if the file was completed between the request for the ordered file list 5400 and the opening of the file. To address this problem, the video file reader 5205 asks the file stitching unit 5200 if the file name has been changed and what the new file name is.

Once the next file has been opened, control flow returns to step 5715, in which the video sample data is streamed from the open media file 1800 via the web server 213 to the viewer 2200.

The above process is repeated until the request is satisfied.

4.3.2 Event File Streaming

Figure 58:
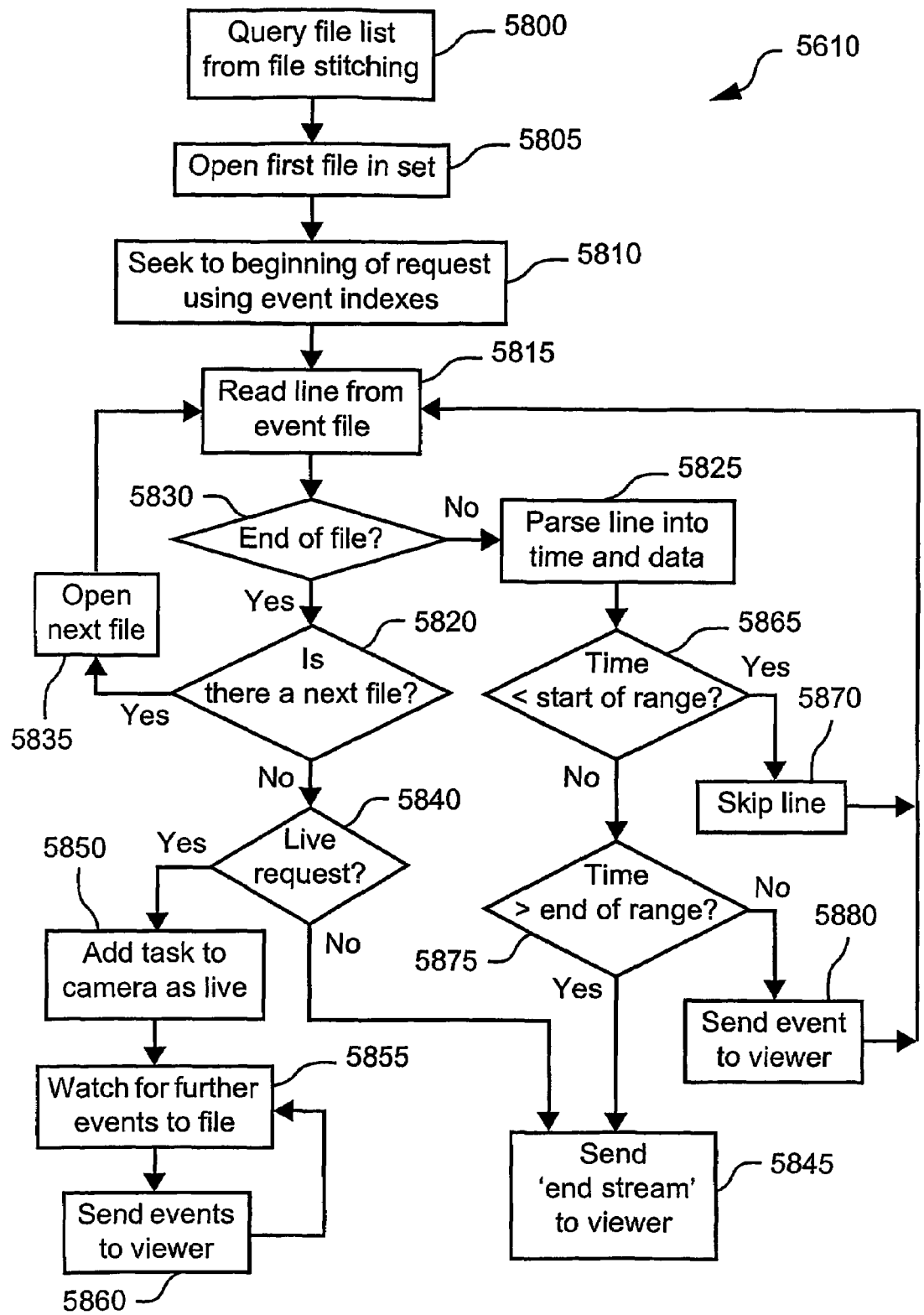
FIG. 58 is a flow diagram of the event file streaming performed by the access engine.

FIG. 58 shows in more detail the event request handling step 5610. The event request handling step 5610 is preferably implemented as a software application resident on the hard disk drive 2310, with execution being controlled by the processor 2305, as shown in FIG. 23.

In step 5800 the event file reader 5215 queries the ordered event file list established by the event file stitching unit 5210. The query establishes a set of event files required to satisfy the request currently being handled.

Then in step 5805, the event file reader 5215 opens the first file in the set identified in step 5800. Next, in step 5810 the reader 5215 seeks through the open file to the beginning of the request using event indexes. Note that, because of the granularity of the event indexes (that is, there is not a direct index entry to every record in the file), the position in the open event file identified in step 5810 may be before the requested time range, requiring the access engine 203 to continue to step through the event records to find a start for the requested time range.

Then, in step 5815, the event file reader 5215 reads a line from the open event file. Step 5820 checks whether the read line is an end-of-file. If this is not the case (i.e., the No option of step 5820) then, in step 5825, the reader 5215 parses the line to obtain the event time and sample data. Next, in step 5865 the reader 5215 checks whether the time of the event is less than the start of the requested range. If the time is too early (i.e., the Yes option of step 5865) then the reader skips the line (step 5870) and process flow returns to step 5815, in which the next line is read from the open event file.

If the time of the event is greater than the start of the request range (i.e., the No option of step 5865) then, in step 5875 the reader 5215 checks whether the time is greater than the end of the requested range. If so (i.e., the Yes option of step 5875) then in step 5845, the streaming interface 5220 sends an "end stream" indication to the viewer 2200.

If the event time falls within the requested time range (i.e., the No option of step 5875) then in step 5880 the streaming interface 5220 sends the event to the viewer 2200. After the event has been sent, process flow returns to step 5815 in which the next line is read from the event file.

If an end of file is encountered, (i.e., the Yes option of step 5820) then in step 5830 the event file reader 5215 checks whether there is a next event file available. If so (i.e., the Yes option of step 5830) then in step 5835 the reader 5215 opens the next file and process flow returns to step 5815 in which a line is read from the newly opened file.

If an end of file has been encountered but there is no next file available, (i.e., the No option of step 5830) then in step 5840 the access engine 203 determines whether the current request is a "Live" request (that is, the request specifies a start time but no end time). If the request is not a Live request (i.e., the No option of step 5840), then in step 5845 the streaming interface 5220 sends an "end of stream" indication to the viewer 2200.

If the request is a Live request (i.e., the Yes option of step 5840) then in step 5850 the access engine 203 adds a task to the appropriate camera record. Then, in step 5855 the access engine 203 watches the final event file associated with each camera. The access engine 203 assumes that the last event file is the only active event file for each camera 112-115. The access engine 203 becomes aware of changes to the file either by comparing the current file size with the previously known file size, or by any other method specific to the operating system being used.

When new event records have been added to an event file, the new events are sent to any viewers 2200 that have Live event requests for that particular camera 112-115 (step 5860).

The writing of event records to the event file by the recording engine 201 is not guaranteed to be atomic, that is, one half of an event can be written to a file and then the other half can be sent at a later time due to operating system caching and input/output prioritisation. Consequently, the access engine 203 only sends Live events to listening viewers 2200 when one or more complete events have been added to the event file.

4.4 Streaming Disjoint Video

The video data stored as data files 209 can contain gaps. These gaps can arise from periods of time where no recording was done at all. In addition, where video recording is triggered by motion detection or a predetermined event, there may be breaks in the recorded data from periods when video recording has not been triggered.

When streaming the disjoint video sample data to the viewer 2200, the problem arises of informing the viewer 2200 when there is no video sample data present in such a way that the stream can continue without interruption.

When there is a gap in the stored video sample data, the access engine 203 sends a frame marker to indicate the gap in the stored video sample data. As described in more detail in Section 4.5.1, the frame marker takes the form of a "no video" blob. A "no video" blob includes two pieces of time information. The first piece of information is the current time in the sample data stream and the second piece of information is the time of the next sample data to be sent (if there is a next sample to send).

"No video" blobs are sent at a lower rate than the video they replace, in order to reduce the network overhead. The decision to send a "no video" blob is based on a threshold which can be based on a predetermined system-wide constant (e.g., a "no video" blob can be sent if there is no video sample data for the next five seconds) or be based on calculating a value from an attribute of the video stream. For example, the threshold could be calculated based on the current frame rate of the video stream (e.g., a "no video" blob can be sent if the frame rate of the current segment of video is 15 frames per second and there is no video sample data to be sent for the next 30 frames (i.e., samples)). The threshold used is referred to as the "no-video" threshold and the send rate is referred to as the "no-video" resend rate.

The rate at which "no video" blobs are sent can be specified in a similar manner. Either a fixed value can be set (e.g., "no-video" blobs may be sent at a rate of twice every second) or a sending rate can be generated (for example "no-video" blobs may be sent at one quarter of the frame rate of the video stream).

Figure 59A:
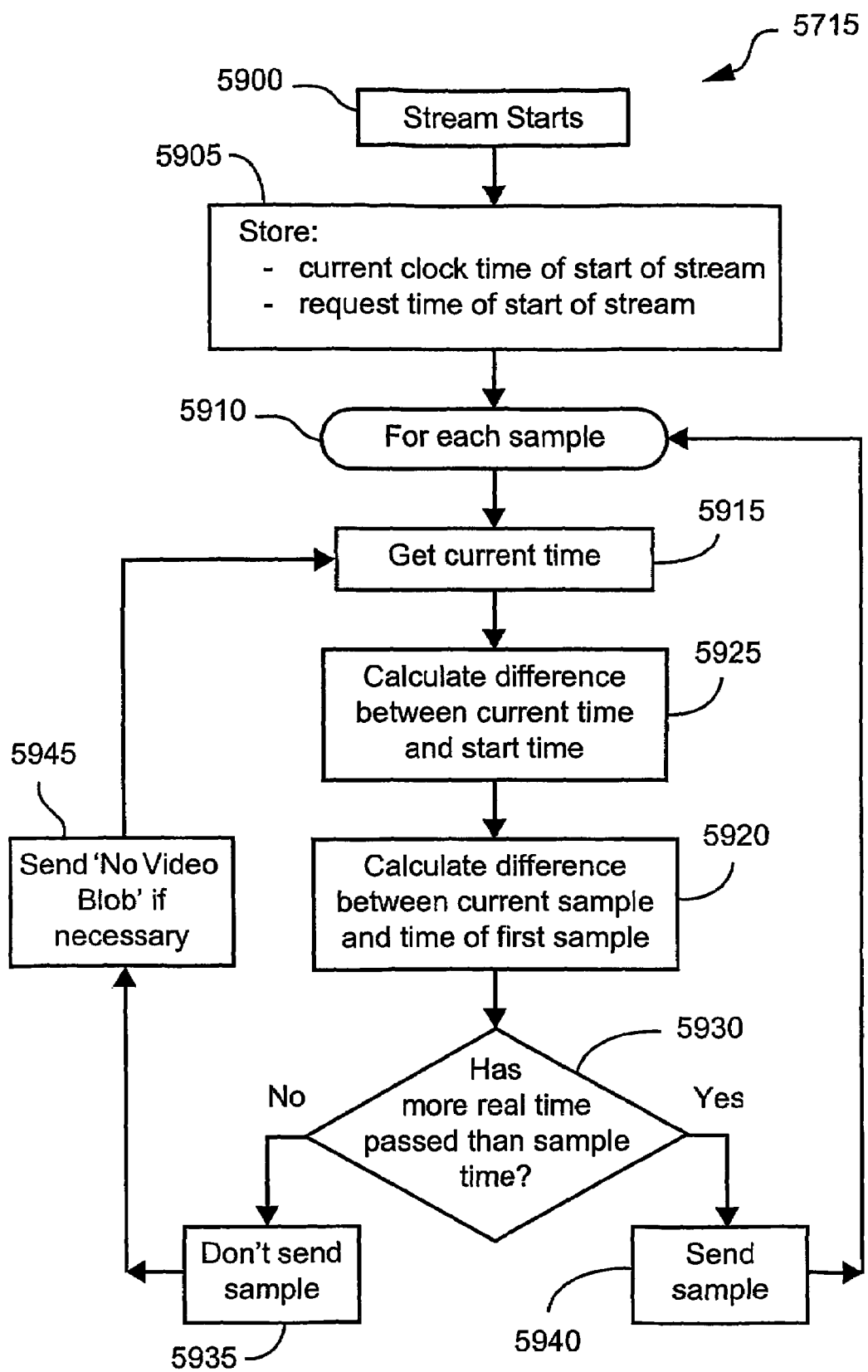
FIG. 59A is a flow diagram of video file streaming.

FIG. 59A shows in more detail the step 5715 of streaming sample data to a viewer 2200 from a media file 1800. Step 5715 is preferably implemented as a software application resident on the hard disk drive 2310, with execution being controlled by the processor 2305, as shown in FIG. 23. The sample data stream is started in step 5900. The procedure for establishing a connection between a viewer 2200 and the access engine 203 is described in more detail in Section 4.5.2.

Next, in step 5905, the access engine 203 stores the current clock time, $t_s$, at the time the sample data stream is started. In addition, the access engine 203 stores the start time, $t_r$, of the requested range of video.

In step 5910 a loop is commenced which considers in turn each sample read from the open files in the directories 209 in respect of the current stream. Step 5915, which is the first step of the loop 5910, gets the current clock time. The next step, 5920, calculates the difference between the current time and the start time $t_s$ of the stream.

Then in step 5925, the access engine 203 calculates the difference between the time of the current sample (i.e., timestamp) and the time $t_r$ of the first sample in the stream. Thus, step 5920 calculates the passing of real time, whereas step 5925 calculates time that has lapsed in sample time, i.e. the time between samples stored in the media file 1800.

Next, in step 5930, the access engine 203 checks whether more real time has passed than sample time, as calculated in steps 5920 and 5925 respectively. If more real time has passed than sample time (i.e, the Yes option of step 5930), then in step 5940 the streaming interface 5220 sends the current sample. Process flow then returns to the beginning of the loop 5910 to examine the next sample from the open media file 1800.

If, however, more sample time has elapsed than real time, (i.e., the No option of step 5930) then the present sample is not yet sent (i.e., notional step 5935). Because the present sample has not yet been sent, in step 5945 the access engine 203 determines whether it is necessary to send a "no-video" blob. The procedure for making this decision is described below with reference to FIG. 59B.

After step 5945 has been executed, control flow returns to step 5915.

Figure 59B:
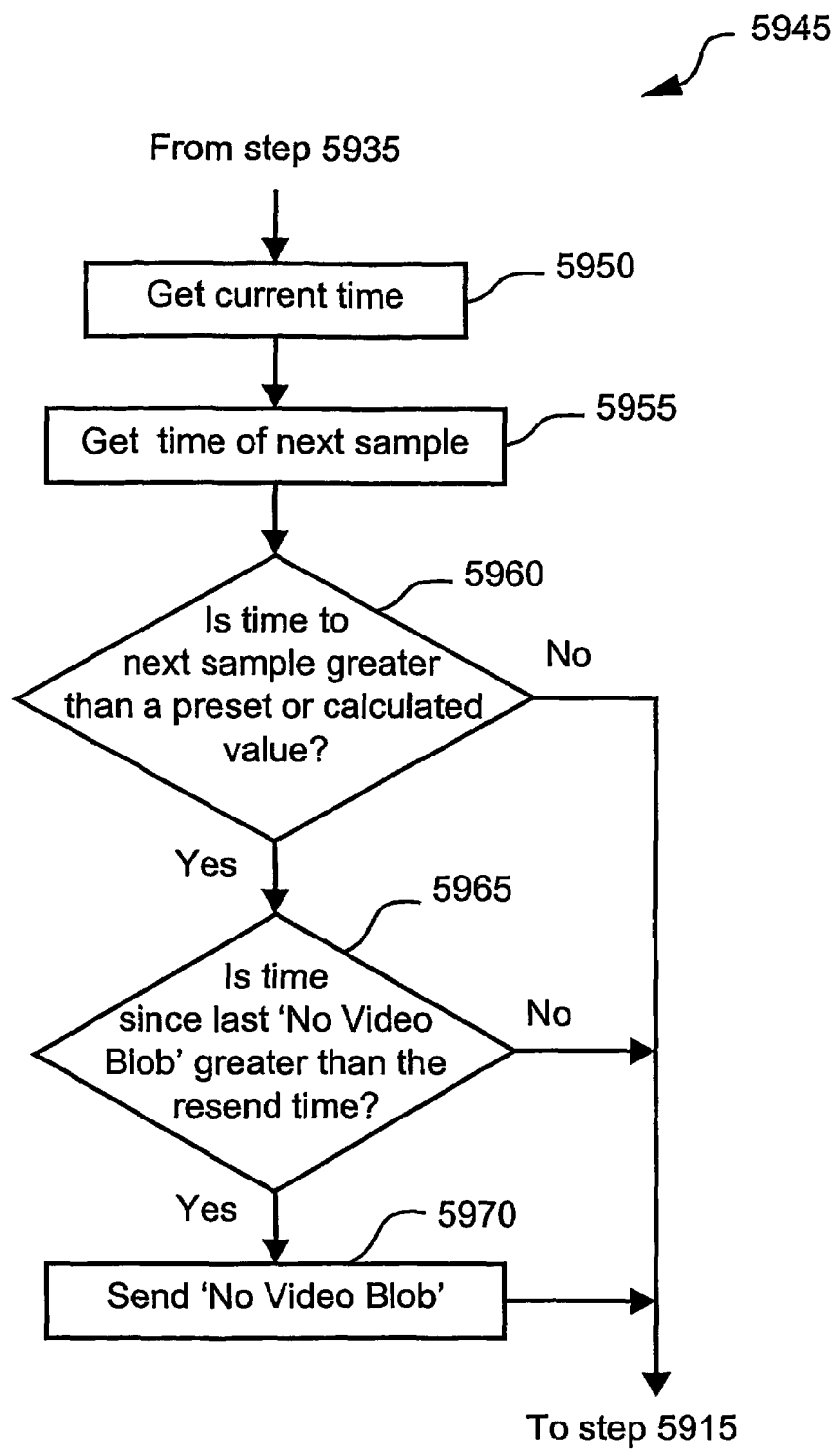
FIG. 59B is a flow diagram showing the steps in the process of FIG. 59A when "no video" blobs are sent.

FIG. 59B shows the substeps performed in step 5945 to determine whether a "no-video" blob should be sent. Step 5945 is preferably implemented as a software application resident on the hard disk drive 2310, with execution being controlled by the processor 2305, as shown in FIG. 23.

In step 5950 the access engine 203 gets the current clock time. Next, in step 5955 the access engine 203 gets the time of the next sample in the media file 1800. Step 5960 determines whether the time to the next sample is greater than the "no-video" threshold value (a preset value or a calculated value as discussed above). If this is the case (i.e., the Yes option of step 5960) then step 5965 does a further check to see whether the time since the last "no-video" blob was sent is greater than the specified "no-video" resend time.

If the elapsed time since the last "no video" blob is greater than the "no-video" resend time (i.e., the Yes option of step 5965) then in step 5970 the access engine 203 sends a "no-video" blob.

If a sample is available within the specified time (i.e., the No option of step 5960) or a "no-video" blob has been sent sufficiently recently (i.e., the No option of step 5965) then control flow proceeds directly to step 5915 to determine whether it is yet time to send the current sample.

Once a "no-video" blob has been sent in step 5970, control flow proceeds to step 5915.

4.5 Connections for Streaming Access

The access engine 203 uses a protocol (known as the access engine protocol) layered on HTTP (HyperText Transport Protocol) to provide access to the video and event data stored in the data files 209. Use of such a protocol allows the data to be accessed when the access engine 203 and the viewers 2200 are on opposite sides of an HTTP proxy Use of the protocol typically allows access from a viewer 2200 to an access engine 203 on a storage server 2300 through a firewall without reconfiguration of the firewall to allow non-HTTP traffic. The protocol is fully compliant to the HTTP 1.1 specification (as publishing by the Internet Engineering Task Force (IETF) in June 1999). A goal of the access engine protocol is to reduce the latency of requesting video and event data as far as possible and also to allow time-sensitive data (such as video) to be given a different priority to data that is less time-sensitive.

Figure 60:
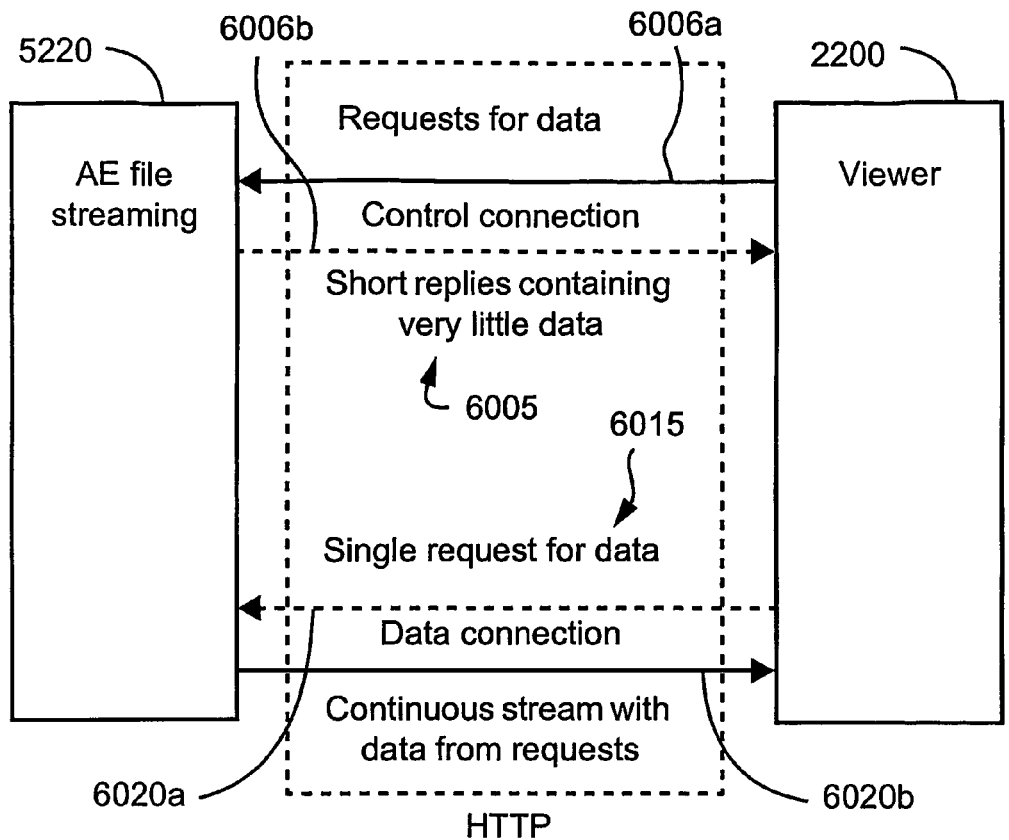
FIG. 60 is a schematic block diagram of the connections between the access engine and a viewer.

FIG. 60 shows the connections between the HTTP streaming interface 5220 of the access engine 203 and the viewer 2200. The connections are made through the web server 213. However, the web server 213 is not shown in FIG. 60. The viewer 2200 can also be referred to as a client.

To access the access engine 203, a viewer 2200 makes two HTTP connections. One is a control connection 6005 and the other is a data connection 6015. The control connection 6005 transmits requests for data 6006a sent from the viewer 2200 to the access engine 203 and replies to the viewer 2200 with short replies 6006b. The replies 6006b are kept short for speed reasons.

The data connection 6015 transmits a single initial request 6020a from the viewer 2200 to the access engine 203, and then supports a continuing stream 6020b that contains data from the data files 209 corresponding to the request made by the viewer 2200.

The control connection 6005 is made and then the viewer 2200 then sends an HTTP GET request down the control connection 6005 containing the necessary information to set up a connection. The file streaming interface 5220 sends a reply 6006b that contains identifying information which includes identifier numbers for both the control connection 6005 and the data connection 6015. These identifiers uniquely identify the connections within the realm of the access engine 203 and are needed because HTTP is a stateless protocol. To provide the required abilities, a knowledge of the current state of the communications is implemented in the access engine protocol (i.e., the protocol includes a session identifier which is included in all messages that are part of the same session).

Next, the viewer 2200 makes the second connection 6015 with the information returned from the set-up command. Unlike the typical HTTP transactions, the data connection 6015 of the viewer 2200 does not end once the reply has ended. Instead, the data connection 6015 is used to send data that is requested via the control connection 6005 and is kept open by regular "keep alive" blobs if no actual data is being sent. The benefit of keeping the data connection 6015 open is that the viewer 2200 is not required to make a new connection every time the viewer 2200 needs to request new video data or to modify an existing video request.

In one implementation, both the control connection 6005 and the data connection 6015 are persistent across multiple requests. In such an implementation, neither the data connection 6015 nor the control connection 6010 should be closed during the life of a session between the viewer 2200 and the access engine 203. The system 100 is tolerant of the control connection 6005 being closed, but the data connection 6015 is required to remain connected for the duration of the session, or the access engine 203 will consider the session ended and will free resources associated with the connection 6015. To ensure that the connections are not closed prematurely by either the operating system or any intermediate proxy server, both the control and data connections 6005, 6015 have "keep alive" messages that are sent periodically. The viewer 2200 is expected to make periodic "keep alive" requests to keep the control connection open. The HTTP Streaming module 5220 also sends "keep alive" requests to keep the data connection open.

Figure 61:
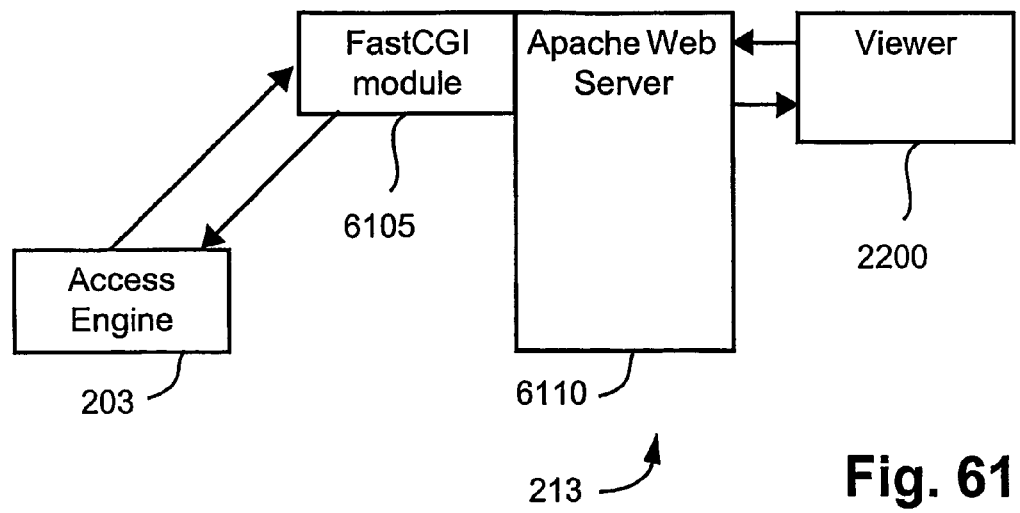
FIG. 61 is a schematic block diagram of one implementation of the connections of FIG. 60.

FIG. 61 shows a particular configuration including the web server 213. The implementation shown in FIG. 61 uses an Apache web server 6110 and a communications library 6105 (FastCGI™). The arrangement of FIG. 61 allows for the details of HTTP communication to be handled by specialised application software and frees the access engine 203 from having to implement an HTTP server. In an alternative implementation the web server is implemented in the access engine 203. Other implementations using different web servers and communications libraries are possible. In all cases the interface and protocol remain substantially the same.

To the viewer 2200, the interface presented by the access engine 203 resembles traditional Common Gateway Interface pages. Each command requests a "resource" on the server 2300 and specifies parameters for the request (using the query part of a Uniform Resource Locator) using the syntax described in RFC 1738 (Uniform Resource Locators) published by the IETF. The format of the commands is given in Appendix B. The file requested for the request is the same for all requests. The parameters are used to decide which command to perform in the access engine 203. In the present description the phrase "connecting to the access engine 203" implies "connecting to the web server 213 and requesting a "resource" from the access engine" (that is, requests include a path that specifies the access engine). In addition, references to "the X command" indicate requesting the access engine resource with the command parameter set to X.

4.5.1 Format of Data Connection

A blob consists of a blob header and optionally one portion of blob data. When blobs are transmitted over a connection, they are transmitted one after the after.

Figure 63:
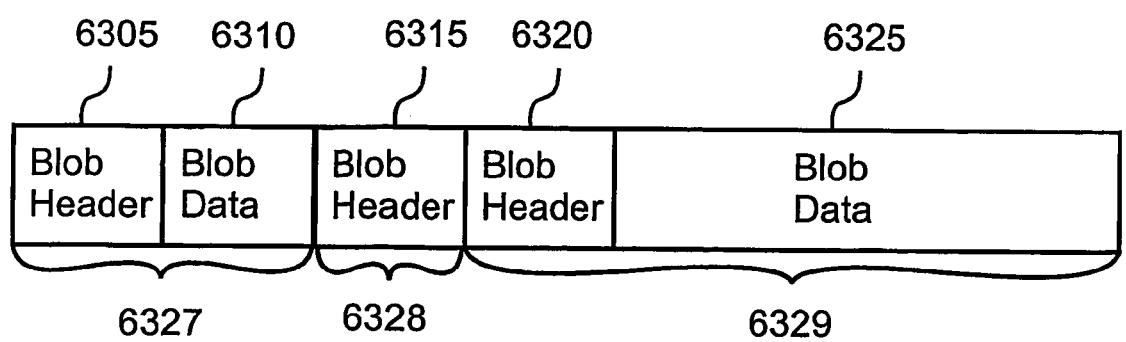
FIG. 63 is a schematic block diagram of the data format of the data stream used in the arrangement of FIG. 60.

FIG. 63 shows an example of the format of some data sent on the data connection 6015. In the example of FIG. 63 a blob header 6305 is followed by associated blob data 6310, followed in turn by a blob header 6315 which does not have associated blob data, followed by blob header 6320 and associated blob data 6325.

The blob header (eg 6305, 6315 and 6320) each consists of a stream identifier, a blob data length value, and a blob type value. The blob data section (eg 6310, 6325) has its own format which is dependent on the type of blob and is described below. If the value of the blob data length is zero, there is no blob data.

Each blob can be part of a larger stream of data (such as a video data sample stream). The stream identifier is an identifier that identifies the stream of which the blob is a part and allows the blobs to be demultiplexed into separate streams by the viewer 2200. The blobs within each stream are sent in order (for example, if the stream is a video stream, the frames are sent in order), and streams may be multiplexed with other streams of data if there are any. The viewer 2200 keeps track of all streams requested. If a viewer 2200 receives a blob of a type the viewer 2200 does not understand, the viewer 2200 ignores the blob.

4.5.1.1 Types of Blob

Appendix A gives a list of the available types of blobs.

An image blob (or video blob) contains a single JPEG image and data specifying the time associated with that image (typically the image acquisition time).

An event blob contains a number of events each separated by a new line character. The event blob structure defines the number of events contained in the blob.

A start blob is the first blob sent via the data connection 6015. The start blob contains the connection ID of the data stream. The stream ID of the blob is set to zero.

A "keep alive" blob is sent to the viewer 2200 after a period of inactivity to prevent intermediate proxy servers closing the data connection 6015 due to time outs. If there is any other activity on the connection such as streaming video, then "keep alive" blobs are not sent. The viewer 2200 should not rely upon "keep alive" blobs for timing information. "Keep alive" blobs have no extra data.

"End stream" blobs are sent when a stream has finished and indicate that the access engine 203 is ending the stream. The viewer 2200 will no longer receive blobs from the stream. All further requests to modify a stream (using the modify video stream command as described in Appendix B) will fail after an end stream blob has been sent.

"Close stream" blobs are sent as the last blob on a data connection. The viewer 2200 can cleanly close the connection once the viewer 2200 has received a close stream blob. Close stream blobs have no extra data.

As described with reference to FIG. 59, "no-video" blobs are sent to the viewer 2200 when there is stored video sample data still to be streamed but no video sample data is available at the current time in the stream.

Reply blobs contain a reply from a command sent on the control connection 6005.

4.5.2 Establishing a Connection between Access Engine and Viewer

Figure 62:
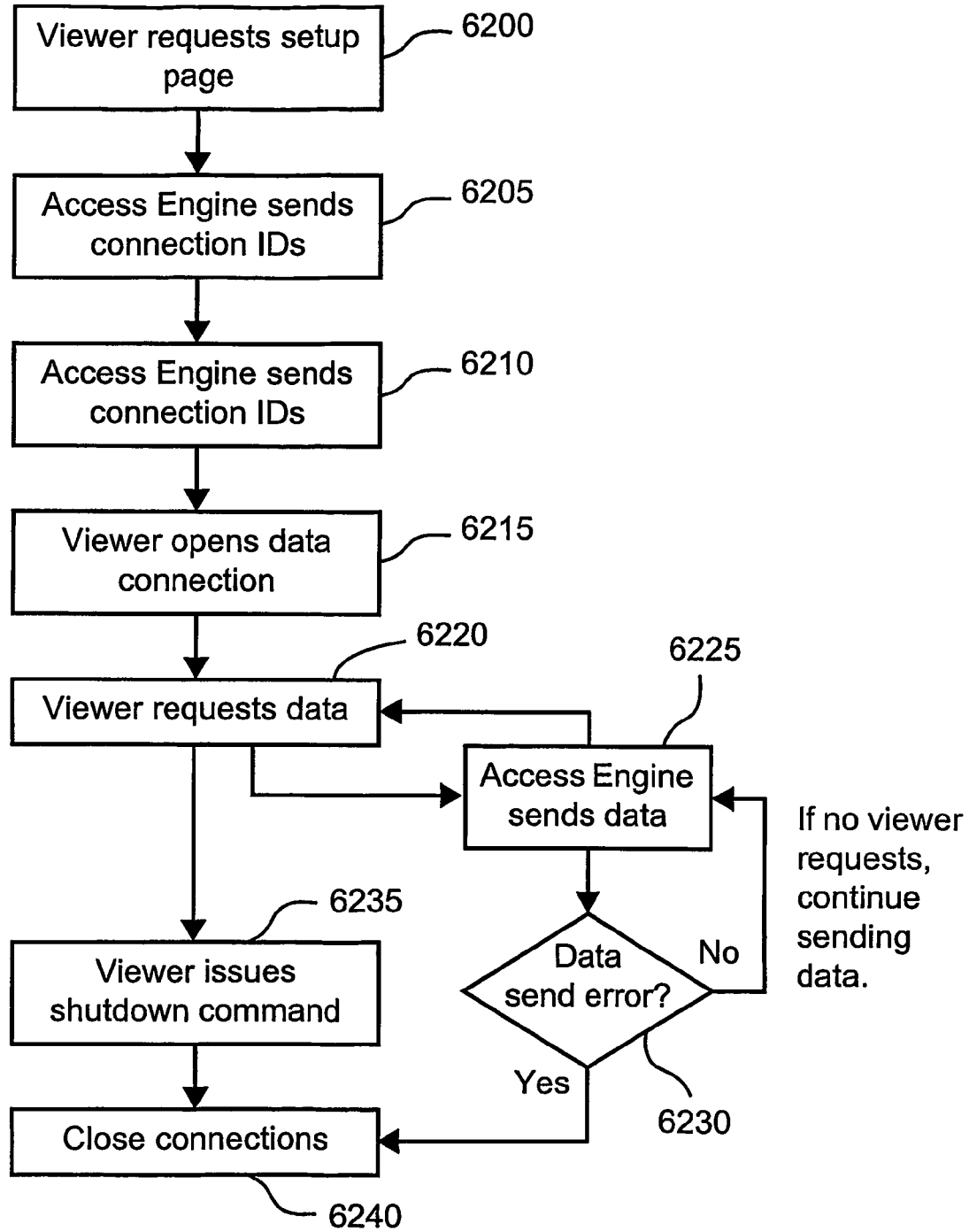
FIG. 62 is a flow diagram of a connection procedure between the viewer and the access engine.

FIG. 62 summarises the procedure for establishing a connection between the viewer 2200 and the access engine 203.

In the initial step 6200 the viewer 2200 connects to the web server 213 and issues a set-up command. This command is passed to the access engine 203. In step 6205 the access engine 203 returns the connection identifier of the control connection 6005, and in step 6210 the access engine 203 sends the connection identifier of the data connection 6015. The identifiers sent by the access engine 203 are unique in the system 100 and are used to identify the source of commands received by the access engine 203 from many potential viewers in the system 100, for example viewers 2200A-D.

Once the control connection 6005 has been established, the viewer 2200 issues a single request to establish the data connection (step 6215). The request for data is the only request that will be made on the data connection 6015. The single request does not end until the viewer 2200 issues a shutdown command (step 6235). If the data connection 6015 is closed at any time other than when a shutdown request is issued by the viewer 2200, the access engine 203 will assume the data connection 6015 has been terminated, and will free all associated resources. This means that the identifiers issued to the control connection 6005 and data connection 6015 are cleared. Accordingly, the viewer 2200 will need to re-issue a set-up request if the viewer 2200 wishes to continue requesting sample data from the access engine 203. Attempting to reconnect and re-use the previous identifiers will generate an error from the access engine 203.

After the data connection 6015 has been established, in step 6220 the viewer 2200 can begin to request video sample data and event records from the access engine 203. Such requests are sent via the control connection 6005. Each request via the control connection 6005 includes the command identifier and the data connection identifier that were returned by the set-up request.

In step 6225 the access engine 203 sends the requested data to the viewer 2200 via the data connection 6015. Step 6230 checks whether data send errors have occurred. If an error has occurred (i.e., the Yes option of step 6230) then in step 6240 the access engine closes the connections 6005, 6015. If there is no data send error (the No option of step 6230), the access engine 203 continues to send data to the viewer 2200.

4.6 Other Information

One advantage of the access engine 203 being a separate software application from the recording engine 201, is that, for a system performing a recording function only, only the recording engine 201 needs to run and this can lead to better recording performance on the storage server 2300. Conversely, if a system needs to perform an access function only (for example if a system is set up to allow viewing of archived video only), only the access engine 203 needs to run and this may lead to better access performance. In one implementation, the access engine 203 runs on a different storage server 2300 from the recording engine 201. In such an arrangement, after the recording engine 201 has closed a set of video and event data files 209 (i.e., after a swap-over), a software application moves the video and event data files from a first storage server 2300A over a network 2220 to a second storage server 2300B. In this arrangement, an access engine 203 runs on the second storage server 2300B and makes video and event data available to viewers 2200. In a still further alternative arrangement, an access engine 203 can be running on the first storage server 2003A serving data from uncompleted (ie active) files and another access engine 203 can be running on the second storage server 2003B serving data from completed files which have been copied over the network 2220 as described above.

5.0 Viewer 5.1 Viewer Overview

The viewer 2200 includes viewer application software resident on the hard disk drive 2205 and being controlled in its execution by the processor 2205. The viewer application software typically executes under a Windows™ operating system. The viewer application software provides local or remote access across the computer network 2220 to both live and recorded sample data (i.e., representing video images and events) captured by the cameras 112-115 and provided over the network by the camera servers 109-111.

The viewer 2200 and the viewer application software resident and executed thereon, will hereinafter be generically referred to as the viewer 2200, excepting where explicitly distinguished.

The viewer 2200 can be used to perform the following functions:

(i) configuration of a local or remote storage server 2300 including registering cameras 112-115, camera servers 109-111 and storage servers 2300 and setting schedules. In this context, a local storage server refers to an implementation where the viewer 2200 and the storage server 2300 are implemented on the same computer module (e.g., computer module 2301). In contrast, a remote storage server 2300 refers to an implementation where the viewer 2200 is executed on a computer module such as the computer module 2201, which is remote from the storage server 2300, as seen in FIG. 1;

(ii) configuration of preferences for the viewer 2200 functions (iii) viewing of live video sample data streams from remote camera servers 109-111, via the computer network 2220, and control of these camera servers 109-111 including pan, tilt, zoom and backlight adjustment of cameras 112-115 associated with the camera servers 109-111;

(iv) viewing of recorded video sample data streams from a local or remote storage server 2300;

(v) viewing of events from a local or remote storage server 2300;

(vi) searching for events from a local or remote storage server 2300; and (vii) initiating of recording to override existing schedules associated with one or more cameras 112-115.

In the following description, a number of screens, (e.g., FIGS. 64 and 65) are shown and described. One or more of the screens (e.g., 6400) are displayed on the display 2214 of the viewer 2200 to a user by the viewer application software, to provide a graphical user interface to a user for performing a number of functions on the system 100. A number of dialog windows or dialogs are also described together with menu items, which are also displayed on the display 2214 by the viewer application software in response to certain user actions. Further, a number of buttons are described which a user can select in order to initiate a response. Such screens, buttons, dialogs and menu items can be selected by a user using a mouse 2203 or other similar device (e.g., trackball, joystick, arrows on the keyboard 2202, etc) in a conventional manner similar to other such screens, dialogs and menu items which typically execute under the Windows™ operating system. However, a person skilled in the relevant art would appreciate that any other suitable operating system can be used to provide a graphical user interface to a user of the system 100 to provide the functions described below.

The viewer 2200 connects to storage servers 2300 via a custom protocol which operates over HTTP. The viewer 2200 connects to camera servers 109-111 using a different custom protocol which operates over HTTP. By operating over HTTP, the system 100 can be used with commonly configured firewalls or other forms of equipment performing a network gateway function without additional configuration of the firewall or gateway. Firewalls and similar gateways are typically configured to allow HTTP traffic to pass while disallowing some other protocols. By the surveillance system 100 sending and receiving all traffic over the computer network 2220 in accordance with the HTTP, the system 100 can be installed without complicated network system configuration.

During installation, an administrator (i.e., a user having administrative rights) can choose to implement the viewer 2200 (i.e., install the viewer application software) on the same computer module as a storage server 2300 (e.g., the computer module 2301) or on a different computer module (e.g., the computer module 2201). A viewer 2200 that is installed on the storage server 2300 can access the storage server 2300 implemented on the same computer module and can also access other storage servers (e.g., 2300A, 2300B, 2300C, 2300D). Other viewers (e.g., 2200A, 2200B, 2200C and 2200D) can also access a storage server 2300 implemented on the same computer module (e.g., the computer module 2201) as the viewer 2200.

The system 100 organises camera servers 109-111 and sensors (not shown) into a hierarchy of named Locations and Zones, enabling a user to search through a large number of video files and event files efficiently. A camera selector can be provided by the viewer 2200 to a user displayed on the display device 2214 with a sorted menu of all camera servers 109-111.

In a viewing window 7600 (see FIG. 76) provided on the display device 2214, viewports can be added, removed, repositioned and resized whilst the viewports are executing. Different video windows (e.g., 7625 of FIG. 76) displayed on the display 2214 can include a mixture of live video sample data streams and playback of recordings from video files stored on the hard disk drive 2210 or the hard disk drive 2310 of the storage server 2300. Video window layouts that contain useful viewing combinations can be saved on the hard disk drive 2210 for later reuse.

As will be explained in detail below, in an events view provided on the display device 2214 by the viewer 2200, an interactive timeline 7607 (see FIG. 76) presents a filterable view of events that have occurred within a predefined time range. A user can select an event (e.g., 8919) from the timeline 7607, and a segment of video sample data surrounding that event can be automatically played.

5.2 Viewer Startup and Login

When the viewer 2200 is started, a dialog window is displayed on the display device 2214. The dialog window typically contains information about the viewer application software and a "cancel" button. While the dialog is displayed the viewer 2200 attempts to connect to a master storage server (MSS) (e.g., any one of the storage servers 2300A, 2300B, 2300C or 2300D). The master storage server will be herein referred to as the master storage server 2300A. The master storage server 2300A is the storage server from which the viewer 2200 retrieves various settings for the system 100 (such as information about cameras 112-115, camera servers 109-111, Zones, Locations and video window layout information). These settings are referred to as network video recorder configuration data.

The first time that the viewer 2200 is executed, the viewer 2200 automatically attempts to connect to the host "localhost" on the same computer module 2201 as the viewer 2200 is being executed. "localhost" is the name typically used to refer to a hostname which resolves to the same computer module (e.g., 2201) that the viewer application software is executing on.

Clicking the cancel button closes the dialog window and launches a "connect to master storage server dialog" window. The connect to master storage server dialog window allows the user to change the hostname or IP address that is used to access the master storage server 2300A and to change the port number that is used to access the master storage server 2300A. The connect to master storage server dialog window also includes a "connect button" and a "cancel button". If the user selects the "connect button", the viewer 2200 attempts to connect to the specified master storage server 2300A using the specified port number.

Clicking cancel on the connect to master storage server dialog window closes the dialog window and causes the viewer 2200 to exit.

The attempt to connect to the master storage server 2300A by the viewer 2200 involves the viewer 2200 sending an NVR_UserGet command to the master storage server 2200A to get network video recorder configuration data, as described above. The network video recorder configuration data is typically stored on the master storage server 2200A as a file named "config.cui.SS" and contains the set of known storage servers 2300 and camera servers 109-111, and relating camera servers 109-111 on these known storage servers 2300 to a set of Zones and Locations as will be described in detail below.

The structure of the network video recorder configuration data is as follows:
  Version of file format
  A list of Locations, each entry containing a name, a list of Zones within that Location, each Zone entry containing a list of camera identifiers each of which contains data associated with that camera
  A list of storage servers, each storage server entry containing data associated with that storage server, a list of camera servers associated with that storage server, each camera server entry containing a list of cameras associated with that camera server
  A list of camera servers not associated with any storage server, each entry containing a list of cameras associated with the camera server
  An example configuration file is as follows:

---

V1.1
[Location 1] Sydney
%[Zone 1] Bronte: 111111, 222222, 333333
%[Zone 2] Coogee: 444444
[Location 2] Melbourne
%[Zone 1] St Kilda: 555555
[Storage Server 1]
%Name: cupboard; Hostname: server; Port: 80
%[Camera Server 1]
%%Name: koal; Hostname: koal; Port: 80; Username: root; Password: VB
%%Remote Hostname: koal; Remote Port: 80
%%[Camera 1]
%%%Name (English): koal1; Name (Japanese): jkoal2; Camera ID: 111111
%%%Cam #: 1; Drive: D:; Thumbnail: abbbbba123212412434... (hexadecimal data)
%[Camera Server 2] ...
[Camera Server S]...// camera server not associated with a storage server

---

The NVR_UserGet command is constructed and sent to the master storage server 2300A as a request using the HTTP Get method as described above. To send the message, the viewer 2200 attempts to connect to the specified hostname or IP address with the specified port and sends an HTTP GET message for the following resource (14):

/webview-nvr/nvr_userget.fcgi?file=config      (14)

If the master storage server 2300A has not been configured to require authentication, the HTTP server on the master storage server 2200A will return the network video recorder configuration data to the viewer 2200. In this case, a login dialog window described below would not be shown to the user and the viewer 2200 would be presented with a viewing screen 7600, which will be described in detail below with reference to FIG. 76.

However, typically the master storage server 2300A is configured so that HTTP Authentication is required to access the network video recorder configuration data on the master storage server 2300A. In this instance, the attempt to retrieve the network video recorder configuration data results in a HTTP "Authentication Required" message being sent from the master storage server 2300A to the viewer 2200. This message contains the value for a realm specified for the system 100 (for example, "COMPANYNAME"). If HTTP Digest Authentication is being used, a nonce (that is, a random string) is also included in the message.

When the viewer 2200 receives an "Authentication Required" message for a first time a login dialog window is presented to the user on the display device 2214. The login dialog window typically includes fields for "User name" and "Password", a "login" button and a "cancel" button. A user typically enters a user name and password details and selects the login button. In response, a login process is executed by the processor 2205. If the user selects on the cancel button of the login dialog window, the viewer 2200 terminates.

If the viewer 2200 is unable to connect to the specified master storage server 2300A (e.g., if no host is found with the specified hostname or IP address and port number, or if that host has not been configured as a storage server 2300), the user is presented with a dialog (i.e., a "failed" dialog) containing a message indicating that the viewer 2200 failed to connect. The failed dialog additionally contains editable fields for the "hostname or IP address" and the port number as well as connect and cancel buttons. The failed dialog initially has these values set to current values set for the viewer 2200 and which have been used in the failed attempt to connect. The user can modify these values and try connecting to an alternative storage server (e.g., 2300A, 2300B, 2300C or 2300D) by selecting a "connect" button of the failed dialog window. Alternatively, the user can select a "cancel" button of the failed dialog window which will cause the viewer 2200 to exit.

When a user selects the login button of the login dialog window, the previously entered user name and password are used to modify a previous HTTP message for retrieving the network video recorder configuration data. If the web server 213 on the storage server 2300 is configured to use HTTP Basic Authentication, the username and password are included in the new message which is sent from the viewer 2200 to the web server 213. If the storage server 2300 is configured to use HTTP Digest Authentication, the viewer 2200 generates a checksum (e.g., using MD5) from a collection of the nonce sent by the web server 213, the user name, password, HTTP method, and resource in the request. This checksum is included in the new message (as are the HTTP method, resource requested and user name). When the web server 213 receives the new message, the web server 213 attempts to authenticate the user using the information in the storage server user file. The web server 213 does this by applying the same checksum technique to the same collection of information (that is, the nonce that was sent to the viewer 2200, the user name, password and realm from the storage server users file, the HTTP method being used and the resource being requested.) If the authentication is successful, the request succeeds and the network video recorder configuration data is returned by the web server 213.

According to the typical configuration of a storage server 2300, authentication of the type discussed above is required for all transactions with the web server 213. This includes all requests through the web server 213 and includes requests to access and set data to the recording engine 201, queries (including queries for video or event data) to the access engine 203 and also includes requests for manual recording sent to the recording engine 201. After the user has entered the password, the authentication information (which is username and password where HTTP Basic Authentication has been configured on the web server 213 and the checksum where HTTP Digest Authentication has been configured) would typically be included in all subsequent messages to the same storage server 2300. The policy for length of time or number of transactions between a request for authentication would typically be configured for the web server 213.

When the viewer 2200 receives the network video recorder configuration data, the viewer 2200 creates a copy of this data within memory 2206. The viewer 2200 uses this configuration data in memory when modifications are made to the configuration when the user is using the Storage and Camera Server Summary screen.

After the viewer 2200 has received the network video recorder configuration data, the viewer 2200 formulates additional HTTP messages to retrieve "shared video windows layouts data" and "personal video window layouts data" from the hard disk drive 2310 of the master storage server 2300A.

Shared video window layouts data and personal video window layouts data are data relating to, respectively, the shared video window layouts and personal video window layouts that are available for laying out video windows (e.g., 7605) on the viewing screen 7600 provided by the viewer 2200 and being displayed on the display device 2214. The video window layouts data includes data specifying the type of layout (e.g., whether the layout is an alignment grid, small grid, medium grid or no grid) and, for each video window (e.g., 7625) on a video window layout area 7605 (see FIG. 76), data specifying the position, size and camera 112-115 associated with that video window (e.g., 7625).

The shared video window layouts data is typically stored on the master storage server 2300A as a file named "playout-.cui.SS" and the personal video window layouts data is typically stored on the master storage server 2300A as a file named "ulayout.cui.[username].SS" where [username] is the name of the user as entered on the login dialog window and passed to the storage server 2300A as a header in the HTTP message (eg for a user "bob", the header would be "username: bob").

The structure of the layout data is as follows:
Version of file format
A list of layouts and folders of layouts where layouts within a folder are represented nested within the folder that they are in. For each layout, there is a name and grid type and a list of camera ids, position, and size.
An example layout file is as follows:

```
V1.1
[Layout 1]
%Name: Carpark
%Gridtype: alignment
%Window: x: 24; y:26; width:320; height 240; camera:111111
%Window: x: 38; y:128; width:320; height 240; camera:222222
[Layout Folder 1]
%Name: Andrew's layouts
%[Layout 2]
%Name: Kitchen
%Gridtype: none
%Window: x: 23; y:25; width:320; height 240; camera:333333
%Window: x: 38; y:127; width:320; height 240; camera:444444
%[Layout 2]...
```

Shared video window layouts are created by an administrator and can be read by any user. Shared video window layouts can only be modified by administrators (i.e., a user with administrative rights). Personal video window layouts are associated with a specific username and can only be read, created or modified by a user who has logged in with that user name.

To get the shared video window layouts, the viewer 2200 sends another NVR_UserGet command as a request using the HTTP Get method to the master storage server 2300A. In this instance, the viewer 2200 attempts to connect to the specified hostname or IP address with the specific port and sends an HTTP GET message on the following resource (15):

/webview-nvr/nvr_userget.fcgi?file=ulayout  (15)

The recording engine 201 on the master storage server 2300A, as described above, processes the GET message received from the viewer 2200, reads a file containing the shared video window layouts (i.e., "shared layouts file") configured within the hard disk drive 2310 and returns the data from the shared layouts file to the viewer 2200 via the computer network 2220.

The personal video windows layouts are accessed in a similar manner by sending a message on the following resource (16):

/webview-nvr/nvr_userget.fcgi?file=playout  (16)

In the case of the personal video window layouts, the recording engine 201 on the master storage server 2300A, as described above, processes a GET message received from the viewer 2300, constructs a filename based on the username used in the request, reads a file containing the personal video window layouts (i.e, the "personal layouts file") configured within the hard disk drive 2310 and returns the data from the personal layouts file to the viewer 2200, via the computer network.

If the viewer 2200 is able to connect and login to a master storage server 2300A (i.e., including if the master storage server 2300A is the implemented on the same computer module as the viewer 2200), then the user is presented with the viewing screen 7600, which will be described below.

5.3 Viewer Menus

Figure 64:
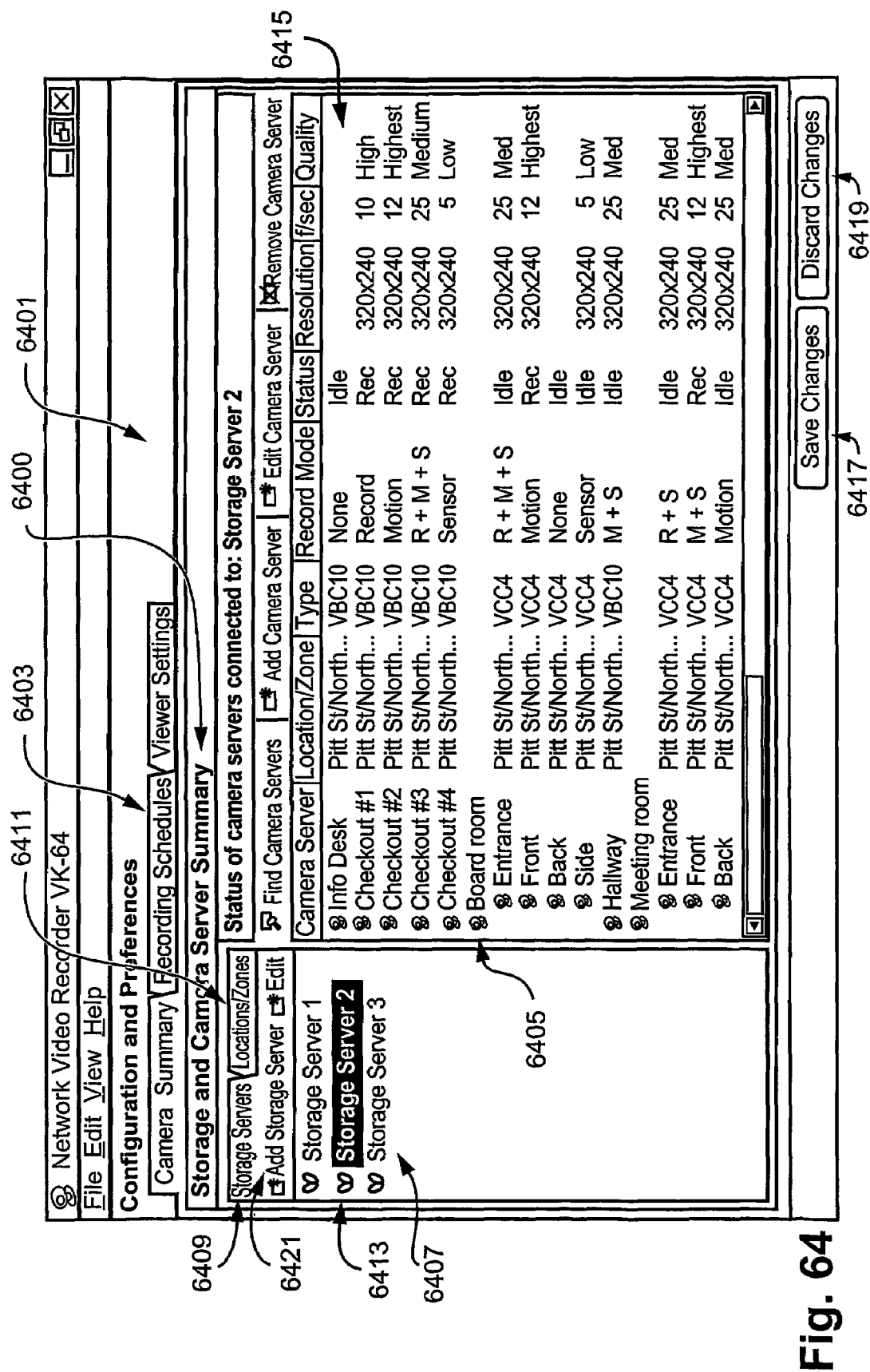
FIG. 64 shows a storage and camera server summary of a configuration and preferences screen.

The viewer 2200 provides a user interface displayed on the display device 2214 and which includes two main screens. The first screen is a "configuration and preferences" screen 6401, as shown in FIG. 64, and the second screen is the viewing screen 7600 as seen in FIG. 76.

A common set of application menu items are available from both the "configuration and preferences" screen 6401 and the viewing screen 7600. These common menu items are as follows:

(i) A "File" menu containing an item "Exit";
(ii) An "Edit" menu containing items "Delete", "Cut", "Copy", "Paste" and "Select All";
(iii) A "View" menu containing the items "Viewing screen", "Configuration" and "Live Events Log"; and
(iv) A "Help" menu containing the item "About"

The menu items are described below.

5.3.1 Exit

The Exit item closes the viewer application software.

5.3.2 Delete

In the viewing screen 7600, the Delete item deletes selected video windows (e.g., 7625) from a current layout of video windows on the viewing screen 7600 being displayed on the display device 2214. In other dialogs provided by the viewer 2200 referred to as "Storage" and "Camera Server Summary" dialogs, the Delete item is used to delete storage servers 2300, Locations, Zones or camera servers 109-111. In a "recording schedule" dialog 6403, the Delete item deletes selected recording schedule items from a normal schedule or special day recording schedules. The Delete item is disabled unless a particular item displayed on the display 2214 that can be deleted is selected.

5.3.3 Cut

In the viewing screen 7600, the Cut menu item removes a selected video window (e.g., 7625) from the layout and places a copy in a clipboard to be pasted into the same or another layout. The Cut menu item is disabled if there are no video windows selected in the viewing screen 7600. In a recording schedules dialog 6403 of the configuration and preferences screen 6401, the Cut menu item is disabled.

5.3.4 Copy

In the viewing screen 7600, the Copy menu item places a copy of the selected video window (e.g., 7625) in the clipboard. The Copy menu item is disabled if there are no video windows selected in the viewing screen 7600. In the recording schedules dialog 6403 of the configuration and preferences screen 6401, the copy menu item is disabled.

5.3.5 Paste

In the viewing screen 7600, the Paste menu item pastes a video window (e.g., 7625) in the clipboard into the current layout. The Paste menu item is disabled unless a video window (e.g., 7625) has been cut or copied. In the recording schedules dialog 6403 of the configuration and preferences screen 6401, the Paste menu item is disabled.

5.3.6 Select All

In the viewing screen 7600, the Select All menu item selects all video windows in the current layout. In the recording schedules dialog 6403 of the configuration and preferences screen 6401, the select all menu item is disabled.

5.3.7 Viewing Screen

The Viewing Screen menu item changes the view to the viewing screen 7600. The Viewing Screen menu item is only active when the user is currently in the configuration and preferences screen 6401.

5.3.8 Configuration

The Configuration menu item changes the view to a camera summary dialog 6400 of the configuration and preferences screen 6401. The Configuration menu item option is only active when the user is in the viewing screen 7600.

5.3.9 Live Events Log

In the viewing screen 7600, the Live Events Log menu item opens a live events log 7619, as seen in FIG. 76, at the position and size that live events log 7619 was last open at. If the live events log 7619 is already open, the live events log 7619 is displayed with a tick next to the Live Events menu item. Selecting the Live Events Log menu item when the live event log 7619 is already open will close the live events log 7619 and remove the tick.

5.3.10 About

The About menu item opens an "About" dialog which provides product information to the user. The About menu item has an "OK" button which the user can select to dismiss the About dialog.

5.4 Viewer and Configuration Preferences

The configuration and preferences screen 6401 is only accessible to administrators (i.e., users with administrative rights). To access the configuration and preferences screen 6401, users select the Configuration menu item from a View menu. If the user does not have administrator privileges, the Configuration menu item is disabled in the Configuration menu. The configuration and preferences screen 6401 is used for configuring one or more storage servers 2300 and for setting local preferences. Such storage servers 2300 can be implemented on the local computer module 2201 being used, on another computer module (e.g., the computer module 2201) on a local area network (LAN), or a remote computer module on the network 2220.

The configuration and preferences screen 6401 is used for:
 (i) Registering storage servers 2300 and camera servers 109-111 with the system 100;
 (ii) Setting recording schedules for camera servers 109-111 including specifying events for triggering recording; and
 (iii) Configuring viewer settings.

The configuration and preferences screen 6401 typically has a tabbed interface as shown in FIG. 64. When entering the configuration and preferences screen 6401, the viewer 2200 attempts to connect to all known storage servers 2300 as specified in the network video recorder configuration data retrieved from the master storage server 2300A. The viewer 2200 does this by attempting to authenticate to the web server 213 on each storage server 2300 using the same user name and password which were entered in the login dialog. If the viewer 2200 cannot connect to a storage server 2300, a connection warning is displayed.

5.4.1 Storage and Camera Server Summary

A storage and camera server summary 6400, as shown in FIG. 64, of the configuration and preferences screen 6401 allows administrators to view a summary of all storage servers 2300 and camera servers 109-111 known to the system 100. The storage and camera server summary 6400 also allows users to modify a list, configured within the memory 2206, of the storage servers 2300 or camera servers 109-111 known to the system 100.

Using the storage and camera server summary 6400 dialog, camera servers 109-111 can be registered and can be associated with a specific storage server 2300 on which the sample data from the camera server 109-111 will be recorded. In addition, the camera servers 109-111 can be associated with specific locations and zones.

The viewer 2200 uses the concepts of locations and zones to allow the camera servers 109-111 known to the system 100 to be organised in a hierarchical structure. Using such a hierarchical structure multiple locations can be set up, each of which contains any number of Zones. Each Zone can contain any number of camera servers 109-111.

A Location may be set up to correspond with a specific physical location (e.g., one Location may be "Sydney Office" and another Location could be "Melbourne Office"). Zones may be set up to refer to specific physical zones within a Location (e.g., one Zone may be "Level 5" and another Zone may be "Level 7").

Although, the Locations and Zones may be used as described above, Locations and Zones can be used in any way that an administrator chooses to use them in order to create a hierarchy of camera servers 109-111. For example, an administrator can configure Locations to refer to a specific country and Zones to refer to a specific city in that country. As another example, if all camera servers 109-111 are in one building, an administrator can choose to configure the Locations and Zones such that Locations refer to levels of the building and Zones refer to areas within each level.

The hierarchical structure of Locations and Zones is independent of the hierarchical structure whereby specific storage servers 2300 have a number of camera servers 109-111 associated with them for recording. For example, a specific storage server 2300 can have multiple camera servers 109-111 associated with the storage server for recording, where these camera servers 109-111 are associated with different Zones or even Locations. For example, in a configuration where each Location is associated with a specific country, a storage server 2300 can be configured to record sample data from camera servers 109-111 which are in different countries and have been configured to be in different Zones. Similarly, a specific Zone can consist of camera servers 109-111 which are each recorded to a different storage server 2300.

In the storage and camera server summary dialog 6400, a user is able to view a list of camera servers 6405 either according to the storage server hierarchy or according to the Locations and Zones hierarchy. On the left side of the dialog 6400 is a tabbed panel 6407 with a "Storage Servers" button 6409 and a "Locations/Zones" button 6411.

When a user clicks on the Storage Server button 6409, a Storage Servers dialog is shown. By selecting a specific storage server (e.g., 6413) in the left hand panel 6407, the list of camera servers 6405 associated with that storage server 6413 are displayed in the right hand panel 6415. When the Storage Server dialog is showing, the administrator can register or remove storage servers 2300.

Figure 65:
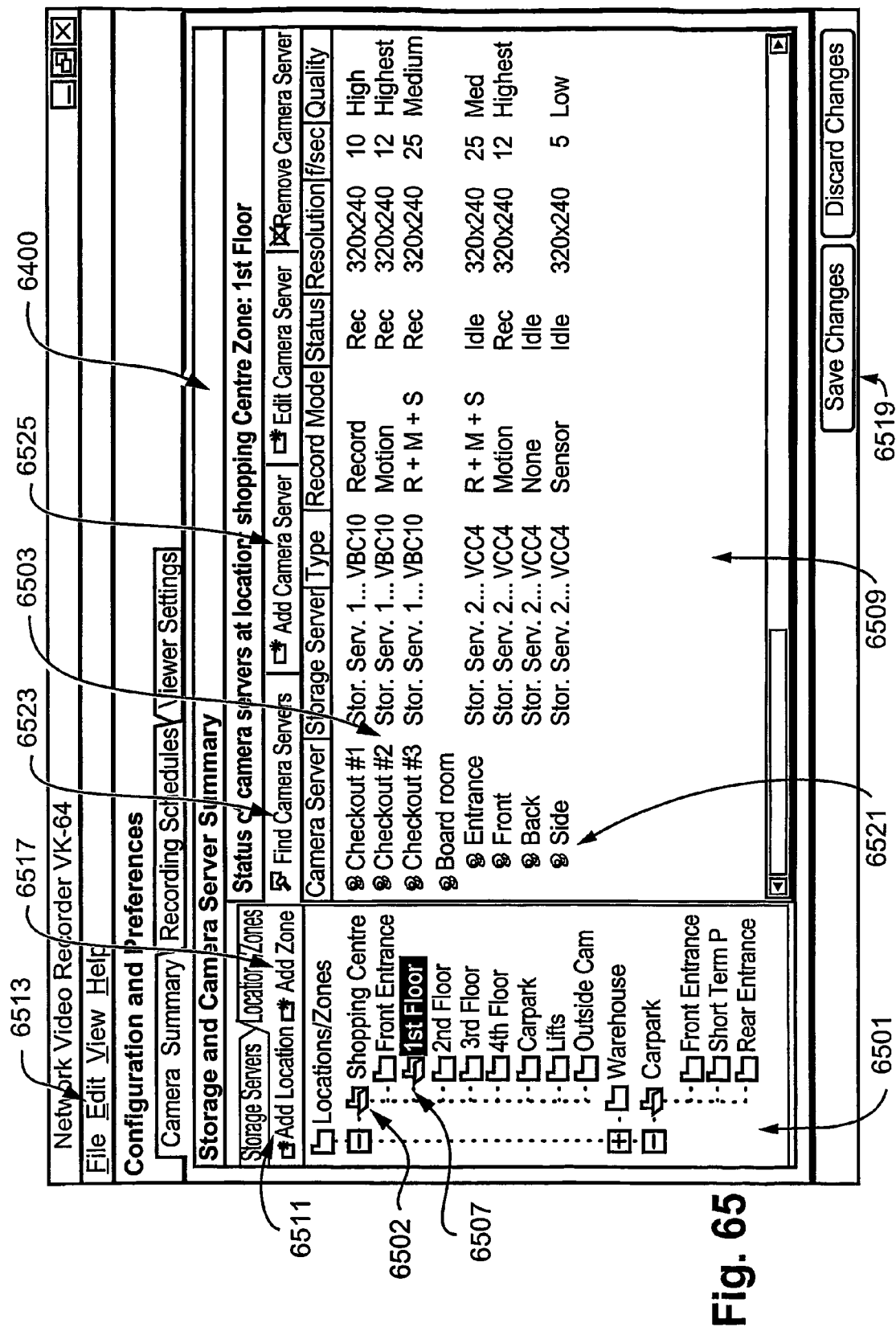
FIG. 65 shows the dialog of FIG. 64 showing a number of locations associated with storage servers.

Similarly, as seen in FIG. 65 when a user selects on the Locations/Zones button 6411 of the storage and camera server summary window 6400, a Locations/Zone dialog is shown. By selecting a specific Location (e.g., Shopping center 6502) in the left hand panel 6501, a list of camera servers 6503 associated with all Zones in that Location (i.e., Shopping center 6502) are displayed in the right hand panel 6509. By selecting a specific Zone (e.g., $1^{st}$ Floor) 6507 in the left hand panel 6501, the camera servers 109-111 associated with that Zone are displayed in the right hand panel 6509. The hierarchical display of Locations and Zones is typically displayed using a conventional tree user interface element such that double clicking on an unexpanded Location element expands that element by showing the Zones that are within that Location. Similarly, double clicking on an expanded Location hides the Zones that are within that Location.

From a Camera Server summary dialog, which is displayed when either the Storage Server or Location/Zone dialog is active, users can search for camera servers 109-111 not already registered on the system 100 and add, edit or delete a camera server 109-111 listing.

The camera server list 6405 displays the following:
(i) camera server name;
(ii) storage server name (i.e., if the Location/Zone dialog is active) or location/zone (i.e., if the Storage Server dialog is active);
(iii) type of camera server, recording status (i.e., idle or recording);
(iv) recording mode (i.e., if recording);
(v) resolution;
(vi) frames per second; and
(vii) recording quality.

Once changes have been made to the list 6405 of known storage servers and camera servers, a "Save Changes" button 6417 can be selected to save the changes to the master storage server 2300A. If the user tries to go to another dialog or back to the viewing screen 7600 before saving, the user is prompted to save with a dialog.

Modifications made, including adding and removing storage servers 2300 and camera servers 109-111 and modifying properties thereof, are initially performed on data structures configured within the memory 2206 of the viewer 2200 which hold the configuration data as described earlier. Changes are not made to the data on the master storage server 2300A or other storage servers (e.g., 2300A, 2300B, 2300C or 2300D) until the Save Changes button 6417 is selected.

When the Save Changes button 6417 is selected, the viewer 2200 constructs an NVR_AdminSet command, as described above, and sends the NVR_AdminSet to the master storage server 2300A as a request using the HTTP POST method as described above. To send such a request, the viewer 2200 attempts to connect to the hostname or IP address of the master storage server 2300A with the specified port and sends an HTTP POST message for the following resource (16):

/webview-nvr/nvr_adminset.fcgi?file=config    (16)

This message includes the new network video recorder configuration data which has been generated from the configuration data stored in memory 2206 and which is sent as part of the POST message to the web server 213 and passed to the recording engine 201 which writes the configuration data to disk 2310.

If an administrator selects a Discard Changes button 6419 displayed on the storage and camera server summary dialog 6400, the changes that have not been committed to a master storage server 2300A are discarded from local memory 2206.

5.4.1.1 Adding and Removing Storage Servers

When a user selects on an "Add Storage Server" button 6421, a dialog is displayed on the display 2214 which allows the user to enter the hostname or IP address of the storage server 2300 and the port number for accessing the storage server 2300. An Add Storage Server dialog also contains an "OK" button and a "cancel" button. If the user selects the OK button, the viewer 2300 attempts to connect to the hostname or IP address using the specified port. If such a connection is unsuccessful, an error message is displayed on the display device 2214. If the user selects the cancel button, the operation is cancelled and the dialog is dismissed.

Although the term "adding" is used, the action can be more accurately described as "registering" a storage server 2300 with the system 100, since in order to "add" a storage server 2300, the corresponding storage server 2300 is already connected to the network 2220 and is already configured as a storage server 2300.

Storage servers 2300 are removed (i.e., unregistered) by selecting the storage server 2300 to be removed from a corresponding Storage Server dialog and selecting Delete from an Edit application menu or selecting the delete key on the keyboard 2202. A Confirmation dialog is displayed with the option to continue deleting the corresponding storage server 2300 by selecting a "Yes" button or cancel the operation by selecting a "No" button.

Removing a storage server 2300 deletes the storage server 2300 from a list of known storage servers in the configuration data within memory 2206. As mentioned above, when the save changes button 6417 is selected by the user, the network video recorder configuration data is generated from the configuration data in memory 2206 and sent to the storage server 2300 in a NVR_AdminSet message and written to hard disk drive 2310 of the master storage server 2300A. If the removed storage server was running when removed from the list configured within the hard disk drive 2210, the storage server 2300 will continue running as before. A removed storage server can be re-added to the system 100 with all corresponding associations to camera servers still present. The removed storage server can also be added to the list of known storage servers in the configuration data in memory 2206.

5.4.1.2 Adding, Editing and Deleting Locations

When a user selects an "Add Location" button 6511 on the storage camera server summary 6400, as seen in FIG. 65, a dialog is displayed which allows the user to enter a name for the location to be added. The dialog also contains an "OK" button and a "Cancel" button.

Locations are required to be unique. If a user tries to add a Location using a name that already exists, the user is given a warning and asked to use a different name. There is no fixed limit on the number of Locations that can be added.

When the user selects an OK button, the Location is added in the configuration data stored within the memory 2206 of the viewer 2200. The change of configuration is updated to the master storage server 2300A when a "Save Changes" button is selected.

Locations are edited by double clicking on the name of a Location in the storage and camera server summary dialog 6400 and editing the settings in an Edit Location dialog. The Edit Location dialog is the same dialog as the Add Location dialog except that the Edit Location dialog uses the title "Edit Location".

Locations are deleted from the storage and camera server summary 6400 by selecting the name of the Location in the Locations/Zone dialog and selecting Delete from the Edit application menu 6513 or selecting the delete key on the keyboard 2202. Locations preferably do not have any Zones associated with the Locations when the Location is deleted. If the user tries to delete a Location that contains Zones, the user is given a warning on the display 2214 asking the user to delete the Zones first.

5.4.1.3 Adding, Editing and Deleting Zones

When a user selects an "Add Zone" button 6517, a dialog is displayed which allows the user to enter a name for the Zone. The Add Zone dialog contains a pull-down menu for selecting a Location within which to put the Zone to be added. The pull-down menu contains a list of all known Locations of camera servers 109-111 connected to the network 2220. The Add Zone dialog also contains an "OK" button and a "Cancel" button.

Zones are required to be unique within a location. If a user tries to add a Zone using a name that already exists in the corresponding Location, the user will be given a warning and asked to use a different name. There is no fixed limit on the number of Zones that can be added to a Location. There may be Zones with the same name, which are within different Locations (eg a Location "Sydney" may have Zones "Level5" and "Level7" and a Location "Melbourne" may have Zones "Level5" and "Level7". There is no relationship in the system 100 between Zones with the same name, but within different Locations.

When the user selects OK on the Add Zone dialog, the Zone is added in the configuration data stored within the memory 2206 of the viewer 2200. The change of configuration is updated to the master storage server 2300A when a Save Changes button 6519 is selected by the user as seen in FIG. 65.

Zones are edited by double clicking on the name of the Zone (e.g., 6521) to select the Zone and then editing the settings of the selected Zone in an Edit Zone dialog. The Edit Zone dialog is the same dialog as the Add Zone dialog except that the Edit Zone dialog uses the title Edit Zone.

Zones are deleted by selecting the name of the Zone in the Locations/Zone dialog and selecting Delete from the edit application menu 6513 or selecting a delete key on the keyboard 2202. Zones do not have any camera servers 109-111 in them when deleted. If the user tries to delete a Zone that contains camera servers 109-111, the user is given a warning asking the user to associate the camera servers 109-111 with another Zone or delete the associated camera servers 109-111.

5.4.1.4 Finding Camera Servers

Figure 66:
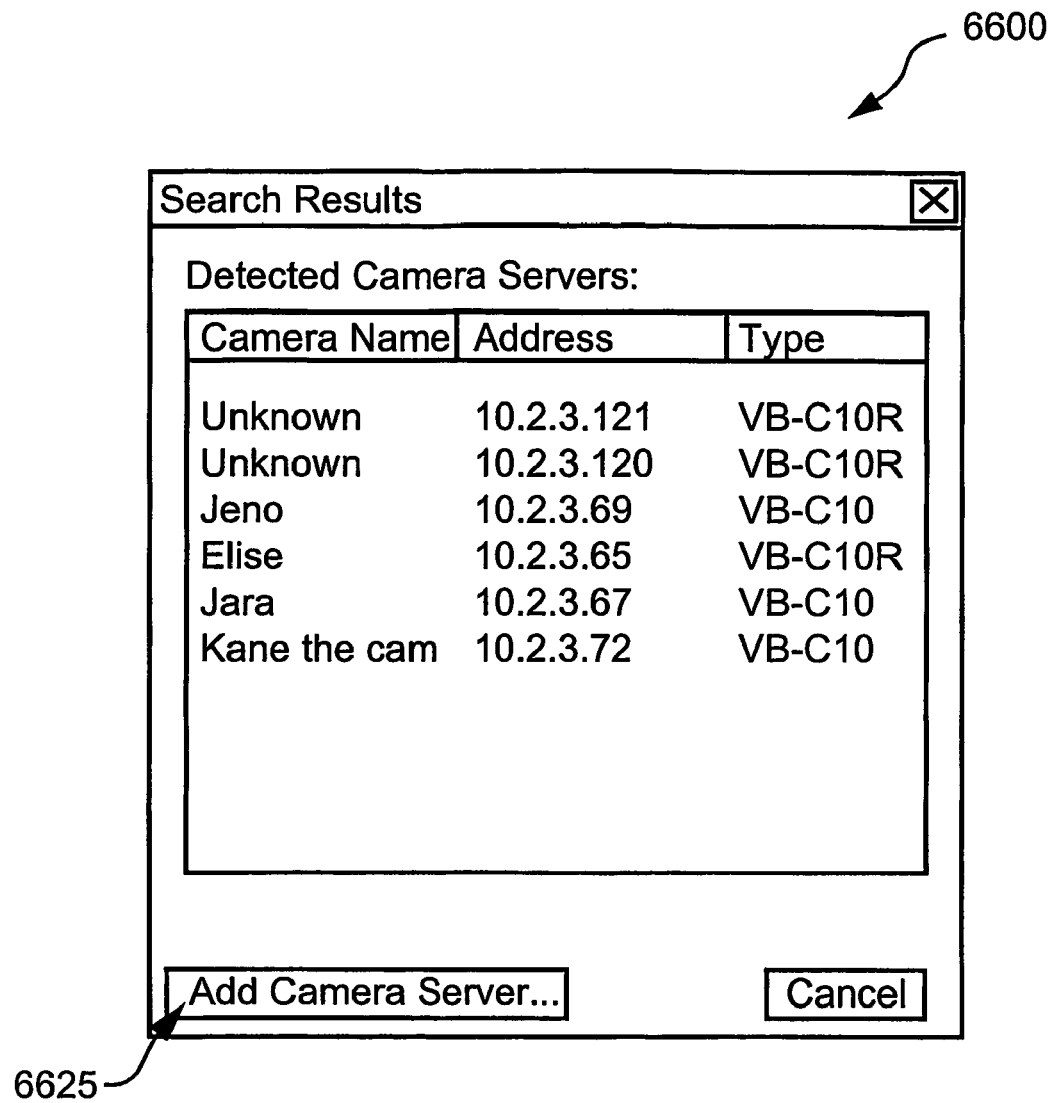
FIG. 66 shows a search results dialog which is displayed by the viewer.

When a find camera server button 6523, as seen in FIG. 65, is selected by the user, the viewer 2200 sends a broadcast message onto the network 2220. Any camera server 109-111 on the network 2220 which is configured to respond to such a broadcast message will respond to the viewer 2200. After the broadcast message has been sent by the viewer 2200, the viewer 2200 displays a search results dialog 6600, as shown in FIG. 66, on the display 2214. When a camera server 109-111 responds to the broadcast, the viewer 2200 places the name, IP address and type into a list within the dialog 6600. The result is a list of all of the camera servers 109-111 connected to the network 2220.

Figure 67:
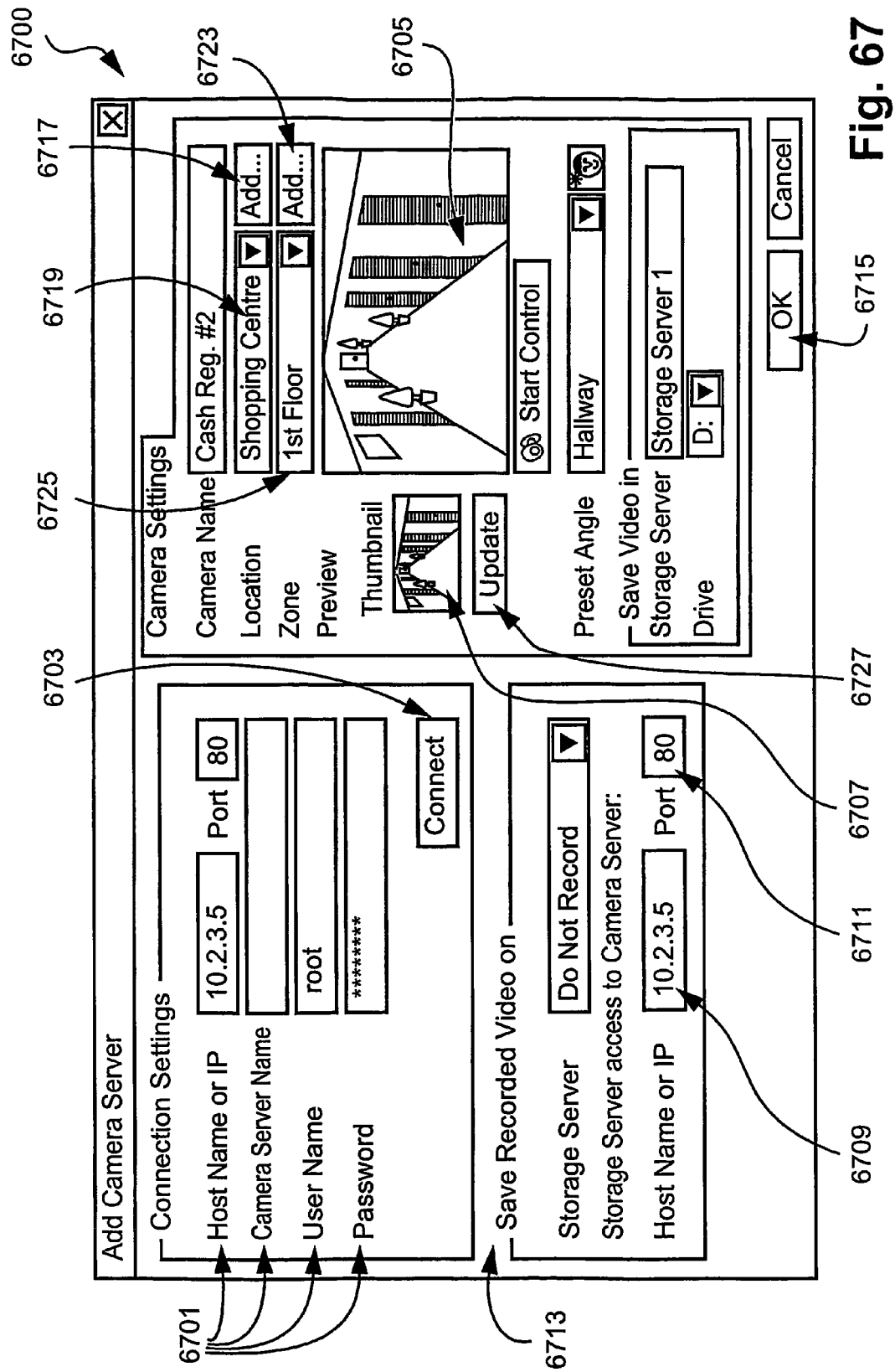
FIG. 67 shows an add camera server dialog.

The user is able to register a camera server 109-111, which is listed in the search results dialog 6600, with the system 100. To add a camera server 109-111, the user selects the particular camera server 109-111 from the search results dialog 6600 and clicks an Add Camera Server button 6625 or double clicks on a particular camera server in the dialog 6600, which results in an add camera server dialog 6700 being displayed on the display 2214, as seen in FIG. 67.

5.4.1.5 Adding Camera Servers

The add camera server dialog 6700 allows a user to register a new camera server 109-111 or camera 112-115 with the system 100. Depending on how the user arrives at the add camera server dialog 6700, some of the fields can be pre-selected or pre-populated. When coming from the storage and camera summary dialog 6400, if the Storage Server dialog is active, a corresponding storage server setting is pre-selected to be the currently selected storage server. If the Locations/Zones dialog is active, the Location and/or Zone settings are pre-selected to be the currently selected Location and/or Zone.

If the add camera server dialog 6700 is launched from the find camera servers search results dialog 6600, the host name and either the storage server 2300 or Location and Zone fields are pre-populated, depending on which dialog was active in the storage server and camera summary dialog 6400 when the Find Camera Servers button 6523 was selected.

In response to the add camera server dialog 6700 being launched, the user may enter the hostname or IP address and port number if not already populated and then a username and password in the fields 6701, as seen in FIG. 67, corresponding to the camera server 109-111 to be added. The entered username and password are typically not the same username and password as the user entered in the login dialog to access the master storage server 2300A but are the username and password that the particular camera server 109-111 has been configured to require for administrative access.

In the implementation described herein, the camera server username and password are required in order to connect to a camera server 109-111 in the system 100. Requiring the username and password ensures that users are not able to record from camera servers 109-111 which may be publicly viewable but which the user may not have permission to record from.

In another implementation, a camera server username and password are not required in order to connect to a particular camera server 109-111. In this instance, it is possible for any user to record video from a publicly viewable camera server.

After the user has entered the connection settings, the user can press a connect button 6703. In response, the viewer 2200 uses the camera server protocol to connect, over HTTP, to the specified camera server.

When a response is received from a particular camera server 109-111, video samples received from the camera server over the network 2220 are displayed and continuously updated in a preview window 6705 on the add camera server dialog 6700. Also the viewer 2200 takes the first video sample returned from a camera 112-115 by the camera server 109-111, resizes a corresponding video window (e.g., 7625) to thumbnail size and places the thumbnail window in a thumbnail area 6707 next to the preview area 6705.

In addition, when the connection with the camera server is made, host name 6709 and port 6711 input boxes in a save recorded video on group 6713 are automatically populated with the same values as the host name and port input boxes in the fields 6701.

If the connect button 6703 is not selected and an OK button 6715 is selected to complete the registration process, the particular camera server will still be registered without the viewer 2200 making any connection to the particular camera server 109-111. Such registration allows camera servers 109-111 which are not yet available or not yet configured to be partially set up within the system 100.

After connection with the particular camera server, a number of Camera dialogs on the right side of the dialog 6700 is set to be the number of cameras enabled on the selected camera server 109-111. For example, when connecting to a Canon™ VB101, a Canon™ VB150 running in a single mode, a Canon™ VB-C10 or a Canon™ VB-C10R, only one dialog is displayed with a title "Camera Settings". If connecting to a Canon™ VB150 in multiple mode (i.e., a camera server 109-111 which allows multiple cameras 112-115 to be separately viewed simultaneously), additional dialogs are displayed depending on how many cameras 112-115 are enabled. The dialogs corresponding to these cameras are labelled Cam 1, Cam 2, etc.

The user is able to associate a camera 112-115 with a specific Location and a Zone within that Location, by using pull-down menus. If the user wishes to add a new Location, the user can press an add button 6717 beside a location field 6719 to bring up the Add Location dialog described above. If the user wishes to add a new Zone within a Location, the user can press an add button 6723 beside a Zone field 6725 to bring up the Add Zone dialog described above.

The preview area 6705 is used to provide visual feedback to the user about which camera 112-115 is being registered and allows the thumbnail image 6707 in the viewer 2200 to be updated based on the preview area 6705. If a user presses on an update button, the viewer 2200 copies the frame that is currently being displayed in the preview area into another location in memory 2206 and displays the saved frame as a thumbnail in the thumbnail area 6707 beside the preview area 6705. In some implementations, before saving the frame in memory 2206, the viewer 2200 converts the frame by reducing the resolution and saves a reduced resolution version of the frame rather than the full frame.

The thumbnail is intended to form a representation of the camera 112-115 and is used to represent the camera 112-115 in a camera selector on the viewing screen 7600. An administrator typically chooses a particular thumbnail to represent a particular camera 112-115 based on the thumbnail being a good representation of a viewable area for that camera 112-115. For example, an administrator can choose a thumbnail to be the typical view for which the camera is used to monitor. As another example, an administrator can choose a thumbnail which has a wide view of an area being monitored (i.e., taken with the camera being zoomed out) even though the particular camera is typically operated zoomed in on a specific region within that area.

Figure 68:
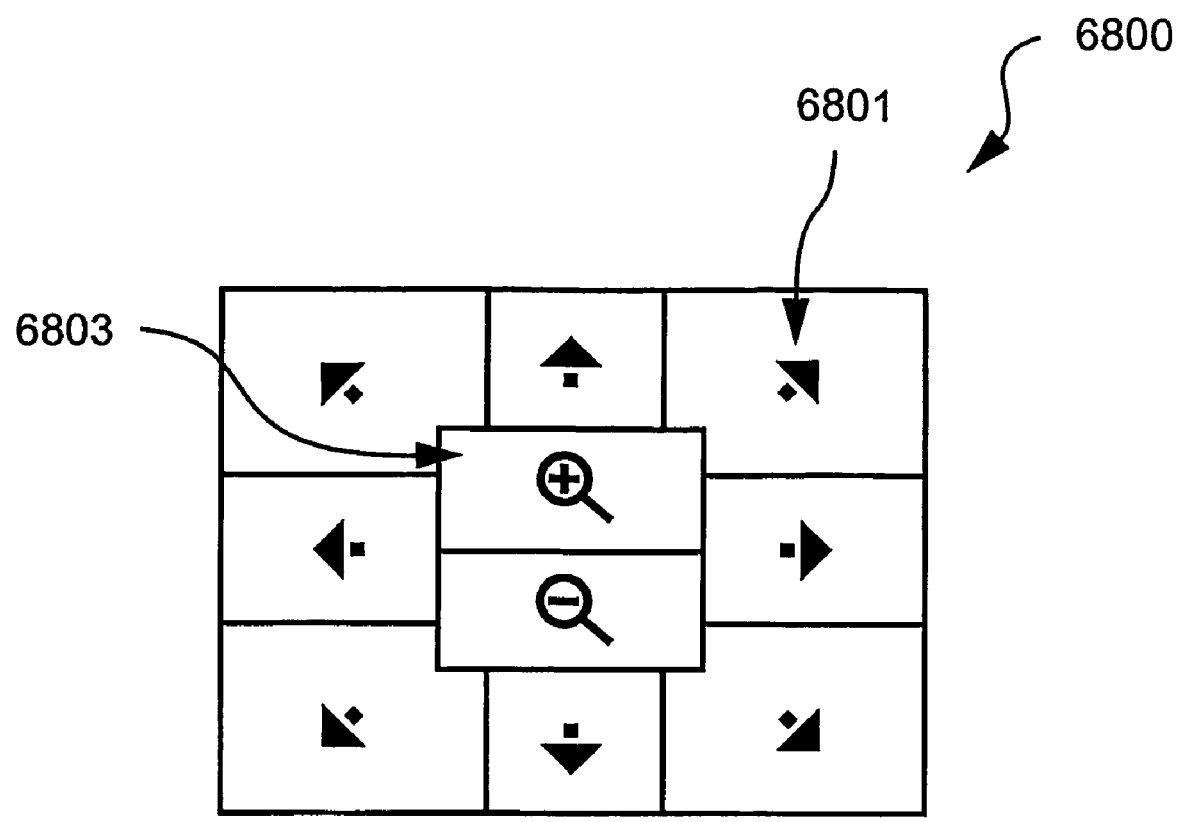
FIG. 68 shows a pan, tilt control tool.

If an administrator is not satisfied with the framing of the preview 6705 in a video window (e.g., 7625), the administrator can change the pan, tilt and/or zoom settings of the corresponding camera 112-115 by clicking a Start Control button or double clicking in the preview video window 6705. As a result, a pan, tilt control tool 6800, as shown in FIG. 68 is displayed over the video window 6705. Once the viewer 2200 has control of the particular camera 112-115, visual feedback is provided using different cursors over different regions of the video window 6705. As seen in 68, arrows (e.g., 6801) can be used to indicate if clicking at a cursor position (ie., the position of a mouse arrow on the display 2214) can cause the pan and/or tilt settings of the corresponding camera 112-115 to be changed and a magnifying glass 6803 can be used to indicate if clicking at the cursor position will cause the particular camera 112-115 to be zoomed in or out. In addition, zoom can also be controlled using a wheel of the mouse 2203 (i.e., the mouse wheel).

The user can control the particular camera 112-115 using clicks or by dragging the cursor into different regions, using the mouse 2202 in a conventional manner. If the user is controlling pan and tilt, magnify regions are disabled to allow the cursor to move across the center of the video window 6705 without zooming. When changing the pan and tilt settings of the corresponding camera 112-115, the amount of movement is determined by how far the cursor is away from the center of the video window. The pan, tilt control tool 6800 is suitable for control of the cursor using the mouse 2203, a similar trackball, joystick, touch-screen or other similar pointing device as well as by the keyboard 2202.

The user can also control the corresponding camera 112-115 by selecting a preset angle from a list of presets. The available presets, which are retrieved from the associated camera server 109-111 when a Connect Button is selected, are listed in a pull-down menu which the user can choose from. When a preset is selected from the pull-down menu, the corresponding camera 112-115 is controlled to go to the corresponding preset position.

When the user has modified the position of the corresponding camera 112-115 using the control tool 6800 described above, the preset position is displayed as "custom" indicating that the current position of the corresponding camera 112-115 does not correspond to a known preset position. The user can also press a "backlight compensation" button to toggle backlight compensation between on and off, which controls the associated camera 112-115 accordingly.

When the user has the corresponding camera 112-115 in a position, at a zoom setting, with a backlight compensation setting, and with a current view with which the user would like to make the representation of the associated camera, the user can press on an "update" button 6727 to update the thumbnail 6707 as described above.

The above description describes the case whereby the thumbnail 6707 that is used to represent a camera 112-115 is captured from that camera 112-115. An administrator can even use a thumbnail 6707 which is captured from one camera 112-115 as a representation of another camera 112-115, by connecting to a camera server 109-111 as described above, modifying the values of the fields in the hostname or IP address and/or port number in the fields 6701 group and pressing "OK". As a new connection is not made to the camera server 109-111, the thumbnail 6707 is not replaced so the thumbnail 6707 from the previous camera server is retained as a representation.

An administrator can use such a connection, for example, if the user wants the representation for a particular camera 112-115 to be an image of the particular camera 112-115 itself in the environmental context of the particular camera 112-115 or of the area covered by the particular camera 112-115 as seen from another camera 112-115. An administrator can also use the above connection to set up all thumbnails for all cameras 112-115 associated with a single camera 112-115 (e.g., in the office of the administrator). In this instance, the administrator can, for example, physically hold up, in turn, a sequence of cards with numbers or some other representation of each camera 112-115. In this example, the administrator could sequentially capture an image of each card and associate each image as a thumbnail associated with each different camera 112-115.

From the add camera server dialog 6700, the administrator is also able to select which storage server 2300 should be used for the recording of sample data from the particular camera 112-115. The storage servers 2300 known to the viewer 2200 are placed in a pull-down menu and the administrator can choose which one. By default, the pull-down menu has "Do Not Record" which means that the particular camera 112-115 is not associated with any storage server 2300.

In the add camera server dialog 6700, an administrator can configure which drive configured within the storage device 2309 of the storage server 2300 should be used for the recording of the video from the corresponding camera 112-115. A list of all drives available on the storage server 2300 can be listed in a pull-down menu and the administrator can choose one of these.

Where there are multiple simultaneous viewable streams from a camera server 109-111 (e.g., for a VB150 in multiple mode), it is possible to configure each of the cameras 112-115 associated with the particular camera server 109-111 to be recorded on a different drive on the storage server 2300. Each of the cameras 112-115 can also be recorded on the same drive on the storage server 2300.

When the user presses the OK button 6715 on the add camera server dialog 6700, the host name, port and storage server (if set to record) are checked to see if the camera 112-115 has already been registered on the selected storage server 2300. In this instance, a warning message is presented to the user saying that such is not allowed.

If the above warning condition does not occur, pressing on the OK button 6715 results in an updating of the configuration data in the memory 2206 of the viewer. As described above, these changes to the configuration data are not written to the master storage server until the "Save Changes" button 6519 is pressed.

5.4.1.6 Editing Camera Settings

Cameras 112-115 are edited by selecting a camera 112-115 on the camera server list and clicking an Edit Camera Server button or double clicking on name of the particular camera server. In response, the viewer 2200 opens an Edit Camera Server dialog where camera server settings for the particular camera 112-115 can be edited. The Edit Camera Server dialog is the same dialog as the Add Camera Server dialog except that the Edit Camera Server dialog uses the title "Edit Camera Server".

5.4.1.7 Deleting Camera Servers

Cameras 112-115 or camera servers 109-111 are deleted from the system 100 by selecting the name (e.g., 6521) of the particular camera or camera server in the right panel 6509 of the storage and camera server summary dialog 6400 and either clicking the Remove Camera Server button, selecting delete from the edit application menu 6513 or pressing a delete key on the keyboard 2202. A Confirmation dialog is displayed with the option to continue deleting the camera server by pressing the Yes button or cancel the operation by pressing the No button.

5.4.2 Recording Schedules

Figure 69:
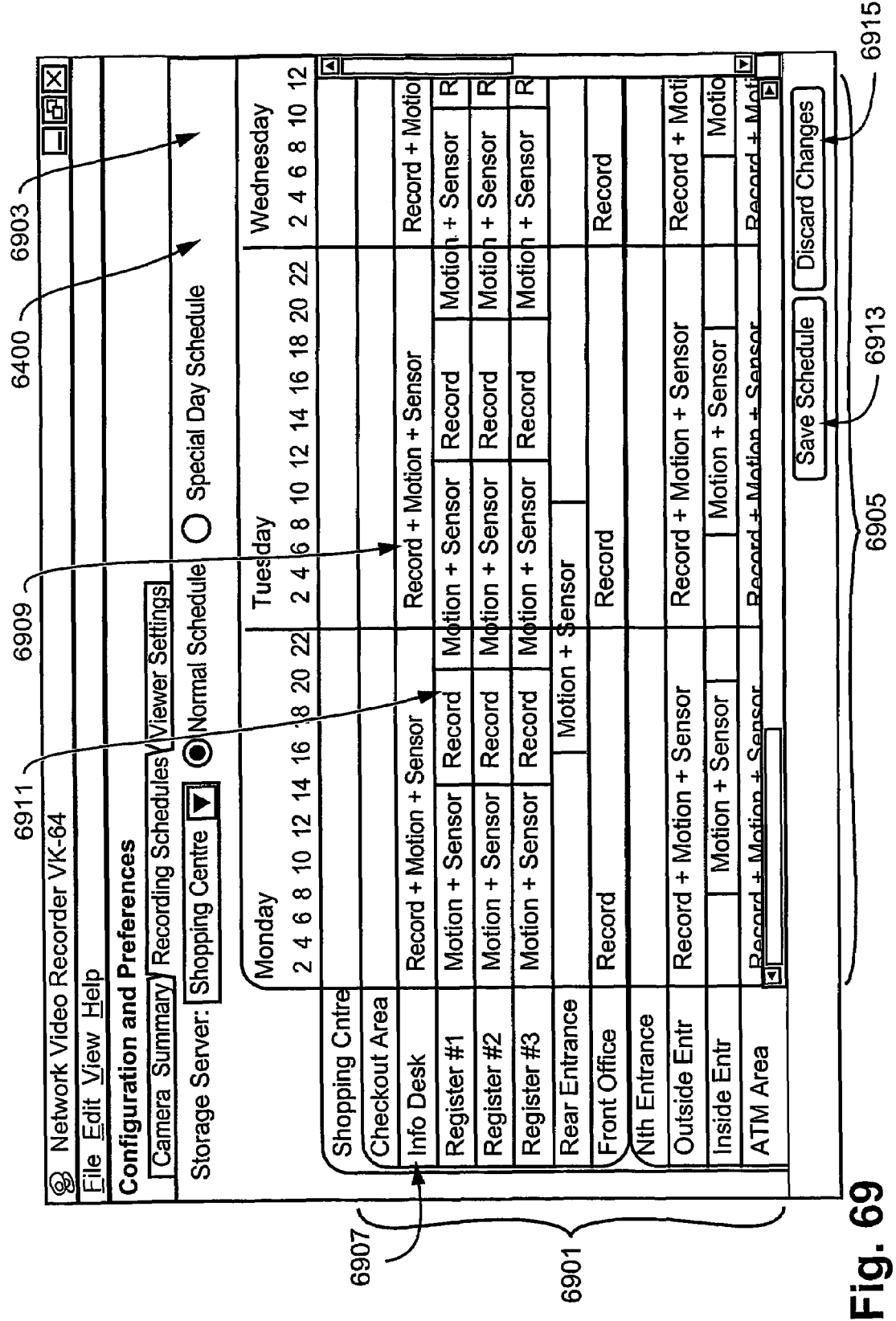
FIG. 69 shows a recording schedules dialog.
Figure 70:
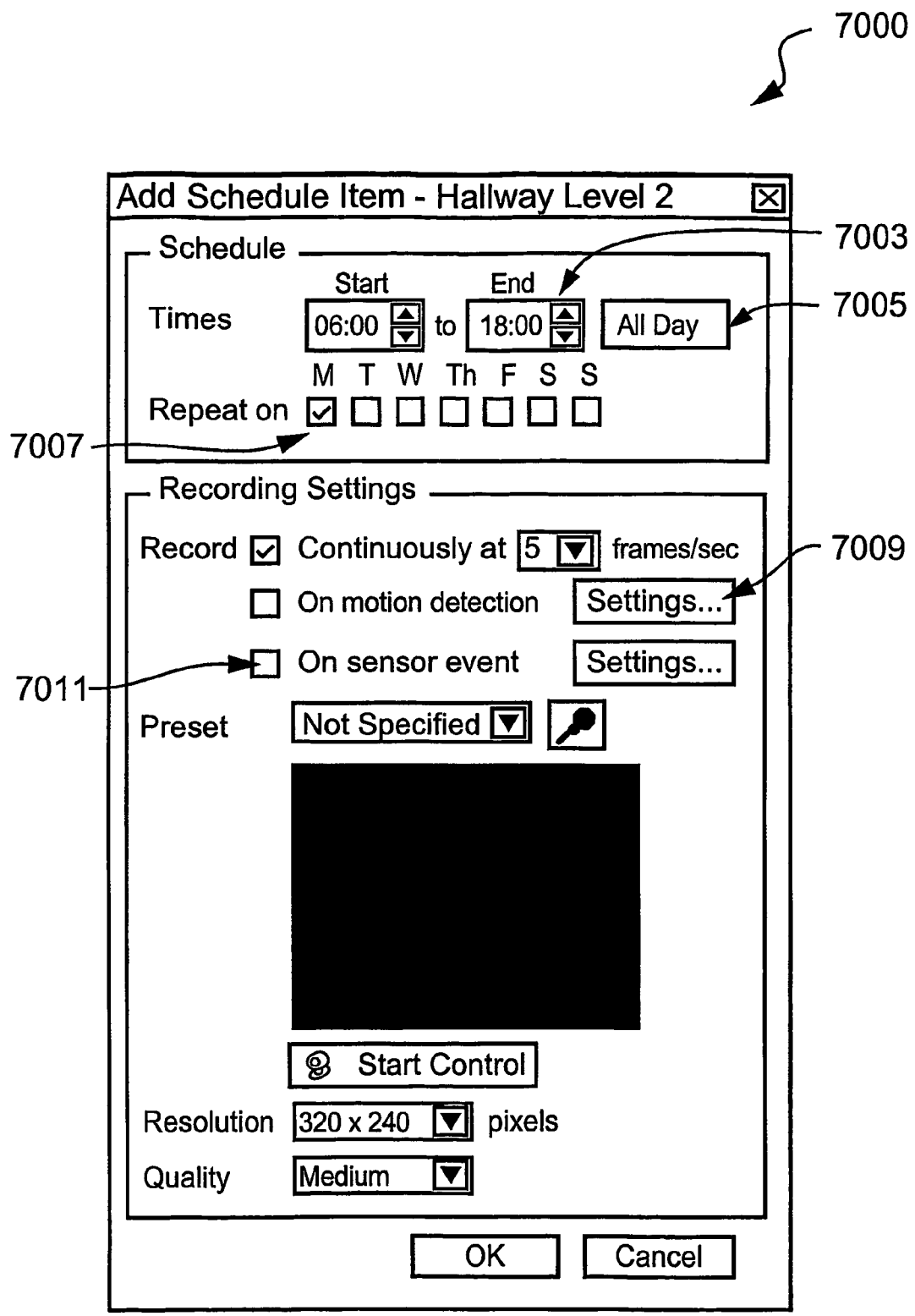
FIG. 70 shows a schedule item dialog.

As seen in FIG. 69, the recording schedules dialog 6403 on the configuration and preferences screen 6401 can be used for configuring a recording schedule, including event and sensor based recording, for each known camera 112-115. The recording schedules dialog 6403 can be used for setting up a normal recording operation of the system 100 on a day-to-day basis and for special days such as public holidays which override the normal schedule on specified days.

The recording schedules dialog 6403 shows the cameras 112-115 associated with one storage server 2300 at a time. The administrator can choose which storage server to configure by using a storage server pull-down menu. The storage server pull-down menu is populated with all storage servers 2300 known to the system 100. When the administrator chooses a storage server 2300, the recording schedules dialog 6403 is updated to show the schedule items (e.g., 1115) associated with the chosen storage server 2300. By default a first storage server (e.g., the "shopping center" storage server) in a list 6901 is selected with the schedules for each camera 112-115 associated with that first storage server displayed.

Selecting a different storage server changes the list 6901 of cameras 112-115 displayed and keeps the user in a same schedule type (i.e., normal or special day).

Only cameras 112-115 that have been setup to record to a storage server 2300 are displayed in the recording schedules dialog 6403.

5.4.2.1 Normal Schedules

A "normal schedule" is used to set up standard day-to-day recording settings of each storage server 2300. The storage server 2300 uses these normal schedule settings unless an alternative "Special Day" schedule has been set up to override the settings on a specified day. Normal schedules are setup by creating schedule items 1115 (see FIG. 13) for each camera 112-115 associated with the storage server 2300.

5.4.2.1.1 Schedule Items

Schedule items 1115 are added by dragging out a time period for an individual camera 112-115 on the recording schedules dialog 6403. For example, as seen in FIG. 69, for an Information Desk camera server 6907, the time period for a schedule item 1115 can be altered by selecting the line 6909 on the dialog 6403 in a conventional manner and dragging the line either left or right in relation to the dialog 6403 as shown in FIG. 69. When the user lets go of the mouse 2203, an add schedule item dialog 7000 is displayed on the display 2214. The user can also click in a schedule area 6905 to open up the add schedule item dialog 7000. The details of a schedule item 1115 can be set using the schedule item dialog 7000. By default, the duration of a schedule item 1115 when added through a context menu is as long as possible without interfering with another schedule item. Each schedule item can be a maximum of twenty four hours long.

If the user drags out a time period for a schedule item 1115, the left edge of an associated selection box (e.g. 6911) is used as a start time and the right edge is used as an end time, unless the duration dragged out is longer than twenty four hours. In this case, the left edge is used as the start time and the end time is set twenty four hours after the start time. If the user clicks in the schedule area 6905, the position where the user clicked is used as the start time.

An administrator can set the start time and end time of a schedule item 1115 in "Start" and "End" fields 7001 and 7003, respectively, of the add schedule item dialog 7000. Clicking an all day button 7005 automatically fills in "0000" in the start time field 7000 and "0000" in the end time field 7003. The "0000" corresponds to a schedule item 1115 starting at midnight and continuing to the next midnight. An administrator can select the days of the week to which a particular schedule item 1115 is to apply.

To setup a schedule item 1115 that starts on one day and ends on the next day (e.g. from Monday 2200 to Tuesday 0300) the user has to check a Monday checkbox 7007 as Monday is the day that the schedule item to be setup starts on and enter a start time of 2200 and an end time of 0300. In this instance, the end time is earlier than the start time, which indicates that the schedule item 1115 continues from one day to the next.

An administrator can select a recording mode for a specific camera 112-115 for a specific time of a schedule item 1115. Such a recording mode can be one or more of:

(i) "continuous recording": which causes a storage server 2300 to record sample data from the particular camera 112-115 all the time within the scheduled time;

(ii) "on motion detection": which causes a storage server 2300 to record video from that particular camera server when motion is detected; or (iii) "on sensor event": which causes a storage server 2300 to record video if an event is received from a sensor associated with the particular camera server.

Multiple recording modes can be set up within a single schedule item 1115 by selecting more than one recording mode. For example, a camera can be on "record" at all times with a frame rate of 1 frame per second (fps) and simultaneously on "motion detection" at all times with a frame rate of 30 fps. Such allows a complete record of camera images at the lower frame rate but with a higher frame rate associated with times of motion activity.

For motion detection and sensor event recording modes, there is a "Settings" dialog, which is launched by pressing a corresponding settings button (e.g., 7009). These modes allow the setting of the recording parameters including preset position and frame rate which override the settings in an "Add/Edit Schedule Item" dialog. The "settings" and the "Add/Edit Schedule item" dialogs will be discussed below.

An administrator can configure the frame rate to use for continuous recording of sample data. The frame rate setting can be made from a pull-down menu with available frame rates (i.e., in number of frames per second). Typical frame rates include 0.1, 0.2, 0.5, 1, 2, 5, 10, 15, 20, 25 and 30. In another implementation, frame rates can be specified as any number with up to one decimal place within a range (eg 0.1 to 30.0).

By default, a preset camera 112-115 position associated with a schedule item 1115 is set to "Not specified". As a result, when the schedule item 1115 starts, the recording engine 201 on the storage server 2300 will not attempt to reposition the camera via the camera server 109-111. The recording engine 201 will leave the particular camera 112-115 in a current position and start recording.

As well as the value "Not Specified", the pull-down menu for the preset selection contains a list of available preset positions retrieved from the particular camera server 109-111. An administrator can select a preset position which will cause a message to be sent to the particular camera server 109-111 to alter the position of a particular camera 112-115 associated with the particular camera server 109-111. A backlight compensation button is used to send a message to the particular camera server 109-111 to toggle the backlight compensation setting of the camera 112-115.

The preview window 6705, as seen in FIG. 67, can be used as described above to view the live images from the particular camera server 109-111 and can be used to control the particular camera 112-115 (e.g., pan, tilt and zoom) using the control tool 6800 as described above.

When the user has modified the position settings of the camera 112-115 using the control tool 6800 described above, a preset position is displayed as "Custom" indicating that the current position of the camera 112-115 associated with the camera server 109-111 may not correspond to a known preset position.

The right to control a camera via a camera server 109-111 (i.e., the "control right") of the viewer 2200 when attempting to control a particular camera server 109-111 associated with the schedule item dialog 7000 and the Sensor Settings dialog, is higher than the right to control the particular camera server 109-111 of the recording engine 201. As a result, an administrator can see a camera 112-115 at the actual angle at which recording will be done. The level of control right is not as high as an operator override function provided within the viewing screen 7600. If an operator is using a viewer 2200 and is using operator override, it will not always be possible for the viewer 2200 which has the schedule item dialog 7000 or a sensor settings dialog displayed to have the control right. In such cases, the administrator will need to wait until the control right is received.

An administrator can change a resolution setting for a particular camera 112-115 for the period associated with a particular schedule item, by using a resolutions pull-down menu. The resolution setting can typically be chosen from the set of 160×120, 320×240, 640×240 or 640×480. The resolutions available depend on the type of camera server. For example, a Canon™ VB150 supports 160×120, 320×240 and 640×240 whereas a Canon™ VB-C10 supports 160×120, 320×240 and 640×480. The resolution options displayed are those that are available on the specific type of camera server 109-111 being used. In addition, the pull-down menu has the option "Not Specified". If the administrator sets the resolution to "Not Specified", the recording engine 201 on the storage server 2300 will not attempt to change the resolution of the camera 112-115 for the duration of the schedule item.

An administrator can change a quality setting (i.e., level of compression) for a particular camera 112-115 for the period associated with a particular schedule item 1115, using a quality pull-down menu. The quality setting can typically be chosen from the set:

(i) Lowest: corresponding to a compression ratio of 10%;
(iii) Low: corresponding to a compression ratio of 30%;
(iv) Medium: corresponding to a compression ratio of 50%;
(v) High: corresponding to a compression ratio of 70%; or
(vi) Highest: corresponding to a compression ratio of 90%.

In addition, the quality pull-down menu has the option "Not Specified". If the administrator sets the quality to "Not Specified", the recording engine 201 on the storage server 2300 will not attempt to change the quality of a camera 112-115 for the duration of the schedule item 1115.

Once the settings for a schedule item 1115 have been set (i.e., including all applicable recording mode settings) the schedule item 1115 is added to the schedule by clicking an OK button. Clicking the OK button updates data structures in the memory 2206 of the viewer 2200. However, a corresponding schedule in the storage server 2300 is not updated. The schedule in the storage server 2300 is only updated when the administrator selects a Save Schedule button 6913 as will be described below.

From the updated data structures, the viewer 2200 updates a visual representation of the schedule item 1115 within the schedule view 6905 on the recording schedule dialog 6403.

Updates to the visual representation are only needed if any additional days have been added or deleted, times have been changed or modes have been changed.

If the user tries to setup a schedule item 1115 which overlaps another schedule item, an error message will be displayed explaining that there is a scheduling problem.

Schedule items can be moved or resized (i.e., changes start and end times) by clicking and dragging with the mouse in a conventional manner. Schedule items can be deleted by selecting a particular item to be deleted and pressing the Delete key on the keyboard 2203, selecting Delete from an Edit application menu or by selecting Delete from a Schedule Item Context menu. If the user wants to delete a day from a schedule item that repeats on other days, that day is required to be unchecked from the Edit Schedule Item dialog.

Once all schedule items have been created, the Save Schedule button 6913 is pressed to save an entire schedule to the storage servers 2300.

As described above, modifications made from the recording schedules dialog 6403, including adding, deleting and modifying schedule items, are initially performed on data structures in the memory 2206. No change is made to the data on the master storage server 2300A or other storage servers 2300 until the Save Schedule button 6913 is selected.

When the Save Schedule button 6913 is selected, the viewer 2200 constructs an RE_Set command as described above and sends this to the storage server 2300 for which the schedule changes have been made (i.e., the storage server selected in the storage server pull-down list). The RE_Set command is sent as a request using the HTTP POST method as described above. To send the RE_Set command, the viewer 2200 attempts to connect to the hostname or IP address of the storage server 2300 with the specified port and sends an HTTP POST message for the following resource (17):

/webview-nvr/re_set.fcgi?action=scheddetails           (17)

The schedule data in memory 2206 is converted to an XML document comprising a CAMERA element 409 and is sent as part of the HTTP POST message. This is received by the recording engine 201 via the web server 213 and written to disk 2310.

If an administrator presses a Discard Changes button 6915, the changes that have not been committed to a storage server 2300 are discarded from the hard disk drive 2310 of the storage server 2300 and the recording schedules dialog 6403 is updated to reflect the altered schedule as the schedule was before the changes.

To edit an existing schedule item 1115, the user double clicks on a colored bar or selects Edit Schedule item from the Schedule Item Context menu to open the Edit Schedule Item dialog. The Edit Schedule Item dialog is the same dialog as the Add Schedule Item dialog except that the Edit Schedule Item dialog uses the title "Edit Schedule Item".

When the Edit Schedule Item dialog is displayed, if a preset or custom position has been selected, the viewer 2200 attempts to get control of the particular camera server 109-111 and change the position settings to correspond to the existing setting for that schedule item. The control is obtained in a similar manner as that described above when the administrator attempts to take control to reposition a camera server 109-111 in the schedule item dialog.

5.4.2.1.2 Motion Detection Settings

Figure 71:
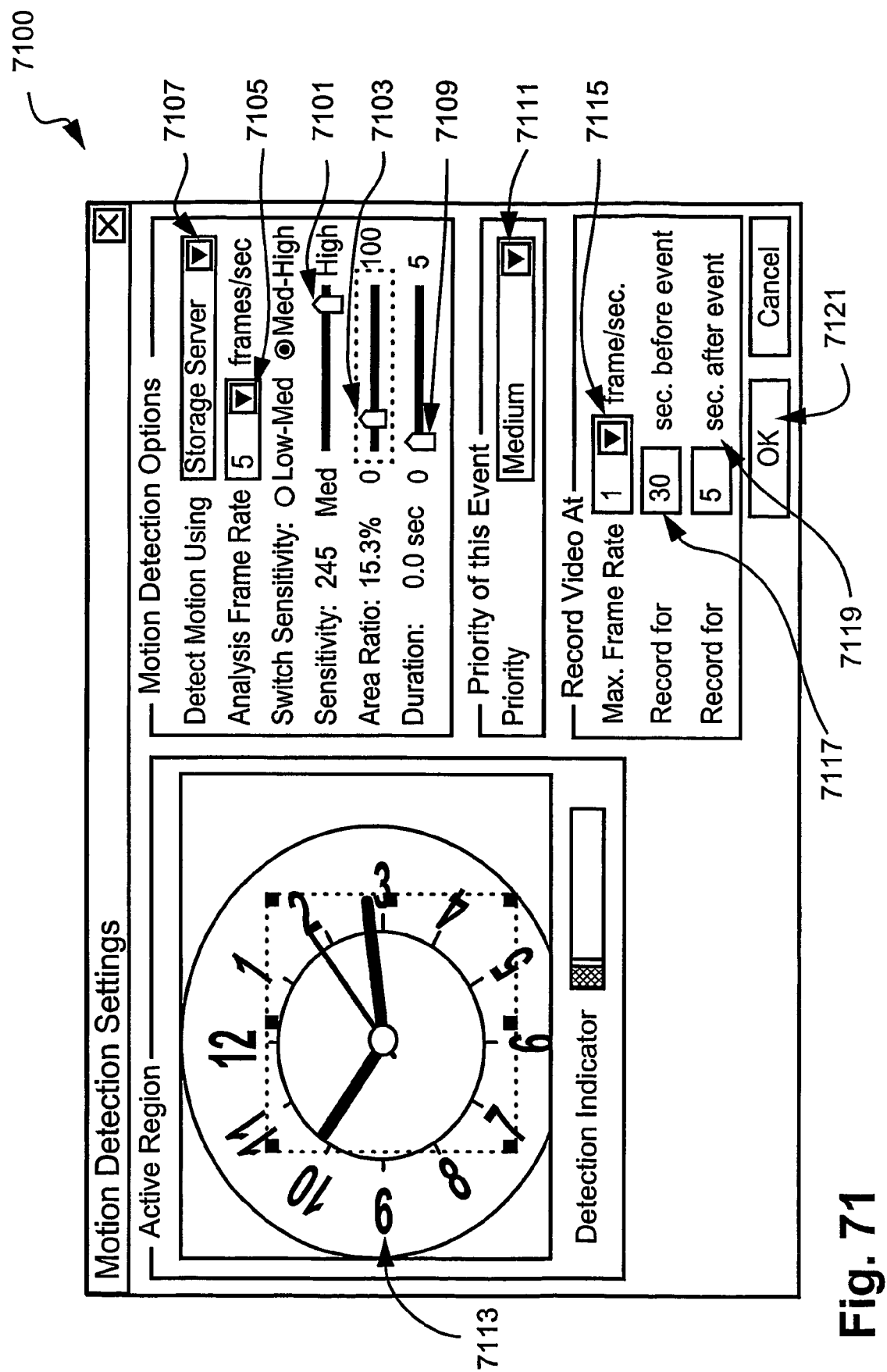
FIG. 71 shows a motion detection settings dialog.

FIG. 71 shows a motion detection settings dialog 7100. The motion detection settings dialog 7100 allows an administrator to set up settings for detection and recording when motion events are detected by sensors associated with the camera servers 109-111. The motion detection settings are used with the position settings of a camera server 109-111 determined in the add/edit schedule item dialog 7000.

The motion detection settings available are as follows:

5.4.2.1.2.1 Active Region

An active region setting can be used to set the region within a video frame (i.e., sample) on which the checking for motion is to be performed. The value of the active settings region is displayed as a rectangle showing the bounds of the region overlaid on a video preview window 7113. By default, the region is the full image area and the edges of a displayed rectangle correspond with the edges of the preview window 7113. An administrator can use the mouse 2203 in a conventional manner to click on a corner or edge of the displayed rectangle and drag the mouse cursor to the desired location. The displayed rectangle drawn on the video preview window is continually redrawn to track the cursor movement and stays in a current position when the user ceases dragging the cursor in a conventional manner. The region chosen corresponds to the coordinates and dimension of the displayed rectangle.

5.4.2.1.2.2 Detect Motion Using

A pull-down menu 7107 known as the "detect motion using" menu can be used to determine where motion detection will be performed. A value associated with the detect motion using menu 7107 can be set to either "storage server", if the motion detection is to be performed on a storage server 2300 or to "camera server", if the motion detection is to be performed on a cameras server 109-111. By default, the value is preferably "storage server". The option for "camera server" is only presented in the pull-down menu 7107 if the type of camera server 109-111 is known to support motion detection (eg a Canon™ VB150). The advantage of performing motion detection on a camera server 109-111 over performing the motion detection on a storage server 2300 is that a storage server 2300 typically records video from a large number of camera servers 109-111 and motion detection can be processor intensive. However, a storage server 2300 may not be able to adequately perform motion detection for video sample data uploaded from a large number of camera servers 109-111 simultaneously. In this instance, it is often preferable for an administrator to choose to have the motion detection performed on a camera server 109-111. However, such is not always possible as many camera servers 109-111 may not support motion detection directly.

5.4.2.1.2.3 Analysis Frame Rate

An analysis frame rate pull-down menu 7105 is also provided for selecting the frame rate at which analysis for motion detection is to be performed. The analysis frame rate pull-down menu can typically be set to one of the same set of frame rates described above (e.g., a rate in the range 0.1 to 30).

5.4.2.1.2.4 Switch Sensitivity

As seen in switch sensitivity setting slider 7101 can be used to change the range of switch sensitivity to represent a low to medium range (i.e., Low-Med) or to represent a medium to high range (i.e., Med-High) range.

5.4.2.1.2.5 Area Ratio

An area ratio slider 7103 is used to specify the percentage of an active region that has to change before motion detection is triggered. The scale is from 0% to 100%.

5.4.2.1.2.6 Duration

A duration slider 7109 can be used to specify the length of time that there is motion before a motion detection event is triggered. The slider 7109 is from 0-5 seconds.

5.4.2.1.2.7 Event Priority

An event priority pull-down menu 7111 can be used for selecting the priority of an event that is triggered by motion detection with the given motion detection settings. The event priority pull-down menu 7111 can be set to one of the values:
- (i) Highest;
- (ii) High;
- (iii) Medium;
- (iv) Low; or
- (v) Lowest.

5.4.2.1.2.8 Maximum Frame Rate

A maximum frame rate pull-down menu 7115 can be used for selecting a maximum number of frames per second that are to be recorded when a motion event (i.e., an event satisfying the specified settings) is triggered.

5.4.2.1.2.9 Pre-Event Recording

A pre-event recording entry field 7117 can be used for entering a duration of seconds that recording is to be performed before an event has occurred in order to capture what was happening immediately before the event.

5.4.2.1.2.10 Post-Event Recording

A post-event recording entry field 7119 can be used for entering a duration of seconds that recording is to be performed after an event has occurred. If the post-event recording entry field 7119 is set to 0, the video sample data will be recorded for the duration while motion is being detected only.

When an OK button 7121 is selected, the motion detection settings according to the motion detection settings dialog 7100 will be added to data structures configured within the memory 2206 of the viewer 2200. As described above, the motion detection settings will not be sent to a storage server 2300 until an administrator selects the "Save Schedule" button 6913 on the recording schedule dialog 6403.

5.4.2.1.3 Sensor Event Settings

Figure 72:
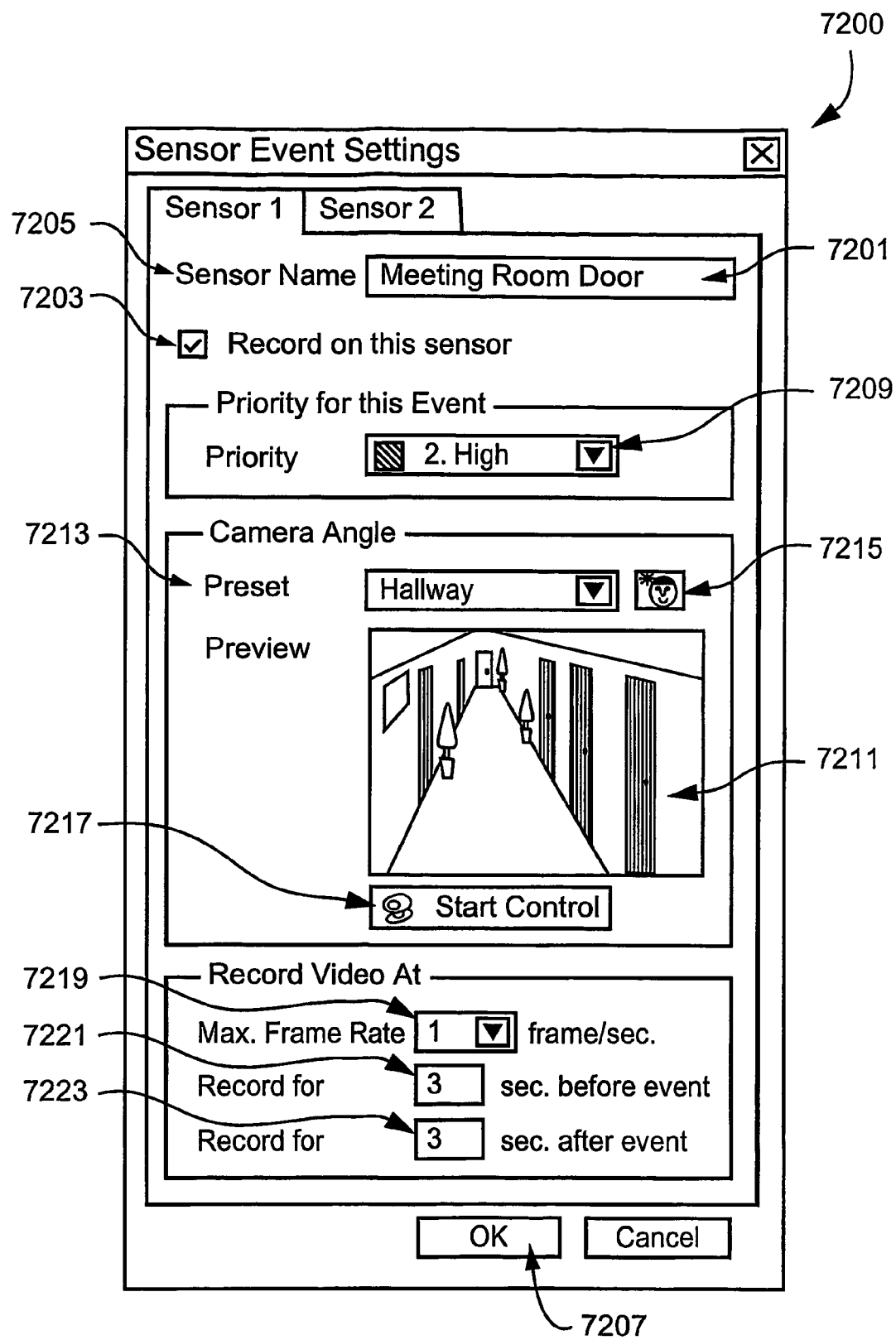
FIG. 72 shows a sensor event settings dialog.

As seen in FIG. 72, a sensor event settings dialog 7200 allows a user to specify recording settings based on the occurrence of a triggering of a sensor which is associated with a camera server 109-111. If the camera server 109-111 has more than one associated sensor, each sensor is represented on a different dialog.

Where a camera server 109-111 supports viewing/recording of multiple cameras simultaneously (e.g., a Canon™ VB150 in multiple mode), different recording settings can be configured for each associated camera server 109-111 (i.e., including the setting of not recording) based on the triggering of a single sensor on the associated camera server 109-111.

A sensor name 7201 is retrieved from the associated camera server 109-111 and is the name that is configured within memory of the camera server 109-111 to be associated with a particular sensor associated with the dialog 7200.

A record on this event checkbox 7203 is used to specify whether recording is to be started when an event is triggered from the particular sensor. When a record on sensor event checkbox 7011 is checked in the add/edit schedule item dialog 7000, the system 100 determines if any of the record events on this sensor checkboxes 7203 in the sensor event settings dialog 7200 are checked. If none of the checkboxes (e.g., 7203) in the sensor event settings dialog 7200 are checked, the checkbox 7203 on "Sensor 1" dialog 7205 is automatically checked. If any of the checkboxes 7203 are checked, the settings are left as they are. If the user unchecks all of the record events on this sensor checkboxes (e.g., 7203) and clicks an OK button 7207, a record on sensor event checkbox 7011 in the add/edit schedule item dialog 7000 is automatically unchecked. When the record on sensor event checkbox 7011 in the add/edit schedule item dialog 7000 is unchecked, the settings in the sensor event settings dialog 7200 are left as they are.

A priority of this event pull-down menu 7209 is used to determine the priority that will be associated with an event that is triggered by the particular sensor associated with the sensor event settings dialog 7201. The value for the priority of this event pull-down menu 7209 is the same as for motion detection settings above.

A preview window 7211, preset controls 7213, backlight compensation 7215 and camera controls 7217 on the preview window 7211 are used as described in the add/edit schedule item dialog 7000 described above.

A position to which the associated camera 112-115 is controlled (i.e., using a preset positions or by user the control using the cursor controls tool 6800 on the preview window) is stored in memory 2206 and represents the position to which the associated camera 112-115 is moved if an event is triggered from the particular sensor. So, after the completion of configuration of the recording schedule (i.e., after the settings have been made and the Save Schedules button 6913 selected to save the changes to a storage server 2300), the position will be stored to be associated with the particular sensor for the associated camera 112-115 for the given schedule item.

As described above, the recording engine 201 on the storage server 2300 will use the configuration information so that when an event is received from the particular sensor during the specific schedule item, the camera 112-115 associated with the particular camera server 109-111 will be repositioned to point to the specified position.

Settings for maximum frame rate 7221, pre-event recording 7221 and post-event recording 7223 have a corresponding function to those described for motion detection above.

5.4.2.2 Special Day Settings

Figure 73:
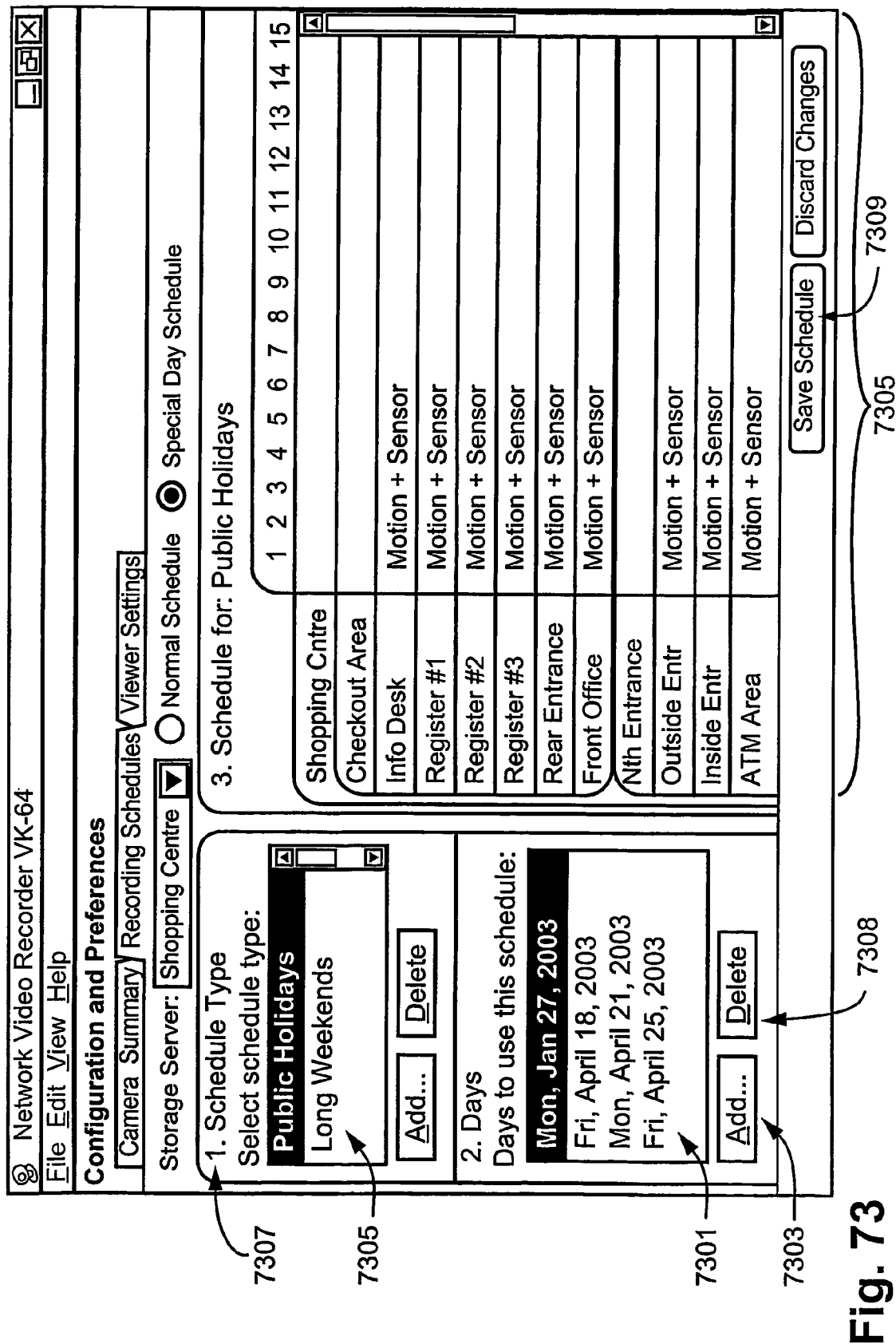
FIG. 73 shows a special days recording schedule dialog.

A special day schedule can be used to setup different recording settings for special days such as public holidays. Special day schedule items override normal schedule items on dates specified in a "Days to use this schedule" list 7301, as seen in FIG. 73.

5.4.2.2.1 Schedule Type

Users can define schedule types for different kinds of special days. For example, public holidays on a weekend might use different recording settings to public holidays during the week. Such schedules are reusable and can be edited or deleted. The days that a special day schedule is applied to are then added. By selecting an "Add" button 7303, an administrator is presented with a dialog in which the administrator can enter a name of a schedule type.

If a schedule type is deleted and there are dates in the future that are associated with the deleted schedule, the user is given a warning and asked to delete those dates before deleting the schedule type.

A scheduling area 7305, as seen in FIG. 73, is functionally the same as the scheduling area 6905 of the normal recording schedule dialog 7000. However, the scheduling area 7305 only covers a single day. On a special day, the special day schedule will override a normal recording schedule from 0000 hrs. to 2400 hrs. To have a special day schedule run over a long weekend (i.e., Fri, Sat & Sun), all three days are required to be added to the list of days to use the schedule 7301.

The first time users setup special day recording schedules a schedule type list 7305 is empty.

5.4.2.2.2 Days

To add days when a schedule type is to be used, a user clicks the Add button 7303 and a calendar control is displayed in which the user selects a day for the schedule type to be used. The calendar control is a conventional calendar control for choosing a day. A schedule type needs to be selected in a schedule type panel 7307 when the Add button 7303 is clicked.

Within the calendar control, clicking on a date selects that date and clicking an OK button closes the calendar control and adds the selected date to the "Days to use this schedule" list 7301.

If the user tries to associate the same day with different special day schedules, the user is given a warning and asked to delete the other entry before creating a new one.

Once a scheduled special day has past, the scheduled special day is displayed in italics and grey, in the list 7301. To clear such passed days from the list 7301, users may select and delete them using a Delete button 7308.

As with normal schedules described above, changes are not made to the storage server 2300 until a Save Schedule button 7309 is pressed. The manner in which the changes are sent to the storage server 2300 is the same as for the normal schedules described above.

5.4.3 Viewer Settings

Figure 74:
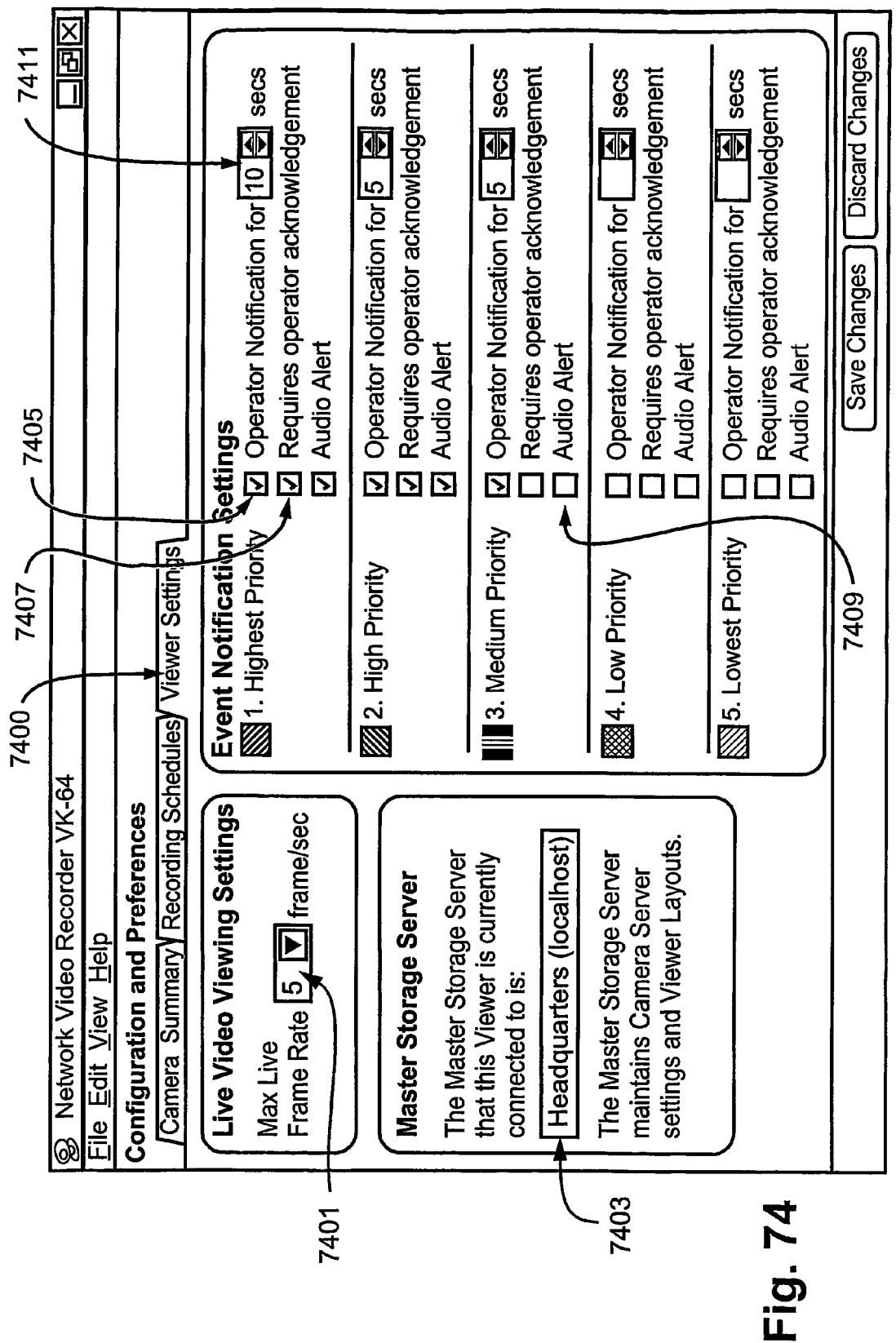
FIG. 74 shows a viewer settings dialog.

As seen in FIG. 74, a viewer settings dialog 7400 in the configuration and preferences screen 6401 can be user for configuring settings specific to each viewer (e.g., 2200A, 2200B, 2200C and 2200D). The settings are stored in the hard disk drive 2210 of the viewer 2200 and are for use only by the viewer 2300. The settings are not stored on the master storage server 2300A for use by other viewers 2200. The values for the viewer settings are typically stored in a viewer configuration file on a file system configured within the hard disk drive 2210 or as entries in a registry maintained by the operating system of the viewer 2200.

The viewer settings consist of:
(i) Live Video Viewing Settings;
(ii) Master Storage Server; and
(iii) Event Notification Settings.

5.4.3.1 Live Video Viewing Settings

A live video viewing settings pull-down menu 7401 can be used to control a maximum frame rate for viewing live video. A frame rate is selected from a list of options. These options would typically be the same list of frame rates given above. The default value is five frames per second.

The selected frame rate applies to each video window on the viewing screen 7600 and is the maximum frame rate at which a camera server 109-111 will be configured to send a single live video sample stream to the viewer 2200, over the network 2220. The selected frame rate does not apply to the frame rates of the video windows (e.g., 7625) in the configuration and preferences screen 6401, whose frame rates are selected according to specific settings in that and resulting dialogs.

5.4.3.2 Master Storage Server

The current storage server (e.g., 2300A, 2300B, 2300C and 2300D) being used as the master storage server 2300A is displayed in a non-editable text field 7403. The non-editable text field 7403 is for the information of the administrator. The field provides the name of the master storage server 2300A and the hostname or IP address used to access the master storage server 2300A.

5.4.3.3 Event Notification Settings

As described above, a motion event or sensor event associated with a specific camera 112-115 at a specific time can trigger recording of video sample data and can be set at a specific priority level. Events are classified according to five designated priorities which are used to represent them in the viewing screen 7600 as follows:
(i) Highest;
(ii) High;
(iii) Medium;
(iv) Low; and
(v) Lowest.

Each event priority has four settings that affect the appearance and handling of an event on the viewing screen 7600, in particular in the live events window.

In addition, the viewer 2200 can be configured to notify an operator in a particular manner and optionally to require an action by the operator based on the occurrence of an event at a particular priority.

As seen in FIG. 74, if an operator notification checkbox (e.g., 7405) is ticked for a particular priority, the ticked checkbox indicates that when an event of the corresponding priority is received, the representation of the event in the live events log 7619 (see FIG. 76) configured within the hard disk drive 2210 should flash. The value of seconds specified indicates the duration for which the representation of the event should flash.

If an operator acknowledgement checkbox (e.g., 7407) is ticked for a particular priority, the checkbox 7407 indicates that when an event of the corresponding priority is received, the event will be highlighted in the live events window until the operator acknowledges the event by clicking on the live events window.

If an audio alert checkbox (e.g., 7409) is ticked for a particular priority, the checkbox 7409 indicates that when an event of the corresponding priority is received, an audio alert will be given. The audio alert will be repeated for the duration of the operator notification duration setting 7411, if specified. If the operator notification duration setting 7411 is not specified, the audio alert is played once per event.

5.4.3.4 Viewer Configuration File

FIG. 75 shows an example of a viewer configuration file 7500.

5.5 Viewing Screen

FIG. 76 shows the viewing screen 7600. As described above, if the viewer 2200 is able to connect and login to a master storage server 2300A, including the case that the master storage server 2300A is implemented on the same computer module (e.g., 2301) that the viewer 2200 is implemented on, the user is presented with the viewing screen 7600.

The viewing screen 7600 comprises four main sections being a title and menu bar 7601; a camera selection area 7603, a layout area 7605; and a timeline area 7607. When the viewer 2200 is launched (i.e., the viewer application software is executed), a main window containing the viewing screen 7603, and which will be generically referred to herein as the viewing screen 7600, is maximised at the current screen resolution. Users can resize the main window to any available resolution. When resizing the main window, the height of the menu bar 7601, camera selection area 7603 and timeline 7607 all remain the same whilst the layout area 7605 scales to occupy the remaining space.

The menu bar 7601 together with the main window title are built using standard components and display an application icon, title, window controls and menus in a conventional manner.

5.5.1 Camera Selection

The camera selection area 7603 is used to display thumbnails associated with each of the cameras 112-115 available for monitoring and to select which cameras 112-115 the user wants to view in the layout area 7605. The camera selection area 7603 is made up of the location 7609 and zone 7611 menus and a camera thumbnail area 7613.

The network video recorder configuration data which has been retrieved from the master storage server 2300A is used to populate the camera selection area 7603.

When the viewing screen 7600 is displayed, the viewer 2200 populates the location menu 7609 with the list of locations in the network video recorder configuration data and populates the zones menu 7611 with the list of Zones in the network video recorder configuration data. Initially, after start-up of the viewer 2200, a first Location in the list of Locations is displayed and the first Zone within the list of Zones associated with that Location is displayed. The viewer 2200 then populates the camera thumbnail area 7613 with thumbnails (e.g., 7615) associated with the cameras 112-115 in the first Location in the list of Locations in a manner corresponding to if the first Zone within that Location is selected.

If the network video recorder configuration data on the master storage server 2300A has not yet been set up or has been configured to be empty, there will not be any Locations or Zones available in the respective menu 7609, 7611 and there will be no camera thumbnails (e.g., 7615) in the camera thumbnail area 7613.

Control of the display of camera thumbnails (e.g., 7615) is provided through the Location 7609 and Zone 7611 pull-down menus. When a user selects a location item in the Location menu, the Zone menu is updated to contain only the Zones that are in that Location. At the same time, the camera thumbnail area 7613 is also updated to only display thumbnails associated with cameras in the selected Location.

When a user selects a Zone item in the Zone menu 7611, a corresponding Zone dialog is scrolled so that the left edge of the Zone dialog is aligned with the start (left edge) of the thumbnail area 7613, allowing a user to easily use the thumbnails of the cameras in that Zone. A scroll bar 7623 only appears if there are more thumbnails than can fit in the camera thumbnail area 7613 on the screen or if a Zone is selected such that the Zone dialog is displayed at the leftmost visible position, causing camera thumbnails (e.g., 7615) that are normally drawn to the left of the thumbnails of the selected Zone to be hidden.

The camera thumbnails (e.g., 7615) in the camera thumbnail area 7613 are organized into Zone tabs (e.g., "Carpark" 7621) with each Zone tab containing thumbnails associated with each of the cameras that are in that zone. The zone tabs also contain the name of the zone. Below each thumbnail (e.g., 7615) is displayed the name of the corresponding camera 112-115. If the name is longer than the width of the camera thumbnail (e.g., 7615), the name is truncated so that the thumbnail can be displayed below the thumbnail and not overlap with the name of the neighbouring thumbnail.

Each zone tab (e.g., 7621) is arranged horizontally in sequence in the same order as the zone pull-down menu 7611. The user can scroll the camera thumbnail area 7613 by clicking and dragging on the scrollbar 7623. As a result, other camera thumbnails can be seen and used. The thumbnails (e.g., 7615) are displayed with the zone tab (e.g., 7621) in the order that the camera 112-115 details are stored in the network video recorder configuration data.

To view video sample data captured from a camera 112-115 and sent by a camera server 109-111, the user can create a video window 7625 on the layout area 7605. The user can create the video window 7625 by selecting on an appropriate thumbnail (e.g., 7615) in the layout area 7605 and dragging the cursor onto the layout area 7605. During the dragging action, a rectangular outline representing a bounding box of the video window, which is about to be created, follows the cursor. When the user releases the press a video window replaces the rectangular outline in the same position, the viewer 2200 makes a connection with the camera server 109-111 associated with the camera 112-115 represented by the thumbnail, and the video window displays live video sample data representing images from that camera 112-115.

A user can perform a similar operation using any number of thumbnails to form different video windows (e.g., 7625) associated with different cameras 112-115 in different positions on the layout area 7605. The user can perform a similar operation using the same thumbnail any number of times and form different video windows (e.g., 7625) at different positions on the layout area 7605 which each display video from the same camera 112-115.

If a user rolls over a camera thumbnail using the mouse 2203, the full name of the associated camera 112-115 is displayed on the display 2214 in a tool-tip. The tool-tip allows the user to see the full name of the camera 112-115 in case the name has been truncated to fit under the camera thumbnail.

As described earlier, the images used for each thumbnail are set by the administrator in the add/edit camera server dialog 7000.

5.5.2 Layout Area

The layout area 7605 is used to display multiple video windows (e.g., 7625) corresponding to live video sample data from cameras 112-115 and recorded sample data from a storage server 2300. As described above, the specific arrangement on the layout area 7605 of a set of video windows (e.g., 7625) each associated with a specific camera 112-115 is referred to as a layout. A user can make arrangements of video windows associated with specific cameras on the layout area 7605 and save the arrangement as a layout for future use.

The data for the shared layouts and the data for the personal layouts which have been retrieved from the master storage server 2300A are used to populate a tree structure configured within the memory 2206 of the viewer 2200. The tree structure has a top node representing layouts and, within that, a node representing shared layouts and a node representing personal layouts. Within each node, there are representations of the set of corresponding layouts. Layouts can be grouped within each of the shared and personal structures in subfolders according to a hierarchical structure. For example the structure of shared layouts can include some layouts at the top level of the structure and can include subfolders which themselves contain layouts. The subfolders are assigned names by a user. These subfolders can be nested. For example, the shared layouts being used in a system 100 by a company could have separate groups associated with different cities, within each city group, there could be separate groups associated with different buildings within each city and within each building group, there could be a set of layouts, each containing different layouts for different parts of the building.

A particular layout can contain a camera 112-115 from any Location or Zone within a single layout. The hierarchy of layouts is independent of the hierarchy of Locations and Zones.

When the viewer 2200 displays the viewing screen 7600, the viewer 2200 uses the layout tree structure to populate a Layout Selection menu. The Layout Selection menu contains general layout operations (e.g., new layout, save, save as, organise), followed by a horizontal separator, followed by a list of the top nodes in the shared layouts structure (i.e., layouts and subfolders), followed by a horizontal separator, followed by a list of the top nodes in the personal layouts structure (i.e., layouts and subfolders).

A user is able to use an input device such as the mouse 2203 to add video windows to the layout area 7605, move, resize and remove video windows (e.g., 7625) and change the type of grid displayed on the layout area 7605. The changing of the type of grid will be further described below.

A user is able to save a current arrangement of video windows on the layout area 7605 as a layout and associate a specific name with the layout. Different layouts can be saved using different layout names, allowing there to be a number of different layouts which can each be used for monitoring sample data and/or viewing recorded sample data. For example, a user can set up a layout to correspond to a particular area of a building for convenient monitoring of that area. As another example, a user can set up a layout to correspond to areas of activity which are important at a particular time of day. As another example, an administrator can set up a layout for a particular operator which includes those video windows (e.g., 7625) which that administrator is required to monitor. As another example, if the viewer 2200 is being used for viewing web-cams showing surf beaches, a user can set up a layout to correspond to their favourite surf beaches.

A set of layouts (e.g., the set of shared layouts or the set of personal layouts associated with a specific user name) consists of an ordered set of layouts. The ordered set of layouts is typically ordered by creation order but in other implementations can be ordered in other ways such as alphabetically or in a user-defined order.

A layout is represented within a layout file on the master storage server 2300A and within the memory 2206 on the viewer 2200 after retrieval from the master storage server 2300A, as a data structure consisting of a layout name, the value for a grid type and a list of representations of video windows. Each video window representation consists of an identifier for a camera 112-115, an X and Y coordinate for the top left hand corner of the corresponding video window within the layout area 7605, and values for width and height of the corresponding video window. In variants of the implementation, the camera identifier can be a unique number associated with the camera 112-115, a unique name associated with a camera 112-115, a hostname or IP address (optionally with a particular port address) associated with a camera 112-115, or any other form of identifying a particular camera server.

When the viewing screen 7600 is first displayed after viewer start up, the viewer 2200 loads a first personal layout in the structure of layouts returned from the master storage server 2300A. The first personal layout corresponds to the first layout for a current user (i.e., as defined by the value entered in the login dialog described above). The first personal layout is displayed in the layout area 7605. If there are no personal layouts returned from the master storage server 2300A, the first shared layout is loaded instead.

When the viewer 2200 loads a layout, the viewer 2300 determines a grid type and draws points or lines on the layout area 7605 as applicable, as will be described in detail below. The viewer 2200 then goes through the list of representations of video windows and, for each one, creates a video window (e.g., 7625) at the specified X and Y position and of the specified width and height. For each video window, the viewer 2200 attempts to connect to the camera server 109-111 which is associated with the camera 112-115 identified by the identifier associated with the video window representation and displays the live stream of video sample data that is coming from the camera 112-115 via the camera server 109-111 into the video window (e.g., 7625).

The viewer 2200 also makes a request to each storage server 2300 associated with cameras 112-115 displayed in the layout area 7605 to get events associated with each camera 112-115. The viewer 2200 then populates the timeline 7607 with these events. If the user has previously had the live events log 7619 displayed at the time when the viewer 2200 was previously terminated, the live events log 7619 is displayed. As this is a live events log 7619, only events that occur when the client application has started are displayed.

The layout area typically allows four different grid types. These are typically:
 (i) Alignment;
 (ii) Small;
 (iii) Medium; and
 (iv) None.

Figure 77:
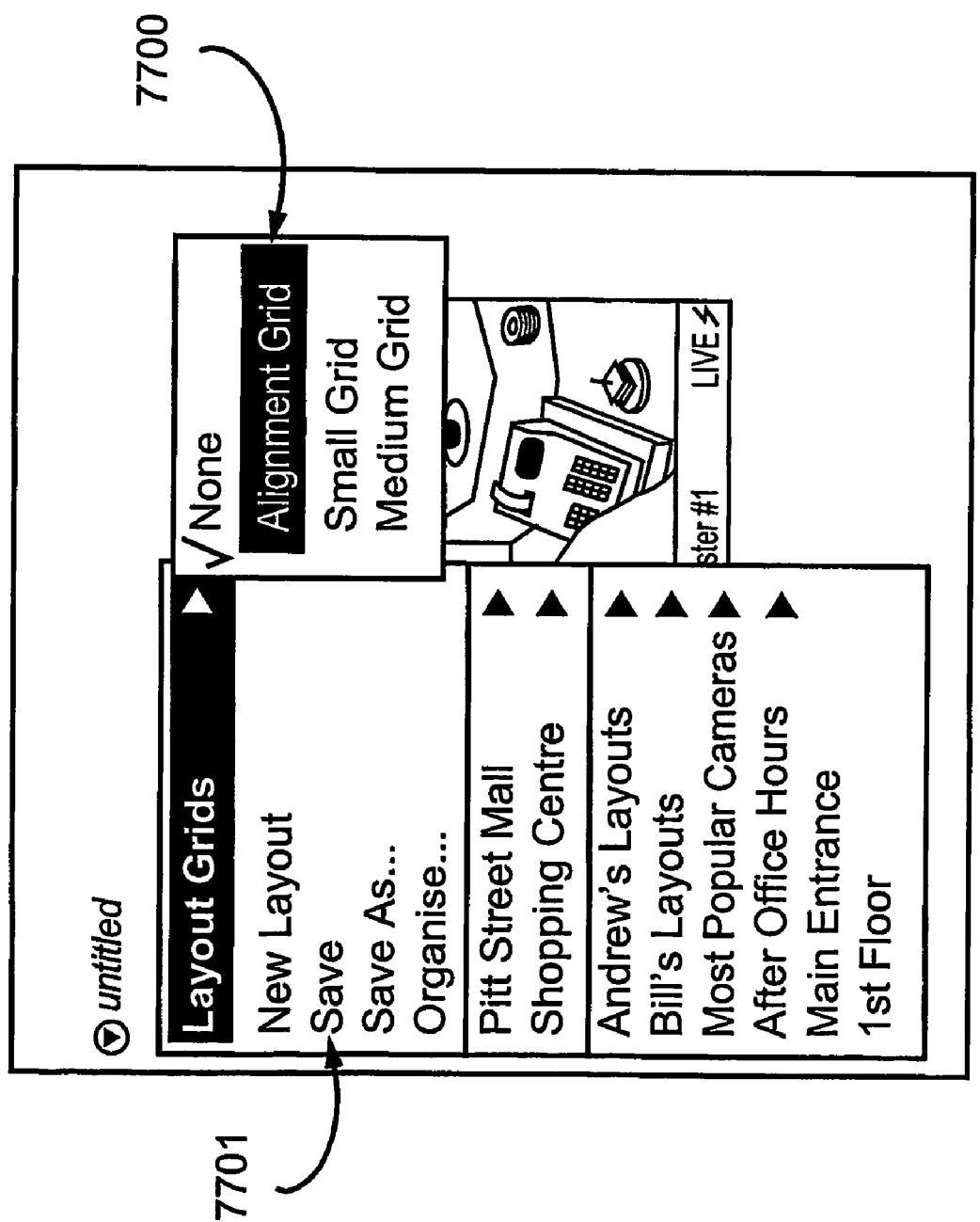
FIG. 77 shows a layout selection menu.

Other types of grids can be made available in other implementations. A grid type is selected from the layout selection menu 7700, as seen in FIG. 77 or by right-clicking in the layout area 7605 and selecting "layout grids" from the context menu 7701 and then selecting the grid type. When a grid type is selected, the points or lines associated with that grid are drawn on the layout area 7605. Grids are turned off by selecting "None" in which case any grid lines or dots are removed from the screen. Changing the grid type does not affect the video windows (e.g., 7625) that are already displayed on the layout area 7605. Changing the grid type affects subsequent video windows which will be placed on the layout area 7605 according to user interaction.

By default, layouts use the alignment grid where the sizes and positions of video windows snap to a predefined grid. Such snapping allows users to establish visual hierarchy between the different video windows depending on what is most important at the time. Layouts can also be organized into other grid arrangements using different types of grids.

Figure 78:
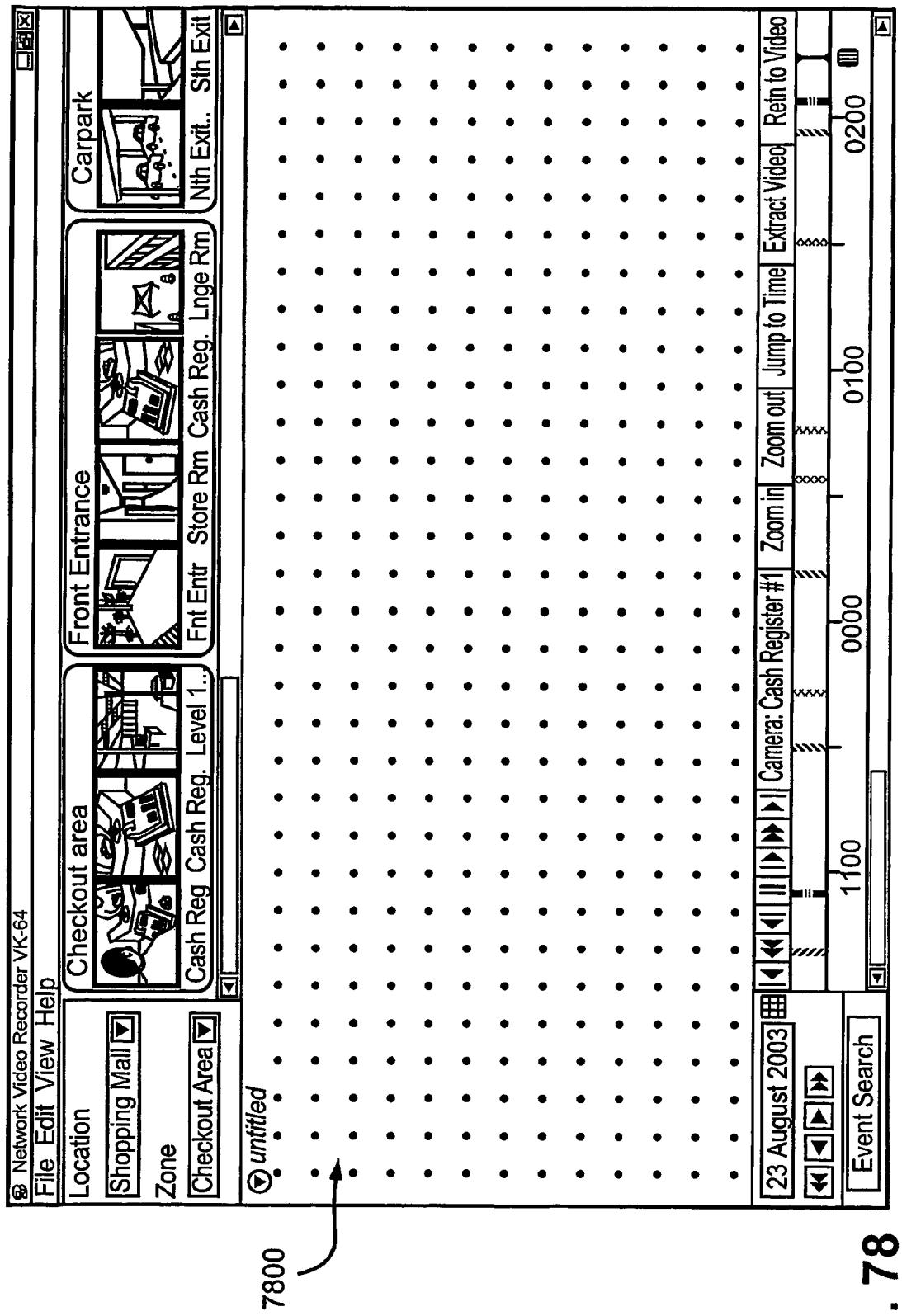
FIG. 78 shows an alignment grid.
Figure 79:
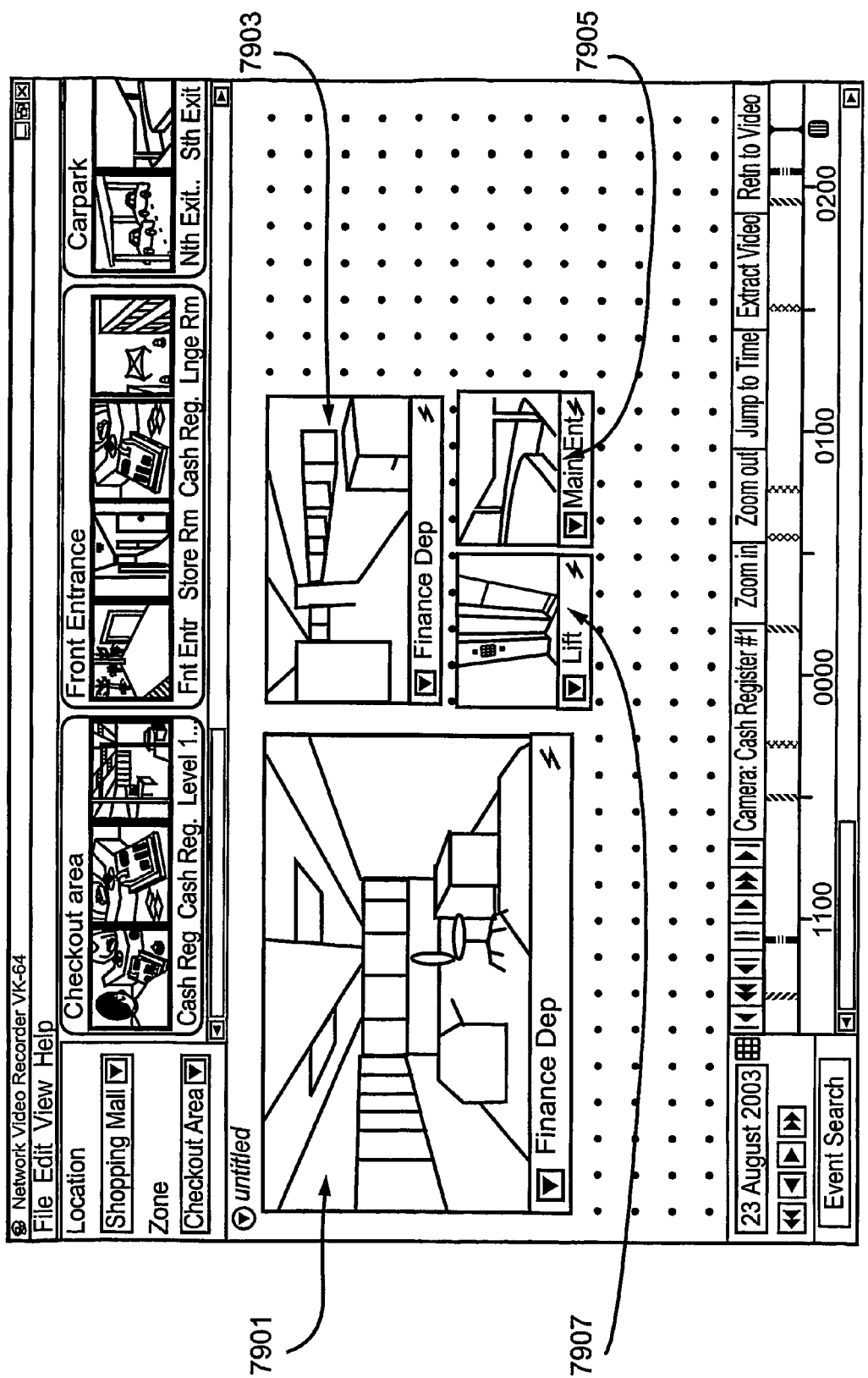
FIG. 79 shows a number of video windows arranged using the alignment grid of FIG. 78.

The alignment grid is displayed as a regular grid of dots 7800, as shown in FIG. 78. The video windows (e.g., 7625) snap to the grid when repositioned or resized. The alignment grid 7800 is useful for aligning video windows of different sizes. For example, FIG. 79 shows a number of video windows 7901, 7903, 7905 and 7907 arranged using the alignment grid 7800. When the alignment grid is being used, video windows can be placed at any location within the layout area (though they will snap to the position of the closest grid point). In this way, video windows can be a wide variety of sizes and video windows can overlap each other. Unlike the small and medium grid types (see below), when the alignment grid is being used, the sizes of video windows are not required to be strict multiples of each other (for example, one video window may be 1.1 times the width and height of another one). This provides a great deal of flexibility in the layouts.

When no grid type is selected (ie "None" is selected), there is no grid or grid points. In this case, the behaviour when dragging out to form video windows is the same as for the alignment grid except that there is no snapping to grid. This allows complete flexibility of positioning and sizing of video windows.

Figure 80:
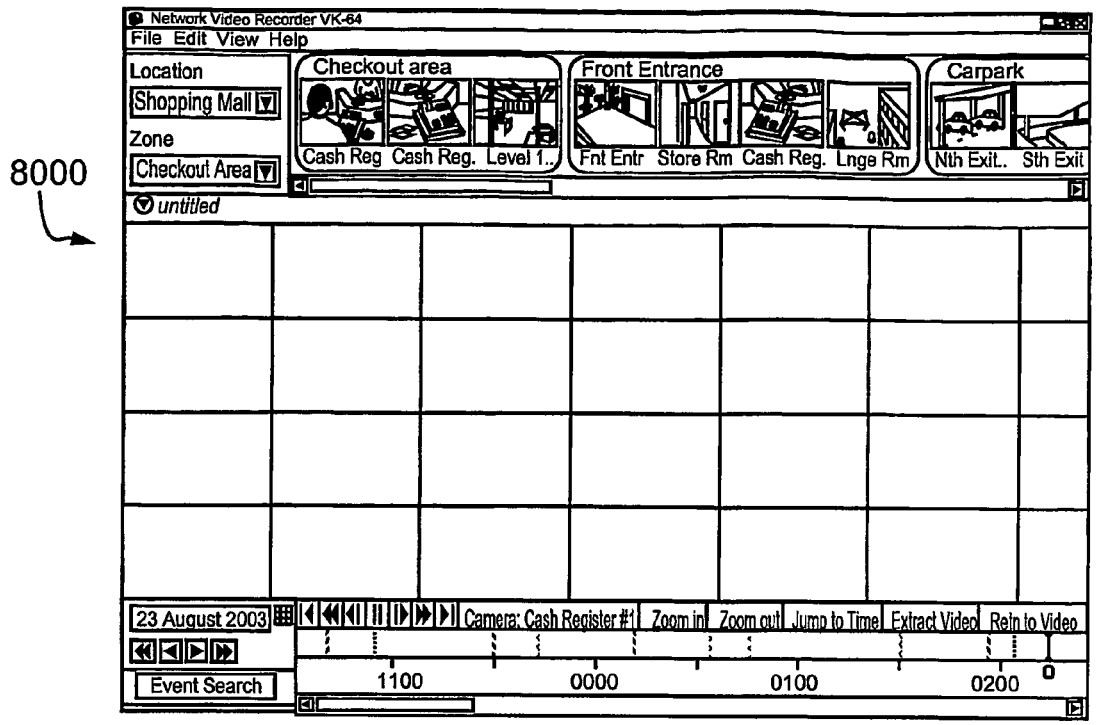
FIG. 80 shows a small alignment grid.
Figure 81:
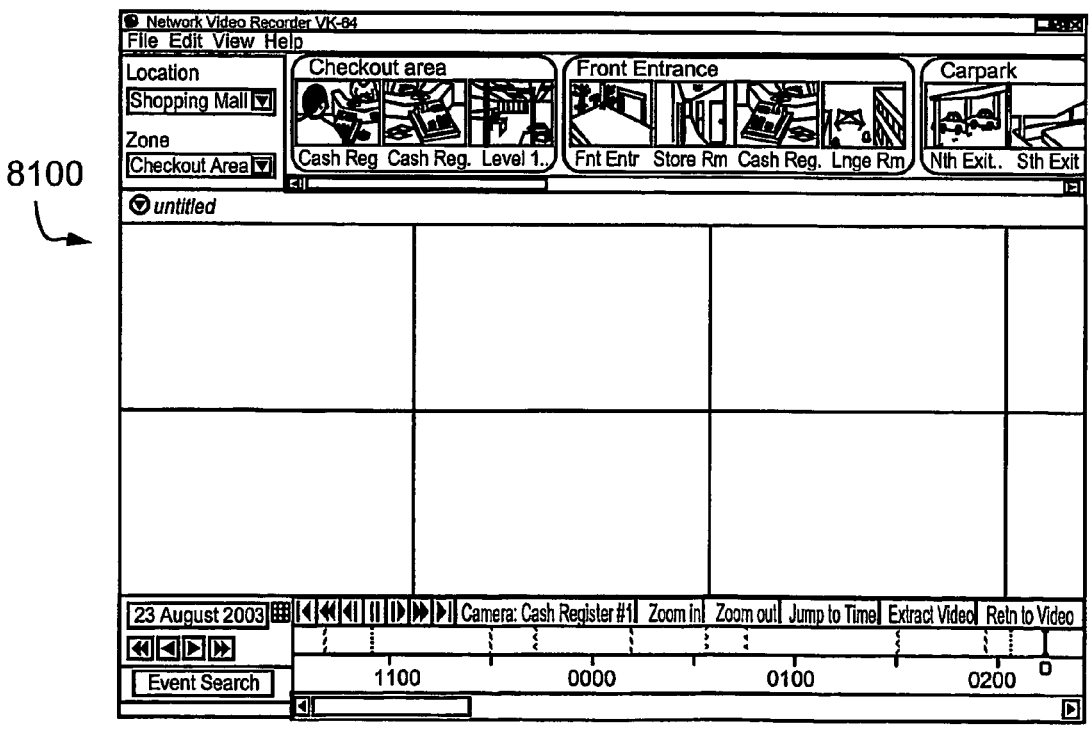
FIG. 81 shows a medium alignment grid.
Figure 82:
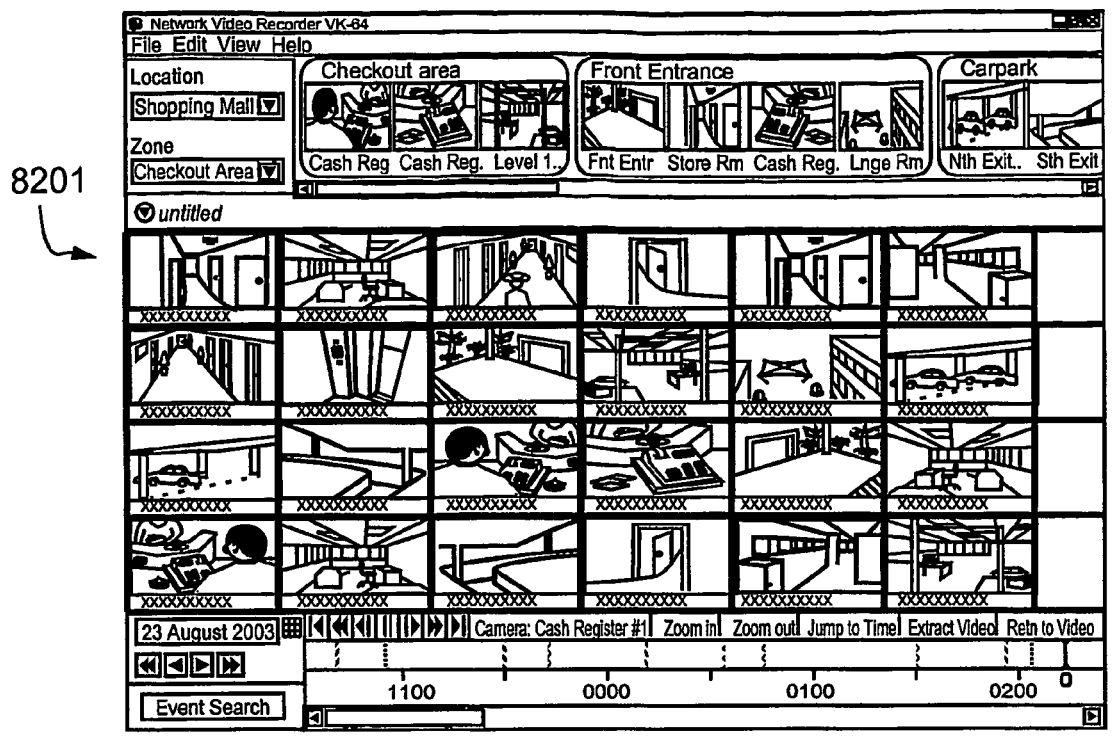
FIG. 82 shows a number of video windows arranged using the small alignment grid of FIG. 80.
Figure 83:
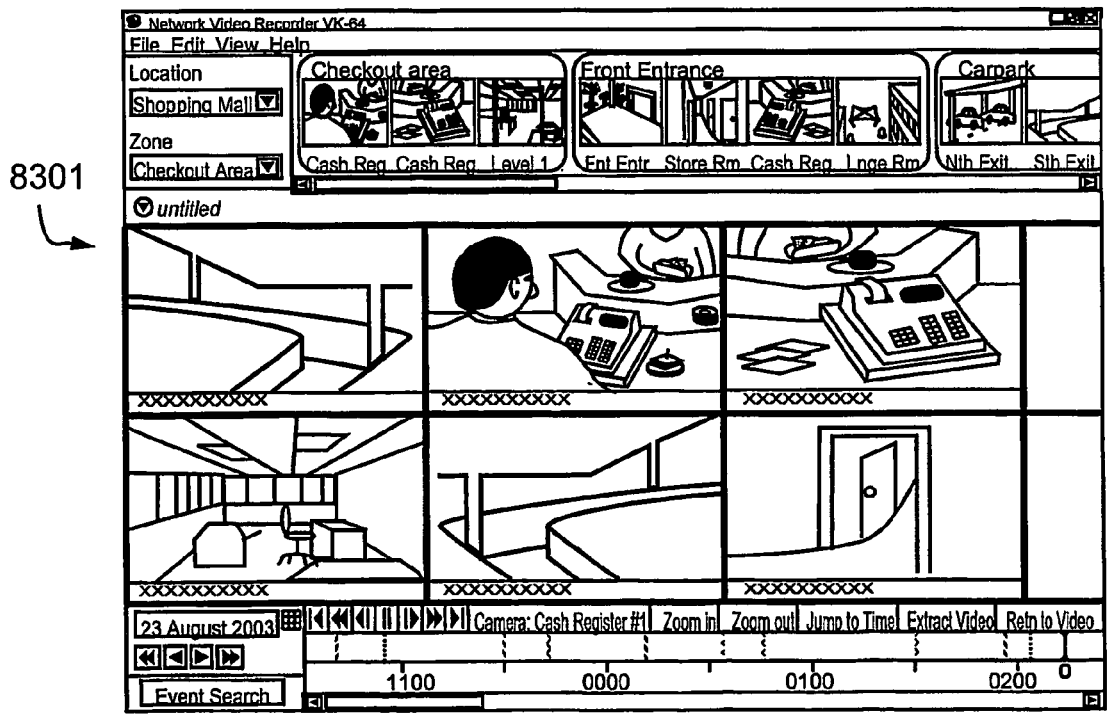
FIG. 83 shows a number of video windows arranged using the medium alignment grid of FIG. 81.

The grid type can also be configured to one of a small 8000, as seen in FIG. 80, and medium 8100, as seen in FIG. 81, where the cells of the grid 7800 are displayed as rows of boxes. FIG. 82 shows video windows (e.g., 8201) arranged using the small grid 8000 and FIG. 83 shows video windows (e.g., 8301) arranged using the medium grid 8200.

The small and medium grid types 8000 and 8100, respectively, are useful for creating layouts where all of the video windows are the same size or where the size of larger video windows is a multiple of the size of smaller video windows. In the small and medium grid types, video windows that are dragged into the grid 7800, either where the drag has been started from a thumbnail (e.g., 7615) or from another position on the layout area 7605, are automatically repositioned such that the edges of the video window align with the edges of the cell within which the video window has been dropped. The video windows are resized to fit within the cell. If a user resizes a video window and releases the press (e.g., releases a button of the mouse 2203 after a drag), the size of the video window will snap to fit the region which has the size closest to the size of the video window at the time of the release. The region may be a single cell or a number of cells (e.g., a block of cells 2 wide by 2 high, or a block of cells 3 wide by 3 high, etc). For example, a video window in a small grid may initially take up one cell. A user could resize the video window by selecting the bottom right corner and dragging out toward the bottom right of the screen. When the user releases, the video window will be resized to fit the size of the nearest block of cells (eg 4×4 grid elements).

If the grid type is changed (e.g., by a user changing the grid type from "alignment" to "small" grid or any other change in grid type), any existing video windows (e.g., 7625) in the layout area 7605 are not repositioned or resized. If a user subsequently moves or resizes one of these video windows, the user performs the same process as if dragging out from the camera selector.

The small grid typically uses 160×120 pixel boxes as cells and the medium grid typically uses 320×240 pixels boxes as cells. In some implementations, other sizes of grids or combinations of grids, having templates containing some small boxes and some large boxes arranged in a similar fashion.

If the user creates a layout then reduces the size of the main window, some video windows (e.g., 8301) may not fit inside the layout area 7605. In this instance, scrollbars appear so that the layout area 7605 can be scrolled. In addition, if video windows are dragged outside the bottom or right of the layout area 7605, relative to the layout area 7605 as shown in FIG. 76, the virtual layout area increases and scrollbars appear to allow the user to move the layout area 7605 being displayed to show a different part of the virtual layout area.

Horizontal and vertical scrollbars can be used if the main application window containing the viewing screen 7600 is resized and there are video windows positioned outside of the visible area. The layout area can be resized by resizing the main application window.

The different elements of the layout area 7605 comprise:
(i) Layout name 7629 and selection button 7627;
(ii) video windows (e.g., 7625); and
(iii) Live Events Log 7619.

5.5.2.1 Layout Name and Selection Button

The layout selection button 7629 and layout name 7627 are displayed at the top left corner of the layout area 7605, as seen in FIG. 76. The display of the layout name 7627 provides information to the user about which layout the user is currently using. The layout selection button when selected provides selection menu which allows the user to save and organise layouts and to change to view another saved layout. Layouts are selected form the selection menu by choosing the name of the layout from the layout selection menu.

When a layout is displayed, video windows can be added, moved, resized, removed and the grid type can be changed. At any time, the user can choose to save the new arrangement, by choosing "save" or "save as" items from the layout selection menu.

By choosing the "save" item, a layout is saved using the current name. By choosing the "save as" item, the user is presented with a "save as" dialog in which the user enters the name to be associated with the layout and chooses where in the layout structure the user would like to save the layout. Layouts can be organized into subfolders within the shared layout structure or within the personal layout structure and, as described above, subfolders can be nested. From within the save as dialog, a user can create new subfolders or delete layouts or subfolders.

An administrator can save layouts in either the shared layout structure or in the personal layout structure. An operator can save layouts in only the personal layout structure.

If an administrator makes changes to a shared layout and then selects another layout from the layout selection menu, changes to the configuration and preferences screen 6401 or closes the viewer application software, the administrator is prompted to save their changes. If the administrator selects "Yes" (i.e., to save changes), the changes are saved over the old layout using the same name.

If an operator makes changes to a shared layout and then selects another layout from the menu, changes to the configuration and preferences screen 6401 or closes the viewer application software, the operator is prompted to save the changes. If the operator selects "Yes" (i.e., to save changes), the save layout dialog is displayed asking the user for a new layout name, allowing operators to use shared layouts without being able to save changes over them.

If in the above cases, the administrator or operator selects "No", the viewer 2200 discards the changes to the layout.

If a user selects a new layout option from the layout selection menu, a new empty layout is created with the name "untitled". Any existing video windows are removed from the layout area 7605.

If a user selects "organize layouts" from the layout selection menu, the viewer 2200 launches an organize layouts dialog 8400. A user can use the functions provided by the dialog 8400 to change the position of a layout in the layout structure configured within the hard disk drive 2210 of the viewer 2200 as described above. The user can also create, rename and delete subfolders and move, rename and delete layouts.

Figure 85:
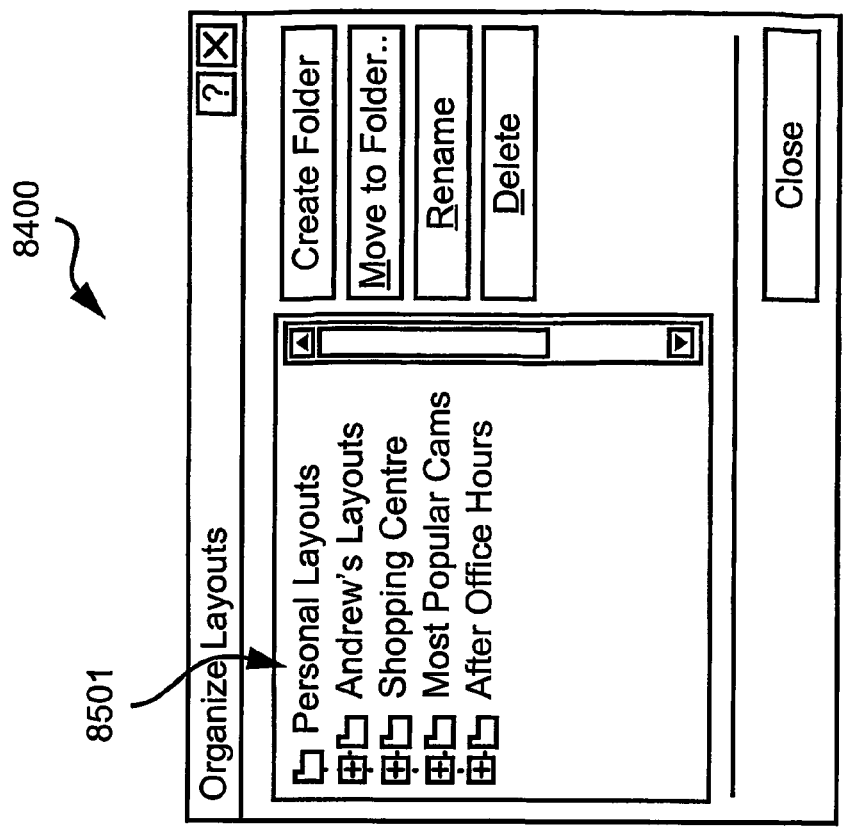
FIG. 85 shows an organise layouts dialog for operators.
Figure 84:
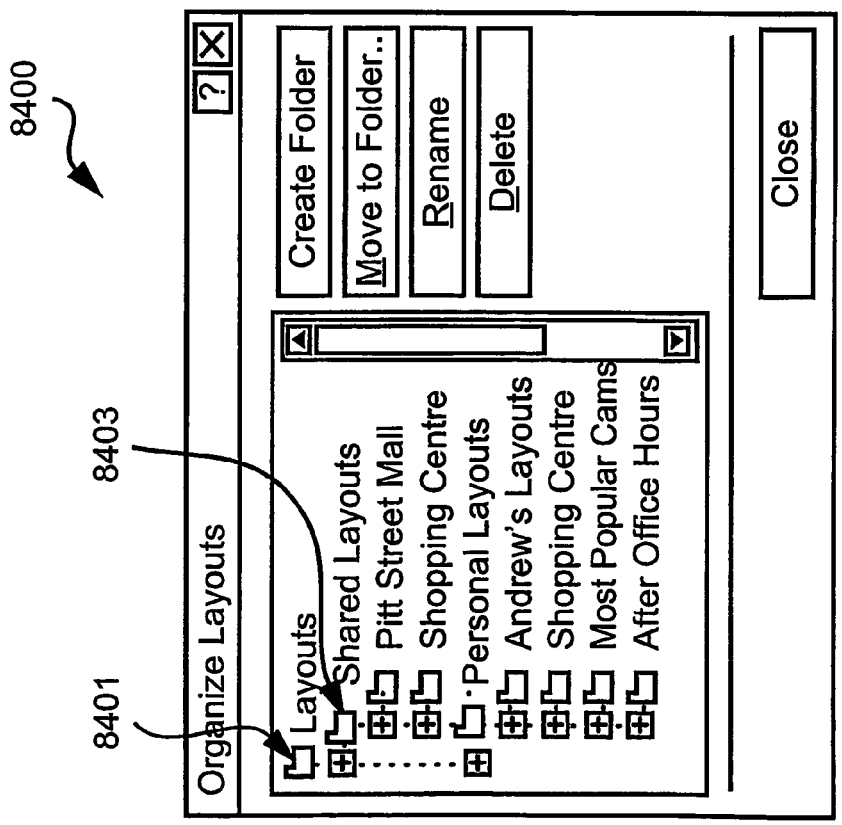
FIG. 84 shows an organise layouts dialog for administrators.

The organise layouts dialog 8400 has a different appearance for administrators and operators. For administrators, the organise layouts dialog 8400 shows a top level node called "Layouts" 8401 which is shown in FIG. 84 with a child node for "Shared Layouts" 8403 and a child node 8405 for "personal Layouts". Under each of these nodes are shown the layouts (e.g., Andrew's Layouts) or subfolders which are within that node in the hierarchical structure representing the layout structure configured within the hard disk drive 2210 of the viewer 2200. For operators, the organise layouts dialog 8400 shows a top level node 8501 for "personal Layouts", as shown in FIG. 85. Under the node 8501 are shown the layouts (e.g., Andrew's Layouts) and subfolders which are within that node 8501 in the hierarchical structure representing the layout structure configured within the hard disk drive 2210 of the viewer 2200. So administrators are able to re-organise shared layouts or personal layouts but an operator can only re-organise personal layouts.

When an administrator saves, renames or deletes a layout or subfolder or moves a layout within the layout structure using the save option, the save as dialog, or the organise layouts dialog 8400, the changes to a layout and the layout structure are sent to the master storage server 2300A.

If an administrator has made changes, the viewer 2200 sends the shared layouts and the personal layouts to the master storage server 2300A. If an operator has made changes, the viewer 2200 sends the personal layouts to the master storage server 2300A.

To send a shared layout structure, the viewer 2200 sends an NVR_AdminSet command as a request using the HTTP POST method to the master storage server 2300A. In this instance, the viewer 2200 attempts to connect to the specified hostname or IP address with the specific port and sends an HTTP POST message using the following resource (19):

/webview-nvr/nvr_adminset.fcgi?file=playout (19)

The data from the shared layout structure stored in memory 2206 is sent as part of the request.

The recording engine 201 on the master storage server 2300A receives the HTTP POST message from the web server 213 and, reads the shared layout structure data sent, and writes the shared layouts data to a file within the hard disk drive 2310 with the name typically used for share layouts, as described above, overwriting an existing file if present.

To send a personal layout structure, the viewer 2200 sends an NVR_UserSet command as a request using the HTTP Post method to the master storage server 2300A. in this instance, the viewer 2200 software attempts to connect to the specified hostname or IP address with the specific port and sends an HTTP POST message on the following resource (20):

/webview-nvr/nvr_userset.fcgi?file=ulayout (20)

The data from the personal layout structure stored in memory 2206 is sent as part of the request.

The recording engine 201 on the master storage server 2300A processes the HTTP POST message, reads the personal layout structure data sent, determines the filename for personal layouts associated with the username associated with the request, as described above, and writes the personal layouts data to a file configured within the hard disk drive 2310, with the filename overwriting an existing file if present.

5.5.2.2 Video Windows

Video windows (e.g., 7625, 8201, 8301) are used to display live or pre-recorded video sample data in the layout area 7605 of the viewing screen 7600. Each video window displays video images for an individual camera 112-115 and a user can reposition, resize or close the video window.

When a video window is first loaded into the layout area 7605, a particular camera server 109-111 associated with the video window streams live video sample data from an associated camera 112-115. If the user wants to take control of a camera 112-115 to adjust pan, tilt or zoom settings or watch pre-recorded video, the user selects an associated video window for the particular camera 112-115 in which the user is interested.

Video windows are selected by clicking on them with the mouse 2203, or other similar device, in a conventional manner. The viewer 2200 automatically selects a video window. Selecting a video window enables a playhead 9001 (see FIG. 90) and changes the display of events on the timeline 7607, as will be described below.

A number of video windows can be selected by dragging a selection box around the video windows. All video windows in the layout area 7605 can be selected in a similar manner or by selecting "Select All" from an edit application menu of the viewing screen 7600.

Multiple instances of the same video window can be loaded into the layout area 7605, allowing a user to compare video sample data from the same camera server 109-111 from different timecodes, or to review pre-recorded sample data in one video window whilst watching live video sample data in another window.

If one video window (e.g., 7625) associated with one camera server 109-111 is selected and a user clicks on another video window, the viewer 2200 deselects the first camera. To select multiple cameras associated with one or more camera servers 109-111, a user may hold down a "CTRL key" whilst selecting additional video windows or drag a selection box around the video windows that the user is interested in.

When selecting multiple video windows, timecodes of all selected video windows automatically synchronise with a first selected video window. For example, if the first selected video window is live, all other selected video windows are updated to display live video. If the first selected video window is playing video sample data from a specific date at a specific time, all other selected video windows will be adjusted to display recorded video sample data from the specific day and time.

Video windows are deselected by clicking in an empty space in the layout area 7605 or holding down the CTRL key and clicking on a selected video window.

Video windows can be resized by dragging the bottom right corner of the window. In some implementations, there is a limitation in the size of the video window. In the implementation described herein, the smallest size that a video window can be scaled to is 96×72 pixels.

When a video window is first loaded or dragged down from the camera selection area 7603, the viewer 2200 attempts to establish a live HTTP connection to the appropriate camera server 109-111. The live HTTP connection is done using a camera server protocol over HTTP such as that described in U.S. Pat. No. 6,484,195 (Canon Kabushiki Kaisha). A connection management object keeps track of all ongoing camera connections. When more than one video window exists in the layout area 7605 for the same camera 112-115, the connection management object ensures that the connection and video stream is reused. The connection management object maintains a vector of camera connection objects and a structure holding an identifier for each video window and the address of a connection callback function. When a connection to a camera server 109-111 is required by a video window, the connection management object is queried for a pointer to a camera connection. The connection management object determines if there is an existing connection by comparing the elements of the camera connections with the desired hostname and port. If the camera connection does not exist, a new connection object is created and returned, otherwise the existing object is returned. In both cases, a new relationship object is also created which connects the camera connection object with the particular video window. The relationship object exists to maintain a count on the number of references to a camera connection object, and also facilitate searching for the camera connection object that a particular video window utilizes.

Each camera connection object also has associated with the camera connection object, several vectors of callback function pointers, all of which get notification on specific events such as connection failure, image reception, and event triggering. When a video window is closed, the connection management object unregisters associated callback functions with the camera object and removes the relationship object. When the last relationship object is removed, the camera connection object is deleted. Connections are retried if a camera connection request fails or the connection is lost.

Once a live connection to a camera 112-115 has been established, video sample data begins streaming frames into a buffer configured within memory 2206. A callback function in a camera connection object is called every time a sample is received. In turn, the callback functions in an open video window associated with the camera 112-115 are called, even if the video window is ready to receive another sample. The associated video window will not be ready to receive an additional sample if the video window has not completed the processing on a previous frame, already notified via the callback function. In this instance, a user interface thread will not be signalled in the callback function that processing of a new image is necessary. There is a protected buffer of length two, which locks elements for access. When a video icon reads the latest element, it is possible for newer samples to update a sample in a non-locked element of the buffer.

Figure 86:
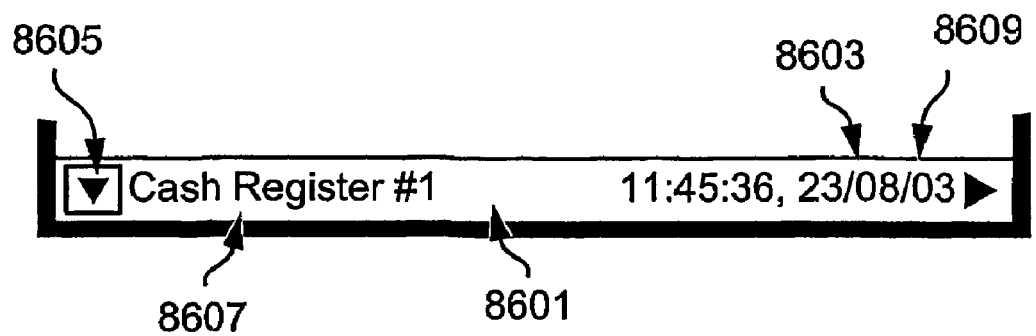
FIG. 86 shows a pre-recorded video indicator.
Figure 87:
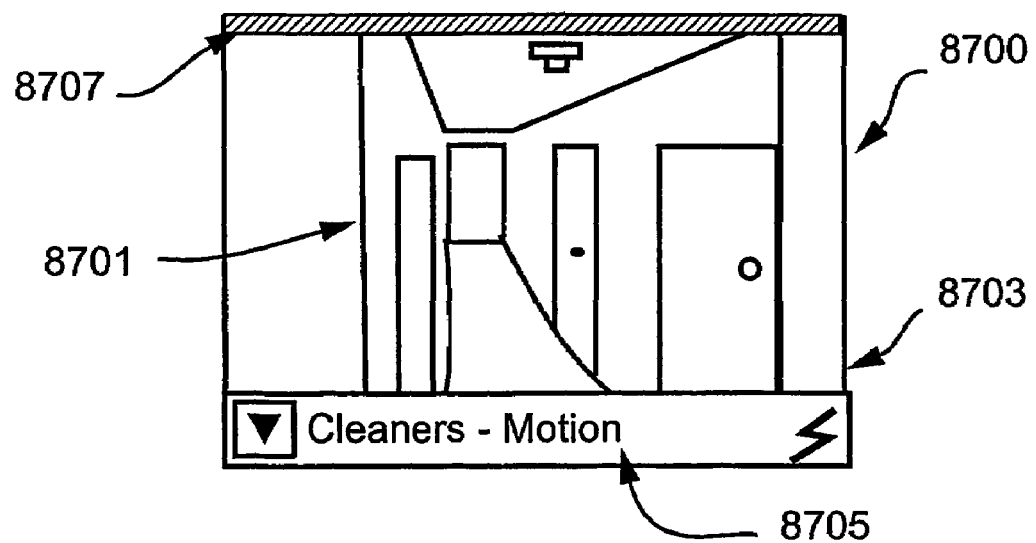
FIG. 87 shows an event indicator.

As seen in FIGS. 86 and 87, video windows (e.g., 8700) consist of a title bar 8601, a video display 8701, a pre-recorded video indicator 8603, and an event indicator 8705. In addition, when the viewer 2200 has control of a camera 112-115, the video window displays direction and zoom cursor controls (with the cursor changing to a different cursor depending on its position within the video window as indicated in FIG. 68).

5.5.2.2.1 Title Bar

Video windows (e.g., 8700) have a title bar 8601 to display:
(i) Menu Button 8605;
(ii) Camera name 8607;
(iii) Event such as motion detection or sensor 8705; and
(iv) Live video 8703 or pre-recorded 8603 video icon and timecode.

If the video window 8700 is not wide enough to display all of the elements of the title bar, the elements are truncated in the following order—when viewing live video, the first string that is truncated is the LIVE text, followed by the camera name. A video window menu and live 8703 or playback icons are always displayed. When viewing pre-recorded video, the first string that is truncated is the date, followed by the time, followed by the camera name. When truncating text, the characters that cannot be displayed are truncated and replaced with " . . . "

The menu button 8605 provides access to functions specific to an individual video window and particular camera server 109-111 as follows:
Video Display Size
Small
Medium
Large
Get Camera Control
Release Camera Control
Preset Camera Angles
(Preset 1 Name)
(Preset 2 Name)
(Preset 3 Name)
(Preset 4 Name)
(Preset 5 Name)
(Preset 6 Name)
(Preset 7 Name)
(Preset 8 Name)
Backlight Compensation
On
Off
Control External Devices
(External Device 1 Name) On
(External Device 1 Name) Off
(External Device 2 Name) On
(External Device 2 Name) Off
Record Now
Capture Still Frame
Close Window If a user selects one of the video display sizes (i.e., small, medium, large) from the video display menu, the video window is resized to the chosen size (e.g., 160×120 pixels for small, 320×240 for medium or 640×480 for large).

If the user selects "Get Camera Control" or "Release Camera Control", the viewer 2200 takes or releases control of the particular camera server 109-111 respectively, which will be described in detail below.

To determine preset positions to display, the viewer 2200 sends a request to the particular camera server 109-111 to retrieve the presets and these are used to populate the preset camera angles menu. The number of preset camera angles displayed is determined by the number of presets returned. If there are no preset camera angles, selection of "Preset Camera Angles" is disabled.

If a user selects "Backlight Compensation On" or "Off", the viewer 2200 sends a message to the particular camera server 109-111 to change the backlight compensation setting on the camera server 109-111. Only one of "Backlight Compensation On" or "Off" is displayed enabled depending on the current setting on the particular camera server 109-111.

To determine an external device name to display, the viewer 2200 sends a request to the particular camera server 109-111 to retrieve the external device names, which are used to populate the menu. If there are no external devices, a "Control External Devices" menu option as shown above is disabled. For each external device, if the "On" menu option is enabled, such indicates that the particular external device is turned off and vice versa. Such indication allows a user to know what the current state of an external device is, and such indication is only accessible when the user has control of the particular camera server 109-111.

The "Record Now" selection shown above allows operators to initiate the recording of video sample data to override the current schedule settings. If this button is selected, the viewer 2200 determines the storage server 2300 which is associated with the camera 112-115 which is associated with the video window on which the selection was made. The viewer 2200 then sends a RE_Trigger command as a request using the HTTP POST method to the specified storage server 2300. In this instance, the viewer 2200 attempts to connect to the specified hostname or IP address for the storage server 2300 with the specific port and sends an HTTP POST message using the following resource (21):

/webview-nvr/re_trigger.fcgi  (21)

As described above, a storage server configuration object for the RE_Trigger command can be supplied in the body of the request message. The storage server configuration object for the RE_Trigger command is constructed as described above using the camera identifier of the camera 112-115 associated with the video window on which the selection was made. As with other commands to the storage server 2300, the command is sent via the web server 213 which authenticates the user. Typically the request is sent with the user's authentication information in the HTTP headers (as described earlier). The user name header is retrieved by the recording engine 201 and written to the event file as part of the event record, the priority of the event is set to "highest priority" and the type of the event set to "manual rec.". This allows subsequent tracking of the "Record Now" event, which is necessary as "Record Now" events override the scheduled settings and frequent use may lead to disk space requirements that have not been envisaged by the administrator For example, the total duration of recordings before overwriting data may not be as long as expected. The user name and type of "Manual Rec." will be visible on the viewer 2200 along the timeline (discussed below).

When the recording engine 201 initiates a manual recording, the recording is initially performed at a maximum frame rate that can be retrieved from a particular camera server 109-111 (typically 25 frames per second or 30 frames per second) and the recording engine 201 records for a duration of one minute. During recording a countdown is displayed. If the user selects "Record Now" from the video window menu again during the recording period, another RE-Trigger command is sent to the storage server 2200 and the counter is reset to 1 minute.

If no storage server 2300 is associated with the particular camera 112-115 associated with the selected video window, a "Record Now" button is disabled.

If the user selects "Capture Still Frame" from the above menu, the viewer 2200 opens a "save as" dialog. The user can type in the name of a file into the save as dialog and the current frame is captured into the file.

5.5.2.2.2 Video Display

Video sample data is displayed at whatever size the user makes an associated video window, regardless of the resolution of the live video sample data coming from a particular camera server 109-111 or of the resolution of the recorded video sample data.

In most cases, users will be watching live video sample data or playing back pre-recorded sample data. However, sometimes the playhead 9001 (see FIG. 90) of the viewer 2200 will move into a region on the timeline where there is no recorded video available associated with a particular camera server 109-111 for which there is a displayed video window. Such movement of the playhead 9001 may be because there was never video recorded for a particular time (e.g., there was no scheduled recording or the recording was based on motion detection and there was no motion at that particular time). As another example, video sample data may have been removed to make more storage space available on the storage server 2300. In such cases where there is no video available, the video sample displayed in the video window is shown as black and a message saying "No recorded video" is displayed over the black on the video window.

If there is a problem accessing video sample data on a storage server 2300 or live video sample from a camera server 109-111, the associated video window is shown as black and an appropriate message is displayed in the video window.

When a Video Window is created in addition to setting up a connection to a Camera Server 109-111 (already described), the Video Window creates a new instance of a Video Playback object in memory 2206. This object manages the relationship between the Video window and the storage server 2300 that holds any video recorded from the camera 112-115 associated with that video window.

The Video Playback object is initialised with the address (ie host name or IP address and port number) of the Storage Server 2300 and the user name and password used by the user during the Viewer login process. If the Video Playback object is the first to require connection to the Storage Server the Video Playback object will generate connections to the Storage Server 2300 (i.e., it will send the initial messages that are part of the access engine protocol). If it is not the first video playback object to require connection to that particular storage server 2300, then it will get access to the existing connections.

As discussed above, depending on the actions of the user, the Video Window can display live video from the Camera connection object or previously recorded video from the Video Playback object. The layout area component 14004 controls the source of the displayed video (i.e., switching between the camera server 109-111 and the storage server 2300) by sending the respective objects (i.e., the video playback object and the camera connection object) the commands to start or stop the video (i.e., one is told to stop and the other is told to start) and by enabling and disabling the call-back procedures that are used to receive the video images.

When receiving recorded video (using the video playback object) the recorded video may consist of segments of recorded frames separated by segments where no video was recorded. The access engine serves NO_VIDEO blobs segments of video where no video has actually been recorded. The layout area component 14004 receives these messages in place of the video data via the Video Playback object. When the NO_VIDEO blob is passed on to the layout area component 14004, the display is switched to show a black image in the video window and text is overlayed with 'No recorded video'. The NO_VIDEO blob includes a timestamp, which is used to present a time value on the caption area of the Video Window in the same way as when there is video frames to be displayed.

5.5.2.2.3 Pre-Recorded Video Indicator

To indicate that pre-recorded video sample data is being displayed in a video window, the title bar 8601 is displayed in a different colour and a playback video indicator 8607 is displayed when watching pre-recorded video, as seen in FIG. 86. In addition, the timecode and date 8607 of video being played is displayed in the title bar 8601.

5.5.2.2.4 Event Indicator

An event indicator 8707 is a coloured band displayed at the top of the video window 8700 when an event is triggered, as shown in FIG. 87. The event indicator 8707 only applies to video windows that are already loaded in the layout area 7605. The colour of the event indicator 8707 is determined by the priority of an event.

When events are first triggered, the indicator 8707 flashes for a user defined period, then remains static for one (1) minute before disappearing. These durations are configurable for an event of a specific priority in configuration and preferences screen 6401.

5.5.2.5 Pan, Tilt and Zoom Controls

To get control of a camera 112-115 of an associated camera server 109-111 to change pan, tilt and zoom settings, users can select "Get Camera Control" in the video window menu or double click on a particular associated video window. Once the viewer 2200 has control, visual feedback is provided using different cursors over different regions of the video window, allowing the same form of pan, tilt and zoom (PTZ) control as described above related to the Add Camera dialog.

Whilst the user has control of a camera 112-115 and associated camera server 109-111, the associated video window can still be moved around the layout area 7605 by dragging on the title bar 8601 of the associated video window.

Control of a camera 112-115 is lost when control times out or the user selects "Release Camera Control" from the video window menu. Time out occurs when the user has stopped changing the pan, tilt and zoom settings for a period of 30 seconds and the user have not extended control during a warning period given to the user.

When the user has stopped changing pan, tilt and zoom settings for a period of 30 seconds, a warning is presented to the user laid on top of the video window saying "Control will be lost in x sec." where x is a countdown starting from 10 seconds. The warning informs the user that the user is about to lose control and gives the user the opportunity to retain control by double clicking again in the video window. Control is automatically extended if the user changes the pan, tilt and zoom settings of the camera 113-115.

If video is currently being recorded by the recording engine 201 when the user tries to take control of a camera 112-115, the user will still be able to take control of the camera 112-115. In this instance, a control right used by the viewer 2200 in the viewing screen 7600 is higher than a control right used by the recording engine 201. After controlling the camera 112-115, the user relinquishes such control. If recording settings associated with the particular camera 112-115 and camera server 109-111 require a preset position, the storage server 2300 will then take the particular camera 112-115 back to the preset position.

If another user that has a higher camera control right than the viewer 2200 is already controlling the particular camera 112-115, a request for control of the camera 112-115 is denied and a message is displayed in the video window saying "Can't get camera control".

5.5.2.6 Video Window Error Messages

Messages displayed in a video window (e.g., 7625) associated with a particular camera 112-115 and associated camera server 109-111 include:

(i) "Could not connect to camera": displayed if user is not allowed to connect to a camera server 109-111 to view live video sample data;

(ii) "Getting camera control": displayed after the user requests control of the particular camera 112-115 and before control is given;

(iii) "Can't get camera control": displayed if control is requested but the particular camera 112-115 is already being controlled by someone with higher camera control privileges;

(iv) "Control will be lost in x sec.": displayed after 30 seconds of pan, tilt and zoom inactivity, a message is displayed indicating that control of the camera will be lost in 10 (countdown) seconds;

(v) "Camera control lost": displayed if an operator has control of the particular camera 112-115 and that control is lost because another request with a higher camera control priority is sent to the camera serve 109-111;

(vi) "No recorded video": displayed when playing back pre-recorded video sample data and there is no video recorded at the current timecode where the playhead 9001 is positioned; and (vii) "Can't connect to storage server": displayed if the user can not connect to a storage server 2300 to playback pre-recorded video.

Messages in the video window are displayed using two (2) layers of text. The top layer is coloured and the bottom layer is black and offset to the right and down by one (1) pixel to create a drop shadow.

5.5.2.3 Live Events Log

As seen in FIG. 88, the live events log 7619 contains a list of events for all known cameras 112-115 regardless of whether or not those cameras 112-115 are displayed in the layout area 7605.

Events that occur after the viewer 2200 is launched (i.e., after the viewer application software is executed) are listed in the live events log 7619 and are colour coded according to an associated priority level. New events are placed at the top of the log 7619, as seen in FIG. 88. The following information is displayed for each event:

(i) Acknowledgement status;
(ii) Priority;
(iii) Event type (e.g., "motion" for motion detection, or the name of a sensor on a camera server for a sensor event);
(iv) Camera server name;
(v) Date and time;
(vi) Location and zone.

Events of a priority level which require operator acknowledgement, as configured in the viewer settings as described above, are displayed flashing between bold and normal text with an alarm bell icon 8801, as seen in FIG. 88. The events continue to flash for the duration configured in the viewer settings. Once the events have been acknowledged the icon 8801 is replaced by a dot icon and the event details are displayed static using normal text (non-bold).

Double clicking on an event in the live events log 7619 acknowledges the event and displays the associated video window. If the video window is already displayed in the layout area 7605, the video window automatically becomes selected. If the video window is not in the layout area 7605, a new floating video window is displayed on top of the layout area 7605 and is automatically selected. In both cases, the playhead 9001, as seen in FIG. 90, is automatically moved to a timecode for that event.

For incoming events of a priority level which has been configured for audio alerts, the viewer 2200 plays an audio sample synchronized with flashing (i.e., once per flash). Regardless of the time an event arrives, flashing is synchronized so that all unacknowledged events in the notification state will flash at the same time. When an event notification period elapses, the unacknowledged events remain bold. If an operator acknowledges an event, the notification cycle ends immediately and the event stops flashing.

Single clicking on an event just selects that event. Only one event can be selected at a time. The live events log 7619 can be resized, repositioned or closed. While open, the log 7619 is always displayed on top (i.e., displayed on top of any video windows on the viewing screen 7600). Displaying the log 7619 on top ensures that the live events log 7619 cannot be obscured behind video windows. On first use of the viewer 2200, the live events log 7619 is closed and is opened by selecting "Live Events Log" from the View menu. Subsequently when the viewer 2200 is launched, the live events log 7619 is displayed at the size and location that the log 7619 was in when the viewer 2200 was closed.

If the live events log 7619 is closed when an event that requires operator acknowledgment occurs, the live events log 7619 is automatically opened at the size and position that the log 7619 was last open at.

The maximum number of events in the live events log 7619 is 200. As new events are triggered, the oldest events are removed from the log 7619 to make room for the newest events.

5.5.3 Timeline

The timeline 7607 displays events for cameras 112-115 associated with a selected video window (e.g., 7625) in the layout area 7605. If no video windows are selected, the timeline 7607 displays events for cameras 112-115 associated with all video windows in the layout area 7605.

The timeline consists of a title 8901; the playhead 9001; playback controls 8903; zoom controls 8905; jump to time 8907; extract video button 8909; return to live button 8911; event display area 8913; events (e.g., 8913); scrollbar 8915; timeline navigation; event search 8917.

5.5.3.1 Title and Playhead

As seen in FIG. 90, the title 8901 shows the name of the currently selected camera 112-115 if there is a single camera 112-115 selected. If no cameras 112-115 are selected, the title is "No cameras selected". If multiple cameras 112-115 are selected, the title is "Multiple cameras selected".

The playhead 9001 provides visual feedback corresponding to the position in time from which video sample data in a selected video window is being played. The playhead 9001 is a visual representation of a timecode for recorded video sample data.

If only one video window (e.g., 7625) is selected, the playhead 9001 represents a timecode of the recorded video sample data associated with that one video window. If multiple video windows are selected, the time position from which playback is occurring is synchronised and represented by one playhead 9001, allowing a user to review recorded video sample data for more than one camera 112-115 at the same time.

If no video windows are selected, the playhead 9001 is set to a disabled state and remains in the last position of the playhead 9001.

There are two video viewing modes as follows:
(i) Monitoring live video sample data; and
(ii) Playing back pre-recorded video sample data.

5.5.3.1.1 Monitoring Live Video Sample Data

By default, video windows loaded into the layout area 7605 display live video sample data, which is indicated by the position of the playhead 9001 in a "Live" position on the timeline 7607. The live position is a fixed distance from the right edge of the timeline when the scrollbar 8915 is scrolled all the way to the right, with respect to the timeline 7607 as shown in FIG. 90. If the user continues watching live video sample data, the playhead 9001 stays still whilst the timeline 7607 scrolls left underneath the playhead 9001, representing the passage of time.

5.5.3.1.2 Playing Back Pre-Recorded Video Sample Data

To view pre-recorded video sample data, the playhead 9001 can be moved to a position on the timeline 7607 other than the "Live" position. The playhead 9001 can be repositioned using:
 (i) Playback controls 8903
 (ii) Dragging the playhead 90001 to a new timecode;
 (iii) Clicking in the event display area 8913 of the timeline 7607;
 (iv) Clicking on an event in the timeline 7607; and
 (v) Clicking on an event in the live events log 7619.

The playhead 9001 can be repositioned by clicking and dragging on the playhead 9001 using the mouse 2203, for example, or within an active region around the playhead 9001 or on a grip area 9003 at the base of the playhead 9001. The playhead 9001 is repositioned wherever the user releases the drag and the playback of video sample data on all selected video windows returns to either play or pause depending on which state the particular selected video window was in before the user started the drag operation. If the user was watching live video sample data before repositioning the playhead 9001, playback is automatically set to play.

Moving the playhead 9001 controls all selected video windows in the layout area 7605. That is, dragging the playhead 9001 to a specific time on the timeline 7607 will cause recorded video sample data associated with camera servers 109-111 associated with all of the selected video windows to be repositioned in time so that playback of the recorded video sample data is played back from the same specific time position. However, video windows in the layout area 7605, which are not selected are not affected by the movement of the playhead 9001. For example, unselected video windows that are playing recorded video sample data will continue to play the recorded video sample data before, during and after the movement of the playhead 9001. Similarly, unselected video windows that are playing live video sample data will continue to play the live video sample data before, during and after the movement of the playhead 9001.

Clicking in the event display area 8913 repositions the playhead 9001 to where the cursor is when the click occurs. Positioning the playhead 9001 in such a manner causes recorded video sample data associated with all selected video windows to be repositioned in time so that playback of recorded video associated with camera servers associated with all of the video windows is played back from the same time position.

If a user clicks on an event (e.g., 8913) in the timeline 7607, the viewer 2200 moves the playhead 9001 to a starting timecode of that event and selects the video window associated with a particular camera server 109-111 associated with the event. The recorded video sample data on the storage server 2300 which has been recorded from that particular camera server 109-111 is played back starting from the time of the event.

When the viewer 2200 is instructed to play back video sample data associated with a specific video window, the viewer 2200 identifies the particular camera server 109-111 associated with the video window, then identifies a storage server 2300 on which that camera server 109-111 is being recorded. The viewer 2200 then connects to that storages server 2300 using the access engine 201 commands, as described above, over the HTTP protocol.

A user can play back video sample data associated with different camera servers 109-111 such that different video data samples streams are positioned at different points of time and are playing back from those different times in parallel. For example, a user can select one video window and then select a position on the timeline 7607. The playhead 9001 is then positioned at a chosen time and recorded video sample data associated with that video window (ie., the video sample data recorded from a corresponding camera server 109-111) is played back starting at the chosen time. Continuing the example, the user can then select a new video window (e.g., by clicking on the new window using the mouse 2203) which has the affect of selecting the new window and deselecting the previous window. The video sample data being played back in the previously selected window would continue to play back. The user could now click on a different position on the timeline 7607. As a result, recorded video sample data associated with the newly selected video window will play back at a temporal position corresponding to the newly selected position on the timeline 7607. However, the playback of recorded video sample data associated with the previously selected video window will not be affected by the user clicking on the new position on the timeline 7607 and will continue to playback as before. Accordingly, a number of video windows can be played back showing images that were recorded on different camera servers 109-111 at different points in time. For example, an operator may wish to see video sample data recorded from different cameras 112-115 showing the movement of a particular person through a building. The operator may set the recorded video sample data from the different camera servers 109-111 playing at different times so that all of the recorded material associated with this person is playing at the same time, even though the sample data was recorded at different times.

The above example describes playing back video sample data from different camera servers 109-111 which have been recorded at different points in time. The system 100 can also be used in a similar manner to play back video sample data recorded from the same camera server 109-111 at different points in time but to play the video sample data back in parallel in different video windows. Playing the video sample data back in parallel in different video windows can be achieved by creating multiple video windows which are associated with the same camera server 109-111.

Creating multiple video windows in such a manner is done by dragging from a thumbnail (e.g., 7615) representing a camera server 109-111 down onto one position on the layout area 7605 to create a first video window associated with the camera server 109-111 and then dragging from the same thumbnail down onto another position on the Layout Area to create a second video window associated with the same camera server 109-111. The user can then select one video window, select a position on the timeline 7607 to show recorded video sample data from the chosen time. The user could then select the second video window and select a time on the timeline 7607 different from the first time selected. The second video window will then show video sample data recorded from a different point in time. The two video windows will continue to playback recorded video sample data from a storage server 2300 showing images recorded at different points in time. As such, the user can compare recorded images from two different positions in time recorded from the same camera server 109-111.

5.5.3.1.3 Returning to Live Video

To return to watching live video images, the playhead 9001 can be repositioned by dragging the playhead 9001 all the way to the right until the playhead 9001 hits the Live position or by clicking on a "Return to Live" button. When the "Return to Live" button button is pressed the playhead 9001 is moved to the Live position at the right hand side of the timeline 7607. The "Return to Live" button is only available when the playhead 9001 is not in the live position.

5.5.3.1.4 Selecting a Segment of Video

A segment of video sample data can be selected for extraction purposes by selecting a single video window and clicking and dragging an area in the timeline 7607. The selected segment may be dragged out either from left-to-right or right-to-left with the left edge used as an in point (i.e., starting timecode) and the right edge used as the out point (i.e., ending timecode). The selected area is displayed with a semi-transparent highlighted area.

If a user selects the extract video button, a save dialog is displayed prompting for a filename and location for saving video sample data. The file location would typically be on the computer module 2201 on which the viewer 2200 software is running but could be a remote file system (e.g., one mounted using a remote file system protocol). The user enters a filename and presses OK. As a result, a message is sent to the storage server 2300 associated with a camera server 109-111 that recorded the video sample data, which is associated with the selected video window. The segment of video associated with the specified time range is requested. The viewer 2200 typically uses a "transfer" flag (to be described below) in such a request to ensure that the storage server 2300 sends the video sample data as fast as possible rather than at a normal play rate. A further reason for using the transfer flag is to ensure that the storage server 2300 does not send a large number of "no video" blobs corresponding to time ranges of video sample data not available on the storage server 2300. In one implementation, the storage server 2300 may send no "no video" blobs in this instance. In another implementation, the storage server 2300 may send one "no video" blob or an indicative frame (e.g., a black frame or a frame with a message indicating missing video) to indicate where there is a gap in the time represented by the transmitted video. In addition, the viewer 2200 may use a "no-skip" flag (to be described below) in the request for the segment of video associated with the specified time range, to ensure that there is no frame dropping by the storage server 2300.

As the viewer 2200 receives requested video sample data, the viewer 2200 saves the sample data on the hard disk drive 2210 or other storage medium using a filename and location selected by the user in a save dialog. In one implementation, if the viewer 2200 receives a "no video" blob, the viewer 2200 saves an indicative frame (e.g., a black frame or a frame with a message indicating missing video sample data) in the corresponding position within the video sample data in the file represented by the filename. This ensures that when extracted video sample data is played back in video playing software (e.g., Apple QuickTime Player™), the video playing software displays the indicative frame from the start of the time region for which there is no extracted video sample data. Typically, the video playing software playing the extracted video sample data in realtime would continue to show the indicative frame for the full duration of the time represented by the gap in the video sample data. When the playback time reaches the next available piece of video sample data, the video playing software may resume playing that video sample data.

A segment of video sample data is typically saved in a standard or de facto standard file format so that the video sample data can be used with other software applications. For example, the video sample data could be saved in AVI™ or WMA file for playback by Microsoft™ Windows™ Media Player (WMP) or saved as a MOV file for playback by Apple™ QuickTime™. Alternatively, the video sample data can be saved in an AVI file and with index data in a MOV file. In this instance, the AVI™ file to be played in WMP and the MOV file to be played in QuickTime™ if the AVI™ file is also present.

During retrieval of a segment of video sample data, a modeless extracting video dialog is displayed to indicate that video extraction is taking place. While a selection of video sample data is shown on the display 2214, the playhead 9001 can still be moved (e.g., by dragging the playhead 9001 to a new location). The new location does not have to be inside the selected video segment. If the user clicks on the timeline 7607 inside the selected segment, the playhead 9001 will move to the position of the click and the segment will stay selected. Clicking on the timeline 7607 outside the selected segment moves the playhead 9001 to that position and deselects the selected area.

The extract video button is only made enabled when a segment of video has been selected and only one video window is selected.

In one implementation, there can be a restriction in the maximum duration of a selection on the timeline 7607 (e.g., one hour). In this instance, the segment can not be dragged out to be more than this maximum duration.

5.5.3.2 Playback Controls

As seen in FIG. 91, playback controls 8903 change the position of the playhead 9001. These include the following, each being represented by a conventional symbol:
(i) Previous Event;
(ii) Rewind;
(iii) Nudge Back;
(iv) Play/Pause;
(v) Nudge Forward;
(vi) Fast Forward; and
(vii) Next Event.

Playback controls remain disabled until one or more video windows are selected.

In one implementation, the playback controls 8903 are disabled if the playhead 9001 is at the live position. In another implementation, the playback controls 8903 can be enabled when the playhead 9001 is at the live position and the operations can be performed directly on live video sample data. For example, pressing pause pauses the playing of live video sample data and leaves a corresponding video window displaying a current frame (i.e., sample) of video at the time the pause button was pressed. In some implementations, pressing pause again after pressing pause when a live video window is selected results in the video window reverting to playback mode and showing video playing back starting from a point in time at which the pause button was pressed. In another implementation, pressing pause again after pressing pause when a video window is selected results in the video window displaying live video sample data again.

The Play/Pause button toggles between play and pause when the user clicks the button.

When playing back pre-recorded video sample data, the timeline 7607 remains static while the playhead 9001 moves to the right. When the playhead 9001 reaches the right edge of the visible area of the timeline 7607, the timeline 7607 jumps to the left so that what was the right edge of the visible area is now aligned with the left edge and the playhead 9001 then continues moving the right.

The rewind and fast forward buttons rewind or fast forward the playhead 9001 at varying speeds depending on how many times the user has clicked on the buttons. For example, clicking on the rewind button results in stepping through different rewind speeds starting at two times normal speed, then 5×, 10×, then loops back to 2×, 5×, 10×, etc. For example, clicking on the fast forward button results in stepping through different fast forward speeds starting at two times normal speed, then 5×, 10×, then loops back to 2×, 5×, 10×, etc.

When the user stops rewinding or fast forwarding, the playback of video sample data returns to either play or pause depending on which state the playback was in to start with.

To stop fast forwarding or rewinding, the user may click the Play/Pause button. Clicking the opposite button activates that button, for example, if the user is fast forwarding then the user clicks the Rewind button, the video stops fast forwarding and starts rewinding.

Clicking on the Previous or Next Event buttons while rewinding or fast forwarding, moves the playhead 9001 to the previous or next event and continues rewinding or fast forwarding.

The nudge button moves the playhead 9001 either forward or back one frame at a time.

The Previous and Next Event buttons move the playhead 9001 from a current position on the timeline to the previous or next primary event on the timeline. Playback then returns to whatever mode playback was in to start with. As will be described below, primary events are those events that are associated with cameras 112-115 that are associated with selected video windows (or, if no video windows are selected, all video windows in the layout area 7605). Thus, if no video windows are currently selected, pressing the Previous Event or Next Event buttons will move the playhead 9001 to the position on the timeline 7607 associated with the previous or next event. If one or more video windows are selected, pressing the Previous Event or Next Event buttons will move the playhead 9001 to the position on the timeline associated with the previous or next event associated with cameras 112-115, which are associated with the selected video window or video windows.

If the user wants to watch a particular event a number of times, the user can place the playhead 9001 at the start of the event, click the Play button, and then jump back to the start of the event by clicking on the Previous Event button. The playhead 9001 continues playing after returning to the start of the event.

If there are no primary previous or next events on the timeline when either of these buttons is pressed, then the playhead 9001 remains where the playhead is and nothing happens.

5.5.3.3 Event Display Area

The event display area 8913 is where events are displayed on the timeline 7607. The event display area 8913 is also used to indicate separation between days and when there is recorded video sample data available for a selected video window.

When changing between normal time and daylight savings time, actual time remains continuous on the timeline 7607 with the time labels skipping or duplicating depending on whether daylight savings is starting or ending. If video sample data is being recorded across these times, the video sample data will either be cut short, when an hour is skipped, or the recording will be extended, when an hour is duplicated.

5.5.3.4 Events

Events associated with a particular camera server 109-111 including events from sensors connected to the particular camera servers 109-111, doors opening, motion detection, etc and events from image-based motion detection in a storage server 2300, can be represented visually (e.g., an event 9005 as seen in FIG. 90). Such events are displayed in the event display area 8913 to indicate when events occurred and their level of importance. The displayed events are also clickable objects that change the position of the playhead 9001 and can select video windows and set video windows to playback video from a corresponding time.

Displayed events are positioned on the timeline 7607 by taking the actual timecode of the event. Such displayed events have five colour coded priority levels, comprising highest, high, medium, low and lowest, and will be referred to hereinafter as "events".

In addition to colour coding, events associated with camera servers 109-111 which are associated with selected video windows are displayed as primary events (i.e., visually stronger) and events for camera servers 109-111 which are not associated with selected video windows are displayed as secondary events (i.e., visually weaker).

If no camera servers 109-111 are selected, the timeline 7607 treats such non-selection as a special case as though all camera servers 109-111 represented in the layout area 7605 are selected. In this instance, the events for all camera servers associated with video windows which are on the layout area 7605 are displayed as primary events.

Rollover and mouse down states for secondary events are displayed the same as rollover and mouse down states for primary events.

When events are displayed at the same time, primary events are always displayed in front of secondary events. If both events are primary, the higher priority event is displayed in front, hiding the lower priority event.

Clicking on an event makes the playhead 9001 jump to the start time code of that event. Both primary and secondary events are clickable.

If only one camera server 109-111 is selected, clicking on one of the events associated with the selected camera server 109-111 moves the playhead 9001 to the starting timecode of that event and positions the video to playback from the corresponding position in time.

When multiple camera servers 109-111 are selected, clicking on a primary event keeps all of the same camera servers selected and moves the playhead 9001 to the time of that event, regardless of which camera server the event belongs to, and positions all selected video windows to playback from the corresponding position in time.

Clicking on a secondary event deselects any currently selected cameras, moves the playhead 9001 and selects the camera server 109-111 associated with that event.

Events have a rollover state and are clickable. Rolling over an event also displays information about the event including: camera name, event name, and time in a similar fashion to tool tips.

5.5.3.5 Scrollbar

The scrollbar 8915, as seen in FIG. 90, provides navigation along the timeline 7607. The scrollbar 8915 does not change the position of the playhead 9001. Scrolling left moves the view of the timeline backwards in time, scrolling right moves the view forward. The timeline 7607 can only be scrolled as far right as the current "Live" time.

When viewing live video sample data, the scrollbar 8915, as seen in FIG. 90, is positioned as far right as possible, pushed up against a right scroll button. As time passes, the scrollbard 8915 remains in this position even though the timeline 7607 itself moves left.

From the "Live" position, the timeline 7607 represents one week into the past. To move to the beginning of the week, the user moves the scrollbar 8915 to the left. The amount of time visible within that week is determined by how zoomed in the view of the timeline 7607 is. Zooming in and out changes the amount of time displayed but does not change amount of time represented by the scrollbar 7607.

To jump to days or weeks outside of the week represented by the scrollbar 7607, previous week, previous day, next day and next week buttons are provided below the date display.

5.5.3.6 Zoom Controls

The timeline 7607 can be zoomed in to show more detail or out to view longer time periods. Zooming out provides more of an overview of event activity and allows patterns to be recognised more easily.

The user can zoom in on the timeline 7607 to see time in more detail, which increases the distance between the displayed time divisions. As the user zooms in more, additional time segment markers and time codes are displayed.

The zoom controls 8905 are positioned above the timeline. Zooming in or out changes the speed that the playhead 9001 will move when watching live, fast forwarding and rewinding. For example, when the timeline 7607 is zoomed in, the playhead 9001 will move faster than when the playhead 9001 is zoomed out as the representation of the same duration of time is wider when the timeline 7607 is zoomed in. So, because the distance for the playhead 9001 to cover is greater for the same amount of time, the playhead travels faster.

5.5.3.7 Timeline Navigation

Timeline navigation controls a date range that is displayed in the timeline 7607. Timeline Navigation does not change the position of the playhead 9001. Timeline navigation controls include: Calendar; Previous Week; Previous Day; Next Day; Next Week.

Clicking on the previous week button changes the date range displayed in the timeline 7607 from a current week to the previous week and clicking the Previous Day button makes the timeline jump back 24 hours. However, the timeline 7607 still displays seven days in total. For example, if the user is looking at 15:00 on 23 Aug. 2003 and the user clicks on the previous day button, the timeline 7607 will jump to 15:00 on the 22 Aug. 2003 and the appropriate events will be displayed.

A date display indicates the date of the time region being displayed in the timeline 7607. If the timeline 7607 is zoomed out so that more than one day is visible in the timeline 7607, the date of the first day displayed in the timeline 7607 is used. As the scrollbar 7607 is moved, the date display automatically updates as different days are made visible in the timeline 7607.

Clicking on a calendar icon launches a standard calendar control where users can select a day to view in the timeline 7607. Such an action only changes the view of the timeline 7607 and does not change the position of the playhead 9001. Clicking on a date selects that date and clicking an OK button closes the calendar control and updates the timeline to display the selected date.

5.5.3.8 Event Search

The event search button 8917 brings up an event search dialog 9200, as seen in FIG. 92, which can be used to search for events. The event search dialog 9200 allows the user to specify search criteria, view search results and open a video window associated with an event directly from the event search dialog 8917.

The search criteria can be entered in the following fields:
(i) Priority 9201: which allows the user to select a priority level;
(ii) Location 9203: which allows the user to select a location from a list of locations returned from the master storage server 2300A;
(iii) Zone 9205: which allows the user to select a zone from the list of zones returned from the master storage server 2300A which is in the currently selected location;
(iv) From date/time 9207: which allows the user to enter the starting date and time which the user would like to use to constrain the search; and
(v) To date/time 9209: which allows the user to enter the ending date and time within which the user would like to constrain the search.

When the user has entered the search criteria, the user can press a search button 9209 which initiates the search.

As hits corresponding to the entered search criteria are received from the storage servers (e.g., 2300A, 2300B, 2300C and 2300D), each event is displayed as the event is received. A user can view recorded video sample data associated with the event in a video window by double clicking on the event in a search results list 9211 or by selecting the event and clicking a view event in camera button 9213.

The view event in camera button 9213 is only enabled when a search result is selected. Only one item can be selected at the same time.

If no events are found or the viewer 2200 fails to connect to a storage server 2300, "There are no events to display" is displayed in the dialog 9200.

Clicking stop search 9215 stops the search put leaves the current results from the search displayed. Clicking cancel 9217 stops any searching and closes the dialog.

5.5.3.9 Jump to Time

To jump to a particular timecode, users can click the jump to time button 8907 above the timeline 7607. As a result, a jump to time dialog is launched where users can enter a timecode and press OK. The playhead 9001 and timeline are moved to the entered time within the day that the playhead 9001 is currently on.

The jump to time button remains disabled until one or more video windows are selected.

If a user tries to jump to a time that is missing due to the start of daylight savings, the playhead 9001 jumps to a time one hour before the specified time. If the user tries to jump to a time that is duplicated due to the end of daylights savings, the playhead 9001 jumps to the second instance of the time.

5.5.4 Viewer Errors and Warnings

The viewer 2200 informs a user if any problems are encountered, for example, with connection to camera servers 109-111. Examples of error and warning messages which may be provided to the user are as follows:

(i) If the user attempts to launch the viewer 2200 (i.e., execute the viewer application software) when a specified master storage server 2300A cannot be found on the network 2220, an error is given saying "Failed to connect to Master Storage Server.";

(ii) When an administrator attempts to access the configuration and preferences screen 6401, the viewer 9001 attempts to connect to a known storage server 2300. If the known storage server 2300 can not be found, a message is given saying "Failed to connect to Storage Server. Recording settings for camera servers on these storage servers will not be available.";

(iii) If an administrator attempts to save changes to any of dialogs of the configuration and preferences screen 6401 and the relevant storage server 2300 cannot be found on the network 2220, an error is given saying "Failed to connect to Storage Server. The changes you are trying to save cannot be sent to the storage server and will be lost."

(iv) Whenever the system 100 attempts to connect to a camera server 109-111 from the Configuration screens and fails, an error is given saying "Connection to the camera server could not be established.";

(v) Whenever a connection is lost to a camera server 109-111 from any of the dialogs of the configuration and preferences screen 6401, an error is given saying "Connection to the camera server has been lost.";

(vi) If an administrator attempts to add a storage server that has already been added, an error is given saying "This storage server has already been added.";

(vii) If an administrator tries to edit the address of a storage server 2300 when there are pending changes for one or more associated camera servers 109-111, an error is given saying "Please save or discard your changes before changing your Storage Server settings.";

(viii) When a user attempts to start the viewer 2200 (i.e., execute the viewer application software) with the live events log 7619 open or if the user attempts to open the live events log 7619, the viewer 2200 attempts to connect to all known storage servers 2300. If there are any connection problems, an error message is given for each unavailable storage server 2300 saying "Failed to connect to Storage Server. Recorded video and event information for camera servers recording to this Storage Server will not be available."; and (ix) If a user tries to delete a current layout or a folder containing the current layout, an error is given saying "You cannot delete this because it is the current layout or it contains the current layout."

5.6 Commands, Flags and Parameters

A number of commands, flags and parameters as sent between the access engine 203 and the viewer 2200 will now be described.

A video request is used to request video sample data from the access engine 203. Such requests consist of a video command, a camera identifier, a time range, a play rate, a frame rate, and flags that affect how the video sample data should be sent.

A time range specifies the range of video sample data to send. The start time is obligatory, but an end time is optional. If no end time is provided, then the sampled data will continue to be streamed starting from the specified start time until there is no more video sample data to send. Thus, as long as the recording engine 201 is recording video sample data, the access engine 203 will continue to stream video sample data. Alternatively, the specified time range value can be set to the value "Live", meaning that a live feed from the specified camera is provided at approximately the specified frame (i.e., sample) rate.

A play rate specifies how quickly the video sample data will be sent. If the play rate is one hundred then the video sample data is sent in real time. A lower play rate means the video sample data will be sent slower than real time. A play rate of fifty specifies half speed. A play rate of two hundred indicates double speed. The play rate is set to a negative number to play data backwards.

Frame rate is the number of frames per second to send. This determines the rate of video transfer, but does not affect the time the received video can be played for. Thus, regardless of the frame rate, one minute of video sample data will still be viewed as one minute of video sample data by the viewer 2200. The number of frames may differ, but the amount of time covered is the same. If the requested frame rate is higher than the available video frame rate, then the frame rate is reduced to the frame rate of the video sample data. The frame rate is a value between 0.1 and an upper value of thirty.

Flags available for video sample data requests are a transfer flag and a no-skip flag. The transfer flag specifies whether or not video sample data should be sent as fast as possible rather than at the specified play rate. If the transfer flag is true then the access engine 203 will not attempt to send video sample data at the specified play rate. Rather, the access engine 203 will send the video sample data as fast as the available bandwidth permits. Setting the transfer flag to true also sets the no-skip flag to true, and the value of the no-skip flag in the command is ignored.

A no-skip flag causes the access engine 203 to change an algorithm to send samples to the viewer 2200 so that every sample is sent. If the no-skip flag is false then the access engine 203 will gather the samples it needs to send in a given time quantum and, if there are too many samples, the access engine 203 sends some of the available samples. For example, the access engine 203 can only send the last sample in a group of samples, as this is the most relevant to the viewer 2200. Such an arrangement prevents network congestion or viewer overload. If the viewer 2200 wishes to receive every available sample, then the no-skip flag should be set to true. The access engine 203 will then send every sample, which can have a detrimental effect on the performance of the access engine 203 and the recording engine 201 if the engines 201 and 203 are running on the same computer module 2301.

If there is no video sample data at the start time of a request, but there is video sample data for some of the requested time range, then frame markers (i.e., also referred to as "no-video" blobs) will be sent to the viewer 2200 instead of video data samples where no video data samples are present. "No-video" blobs are also sent if there are any gaps in the video sample data for the requested time range. The video command returns a video data sample stream identifier to the viewer 2200 as part of the reply. The video sample data stream identifier is used by the viewer 2200 to identify the video blocks as they arrive on the data connection 6015. Any command which modifies the video data sample stream also requires the identifier. The identifier is only valid in relation to the control connection 6005 that returns the identifier. The identifier can never be used on any other control connection.

An "event" command is used to request a range of events from the access engine 203. The command consists of the event command, a camera identifier and a time range. The time range has the same format used in the video command. If an end time is not specified then the request does not end and any new events on the specified camera server 109-111 will be sent to the viewer 2200. Specifying an end time in the future is not the same as not specifying an end time at all. If a future end time is specified, then the transfer will end once all current events have been sent, even if the end time has not yet been reached or is still in the future. If no end time is provided, the access engine 203 will continue to send events to the viewer 2200 as the events arrive until the video data sample stream is stopped. Event requests are not timed in the same way as video requests and consequently are sent as quickly as possible.

An "event" command returns a stream identifier as part of its reply. The identifier is used in the same way as the stream identifier in a video request.

A "stop" command is used to end a requested sample data stream. Stop commands have a single parameter, the stream identifier of the sample data stream that is to be ended. The end command is used to stop video and event requests. The stop command causes a sample data stream to stop sending data as soon as possible. Because of timing issues, the viewer 2200 does not assume that no more video or event data will be received after the stop command has been issued. The viewer 2200 instead waits to be informed that there will be no more video or event data on the data connection 6015.

A "pause" command is used to pause a request stream. A pause command has a single parameter, which is the stream identifier of the sample data stream to be paused. Both video and event streams can be paused. Because of timing issues, the viewer 2200 does not assume that no more video or event sample data will be received on the data connection 6015 after the pause command has been issued.

A "resume" command is used to resume a previously paused sample data stream. The resume command has a single parameter, which is the stream identifier of the stream to resume. Data transfer on the sample data stream will pick up from where the transfer was interrupted. Video data sample streams resume streaming at the same rate as was used before the stream was paused. The access engine 203 does not attempt to catch up on sending samples that would have been sent had the stream not been paused.

A "shut-down" command is used to cleanly finalise the connection between the access engine 203 and a camera server 109-111. The shut-down command has no extra parameters. Once the shut-down command has been sent, the viewer 2200 will not be able to issue any more commands until the viewer 2200 has established a new control connection 6005 to the access engine 203. All sample data streams will terminate and the data connection 6015 is closed.

A "next" command is used to request the next n frames in a video samples data stream. The next command has two parameters, the identifier of the stream on which the samples are to be fetched, and the number of samples (i.e. frames) to send. The next command can only be used on a video stream. If the stream is not paused when the request is made, then the access engine 203 pauses the stream before the next command is performed. In this case the point at which the stream is paused is timing-dependent. Consequently, it is unpredictable as to exactly which n frames will be sent by the next command. However, no frames will be sent out of order.

A "previous" command is used to request the previous n frames in a video sample data stream. The command has two parameters, the identifier of the data sample stream on which the samples are to be fetched and the number of samples to send. It is not valid to use the previous command on an event stream. If the event stream has not been paused when the request is made, the access engine 203 pauses the stream before the command is performed. In this case, the point at which the stream is paused is timing dependent. Consequently, it is not clear in advance which n frames will be sent as part of the command. However, no frames will be sent out of order.

A "modify" command is used to modify a previously started video data sample stream. The attributes of the video data sample stream that can be modified are the frame rate of the stream, the play rate of the stream and the requested range, together with whether or not the stream is a transfer. In a transfer stream all samples are sent regardless of network congestion, and the video is sent as fast as possible rather than in real time. Changing the range will cause the stream to restart at the beginning of the range provided. All other parameters will have the same affect on the stream as they would have had if set when the stream was requested.

A "keep alive" command is sent by the viewer 2200 on a regular basis so that intermediate proxy servers do not close the control connection 6005 due to inactivity. The implementation shown in FIG. 61 using the apache web server 6110 and FastCGI module 6105 does not require the viewer 2200 to keep the connection open. Thus the keep alive command is redundant in the particular implementation of FIG. 61. This may not be the case in other implementations. The keep alive command cannot fail and takes no parameters. The connection identifier is not required in the keep alive command.

5.7 Viewer Components

Figure 116:
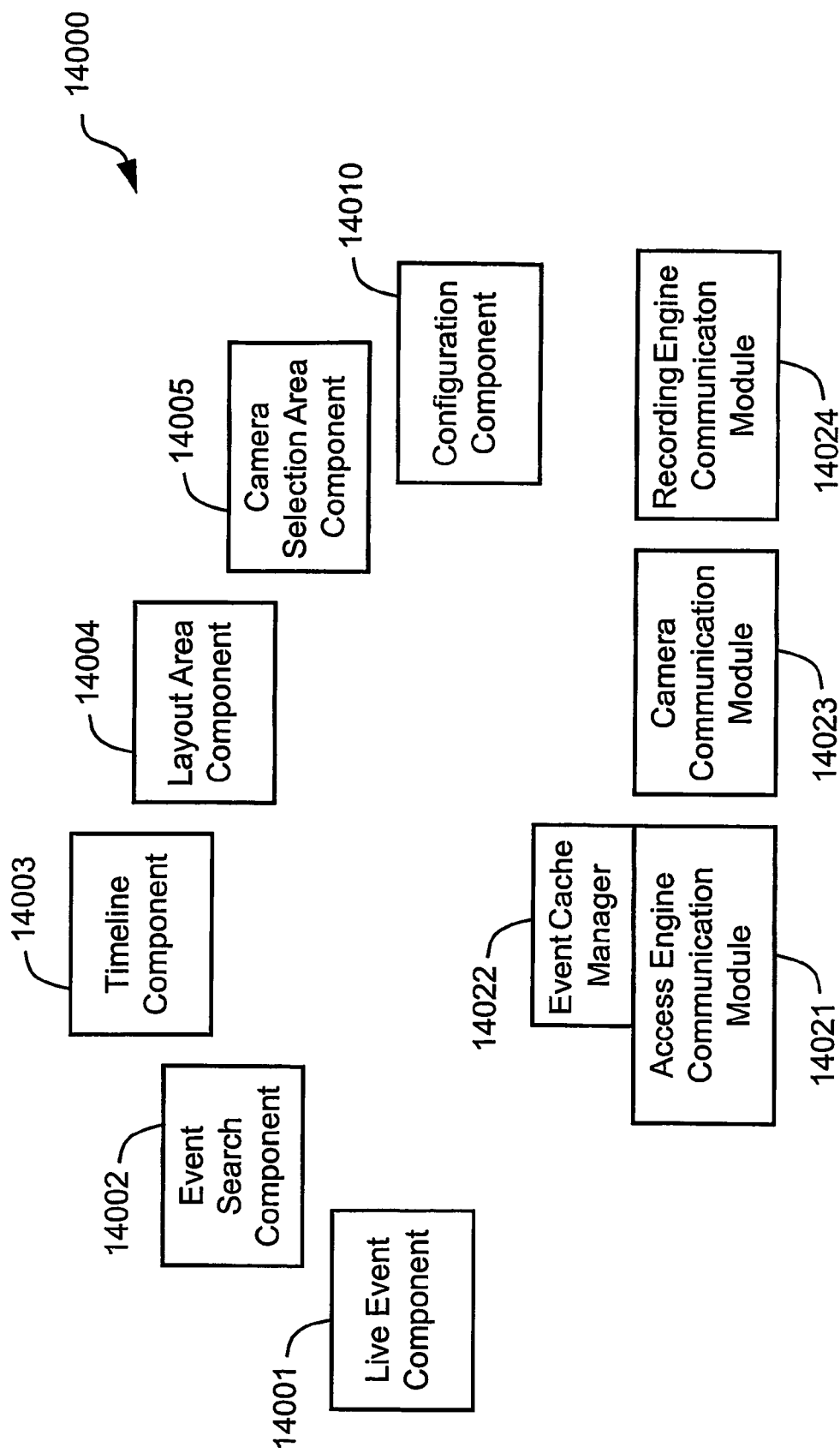
FIG. 116 shows software components of the viewer.

FIG. 116 shows the major software components of the viewer 2200. The recording engine communication module 14024 performs communication with the recording engine 201. This allows for the reading and writing of configuration information and other information using the recording engine protocol as described above (for example, using the NVR_AdminSet, RE_Trigger, RE_Set, NVR_UserGet command etc).

The camera communication module 14023 is responsible for communication with camera servers 109-111. The camera communication module 14023 allows for interrogating camera servers 109-111 for settings stored in the camera servers 109-111, receiving video streams, monitoring event notifications from camera servers and controlling pan, tilt and zoom of cameras 112-115. Certain functions performed by the configuration component 14010, for example, the control of the add camera server dialog 6700, the add schedule item dialog 7000 and the motion detection dialog 7100, access the camera communication module 14023.

The layout area component 14004 is responsible for the operation of the Layout Area 7605. This includes the operation of Video Windows (eg 7625, 8201, 8301) that are displayed in the Layout Area under the control of the Layout Area Component. These Video Windows utilise the Camera Communication Module 14023 to provide functionality including receiving a live video stream and allowing user control of Camera PTZ and external outputs. In addition the Layout Area Component 14004 provides for playback of recorded video from the Storage Server through the Access Engine Communication Module 14021.

The Live Event Component 14001 is responsible for the operation of the Live Events Log 7619. The Event Search Component 14002 is responsible for the operation of the Event Search Dialog 9200. The Timeline Component 14003 is responsible for the operation of the Timeline 7607. Each of these components (14001, 14002, 14003) utilise the Event Cache Manager 14022 to manage the retrieving of event data from the access engine 203 and storage of the event records in a cache to avoid unnecessary communication.

The Camera Selection Area Component 14005 is responsible for the operation of the Camera Selection Area 7603.

5.8 Event Handling in the Viewer

The event cache manager 14022 is a software component executed by the processor 2205 and is responsible for gathering and retaining event information. A separate event cache manager 14022 instance is created for each camera 112-115 known to the system 100. Internally the event cache manager 14022 delegates communication with the access engine 203 to the access engine communication module 14021.

For each Camera 112-115 that is associated with a particular storage server 2300, the live event component 14001 registers its interest with the Event Cache Manager 14022 in the event records which are stored on that storage server 2300. An interest is a defined time range for which the live event component 14001 is interested in knowing all events that were logged in that time range. The live event component 14001 is interested in events as they occur so it registers its interest in events from the current system time into the future (using the access engine protocol as described above). The live event component 14001 also registers a callback address with the event cache manager 14022. The callback is used to receive notification of events that fall in the live event component's range of interest.

The timeline component 14003 displays only event data for cameras 112-115 which are currently represented on the layout area. When a layout is loaded, the timeline component 14003 is directed to update the event data associated with the timeline component 14003. For each camera 112-115 which is represented on the layout area (and only if the camera 112-115 is associated with a storage server 2300), the timeline component 14003 registers its interest in events with the event cache manager 14022 which is associated with that camera 112-115. The timeline component 14003 also sets up a call-back address for the event cache manager 14022 to receive notification of events that fall in its range of interest. The timeline component 14003 registers an interest based on it's the range of time which is currently available in the timeline (that is, the full scrollable range typically one week).

The event search component 14002 is initialised and closed as required according to the user's direction, as described above. When the search button 9209 on the event search dialog 9200 is pressed, the event search component 14002 registers an interest in events with the event cache manager 14022 for every camera 112-115 in the set determined by the Location and Zone pull down controls 9203, 9205 (and only if the camera 112-115 is associated with a storage server 2300). For example, this set would include all of the cameras 112-115 associated with a specified Zone or, if "All Locations" is specified, this set includes all known cameras 112-115 in the system 100. The time range for the interests is determined by the values in the from and to controls 9207. The event search component 14002 also registers a call-back address for the event cache manager 14022 to use to notify it of events that fall in its range of interest.

As the timeline component 14003, the event search component 14002 and the live events component 14001 are all capable of registering interest in events, this set of components can be referred to as event-using components.

Figure 117:
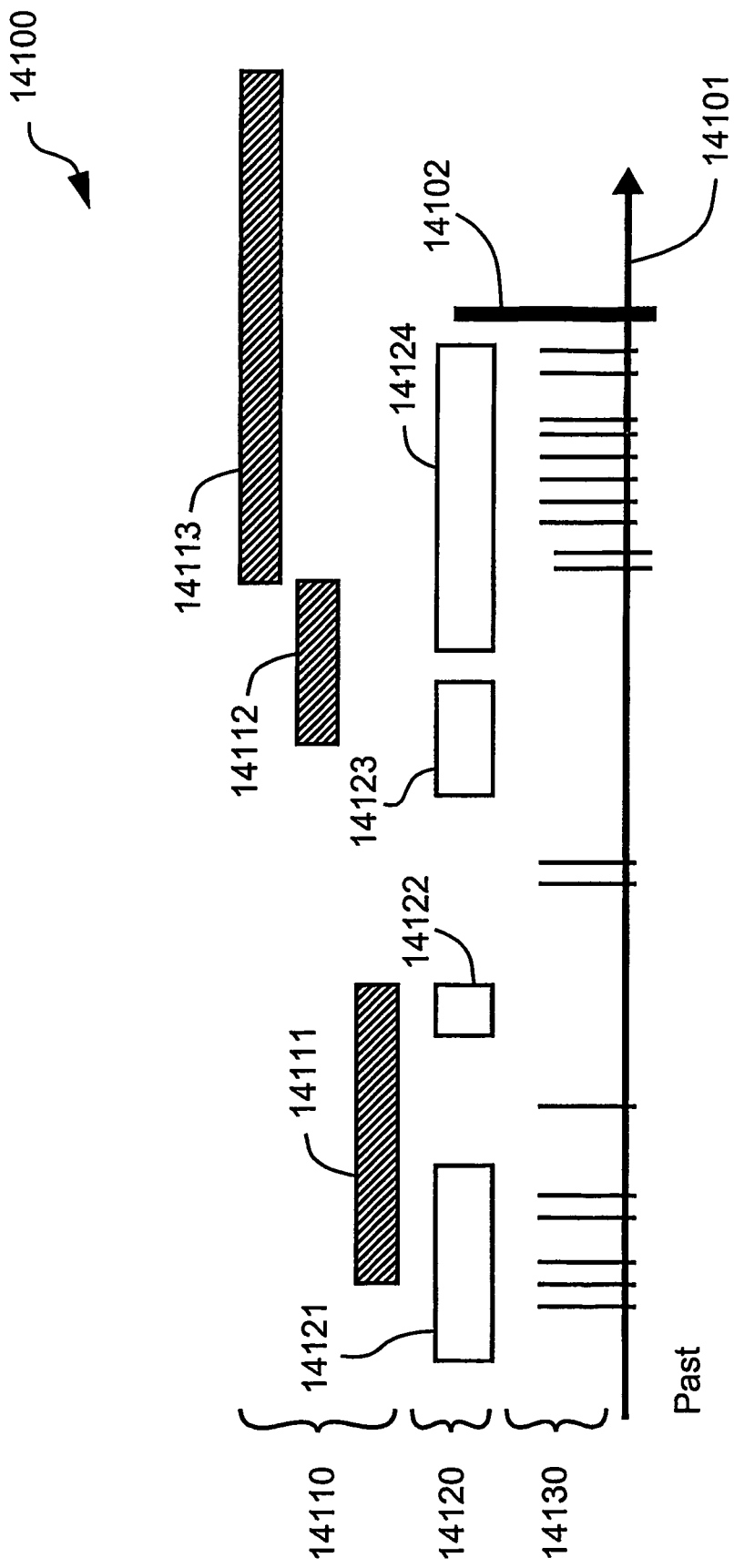
FIG. 117 is a graph showing the relationship between interests, known ranges and events associated with a particular camera.

FIG. 117 is a graph showing the relationship between interests, known ranges and events associated with a particular camera 112-115. The horizontal arrow 14101 represents the passage of time. The vertical line 14102 represents the current time, and positions to the right of this line represent times in the future and positions to the left of this line represent times in the past. A series of vertical lines 14130 mark events that have been logged by the recording engine 201.

Blocks at 14110 (including 14111, 14112, 14113) represent interests in events associated with a particular camera 112-115 for certain periods of time, which have been registered with the event cache manager 14022 by the event-using components. An interest can be implemented using the following data structure.

```
struct interest
{
    time_t          mi_begin; // beginning time of the
                              interest
    time_t          mi_end;   // ending time of the
                              interest (can be set to the special
value of −1 to represent the future)
    bool mi_complete;         // flag to indicate that the
                              interest has been fully
completed. That is, that all events within this time range for this
associated camera 112-115 are known to the event cache manager 14022.
}
```

Blocks at 14120 (including 14121, 14122, 14123, 14124) represent known ranges of events which the event cache manager has retrieved from the storage server 2300. A known range can be implemented using the following data structure.

```
struct known_range
{
    list<Events>    mk_events; // list of event data
    time_t          mk_begin;  // beginning time of range
    time_t          mk_end;    // end time of range
    bool            mk_complete; // flag to indicate that the
                                 known range has been
fully completed. That is, that all events within this time range for the
associated camera 112-115 are known to the event cache manager 14022.
}
```

The list of event data (mk_events in the above data structure) is the list of events which have a timestamp which falls in the time range (ie greater than or equal to mk_begin and less than mk_end).

The event cache manager 14022 maintains a container of interests (for example, corresponding to the set of interests 14110. The event cache manager 14022 also maintains a container of known_ranges called the event cache. The known events in the event cache are sorted so that the order of the event ranges in the container is based on the mk_begin time.

As described above, the event-using components register interests in the periods of time in which they are interested in receiving event data. For example the live event component 14001 may have an interest 14113 in events from a given time stretching into the future. Event search component 14002 in response to user actions may register an interest 14111 related to a time range in the past.

Considering the example of the event search component 14002 and the interest 14111: The event cache manager 14022 stores the interest 14111 on a container of interests. The interest 14111 is checked against events that are known to the event cache manager that fall in the time range of the registered interest. For each event that is found in the time range of interest, a callback is made to notify the event search component 14002 of the event. Next, the event cache is tested to see if the known ranges (14121, 14122, 14123 etc) form a complete coverage of the interest range (by determining whether there are portions of the range of interest not included in the set of known ranges). If there is complete coverage (that is, no gaps in time), then the interest range is marked as complete and a further callback to the event search component 14002 is made to notify the event search component 14002 that the event data for this interest is completed (i.e., all events in the time range of the interest have been notified to the event search component 14002).

In the example, the known event ranges 14121 and 14122 partially cover the time range of the interest 14111 so there is a gap in the known range that needs to be filled by the event cache manager 14022. Two separate tasks (typically implemented as separate threads) execute within the event cache manager 14022 and are responsible for event communication tasks using the access engine communication module 14021. The first task is responsible for initiating requests to the access engine 203 to retrieve event data for any events that are in interest time ranges but which are not in known ranges and are in the past (that is, not in the future). The second task is responsible for retrieving events that occur currently, that is where the end time lies in the future (ie the mi_end value has been set to the special value of −1).

An example has been given for the requesting of events by the event search component 14002. The operations when a request from any other event-using components (i.e., the live events component 14001 or the timeline component 14003) are substantially the same.

Considering the first event communication task discussed above: when a new interest is registered (that is added to the container on the event cache manager 14022), the task event communication task will search the list of interests in the event cache manager (as discussed above) and locate the first incomplete interest. From the incomplete interest, the task will search through the container of known ranges and locate the first gap in the known ranges that lies in the time range of the interest. For this reason the event cache maintains its known ranges in a sorted order with no overlapping periods of time.

Following the example of interest 14111 and the known ranges 14121, 14122 the event communication task will form a request on the access engine 203 for events in the range between 14121 and 14122. Additionally, a new known range structure is created and placed in the event cache. The begin time for the new known range is the end time of the previous event range or the begin time of the event interest. In this example, the begin time for the new known range is the end time of the previous event range 14121. The end time of the new event range is set equal to the begin time of the new known range.

The request for events includes the new event range and the camera 112-115 associated with the event cache manager 14022. This request is sent to the access engine 203 through the access engine communications module 14021 using the access engine protocol described in Appendix B (typically using a fetch event command). The access engine 203 responds with a series of EVENT_BLOB data transmissions. The access engine 203 sends its events in time order. These are parsed for event data. Received events are stored within a list of events in the new known range and the end time of the new known range is set to the time of the last received event. Also any interests that have been registered (for example, by the timeline component, event search component or live events component) that include the time of this event are notified of the event.

When the last event for the request has been received, the access engine sends an indicator that the request is complete (an end of stream blob). At this point, the event cache manager finalises the new known range by setting its end time to the end time of the request for events and marking it complete. At this point all interests in the event cache manager are checked and any that are completed by the completion of this new known range are marked as complete and notification callbacks made to let event-using components know that the event data they registered interest in is up to date.

Finally, when the new known range has been completed, the event cache manager searches the interests and known ranges for a new gap and begins another cycle of requesting event data.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather than sequentially.

The methods described above may alternatively be implemented in dedicated hardware such as one or more integrated circuits performing the functions or sub functions of described processes. Such dedicated hardware may include graphic processors, digital signal processors, or one or more microprocessors and associated memories.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

Appendix A: Format of the Blobs

The format of the blobs used in communication between the access engine 203 and the viewers 2200 is shown below.

| Image blob |
|---|
| struct AE_VideoBlob<br>{<br>    CNV_Time                   time;<br>    Image                       im;<br>} |

Each video blob contains a single jpeg image of the time specified in the time structure. The time structure is a year followed by a zero-based day number of the year (ie January first is day zero, February 2 is day 32), and the milliseconds into the day the frame was recorded.

| Event blob |
| --- |
| Struct event<br>{<br>    uint16                    num_events;<br>    struct event           events[];<br>}; |

The number of events is the number of events following the number. Each event is separated by a newline character.

| Start blob |
| --- |
| struct start<br>{<br>    uint32        connection_id;<br>} |

This is the first blob sent on a data connection. It contains the connection id of the data stream. The stream id of the blob is set to zero.

Keepalive Blob

This blob is sent to the client (ie viewer 2200) after a period of inactivity to prevent intermediary proxy servers closing the connection due to timeouts. If there is other activity on the connection (such as streaming video) then keepalive blobs are not sent. Such blobs should not be relied upon for timing by the client (ie viewer 2200). This blob type has no extra data.

| End Stream blob |
| --- |
| struct start<br>{<br>    uint32        stream_id;<br>} |

End stream blobs are sent when a stream has finished. This means the access engine 203 is ending the stream and the client (viewer 2200) will no longer receive blobs from this stream. All further requests to modify the ended stream will fail.

Close Stream Blob

Close stream blobs are sent as the last blob on a data connection. The client (viewer 2200) should close the connection once the viewer has received the close stream blob. This blob type has no extra data

| No video blobs |
| --- |
| struct no_video_blob<br>{<br>    CNV_Time        curr_time;<br>    CNV_Time        next_time;<br>} |

No video blobs are sent to the client (ie viewer 2200) instead of video blobs when there is video still to come but there currently is not any at the current time in the stream. These blobs are sent regularly during the no video period but not at the same rate as the video. The current time is the current time in the stream. This current time value can be used by the client (ie viewer 2200) to keep in sync with the access engine 203 during periods of missing video. The time till next frame is the time until the next frame in the stream is due to be sent.

Appendix B: Headers, Replies and Commands Used by Access Engine and Viewer

Headers

The following headers must be present in all or most of the requests sent by the client (ie viewer 2200) or replies sent by the server (ie access engine 203). Other headers may also be included for a particular command.

nvr-protocol-version: <version>

The version of the protocol the client (ie viewer 2200) or server (ie access engine 203) is using. Version is an integer that specifies version of the protocol. This document describes version 1. It must be included in all requests from the client (ie viewer 2200) and replies from the server (ie access engine 203).

nvr-client: <name>

The name of the client (ie viewer 2200). Name is a free form string much like the User-agent string used to describe browsers. It must be included in all requests from the client (ie viewer 2200).

nvr-client-version: <version>

The version of the client (ie viewer 2200). Version is a dotted decimal string of the form "1.2.3". It must be included in all requests from the client (ie viewer 2200).

nvr-server: <name>

The name of the server (ie access engine 203). Name is a free form string much like the Server string in web server replies, and must be included in all replies from the server (ie access engine 203).

nvr-server-version: <version>

The version of the server. Version is a dotted decimal string of the form "1.2.3", and must be included in all replies from the server (ie access engine 203).

nvr-connection-id: <id>

This is the connection id of the current client (ie viewer 2200) connection, and must be sent in all requests from the client (ie viewer 2200) except for setup requests. Id is a 32 bit integer in decimal form.

Common Replies

Some replies are common across all or almost all commands. They are error messages that are not repeated below for all commands.

Internal Error

This indicates an error in the server (ie access engine 203) of unspecified origin. The server (ie access engine 203) may begin to perform erratically. This reply applies to all commands.

Not Setup

The client (ie viewer 2200) has not issued the setup command. The server (ie access engine 203) will respond to any command with this reply, excepting setup or reconnect, until the client (ie viewer 2200) calls setup or reconnect. The command that was being attempted has failed and no changes have been made to data connection if any exist.

Commands

Below is a list of commands sent by the client (ie viewer 2200) to the server (ie access engine 203) on the control connection 6005. Although they are described as commands they are actually parameters to a HTTP GET command fetching the canvas streaming server "file". For example the setup command is actually the following HTTP command (with minimal headers):

GET/webview-nvr/stream?command=setup HTTP/1.1

Host: <access server host> nvr-protocol-version: 1.0 nvr-client: operator interface nvr-client-version: 1.0

Connection: keep-alive

The replies are standard HTTP replies with any additional information in the data section of the reply. For example:

HTTP/1.0 200 OK nvr-protocol-version: 1.0 nvr-server: Access Engine nvr-server-version: 1.0

Connection: keep-alive

Keep-alive: timeout=20, max=0

Content-type: text/text

Connection-id=1234

Num-Data-connections=2

Data-connection-ids=2345, 3456

Each command lists the command text to be put in the URL, any other parameters and the possible replies.

Setup

This is the first command sent to the server (ie access engine 203) by a client (ie viewer 2200) once the viewer 2200 has connected. Any other command sent before this one will generate an error from the server (ie access engine 203). Setup is not complete until the client (ie viewer 2200) has established the number of data connections indicated in the setup reply.

Command: setup

Parameters: none

Replies:

OK

The first part of the setup successfully completed. Until the client (ie viewer 2200) has completed data connections then the setup procedure is not finished. The data in this reply has the following fields:

Connection-id

This specifies the command connection id of the command connection

Data-connection-id

The ids of the data connections

Num-data-connections

The number of data the client (ie viewer 2200) is required to open to the server (ie access engine 203). In this version of the protocol this is always one.

OK Already Setup

The client (ie viewer 2200) is already setup. The data connections are still valid. There is no data with this reply.

Shutdown

This command is used to shutdown the client's (ie viewer 2200) connections to the server (ie access engine 203). All data streams are closed and all server (ie access engine 203) resources are freed. Once this command is complete the viewer must close the connection. The client (ie viewer 2200) should not close the data connections until a close blob has been received.

Command: shutdown

Parameters:

Connection-id

The command connection id given to client (ie viewer 2200) in the setup response.

Replies:

OK

The shutdown was successfully completed. The client (ie viewer 2200) should expect close blobs on the data connections. No new data will be sent by the server (ie access engine 203) but there way be a delay while data in output buffers is sent.

Fetch Video

This command is used to start the streaming of video data from the server (ie access engine 203). The client (ie viewer 2200) can request that the server (ie access engine 203) transfer the video as quickly as possible or stream it at viewing speed. The server (ie access engine 203) will decide which connection the video stream will arrive through.

Command: video

Parameters:

Connection-id

The command connection id given to the client (ie viewer 2200) in the setup response. This parameter is required.

Frame_rate

The desired frame rate of the requested video. If this is higher than the available frame rate the streaming will still start and the client (ie viewer 2200) will be informed of this either in the command connection response or in the data connection before the first video frame. This value is a value between 0.1 and 25 (for PAL recording systems) or 30 (for NTSC recording systems).

Play_rate

The playrate is the perceived rate at which the viewer wants to view the video. The value is a ratio over 100, so 100 is normal playrate, 200 is double speed, 25 is ¼ speed. To play backwards set the playrate to a negative number. Parameter is optional.

Camera-id

The id of the camera from which the video was generated.

No-skip

A Boolean flag telling the server (ie access engine 203) to stream all frame in the video rather than skipping frames due to network congestion. This flag is implied if transfer is set and the setting is always true if transfer is set regardless of the value set in the URL. Note, not all servers support skipping frames.

Transfer

A Boolean flag telling the server (ie access engine 203) this stream is a transfer stream. This has two affects. Firstly it sets the no-skip flag so that all frames are transmitted regardless of network congestion and secondly it means the server (ie access engine 203) will attempt to send the video as fast as possible rather than in real time. The server (ie access engine 203) may still choose to throttle the bandwidth used by transfers to prevent them from starving real time video transfers of network bandwidth.

Time-Range

This is either the time range of the video to be retrieved or the special value "live". If live is set then a live feed from the camera is provided at approximately the frame rate specified. Live requests ignore the transfer and no-skip options. The time range format is:

Yyyymmdd_hhmmss[uuu][_yyyymmdd_hhmmss[uuu]]

IE 4 digit year, two digit month, two digit day, underscore, two digit hour (24 hour time UTC), 2 digit minute, optional three digit milliseconds, optional underscore followed by the optional end time in the same format as the start time. If there is no end time then there must be no trailing underscore. If there is no end time then the time is assumed to be a continuous request.

Replies

OK

The request was successful. Video will start arriving on the specified data connection in the specified stream. This reply has the following fields.

Connection-id

The data connection on which the video will be sent. This field will always be in the command reply.

Stream-id

The stream id of the video stream. This field will always be in the command reply.

No Such Camera

The requested camera doesn't exist. No video will be streamed.

Fetch Frame

This command fetches a single frame from the server (ie access engine 203) given a frame sequence number, camera and a position specifier (next, current or previous). This allows a client (ie viewer 2200) to single step through a section of video frame by frame either forwards or backwards.

Command: frame

Parameters:

Connection-id

The command connection id assigned to the client (ie viewer 2200) by the setup command.

Camera-id

The id of the camera that generated the frame.

Seq-num

The sequence number of the reference frame.

Position

One of "current", "next" or "previous" which refers to the frame to retrieve relative to the seq-num. "Current" means get the closest frame to the given seq-num. If there are two closest frames then the most recent one is returned. "next" will return the next frame after the given sequence number and "previous" will return the previous frame before the given sequence number.

Replies:

OK

The request was successful. The frame will arrive on the returned connection id, in the returned stream. This reply has the following fields:

Connection-id

The connection id that the frame will arrive on. This will be one of the data connections that the client (ie viewer 2200) has open. This field will always be in the command reply.

Stream-id

The stream id that the frame will arrive in. This field will be in the command reply.

No video

The request failed because there is no frame available. This may happen if the next frame after the last frame in a video is requested for instance.

No such camera

The requested camera doesn't exist.

Fetch Event

This command requests event data in a given time range from the server (ie access engine 203). It can also have an option parameter of either location, zone or camera.

Command: event

Parameters:

Connection-id

The command connection id assigned to the client (ie viewer 2200) by the setup command.

Time-Range

The time range in which the event occurred. This is of the same format as the video request. This parameter is required.

Camera

Return events related to this camera. This parameter is required.

Reply:

OK

The request was successful. The event data will start arriving on the returned data connection and stream. This reply has the following fields:

Connection-id

The connection id of the connection that the event data will be arriving on. This will be one of the data connections that the client (ie viewer 2200) has opened. This field will always be in the command reply.

Stream-id

The stream id that the event data will be arriving in. This field will always be in the command reply.

No such camera

The specified camera doesn't exist.

Too much data

The server (ie access engine 203) is unable to complete the request as there is too much event data to send. The client (ie viewer 2200) should request a small time range and complete the request in multiple smaller chunks.

No events in range

No event data is within the specified query.

Pause Stream

This command pauses an inprogress stream. It is applicable to both video and events. The stream can be resumed at a later by calling the resume on the stream Command: pause Parameters:
   Connection-id
      The command connection id assigned to the client (ie viewer 2200) by the setup command. This is not the connection id of the data connection that contains the stream to be paused.
   Stream-id
      The stream id of the video or event stream to be paused.

Reply:

OK

The command completed successfully. The stream will be paused in the near future. Some blobs may still be received from the Access Engine 203 due to network buffering.

No such stream

The stream specified does not exist.

Resume Stream

This command resumes a previously paused stream. The stream will continue exactly where it was paused.

Command: resume

Parameters:
   Connection-id
      The command connection id assigned to the client (ie viewer 2200) by the setup command. This is not the connection id of the connection that contains the stream to be resumed.

Reply

OK

The command completed successfully. The stream will be resumed on the data.

No such stream

The stream specified doesn't exist.

Next Frame

Request the next frame in a paused stream. If the stream is not already paused then it is first paused and then the next frame (s) is sent. In this case the frame that is sent is indeterminate due to network latency and buffering. It is guaranteed that all frames will be sent in order and only once is this case.

Command: next

Parameters:
   Connection-id
      The command connection id assigned to the client (ie viewer 2200) by the setup command. This is not the connection id of the connection that contains the stream you wish to retrieve the frame from.
   Stream-id
      The stream id of the stream you wish to retrieve the frame from.

Reply

OK

The command completed successfully. One frame will be sent to the client (ie viewer 2200) on the data connection.

No such stream

The stream specified does not exist.

Prev Frame

Request the previous frame in a paused stream. If the stream is not already paused then it is first paused and then the previous frame is sent. In this case the frame that is sent is indeterminate due to network latency and buffering. It is guaranteed that all frames will be sent in order and only once in this case.

Command: prev

Parameters:
   Connection-id
      The command connection id assigned to the client (ie viewer 2200) by the setup command. This is not the connection id of the connection that contains the stream you wish to retrieve the frame from.
   Stream-id
      The stream id of the stream you wish to retrieve the frame from.

Reply:

OK

The command completed successfully. One frame will be sent to the client (ie viewer 2200) on the data connection.

Modify Video Stream

This command modifies the frame rate of the specified video stream. The actual frame rate streamed may be different to the specified frame rate.

Command: modify

Parameters:
   Connection-id
      The command connection id assigned to the client (ie viewer 2200) by the setup command. This is not the connection id of the connection that contains the stream you wish to modify.
   Stream-id
      The stream id of the video stream that is to be modified. This must be a video stream.
   Frame_rate
      The frame rate the stream should be changed to. This can be an absolute value (ie 20) or a relative value (ie −2). Any value starting with a plus or minus sign is a relative value. The frame rate cannot be raised above what the server (ie access engine 203) has available.

Range

Change the range of the request. This will cause the stream to restart at the beginning of the range.

Play_rate

Change the playrate of the stream. This has the same effect as setting the playrate when the stream is first requested. The position of the video stream does not change.

Transfer

Sets or clears the transfer flag for the video. This has the same effect as setting it when the stream is requested.

Reply

OK

The command completed successfully. Once this reply has been received all frames after that point are at the new frame rate.

No Such Stream

The specified stream does not exist or is not being sent to this client (ie viewer 2200).

Not a Video Stream

The specified stream is not a video stream.

Stop Stream

This command stops any stream currently being sent to the client (ie viewer 2200). This includes none video streams such as event requests.

Command: stop

Parameters:
 Connection-id
  The command connection id assigned to the client (ie viewer 2200) by the setup command. This is not the connection id of the connection that contains the stream that is to be stopped.
 Stream-id
  The stream-id to be stopped.

Replies:

OK

The command completed successfully. The stream will be stopped. A close blob will be sent via the stream to indicate the last blob in the stream. Once the client (ie viewer 2200) has received this blob the stream-id is no longer valid.

No Such Stream

The specified stream does not exist or is not being sent to this client (ie viewer 2200).

Keep Alive

This command is a no-op command that must be sent by the client (ie viewer 2200) to the server (ie access engine 203) on a regular basis to ensure that the connection is not closed. It is only required if the client (ie viewer 2200) is not sending any other data on the command connection.

Command: keepalive

Parameters: none

Replies

OK

This command cannot fail. No blobs are sent to any data connection.

Initiating a Data Connection

Once the client (ie viewer 2200) has made a command connection and issued a setup command, the client (ie viewer 2200) is required to make one or more data connection to the server (ie access engine 203). This is done in the same way as issuing a command to the server (ie access engine 203) with only one parameter, that is, the connection id of the data connection. ie

---

GET
 /canvas/access_engine/stream?command=data&connection_id=2345&command_connection=1234 HTTP/1.0

---

Host: <access server host>

Canvas-protocol-version: 1.0

Canvas-client: operator interface

Canvas-client-version: 1.0

Connection: keep-alive

The possible replies to this are:

OK

The data connection is now ready. The server (ie access engine 203) will specify chunked-encoding and the HTTP response will not end.

Invalid Data Connection id

The connection id given has either not been assigned, has not been assigned to the given command id or is not a data connection.

Invalid Command Connection id

The command connection id given is not a valid command connection id or it is not associated with that data connection.

Too Many Data Connections

The given command connection already has the required number of data connections.

Once an OK response has been received data will arrived in the above format using HTTP chunked encoding. The client should not assume that an entire blob is contained in a singe chunk nor should it assume that each chunk contains only a single blob.

Appendix B: Format of the Blobs

The format of the blobs used in communication between the access engine 203 and the viewers 2200 is shown below.

---

Image blob

```
struct AE_VideoBlob
{
    CNV_Time        time;
    Image           im;
}
```

---

Each video blob contains a single jpeg image of the time specified in the time structure. The time structure is a year followed by a zero-based day number of the year (ie January first is day zero, February 2 is day 32), and the milliseconds into the day the frame was recorded.

```
                    Event blob
    Struct event
    {
        uint16              num_events;
        struct event        events[];
    };
```

The number of events is the number of events following the number. Each event is separated by a newline character.

```
                    Start blob
    struct start
    {
        uint32      connection_id;
    }
```

This is the first blob sent on a data connection. It contains the connection id of the data stream. The stream id of the blob is set to zero.

Keepalive Blob

This blob is sent to the client (ie viewer 2200) after a period of inactivity to prevent intermediary proxy servers closing the connection due to timeouts. If there is other activity on the connection (such as streaming video) then keepalive blobs are not sent. Such blobs should not be relied upon for timing by the client (ie viewer 2200). This blob type has no extra data.

```
                    End Stream blob
    struct start
    {
        uint32      stream_id;
    }
```

End stream blobs are sent when a stream has finished. This means the access engine 203 is ending the stream and the client (viewer 2200) will no longer receive blobs from this stream. All further requests to modify the ended stream will fail.

Close Stream Blob

Close stream blobs are sent as the last blob on a data connection. The client (viewer 2200) should close the connection once the viewer has received the close stream blob. This blob type has no extra data

```
                    No video blobs
    struct no_video_blob
    {
        CNV_Time            curr_time;
        CNV_Time            next_time;
    }
```

No video blobs are sent to the client (ie viewer 2200) instead of video blobs when there is video still to come but there currently is not any at the current time in the stream. These blobs are sent regularly during the no video period but not at the same rate as the video. The current time is the current time in the stream. This current time value can be used by the client (ie viewer 2200) to keep in sync with the access engine 203 during periods of missing video. The time till next frame is the time until the next frame in the stream is due to be sent.

Appendix C: Headers, Replies and Commands used by Access Engine and Viewer

Headers

The following headers must be present in all or most of the requests sent by the client (ie viewer 2200) or replies sent by the server (ie access engine 203). Other headers may also be included for a particular command.

nvr-protocol-version: <version>

The version of the protocol the client (ie viewer 2200) or server (ie access engine 203) is using. Version is an integer that specifies version of the protocol. This document describes version 1. It must be included in all requests from the client (ie viewer 2200) and replies from the server (ie access engine 203).

nvr-client: <name>

The name of the client (ie viewer 2200). Name is a free form string much like the User-agent string used to describe browsers. It must be included in all requests from the client (ie viewer 2200).

nvr-client-version: <version>

The version of the client (ie viewer 2200). Version is a dotted decimal string of the form "1.2.3". It must be included in all requests from the client (ie viewer 2200).

nvr-server: <name>

The name of the server (ie access engine 203). Name is a free form string much like the Server string in web server replies, and must be included in all replies from the server (ie access engine 203).

nvr-server-version: <version>

The version of the server. Version is a dotted decimal string of the form "1.2.3", and must be included in all replies from the server (ie access engine 203).

nvr-connection-id: <id>

This is the connection id of the current client (ie viewer 2200) connection, and must be sent in all requests from the client (ie viewer 2200) except for setup requests. Id is a 32 bit integer in decimal form.

Common Replies

Some replies are common across all or almost all commands. They are error messages that are not repeated below for all commands.

Internal Error

This indicates an error in the server (ie access engine 203) of unspecified origin. The server (ie access engine 203) may begin to perform erratically. This reply applies to all commands.

Not Setup

The client (ie viewer 2200) has not issued the setup command. The server (ie access engine 203) will respond to any command with this reply, excepting setup or reconnect, until the client (ie viewer 2200) calls setup or reconnect. The command that was being attempted has failed and no changes have been made to data connection if any exist.

Commands

Below is a list of commands sent by the client (ie viewer 2200) to the server (ie access engine 203) on the control connection 6005. Although they are described as commands they are actually parameters to a HTTP GET command fetching the canvas streaming server "file". For example the setup command is actually the following HTTP command (with minimal headers):

GET/webview-nvr/stream?command=setup HTTP/1.1

Host: <access server host> nvr-protocol-version: 1.0 nvr-client: operator interface nvr-client-version: 1.0

Connection: keep-alive

The replies are standard HTTP replies with any additional information in the data section of the reply. For example:

HTTP/1.0 200 OK nvr-protocol-version: 1.0 nvr-server: Access Engine nvr-server-version: 1.0

Connection: keep-alive

Keep-alive: timeout=20, max=0

Content-type: text/text

Connection-id=1234

Num-Data-connections=2

Data-connection-ids=2345, 3456

Each command lists the command text to be put in the URL, any other parameters and the possible replies.

Setup

This is the first command sent to the server (ie access engine 203) by a client (ie viewer 2200) once the viewer 2200 has connected. Any other command sent before this one will generate an error from the server (ie access engine 203). Setup is not complete until the client (ie viewer 2200) has established the number of data connections indicated in the setup reply.

Command: setup

Parameters: none

Replies:

OK

The first part of the setup successfully completed. Until the client (ie viewer 2200) has completed data connections then the setup procedure is not finished. The data in this reply has the following fields:

Connection-id
   This specifies the command connection id of the command connection
Data-connection-id
   The ids of the data connections
Num-data-connections
   The number of data the client (ie viewer 2200) is required to open to the server (ie access engine 203). In this version of the protocol this is always one.

OK Already Setup

The client (ie viewer 2200) is already setup. The data connections are still valid. There is no data with this reply.

Shutdown

This command is used to shutdown the client's (ie viewer 2200) connections to the server (ie access engine 203). All data streams are closed and all server (ie access engine 203) resources are freed. Once this command is complete the viewer must close the connection. The client (ie viewer 2200) should not close the data connections until a close blob has been received.

Command: shutdown

Parameters:

Connection-id
   The command connection id given to client (ie viewer 2200) in the setup response.

Replies:

OK

The shutdown was successfully completed. The client (ie viewer 2200) should expect close blobs on the data connections. No new data will be sent by the server (ie access engine 203) but there way be a delay while data in output buffers is sent.

Fetch Video

This command is used to start the streaming of video data from the server (ie access engine 203). The client (ie viewer 2200) can request that the server (ie access engine 203) transfer the video as quickly as possible or stream it at viewing speed. The server (ie access engine 203) will decide which connection the video stream will arrive through.

Command: video

Parameters:

Connection-id
   The command connection id given to the client (ie viewer 2200) in the setup response. This parameter is required.

Frame_rate
   The desired frame rate of the requested video. If this is higher than the available frame rate the streaming will still start and the client (ie viewer 2200) will be informed of this either in the command connection response or in the data connection before the first video frame. This value is a value between 0.1 and 25 (for PAL recording systems) or 30 (for NTSC recording systems).

Play_rate
   The playrate is the perceived rate at which the viewer wants to view the video. The value is a ratio over 100, so 100 is normal playrate, 200 is double speed, 25 is ¼ speed. To play backwards set the playrate to a negative number. Parameter is optional.

Camera-id
The id of the camera from which the video was generated.

No-Skip
A Boolean flag telling the server (ie access engine 203) to stream all frame in the video rather than skipping frames due to network congestion. This flag is implied if transfer is set and the setting is always true if transfer is set regardless of the value set in the URL. Note, not all servers support skipping frames.

Transfer
A Boolean flag telling the server (ie access engine 203) this stream is a transfer stream. This has two affects. Firstly it sets the no-skip flag so that all frames are transmitted regardless of network congestion and secondly it means the server (ie access engine 203) will attempt to send the video as fast as possible rather than in real time. The server (ie access engine 203) may still choose to throttle the bandwidth used by transfers to prevent them from starving real time video transfers of network bandwidth.

Time-Range
This is either the time range of the video to be retrieved or the special value "live". If live is set then a live feed from the camera is provided at approximately the frame rate specified. Live requests ignore the transfer and no-skip options. The time range format is:

Yyyymmdd_hhmmss[uuu][_ymmdd_hhmmss[uuu]]

IE 4 digit year, two digit month, two digit day, underscore, two digit hour (24 hour time UTC), 2 digit minute, optional three digit milliseconds, optional underscore followed by the optional end time in the same format as the start time. If there is no end time then there must be no trailing underscore. If there is no end time then the time is assumed to be a continuous request.

Replies

OK

The request was successful. Video will start arriving on the specified data connection in the specified stream. This reply has the following fields.
  Connection-id
  The data connection on which the video will be sent. This field will always be in the command reply.
  Stream-id
  The stream id of the video stream. This field will always be in the command reply.

No such camera

The requested camera doesn't exist. No video will be streamed.

Fetch Frame

This command fetches a single frame from the server (ie access engine 203) given a frame sequence number, camera and a position specifier (next, current or previous). This allows a client (ie viewer 2200) to single step through a section of video frame by frame either forwards or backwards.

Command: frame

Parameters:
  Connection-id
  The command connection id assigned to the client (ie viewer 2200) by the setup command.
  Camera-id
  The id of the camera that generated the frame.
  Seq-num
  The sequence number of the reference frame.
  Position
  One of "current", "next" or "previous" which refers to the frame to retrieve relative to the seq-num. "Current" means get the closest frame to the given seq-num. If there are two closest frames then the most recent one is returned. "next" will return the next frame after the given sequence number and "previous" will return the previous frame before the given sequence number.

Replies:

OK

The request was successful. The frame will arrive on the returned connection id, in the returned stream. This reply has the following fields:
  Connection-id
  The connection id that the frame will arrive on. This will be one of the data connections that the client (ie viewer 2200) has open. This field will always be in the command reply.
  Stream-id
  The stream id that the frame will arrive in. This field will be in the command reply.

No Video

The request failed because there is no frame available. This may happen if the next frame after the last frame in a video is requested for instance.

No such camera

The requested camera doesn't exist.

Fetch Event

This command requests event data in a given time range from the server (ie access engine 203). It can also have an option parameter of either location, zone or camera.

Command: event
  Parameters:
  Connection-id
  The command connection id assigned to the client (ie viewer 2200) by the setup command.
  Time-range
  The time range in which the event occurred. This is of the same format as the video request. This parameter is required.
  Camera
  Return events related to this camera. This parameter is required.

Reply:

OK

The request was successful. The event data will start arriving on the returned data connection and stream. This reply has the following fields:
  Connection-id
  The connection id of the connection that the event data will be arriving on. This will be one of the data connections that the client (ie viewer 2200) has opened. This field will always be in the command reply.
  Stream-id
  The stream id that the event data will be arriving in. This field will always be in the command reply.

No such camera

The specified camera doesn't exist.

Too much data

The server (ie access engine 203) is unable to complete the request as there is too much event data to send. The client (ie viewer 2200) should request a small time range and complete the request in multiple smaller chunks.

No events in range

No event data is within the specified query.

Pause Stream

This command pauses an inprogress stream. It is applicable to both video and events. The stream can be resumed at a later by calling the resume on the stream Command: pause Parameters:
   Connection-id
      The command connection id assigned to the client (ie viewer 2200) by the setup command. This is not the connection id of the data connection that contains the stream to be paused.
   Stream-id
      The stream id of the video or event stream to be paused.

Reply:

OK

The command completed successfully. The stream will be paused in the near future. Some blobs may still be received from the Access Engine 203 due to network buffering.

No such stream
   The stream specified does not exist.

Resume Stream

This command resumes a previously paused stream. The stream will continue exactly where it was paused.

Command: resume
   Parameters:
   Connection-id
      The command connection id assigned to the client (ie viewer 2200) by the setup command. This is not the connection id of the connection that contains the stream to be resumed.

Reply

OK

The command completed successfully. The stream will be resumed on the data.

No such stream

The stream specified doesn't exist.

Next frame

Request the next frame in a paused stream. If the stream is not already paused then it is first paused and then the next frame(s) is sent. In this case the frame that is sent is indeterminate due to network latency and buffering. It is guaranteed that all frames will be sent in order and only once is this case.

Command: next

Parameters:
   Connection-id
      The command connection id assigned to the client (ie viewer 2200) by the setup command. This is not the connection id of the connection that contains the stream you wish to retrieve the frame from.
   Stream-id
      The stream id of the stream you wish to retrieve the frame from.

Reply

OK

The command completed successfully. One frame will be sent to the client (ie viewer 2200) on the data connection.

No such stream

The stream specified does not exist.

Prev Frame

Request the previous frame in a paused stream. If the stream is not already paused then it is first paused and then the previous frame is sent. In this case the frame that is sent is indeterminate due to network latency and buffering. It is guaranteed that all frames will be sent in order and only once in this case.

Command: prev

Parameters:
   Connection-id
      The command connection id assigned to the client (ie viewer 2200) by the setup command. This is not the connection id of the connection that contains the stream you wish to retrieve the frame from.
   Stream-id
      The stream id of the stream you wish to retrieve the frame from.

Reply:

OK

The command completed successfully. One frame will be sent to the client (ie viewer 2200) on the data connection.

Modify Video Stream

This command modifies the frame rate of the specified video stream. The actual frame rate streamed may be different to the specified frame rate.

Command: modify

Parameters:
   Connection-id
      The command connection id assigned to the client (ie viewer 2200) by the setup command. This is not the connection id of the connection that contains the stream you wish to modify.
   Stream-id
      The stream id of the video stream that is to be modified. This must be a video stream.
   Frame_rate
      The frame rate the stream should be changed to. This can be an absolute value (ie 20) or a relative value (ie $-2$). Any value starting with a plus or minus sign is a relative value. The frame rate cannot be raised above what the server (ie access engine 203) has available.

Range

Change the range of the request. This will cause the stream to restart at the beginning of the range.

Play_rate

Change the playrate of the stream. This has the same effect as setting the playrate when the stream is first requested. The position of the video stream does not change.

Transfer

Sets or clears the transfer flag for the video. This has the same effect as setting it when the stream is requested.

Reply

OK

The command completed successfully. Once this reply has been received all frames after that point are at the new frame rate.

No such stream

The specified stream does not exist or is not being sent to this client (ie viewer 2200).

Not a video stream

The specified stream is not a video stream.

Stop Stream

This command stops any stream currently being sent to the client (ie viewer 2200). This includes none video streams such as event requests.

Command: stop

Parameters:
  Connection-id
    The command connection id assigned to the client (ie viewer 2200) by the setup command. This is not the connection id of the connection that contains the stream that is to be stopped.
  Stream-id
    The stream-id to be stopped.

Replies:

OK

The command completed successfully. The stream will be stopped. A close blob will be sent via the stream to indicate the last blob in the stream. Once the client (ie viewer 2200) has received this blob the stream-id is no longer valid.

No such Stream

The specified stream does not exist or is not being sent to this client (ie viewer 2200).

Keep Alive

This command is a no-op command that must be sent by the client (ie viewer 2200) to the server (ie access engine 203) on a regular basis to ensure that the connection is not closed. It is only required if the client (ie viewer 2200) is not sending any other data on the command connection.

Command: keepalive

Parameters: none

Replies

OK

This command cannot fail. No blobs are sent to any data connection.

Initiating a Data Connection

Once the client (ie viewer 2200) has made a command connection and issued a setup command, the client (ie viewer 2200) is required to make one or more data connection to the server (ie access engine 203). This is done in the same way as issuing a command to the server (ie access engine 203) with only one parameter, that is, the connection id of the data connection. ie

```
GET
    /canvas/access_engine/stream?command=data&connection_
    id=2345&command_connection=1234 HTTP/1.0
```

Host: <access server host>

Canvas-protocol-version: 1.0

Canvas-client: operator interface

Canvas-client-version: 1.0

Connection: keep-alive

The possible replies to this are:

OK

The data connection is now ready. The server (ie access engine 203) will specify chunked-encoding and the HTTP response will not end.

Invalid data connection id

The connection id given has either not been assigned, has not been assigned to the given command id or is not a data connection.

Invalid command connection id

The command connection id given is not a valid command connection id or it is not associated with that data connection.

Too many data connections

The given command connection already has the required number of data connections.

Once an OK response has been received data will arrived in the above format using HTTP chunked encoding. The client should not assume that an entire blob is contained in a singe chunk nor should it assume that each chunk contains only a single blob.

The claims defining the invention are as follows:

1. A method of transmitting a plurality of sequential images captured by an image capture device for display by a display device at a transmission rate, said method comprising the steps of:
   reading a first image in a sequence of images captured by said image capture device, said first image having first time information;
   reading a second image in the sequence, said second image having second time information; and
   transmitting said first and second images to said display device for display, wherein at least one predetermined frame is transmitted to said display device if a difference between the first time information and the second time information is greater than a predetermined threshold,
   wherein said at least one predetermined frame indicates that images are not available between said first and second images, said at least one predetermined frame comprises first temporal information about a current time and second temporal information for the second frame to be transmitted, and said at least one predetermined frame is transmitted at a lower rate than the transmission rate.

2. A method according to claim 1, wherein said at least one predetermined frame is used to synchronize said plurality of sequential images.

3. Apparatus for transmitting a plurality of sequential images captured by an image capture device for display by a display device at a transmission rate, said apparatus comprising:

means for reading a first image in a sequence of images captured by said image capture device, said first image having first time information;

means for reading a second image in the sequence, said second image having second time information; and means for transmitting said first and second images to said display device for display, wherein at least one predetermined frame is transmitted to said display device if a difference between the first time information and the second information is greater than a predetermined threshold, wherein said at least one predetermined frame indicates that images are not available between said first and second images, said at least one predetermined frame comprises first temporal information about a current time and second temporal information for the second frame to be transmitted, and said at least one predetermined frame is transmitted at a lower rate than the transmission rate.

4. A computer readable medium having a computer program recorded thereon, said computer program being configured to make a computer device execute a procedure to transmit a plurality of sequential images captured by an image capture device for display by a display device at a transmission rate, said program comprising:

code for reading a first image in a sequence of images captured by said image capture device, said first image having first time information;

code for reading a second image in the sequence, said second image having second time information; and code for transmitting said first and second images to said display device for display, wherein at least one predetermined frame is transmitted to said display device if a difference between the first time information and the second time information is greater than a predetermined threshold, wherein said at least one predetermined frame indicates that images are not available between said first and second images, said at least one predetermined frame comprises first temporal information about a current time and second temporal information for the second frame to be transmitted, and said at least one predetermined frame is transmitted at a lower rate than the transmission rate.

* * * * *